(12) United States Patent
Dascola et al.

(10) Patent No.: US 11,402,968 B2
(45) Date of Patent: Aug. 2, 2022

(54) REDUCED SIZE USER IN INTERFACE

(71) Applicant: Apple Inc., Cupertino, CA (US)

(72) Inventors: Jonathan R. Dascola, San Francisco, CA (US); Christopher Patrick Foss, San Francisco, CA (US); Lawrence Y Yang, Bellevue, WA (US); Alan C. Dye, San Francisco, CA (US); David Chance Graham, Campbell, CA (US); Jonathan P. Ive, San Jose, CA (US); Kevin Lynch, Woodside, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/775,528

(22) Filed: Jan. 29, 2020

(65) Prior Publication Data

US 2020/0167047 A1 May 28, 2020

Related U.S. Application Data

(63) Continuation of application No. 14/839,912, filed on Aug. 28, 2015, now abandoned.
(Continued)

(51) Int. Cl.
*G06F 3/0482* (2013.01)
*G06F 3/0484* (2022.01)
(Continued)

(52) U.S. Cl.
CPC ............ *G06F 3/0482* (2013.01); *G06F 3/017* (2013.01); *G06F 3/0362* (2013.01);
(Continued)

(58) Field of Classification Search
CPC ...... G06F 3/0482; G06F 3/0362; G06F 3/017; G06F 3/04842; G06F 3/04847; G06F 3/04845; G06F 3/0488; G06F 2203/04806
See application file for complete search history.

(56) References Cited

U.S. PATENT DOCUMENTS 4,358,837 A 11/1982 Yamazaki et al.
4,395,134 A 7/1983 Luce
(Continued)

FOREIGN PATENT DOCUMENTS

AU 2012200689 A1 3/2012
AU 2014100584 A4 7/2014
(Continued)

OTHER PUBLICATIONS

Askabouttech; How to Change Android Smartwatch Wallpaper; Jul. 12, 2014; Youtube; 5 Pages https://www.youtube.com/watch?v=SBYrsyuHqBA (Year: 2014).*
(Continued)

*Primary Examiner* — Jennifer N Welch
*Assistant Examiner* — Parmanand D Patel
(74) *Attorney, Agent, or Firm* — Dentons US LLP

(57) ABSTRACT

An electronic is disclosed. The electronic device includes a touch-sensitive display and a rotatable input mechanism. The touch-sensitive display includes one or more sensors to detect the intensity of contacts with the touch-sensitive display. The electronic device also includes one or more processors, memory, and one or more programs, the one or more programs including instructions for: receiving data representing a plurality of photos; displaying at least a first photo in the plurality of photos; detecting a contact that includes a characteristic intensity on the touch-sensitive display; and in accordance with a determination that the characteristic intensity is above the threshold intensity, displaying a user interface menu including at least one user interface object that represents an option to display the first photo as a background of a user interface that represents a clock face on the touch-sensitive display.

15 Claims, 51 Drawing Sheets

Related U.S. Application Data

(60) Provisional application No. 62/172,223, filed on Jun. 7, 2015, provisional application No. 62/129,754, filed on Mar. 6, 2015, provisional application No. 62/044,959, filed on Sep. 2, 2014.

(51) Int. Cl.
| | |
|---|---|
| *G06F 3/01* | (2006.01) |
| *G06F 3/0362* | (2013.01) |
| *G06F 3/0488* | (2022.01) |
| *G06F 3/04847* | (2022.01) |
| *G06F 3/04845* | (2022.01) |
| *G06F 3/04842* | (2022.01) |

(52) U.S. Cl.
CPC ........ *G06F 3/0488* (2013.01); *G06F 3/04842* (2013.01); *G06F 3/04845* (2013.01); *G06F 3/04847* (2013.01); *G06F 2203/04806* (2013.01)

(56) References Cited

U.S. PATENT DOCUMENTS

| | | | |
|---|---|---|---|
| 4,623,261 A | 11/1986 | Muto |
| 4,974,174 A | 11/1990 | Kleinman |
| 5,088,070 A | 2/1992 | Shift |
| 5,204,600 A | 4/1993 | Kahkoska |
| 5,220,260 A | 6/1993 | Schuler |
| 5,305,435 A | 4/1994 | Bronson |
| 5,313,229 A | 5/1994 | Gilligan et al. |
| 5,323,363 A | 6/1994 | Hysek et al. |
| 5,329,501 A | 7/1994 | Meister et al. |
| 5,333,256 A | 7/1994 | Green et al. |
| 5,463,725 A | 10/1995 | Henckel et al. |
| 5,477,508 A | 12/1995 | Will |
| 5,508,978 A | 4/1996 | Kalbermatter et al. |
| 5,519,393 A | 5/1996 | Brandestini |
| 5,528,260 A | 6/1996 | Kent |
| 5,530,455 A | 6/1996 | Gillick et al. |
| 5,544,295 A | 8/1996 | Capps |
| 5,563,631 A | 10/1996 | Masunaga |
| 5,572,649 A | 11/1996 | Elliott et al. |
| 5,590,219 A | 12/1996 | Gourdol |
| 5,623,588 A | 4/1997 | Gould |
| 5,689,628 A | 11/1997 | Robertson |
| 5,691,747 A | 11/1997 | Amano |
| 5,736,974 A | 4/1998 | Selker |
| 5,739,775 A | 4/1998 | Brandestini |
| 5,745,096 A | 4/1998 | Ludolph et al. |
| 5,751,260 A | 5/1998 | Nappi et al. |
| 5,825,353 A | 10/1998 | Will |
| 5,852,413 A | 12/1998 | Bacchi et al. |
| 5,874,961 A | 2/1999 | Bates et al. |
| 5,903,229 A | 5/1999 | Kishi |
| 5,940,521 A | 8/1999 | East et al. |
| 5,943,039 A | 8/1999 | Anderson et al. |
| 5,960,366 A | 9/1999 | Duwaer |
| 5,973,670 A | 10/1999 | Barber et al. |
| 5,973,694 A | 10/1999 | Steele et al. |
| 5,982,710 A | 11/1999 | Rawat et al. |
| 6,002,398 A | 12/1999 | Wilson |
| 6,005,579 A | 12/1999 | Sugiyama et al. |
| 6,043,816 A | 3/2000 | Williams et al. |
| 6,064,388 A | 5/2000 | Reyzin |
| 6,081,256 A | 6/2000 | Herget et al. |
| 6,128,006 A | 10/2000 | Rosenberg et al. |
| 6,144,381 A | 11/2000 | Lection et al. |
| 6,157,381 A | 12/2000 | Bates et al. |
| 6,161,957 A | 12/2000 | Guanter |
| 6,166,736 A | 12/2000 | Hugh |
| 6,192,258 B1 | 2/2001 | Kamada et al. |
| 6,203,190 B1 | 3/2001 | Stotz |
| 6,215,490 B1 | 4/2001 | Kaply |
| 6,230,170 B1 | 5/2001 | Zellweger et al. |
| 6,249,689 B1 | 6/2001 | Aizawa |
| 6,266,098 B1 | 7/2001 | Cove et al. |
| 6,281,903 B1 | 8/2001 | Martin et al. |
| 6,297,795 B1 | 10/2001 | Kato et al. |
| 6,300,939 B1 | 10/2001 | Decker et al. |
| 6,305,234 B1 | 10/2001 | Thies et al. |
| 6,310,633 B1 | 10/2001 | Graham |
| 6,310,648 B1 | 10/2001 | Miller et al. |
| 6,333,752 B1 | 12/2001 | Hasegawa et al. |
| 6,336,126 B1 | 1/2002 | Bjorklund et al. |
| 6,339,438 B1 | 1/2002 | Bates et al. |
| 6,351,657 B2 | 2/2002 | Yamada |
| 6,369,794 B1 | 4/2002 | Sakurai et al. |
| 6,396,482 B1 | 5/2002 | Griffin et al. |
| 6,462,757 B1 | 10/2002 | Kao et al. |
| 6,477,117 B1 | 11/2002 | Narayanaswami et al. |
| 6,486,895 B1 | 11/2002 | Robertson et al. |
| 6,489,950 B1 | 12/2002 | Griffin et al. |
| 6,522,347 B1 | 2/2003 | Sakai et al. |
| 6,525,997 B1 | 2/2003 | Narayanaswami et al. |
| 6,535,461 B1 | 3/2003 | Karhu |
| 6,556,222 B1 | 4/2003 | Narayanaswami |
| 6,570,583 B1 | 5/2003 | Kung et al. |
| 6,597,374 B1 | 7/2003 | Baker et al. |
| 6,600,936 B1 | 7/2003 | Karkkainen et al. |
| 6,609,146 B1 | 8/2003 | Slotznick |
| 6,636,197 B1 | 10/2003 | Goldenberg et al. |
| 6,636,246 B1 | 10/2003 | Gallo et al. |
| 6,647,338 B1 | 11/2003 | Hamberger et al. |
| 6,661,438 B1 | 12/2003 | Shiraishi et al. |
| 6,686,904 B1 | 2/2004 | Sherman et al. |
| 6,686,911 B1 | 2/2004 | Levin et al. |
| 6,700,564 B2 | 3/2004 | McLoone et al. |
| 6,720,860 B1 | 4/2004 | Narayanaswami |
| 6,763,226 B1 | 7/2004 | McZeal, Jr. |
| 6,768,497 B2 | 7/2004 | Baar et al. |
| 6,788,220 B2 | 9/2004 | Netzer |
| 6,809,275 B1 | 10/2004 | Cheng et al. |
| 6,809,724 B1 | 10/2004 | Shiraishi et al. |
| 6,842,169 B2 | 1/2005 | Griffin et al. |
| 6,937,228 B2 | 8/2005 | Yu |
| 6,957,395 B1 | 10/2005 | Jobs et al. |
| 6,961,060 B1 | 11/2005 | Mochizuki et al. |
| 6,967,642 B2 | 11/2005 | SanGiovanni |
| 6,967,903 B2 | 11/2005 | Guanter |
| 6,972,776 B2 | 12/2005 | Davis et al. |
| 6,977,868 B2 | 12/2005 | Brewer et al. |
| 7,002,558 B2 | 2/2006 | Keely et al. |
| 7,016,824 B2 | 3/2006 | Waupotitsch et al. |
| 7,024,625 B2 | 4/2006 | Shalit |
| 7,036,090 B1 | 4/2006 | Nguyen |
| 7,046,230 B2 | 5/2006 | Zadesky et al. |
| 7,058,904 B1 | 6/2006 | Khan et al. |
| 7,075,513 B2 | 7/2006 | Silfverberg et al. |
| 7,081,905 B1 | 7/2006 | Raghunath |
| 7,091,964 B2 | 8/2006 | Wong et al. |
| 7,116,317 B2 | 10/2006 | Gregorio et al. |
| 7,143,355 B2 | 11/2006 | Yamaguchi et al. |
| 7,146,005 B1 | 12/2006 | Anft et al. |
| 7,168,047 B1 | 1/2007 | Huppi |
| 7,227,963 B1 | 6/2007 | Yamada et al. |
| 7,256,770 B2 | 8/2007 | Hinckley et al. |
| 7,272,077 B2 | 9/2007 | Nobs |
| 7,286,063 B2 | 10/2007 | Gauthey et al. |
| 7,286,119 B2 | 10/2007 | Yamaguchi et al. |
| 7,298,385 B2 | 11/2007 | Kazi et al. |
| 7,317,449 B2 | 1/2008 | Robbins et al. |
| 7,333,084 B2 | 2/2008 | Griffin |
| 7,362,312 B2 | 4/2008 | Nurmi |
| 7,439,975 B2 | 10/2008 | Hsu |
| 7,458,014 B1 | 11/2008 | Rubin et al. |
| 7,463,239 B2 | 12/2008 | Ledbetter et al. |
| 7,469,381 B2 | 12/2008 | Ording |
| 7,469,386 B2 | 12/2008 | Bear et al. |
| 7,472,047 B2 | 12/2008 | Kramer et al. |
| 7,477,890 B1 | 1/2009 | Narayanaswami |
| 7,489,303 B1 | 2/2009 | Pryor |
| 7,499,040 B2 | 3/2009 | Zadesky et al. |
| 7,506,269 B2 | 3/2009 | Lang |

(56) References Cited

U.S. PATENT DOCUMENTS

| | | |
|---|---|---|
| 7,519,468 B2 | 4/2009 | Orr et al. |
| 7,543,239 B2 | 6/2009 | Viswanathan et al. |
| 7,552,397 B2 | 6/2009 | Holecek et al. |
| 7,596,761 B2 | 9/2009 | Lemay et al. |
| 7,600,192 B1 | 10/2009 | Hashimoto et al. |
| 7,710,393 B2 | 5/2010 | Tsuk et al. |
| 7,710,409 B2 | 5/2010 | Robbin et al. |
| 7,720,552 B1 | 5/2010 | Lloyd |
| 7,739,622 B2 | 6/2010 | DeLine et al. |
| 7,794,138 B2 | 9/2010 | Hilfiker |
| 7,814,112 B2 | 10/2010 | Gupta et al. |
| 7,814,436 B2 | 10/2010 | Schrag et al. |
| 7,844,915 B2 | 11/2010 | Platzer et al. |
| 7,856,255 B2 | 12/2010 | Tsuchiya et al. |
| 7,876,288 B1 | 1/2011 | Huang |
| 7,916,157 B1 | 3/2011 | Kelley et al. |
| 7,954,056 B2 | 5/2011 | Graham |
| 7,956,847 B2 | 6/2011 | Christie |
| 7,965,276 B1 | 6/2011 | Martin et al. |
| 8,001,488 B1 | 8/2011 | Lam |
| 8,009,144 B2 | 8/2011 | Yajima |
| 8,046,705 B2 | 10/2011 | Hunleth et al. |
| 8,130,205 B2 | 3/2012 | Forstall et al. |
| 8,132,123 B2 | 3/2012 | Schrag et al. |
| 8,140,996 B2 | 3/2012 | Tomkins |
| 8,191,011 B2 | 5/2012 | Abanami et al. |
| 8,194,036 B1 | 6/2012 | Braun et al. |
| 8,196,043 B2 | 6/2012 | Crow et al. |
| 8,196,061 B1 | 6/2012 | Bhojan |
| 8,201,102 B2 | 6/2012 | Lee et al. |
| 8,230,358 B1 | 7/2012 | Chaudhri |
| 8,250,071 B1 | 8/2012 | Killalea et al. |
| 8,266,550 B1 | 9/2012 | Cleron et al. |
| 8,290,777 B1 | 10/2012 | Nguyen et al. |
| 8,307,306 B2 | 11/2012 | Komatsu |
| 8,311,727 B2 | 11/2012 | Eckstein et al. |
| 8,365,090 B2 | 1/2013 | Ording |
| 8,375,326 B2 | 2/2013 | Bucher et al. |
| 8,427,432 B2 | 4/2013 | Kim et al. |
| 8,443,280 B2 | 5/2013 | Noyes |
| 8,448,083 B1 | 5/2013 | Migos et al. |
| 8,487,882 B2 | 7/2013 | Inaba et al. |
| 8,499,236 B1 | 7/2013 | Keljo |
| 8,504,937 B2 | 8/2013 | Jobs et al. |
| 8,533,623 B2 | 9/2013 | St Jacques |
| 8,549,429 B2 | 10/2013 | Tsuruta et al. |
| 8,566,700 B2 | 10/2013 | Ueda |
| 8,566,722 B2 | 10/2013 | Gordon et al. |
| 8,607,156 B1 | 12/2013 | Jania et al. |
| 8,627,236 B2 | 1/2014 | Jung et al. |
| 8,656,040 B1 | 2/2014 | Bajaj et al. |
| 8,656,311 B1 | 2/2014 | Harper et al. |
| 8,665,209 B2 | 3/2014 | Rimas-Ribikauskas et al. |
| 8,669,944 B2 | 3/2014 | Klinghult et al. |
| 8,669,945 B2 | 3/2014 | Coddington |
| 8,677,283 B2 | 3/2014 | Fong |
| 8,686,944 B1 | 4/2014 | Charlton et al. |
| 8,717,302 B1 | 5/2014 | Qin et al. |
| 8,739,040 B2 | 5/2014 | Graham |
| 8,743,151 B1 | 6/2014 | Fulcher et al. |
| 8,762,844 B2 | 6/2014 | Kim et al. |
| 8,782,513 B2 | 7/2014 | Migos et al. |
| 8,799,816 B2 | 8/2014 | Wells et al. |
| 8,824,245 B2 | 9/2014 | Lau et al. |
| 8,854,318 B2 | 10/2014 | Borovsky et al. |
| 8,860,674 B2 | 10/2014 | Lee et al. |
| 8,868,338 B1 | 10/2014 | Lookingbill et al. |
| 8,952,886 B2 | 2/2015 | Tsuk et al. |
| 8,954,887 B1 | 2/2015 | Tseng et al. |
| 9,001,625 B2 | 4/2015 | Essery et al. |
| 9,007,057 B2 | 4/2015 | Villaret |
| 9,007,302 B1 | 4/2015 | Bandt-Horn |
| 9,007,323 B2 | 4/2015 | Araki |
| 9,052,814 B2 | 6/2015 | Ording |
| 9,104,705 B2 | 8/2015 | Fujinaga |
| 9,176,652 B1 | 11/2015 | Patel et al. |
| 9,182,876 B2 | 11/2015 | Kim et al. |
| 9,189,089 B2 | 11/2015 | Sutton et al. |
| 9,195,219 B2 | 11/2015 | Hong et al. |
| 9,229,624 B2 | 1/2016 | Wei et al. |
| 9,268,400 B2 | 2/2016 | Gomez Sainz-Garcia |
| 9,395,867 B2 | 7/2016 | Griffin et al. |
| 9,395,905 B2 | 7/2016 | Wherry |
| 9,423,938 B1 | 8/2016 | Morris |
| 9,442,516 B2 | 9/2016 | Migos et al. |
| 9,442,649 B2 | 9/2016 | Davis et al. |
| 9,448,691 B2 | 9/2016 | Suda |
| 9,552,015 B2 | 1/2017 | Migos et al. |
| D778,912 S | 2/2017 | Akana et al. |
| 9,582,187 B2 | 2/2017 | Gil et al. |
| 9,620,312 B2 | 4/2017 | Ely et al. |
| 9,651,922 B2 | 5/2017 | Hysek et al. |
| 9,666,178 B2 | 5/2017 | Loubiere et al. |
| 9,678,571 B1 | 6/2017 | Robert et al. |
| 9,696,809 B2 | 7/2017 | Temple |
| 9,772,769 B2 | 9/2017 | Shimazu |
| 9,798,443 B1 | 10/2017 | Gray |
| 9,823,828 B2 | 11/2017 | Zambetti et al. |
| 9,870,114 B1 | 1/2018 | Jones et al. |
| D813,239 S | 3/2018 | Akana et al. |
| 9,921,711 B2 | 3/2018 | Oh et al. |
| 9,965,144 B2 | 5/2018 | Nakamura et al. |
| 9,984,539 B2 | 5/2018 | Moussette et al. |
| 10,019,097 B2 | 7/2018 | Ely et al. |
| 10,048,802 B2 | 8/2018 | Shedletsky et al. |
| 10,057,470 B2 | 8/2018 | Kim et al. |
| 10,097,496 B2 | 10/2018 | Dye et al. |
| 10,133,439 B1 | 11/2018 | Brichter et al. |
| 10,175,652 B2 | 1/2019 | Ely et al. |
| 10,216,147 B2 | 2/2019 | Ely et al. |
| 10,216,352 B2 | 2/2019 | Liang et al. |
| 10,222,909 B2 | 3/2019 | Shedletsky et al. |
| 10,275,117 B2 | 4/2019 | Zambetti et al. |
| D849,749 S | 5/2019 | Akana et al. |
| 10,289,218 B1 | 5/2019 | Young |
| 10,296,125 B2 | 5/2019 | Ely et al. |
| 10,324,620 B2 | 6/2019 | Balaram |
| 10,331,081 B2 | 6/2019 | Ely et al. |
| 10,331,082 B2 | 6/2019 | Ely et al. |
| 10,339,721 B1 | 7/2019 | Dascola et al. |
| 10,389,675 B2 | 8/2019 | Grandhi |
| 10,417,879 B2 | 9/2019 | Moussette et al. |
| 10,504,340 B2 | 12/2019 | Moussette et al. |
| 10,642,467 B2 | 5/2020 | Merminod et al. |
| 10,977,911 B2 | 4/2021 | Moussette et al. |
| 2001/0004337 A1 | 6/2001 | Paratte |
| 2001/0011991 A1 | 8/2001 | Wang et al. |
| 2001/0041596 A1 | 11/2001 | Forlenzo et al. |
| 2001/0043514 A1 | 11/2001 | Kita et al. |
| 2002/0010707 A1 | 1/2002 | Chang et al. |
| 2002/0019296 A1 | 2/2002 | Freeman et al. |
| 2002/0027547 A1 | 3/2002 | Kamijo et al. |
| 2002/0030665 A1 | 3/2002 | Ano |
| 2002/0030668 A1 | 3/2002 | Hoshino et al. |
| 2002/0036623 A1 | 3/2002 | Kano |
| 2002/0047860 A1 | 4/2002 | Ceulaer et al. |
| 2002/0054164 A1 | 5/2002 | Uemura |
| 2002/0063684 A1 | 5/2002 | Tran |
| 2002/0075334 A1 | 6/2002 | Yfantis |
| 2002/0083101 A1 | 6/2002 | Card et al. |
| 2002/0101457 A1 | 8/2002 | Lang |
| 2002/0101458 A1 | 8/2002 | Sangiovanni |
| 2002/0113802 A1 | 8/2002 | Card et al. |
| 2002/0118169 A1 | 8/2002 | Hinckley et al. |
| 2002/0118230 A1 | 8/2002 | Card et al. |
| 2002/0120651 A1 | 8/2002 | Pustejovsky et al. |
| 2002/0122072 A1 | 9/2002 | Selker |
| 2002/0126099 A1 | 9/2002 | Engholm |
| 2002/0154150 A1 | 10/2002 | Ogaki et al. |
| 2002/0154175 A1 | 10/2002 | Abello et al. |
| 2002/0171689 A1 | 11/2002 | Fox et al. |
| 2002/0186621 A1 | 12/2002 | Lai |
| 2003/0020671 A1 | 1/2003 | Santoro et al. |
| 2003/0025673 A1 | 2/2003 | Ledbetter et al. |

(56) References Cited

U.S. PATENT DOCUMENTS

| | | |
|---|---|---|
| 2003/0030673 A1 | 2/2003 | Ho |
| 2003/0043209 A1 | 3/2003 | Pearson |
| 2003/0052901 A1 | 3/2003 | Fukuchi |
| 2003/0058241 A1 | 3/2003 | Hsu |
| 2003/0076301 A1 | 4/2003 | Tsuk et al. |
| 2003/0076352 A1 | 4/2003 | Uhlig et al. |
| 2003/0098891 A1 | 5/2003 | Molander et al. |
| 2003/0103044 A1 | 6/2003 | Sunda et al. |
| 2003/0112279 A1 | 6/2003 | Irimajiri |
| 2003/0115384 A1 | 6/2003 | Sonehara et al. |
| 2003/0117440 A1 | 6/2003 | Hellyar et al. |
| 2003/0122787 A1 | 7/2003 | Zimmerman et al. |
| 2003/0123329 A1 | 7/2003 | Guanter et al. |
| 2003/0137540 A1 | 7/2003 | Klevenz et al. |
| 2003/0142081 A1 | 7/2003 | Iizuka et al. |
| 2003/0142288 A1 | 7/2003 | Kinrot et al. |
| 2003/0184598 A1 | 10/2003 | Graham |
| 2003/0189598 A1 | 10/2003 | Lipstein et al. |
| 2003/0210259 A1 | 11/2003 | Liu et al. |
| 2003/0210286 A1 | 11/2003 | Gerpheide et al. |
| 2004/0013042 A1 | 1/2004 | Farine |
| 2004/0017404 A1 | 1/2004 | Schileru-Key |
| 2004/0027793 A1 | 2/2004 | Haraguchi et al. |
| 2004/0038667 A1 | 2/2004 | Vance |
| 2004/0047244 A1 | 3/2004 | Iino et al. |
| 2004/0073935 A1 | 4/2004 | Kang |
| 2004/0080531 A1 | 4/2004 | Berstis |
| 2004/0085328 A1 | 5/2004 | Maruyama et al. |
| 2004/0100479 A1 | 5/2004 | Nakano et al. |
| 2004/0113819 A1 | 6/2004 | Gauthey et al. |
| 2004/0125081 A1 | 7/2004 | Hayakawa |
| 2004/0130580 A1 | 7/2004 | Howard et al. |
| 2004/0130581 A1 | 7/2004 | Howard et al. |
| 2004/0141016 A1 | 7/2004 | Fukatsu et al. |
| 2004/0145595 A1 | 7/2004 | Bennett |
| 2004/0150621 A1 | 8/2004 | Bohn |
| 2004/0155907 A1 | 8/2004 | Yamaguchi et al. |
| 2004/0170270 A1 | 9/2004 | Takashima et al. |
| 2004/0196267 A1 | 10/2004 | Kawai et al. |
| 2004/0205514 A1 | 10/2004 | Sommerer et al. |
| 2004/0218472 A1 | 11/2004 | Narayanaswami et al. |
| 2004/0225613 A1 | 11/2004 | Narayanaswami et al. |
| 2004/0230599 A1 | 11/2004 | Moore et al. |
| 2004/0233162 A1 | 11/2004 | Kobayashi |
| 2004/0239649 A1 | 12/2004 | Ludtke |
| 2004/0239692 A1 | 12/2004 | Balle et al. |
| 2004/0252119 A1 | 12/2004 | Hunleth et al. |
| 2004/0264301 A1 | 12/2004 | Howard et al. |
| 2005/0007884 A1 | 1/2005 | Lorenzato |
| 2005/0012723 A1 | 1/2005 | Pallakoff |
| 2005/0028111 A1 | 2/2005 | Schrag et al. |
| 2005/0030279 A1 | 2/2005 | Fu |
| 2005/0081164 A1 | 4/2005 | Hama et al. |
| 2005/0091604 A1 | 4/2005 | Davis |
| 2005/0097466 A1 | 5/2005 | Levi Montalcini |
| 2005/0116941 A1 | 6/2005 | Wallington |
| 2005/0132281 A1 | 6/2005 | Pan et al. |
| 2005/0136955 A1 | 6/2005 | Mumick et al. |
| 2005/0164623 A1 | 7/2005 | Huynh |
| 2005/0168566 A1 | 8/2005 | Tada et al. |
| 2005/0183012 A1 | 8/2005 | Petro et al. |
| 2005/0191994 A1 | 9/2005 | May et al. |
| 2005/0195216 A1 | 9/2005 | Kramer et al. |
| 2005/0209051 A1 | 9/2005 | Santomassimo et al. |
| 2005/0215848 A1 | 9/2005 | Lorenzato |
| 2005/0223068 A1 | 10/2005 | Shohfi et al. |
| 2005/0231489 A1 | 10/2005 | Ladouceur et al. |
| 2005/0259077 A1 | 11/2005 | Adams et al. |
| 2005/0278757 A1 | 12/2005 | Grossman et al. |
| 2006/0007129 A1 | 1/2006 | Pletikosa |
| 2006/0020904 A1 | 1/2006 | Aaltonen et al. |
| 2006/0022956 A1 | 2/2006 | Lengeling et al. |
| 2006/0025091 A1 | 2/2006 | Buford |
| 2006/0026521 A1 | 2/2006 | Hotelling et al. |
| 2006/0026535 A1 | 2/2006 | Hotelling et al. |
| 2006/0026536 A1 | 2/2006 | Hotelling et al. |
| 2006/0028444 A1 | 2/2006 | Hinckley et al. |
| 2006/0028446 A1 | 2/2006 | Liberty et al. |
| 2006/0036962 A1 | 2/2006 | Jobs et al. |
| 2006/0055700 A1 | 3/2006 | Niles et al. |
| 2006/0064716 A1 | 3/2006 | Sull et al. |
| 2006/0069604 A1 | 3/2006 | Leukart et al. |
| 2006/0082554 A1 | 4/2006 | Caine et al. |
| 2006/0085751 A1 | 4/2006 | O'brien et al. |
| 2006/0090090 A1 | 4/2006 | Perng |
| 2006/0092177 A1 | 5/2006 | Blasko |
| 2006/0095846 A1 | 5/2006 | Nurmi |
| 2006/0101122 A1 | 5/2006 | Ishii |
| 2006/0112350 A1 | 5/2006 | Kato |
| 2006/0143574 A1 | 6/2006 | Ito et al. |
| 2006/0150215 A1 | 7/2006 | Wroblewski |
| 2006/0152480 A1 | 7/2006 | Senn |
| 2006/0161861 A1 | 7/2006 | Holecek et al. |
| 2006/0174213 A1 | 8/2006 | Kato |
| 2006/0181506 A1 | 8/2006 | Fyke |
| 2006/0197753 A1 | 9/2006 | Hotelling |
| 2006/0212905 A1 | 9/2006 | Matsuda et al. |
| 2006/0224945 A1 | 10/2006 | Khan et al. |
| 2006/0230346 A1 | 10/2006 | Bhogal et al. |
| 2006/0255683 A1 | 11/2006 | Suzuki et al. |
| 2006/0268019 A1 | 11/2006 | Wang et al. |
| 2006/0268020 A1 | 11/2006 | Han |
| 2006/0277486 A1 | 12/2006 | Skinner |
| 2006/0290671 A1 | 12/2006 | Bohn et al. |
| 2007/0002019 A1 | 1/2007 | Lane et al. |
| 2007/0030256 A1 | 2/2007 | Akaike et al. |
| 2007/0031119 A1 | 2/2007 | Iwanaga |
| 2007/0035513 A1 | 2/2007 | Sherrard et al. |
| 2007/0036346 A1* | 2/2007 | Kwon .................. G06F 3/0486 379/413 |
| 2007/0046635 A1 | 3/2007 | Nishiyama et al. |
| 2007/0063995 A1 | 3/2007 | Bailey et al. |
| 2007/0070090 A1 | 3/2007 | Debettencourt et al. |
| 2007/0073917 A1 | 3/2007 | Larson et al. |
| 2007/0083828 A1 | 4/2007 | Toriyama et al. |
| 2007/0085841 A1 | 4/2007 | Tsuk et al. |
| 2007/0097151 A1 | 5/2007 | Rosenberg |
| 2007/0098395 A1 | 5/2007 | Battles et al. |
| 2007/0106949 A1 | 5/2007 | Narita et al. |
| 2007/0120819 A1 | 5/2007 | Young et al. |
| 2007/0132733 A1 | 6/2007 | Ram |
| 2007/0132789 A1 | 6/2007 | Ording et al. |
| 2007/0136679 A1 | 6/2007 | Yang |
| 2007/0146337 A1 | 6/2007 | Ording et al. |
| 2007/0150830 A1 | 6/2007 | Ording et al. |
| 2007/0157089 A1 | 7/2007 | Van os et al. |
| 2007/0157094 A1 | 7/2007 | Lemay et al. |
| 2007/0168369 A1 | 7/2007 | Bruns |
| 2007/0174761 A1 | 7/2007 | Lin et al. |
| 2007/0176910 A1 | 8/2007 | Simek et al. |
| 2007/0177804 A1 | 8/2007 | Elias et al. |
| 2007/0180379 A1 | 8/2007 | Osato |
| 2007/0182595 A1 | 8/2007 | Ghasabian |
| 2007/0182999 A1 | 8/2007 | Anthony et al. |
| 2007/0209017 A1 | 9/2007 | Gupta et al. |
| 2007/0211042 A1 | 9/2007 | Kim et al. |
| 2007/0216661 A1 | 9/2007 | Chen et al. |
| 2007/0226646 A1 | 9/2007 | Nagiyama et al. |
| 2007/0229458 A1 | 10/2007 | Moon |
| 2007/0233736 A1 | 10/2007 | Xiong et al. |
| 2007/0236475 A1 | 10/2007 | Wherry |
| 2007/0236479 A1 | 10/2007 | Wang et al. |
| 2007/0237493 A1 | 10/2007 | Hall et al. |
| 2007/0239831 A1 | 10/2007 | Basu |
| 2007/0239837 A1 | 10/2007 | Jablokov et al. |
| 2007/0242569 A1 | 10/2007 | Inoue et al. |
| 2007/0247435 A1 | 10/2007 | Benko et al. |
| 2007/0265929 A1 | 11/2007 | Danninger |
| 2007/0277121 A1 | 11/2007 | Beckman |
| 2007/0279401 A1 | 12/2007 | Ramstein et al. |
| 2007/0290045 A1 | 12/2007 | Cisar |
| 2007/0291018 A1 | 12/2007 | Park et al. |
| 2007/0296711 A1 | 12/2007 | Yee et al. |
| 2008/0001915 A1 | 1/2008 | Pihlaja et al. |

(56) References Cited

U.S. PATENT DOCUMENTS

| | | |
|---|---|---|
| 2008/0004084 A1 | 1/2008 | Park |
| 2008/0019494 A1 | 1/2008 | Toda |
| 2008/0020810 A1 | 1/2008 | Park |
| 2008/0033779 A1 | 2/2008 | Coffman et al. |
| 2008/0040692 A1 | 2/2008 | Sunday et al. |
| 2008/0043028 A1 | 2/2008 | Tanaka |
| 2008/0052643 A1 | 2/2008 | Ike et al. |
| 2008/0052945 A1 | 3/2008 | Matas et al. |
| 2008/0055241 A1 | 3/2008 | Goldenberg et al. |
| 2008/0062127 A1 | 3/2008 | Brodersen et al. |
| 2008/0062141 A1 | 3/2008 | Chandhri |
| 2008/0066135 A1 | 3/2008 | Brodersen et al. |
| 2008/0094368 A1 | 4/2008 | Ording et al. |
| 2008/0109764 A1 | 5/2008 | Linnamaki |
| 2008/0123473 A1 | 5/2008 | Ozawa et al. |
| 2008/0125196 A1 | 5/2008 | Ryu |
| 2008/0129520 A1 | 6/2008 | Lee |
| 2008/0134033 A1 | 6/2008 | Burns et al. |
| 2008/0141182 A1 | 6/2008 | Barsness et al. |
| 2008/0148177 A1 | 6/2008 | Lang et al. |
| 2008/0150901 A1 | 6/2008 | Lewies et al. |
| 2008/0155461 A1 | 6/2008 | Ozaki |
| 2008/0155475 A1 | 6/2008 | Duhig |
| 2008/0158149 A1 | 7/2008 | Levin |
| 2008/0163116 A1 | 7/2008 | Lee et al. |
| 2008/0163119 A1 | 7/2008 | Kim et al. |
| 2008/0163121 A1 | 7/2008 | Lee et al. |
| 2008/0165124 A1 | 7/2008 | Kim |
| 2008/0165140 A1 | 7/2008 | Christie et al. |
| 2008/0165152 A1 | 7/2008 | Forstall et al. |
| 2008/0165153 A1 | 7/2008 | Platzer et al. |
| 2008/0165161 A1 | 7/2008 | Platzer et al. |
| 2008/0165210 A1 | 7/2008 | Platzer et al. |
| 2008/0168073 A1 | 7/2008 | Siegel et al. |
| 2008/0168349 A1 | 7/2008 | Lamiraux et al. |
| 2008/0168382 A1 | 7/2008 | Louch et al. |
| 2008/0168384 A1 | 7/2008 | Platzer et al. |
| 2008/0168404 A1 | 7/2008 | Ording |
| 2008/0168478 A1 | 7/2008 | Platzer et al. |
| 2008/0172634 A1 | 7/2008 | Choi et al. |
| 2008/0174570 A1 | 7/2008 | Jobs et al. |
| 2008/0186808 A1 | 8/2008 | Lee |
| 2008/0201649 A1 | 8/2008 | Mattila et al. |
| 2008/0204478 A1 | 8/2008 | Hung |
| 2008/0207281 A1 | 8/2008 | Tsuchiya et al. |
| 2008/0216001 A1 | 9/2008 | Ording et al. |
| 2008/0224995 A1 | 9/2008 | Perkunder |
| 2008/0225014 A1 | 9/2008 | Kim |
| 2008/0257701 A1 | 10/2008 | Wlotzka |
| 2008/0259025 A1 | 10/2008 | Eom |
| 2008/0266407 A1 | 10/2008 | Battles et al. |
| 2008/0279475 A1 | 11/2008 | Lee et al. |
| 2008/0288880 A1 | 11/2008 | Reponen et al. |
| 2008/0318635 A1 | 12/2008 | Yoon et al. |
| 2008/0319944 A1 | 12/2008 | Venolia et al. |
| 2008/0320391 A1 | 12/2008 | Lemay et al. |
| 2009/0002396 A1 | 1/2009 | Andrews et al. |
| 2009/0007019 A1 | 1/2009 | Kobayashi et al. |
| 2009/0015550 A1 | 1/2009 | Koski |
| 2009/0030800 A1 | 1/2009 | Grois |
| 2009/0046110 A1 | 2/2009 | Sadler et al. |
| 2009/0050465 A1 | 2/2009 | Asada |
| 2009/0051649 A1 | 2/2009 | Rondel |
| 2009/0059730 A1 | 3/2009 | Lyons et al. |
| 2009/0064031 A1 | 3/2009 | Bull et al. |
| 2009/0070705 A1 | 3/2009 | Ording |
| 2009/0070711 A1 | 3/2009 | Kwak et al. |
| 2009/0079698 A1 | 3/2009 | Takashima et al. |
| 2009/0089712 A1 | 4/2009 | Sato |
| 2009/0098912 A1 | 4/2009 | Kim et al. |
| 2009/0100373 A1 | 4/2009 | Pixley et al. |
| 2009/0102817 A1 | 4/2009 | Bathiche et al. |
| 2009/0103780 A1 | 4/2009 | Nishihara et al. |
| 2009/0109069 A1 | 4/2009 | Takasaki et al. |
| 2009/0113347 A1 | 4/2009 | Hess et al. |
| 2009/0119678 A1 | 5/2009 | Shih et al. |
| 2009/0125811 A1 | 5/2009 | Bethurum |
| 2009/0138827 A1 | 5/2009 | Van os et al. |
| 2009/0143117 A1 | 6/2009 | Shin et al. |
| 2009/0144642 A1 | 6/2009 | Crystal |
| 2009/0144654 A1 | 6/2009 | Brouwer et al. |
| 2009/0152452 A1 | 6/2009 | Lee et al. |
| 2009/0156255 A1 | 6/2009 | Shin et al. |
| 2009/0164937 A1 | 6/2009 | Alviar et al. |
| 2009/0177538 A1 | 7/2009 | Brewer et al. |
| 2009/0177966 A1 | 7/2009 | Chaudhri |
| 2009/0178008 A1 | 7/2009 | Herz et al. |
| 2009/0183100 A1 | 7/2009 | Eom et al. |
| 2009/0187825 A1 | 7/2009 | Sandquist et al. |
| 2009/0189915 A1 | 7/2009 | Mercer et al. |
| 2009/0193359 A1 | 7/2009 | Anthony et al. |
| 2009/0196124 A1 | 8/2009 | Mooring |
| 2009/0199130 A1 | 8/2009 | Tsern et al. |
| 2009/0204920 A1 | 8/2009 | Beverley et al. |
| 2009/0204929 A1 | 8/2009 | Baurmann et al. |
| 2009/0228126 A1 | 9/2009 | Spielberg et al. |
| 2009/0228825 A1 | 9/2009 | Van Os et al. |
| 2009/0231271 A1 | 9/2009 | Heubel et al. |
| 2009/0235155 A1 | 9/2009 | Ueda |
| 2009/0235162 A1 | 9/2009 | Nuccio et al. |
| 2009/0237372 A1 | 9/2009 | Kim et al. |
| 2009/0241054 A1 | 9/2009 | Hendricks |
| 2009/0241150 A1 | 9/2009 | White et al. |
| 2009/0254867 A1 | 10/2009 | Farouki et al. |
| 2009/0259939 A1 | 10/2009 | Lockett et al. |
| 2009/0271381 A1 | 10/2009 | Beezer et al. |
| 2009/0280907 A1 | 11/2009 | Larsen et al. |
| 2009/0288039 A1 | 11/2009 | Mail et al. |
| 2009/0289905 A1 | 11/2009 | Ahn |
| 2009/0293014 A1 | 11/2009 | Meuninck et al. |
| 2009/0315841 A1 | 12/2009 | Cheng et al. |
| 2009/0315867 A1 | 12/2009 | Sakamoto et al. |
| 2009/0319888 A1 | 12/2009 | Oygard |
| 2009/0319928 A1 | 12/2009 | Alphin et al. |
| 2009/0325563 A1 | 12/2009 | Horodezky et al. |
| 2009/0327955 A1 | 12/2009 | Mouilleseaux et al. |
| 2010/0001967 A1 | 1/2010 | Yoo |
| 2010/0004031 A1 | 1/2010 | Kim |
| 2010/0004033 A1 | 1/2010 | Choe et al. |
| 2010/0017748 A1 | 1/2010 | Taylor et al. |
| 2010/0023878 A1 | 1/2010 | Douris et al. |
| 2010/0023883 A1 | 1/2010 | Khazaka et al. |
| 2010/0026640 A1* | 2/2010 | Kim ................ G06F 3/04886 345/173 |
| 2010/0029327 A1 | 2/2010 | Jee |
| 2010/0044121 A1 | 2/2010 | Simon et al. |
| 2010/0045616 A1 | 2/2010 | Li et al. |
| 2010/0058223 A1 | 3/2010 | Price et al. |
| 2010/0058226 A1 | 3/2010 | Flake et al. |
| 2010/0058240 A1 | 3/2010 | Bull et al. |
| 2010/0066763 A1 | 3/2010 | Macdougall et al. |
| 2010/0070926 A1 | 3/2010 | Abanami et al. |
| 2010/0073692 A1 | 3/2010 | Waltman et al. |
| 2010/0079500 A1 | 4/2010 | O'sullivan et al. |
| 2010/0088634 A1 | 4/2010 | Tsuruta et al. |
| 2010/0093400 A1 | 4/2010 | Ju et al. |
| 2010/0107078 A1 | 4/2010 | Hayashi |
| 2010/0110044 A1 | 5/2010 | Englund |
| 2010/0113101 A1 | 5/2010 | Tanada |
| 2010/0125807 A1 | 5/2010 | Easterday et al. |
| 2010/0128570 A1 | 5/2010 | Smith et al. |
| 2010/0141609 A1 | 6/2010 | Frisbee |
| 2010/0146387 A1 | 6/2010 | Hoover |
| 2010/0148945 A1 | 6/2010 | Yun et al. |
| 2010/0164908 A1 | 7/2010 | Hill et al. |
| 2010/0169097 A1 | 7/2010 | Nachman et al. |
| 2010/0173678 A1 | 7/2010 | Kim et al. |
| 2010/0174606 A1 | 7/2010 | Hoyle |
| 2010/0175018 A1 | 7/2010 | Petschnigg et al. |
| 2010/0187074 A1 | 7/2010 | Manni |
| 2010/0188268 A1 | 7/2010 | Grignani et al. |
| 2010/0199232 A1 | 8/2010 | Mistry et al. |
| 2010/0201692 A1 | 8/2010 | Niles et al. |
| 2010/0211498 A1 | 8/2010 | Aabye et al. |

(56) References Cited

U.S. PATENT DOCUMENTS

| | | |
|---|---|---|
| 2010/0211908 A1 | 8/2010 | Luk et al. |
| 2010/0211919 A1 | 8/2010 | Brown et al. |
| 2010/0214243 A1 | 8/2010 | Birnbaum et al. |
| 2010/0220562 A1 | 9/2010 | Hozumi et al. |
| 2010/0223055 A1 | 9/2010 | Mclean |
| 2010/0235742 A1 | 9/2010 | Hsu et al. |
| 2010/0241699 A1 | 9/2010 | Muthukumarasamy et al. |
| 2010/0241967 A1 | 9/2010 | Lee |
| 2010/0242066 A1 | 9/2010 | Tseng |
| 2010/0248778 A1 | 9/2010 | Biswas |
| 2010/0251168 A1 | 9/2010 | Fujita et al. |
| 2010/0259481 A1 | 10/2010 | Oh |
| 2010/0267424 A1 | 10/2010 | Kim et al. |
| 2010/0269038 A1 | 10/2010 | Tsuda |
| 2010/0271312 A1 | 10/2010 | Alameh et al. |
| 2010/0271340 A1 | 10/2010 | Nagashima et al. |
| 2010/0271342 A1 | 10/2010 | Nagashima et al. |
| 2010/0271343 A1 | 10/2010 | Nagashima et al. |
| 2010/0271401 A1 | 10/2010 | Fong |
| 2010/0277126 A1 | 11/2010 | Naeimi et al. |
| 2010/0283743 A1 | 11/2010 | Coddington |
| 2010/0289217 A1 | 11/2010 | Lavie |
| 2010/0315417 A1 | 12/2010 | Cho et al. |
| 2010/0325575 A1 | 12/2010 | Platzer et al. |
| 2010/0331145 A1 | 12/2010 | Lakovic et al. |
| 2010/0333045 A1 | 12/2010 | Gueziec et al. |
| 2011/0006980 A1 | 1/2011 | Taniguchi et al. |
| 2011/0007029 A1 | 1/2011 | Ben-David |
| 2011/0014956 A1 | 1/2011 | Lee et al. |
| 2011/0022472 A1 | 1/2011 | Zon |
| 2011/0025311 A1 | 2/2011 | Chauvin et al. |
| 2011/0025624 A1 | 2/2011 | Goto |
| 2011/0041056 A1 | 2/2011 | Griffin et al. |
| 2011/0047491 A1 | 2/2011 | Hwang et al. |
| 2011/0055752 A1 | 3/2011 | Rubinstein et al. |
| 2011/0057877 A1 | 3/2011 | Nagashima et al. |
| 2011/0057886 A1 | 3/2011 | Ng et al. |
| 2011/0072345 A1 | 3/2011 | Lim |
| 2011/0074699 A1 | 3/2011 | Marr et al. |
| 2011/0074719 A1 | 3/2011 | Yeh et al. |
| 2011/0074824 A1 | 3/2011 | Srinivasan et al. |
| 2011/0074828 A1 | 3/2011 | Capela et al. |
| 2011/0078622 A1 | 3/2011 | Missig et al. |
| 2011/0086613 A1 | 4/2011 | Doudkine et al. |
| 2011/0087955 A1 | 4/2011 | Ho et al. |
| 2011/0087982 A1 | 4/2011 | Mccann et al. |
| 2011/0090255 A1 | 4/2011 | Wilson et al. |
| 2011/0091182 A1 | 4/2011 | Look et al. |
| 2011/0093812 A1 | 4/2011 | Fong |
| 2011/0095993 A1 | 4/2011 | Zuverink |
| 2011/0099509 A1 | 4/2011 | Horagai |
| 2011/0102455 A1 | 5/2011 | Temple |
| 2011/0107241 A1 | 5/2011 | Moore |
| 2011/0107264 A1 | 5/2011 | Akella |
| 2011/0119578 A1 | 5/2011 | Schwartz |
| 2011/0126139 A1 | 5/2011 | Jeong et al. |
| 2011/0126155 A1 | 5/2011 | Krishnaraj et al. |
| 2011/0128226 A1 | 6/2011 | Jensen |
| 2011/0131494 A1 | 6/2011 | Ono et al. |
| 2011/0131531 A1 | 6/2011 | Russell et al. |
| 2011/0141031 A1 | 6/2011 | Mccullough et al. |
| 2011/0145691 A1 | 6/2011 | Noyes |
| 2011/0145692 A1 | 6/2011 | Noyes et al. |
| 2011/0145759 A1 | 6/2011 | Leffert et al. |
| 2011/0157046 A1 | 6/2011 | Lee et al. |
| 2011/0164042 A1 | 7/2011 | Chaudhri |
| 2011/0167262 A1 | 7/2011 | Ross et al. |
| 2011/0167369 A1 | 7/2011 | Van Os |
| 2011/0167382 A1 | 7/2011 | Van Os |
| 2011/0187355 A1 | 8/2011 | Dixon et al. |
| 2011/0191710 A1 | 8/2011 | Jang et al. |
| 2011/0197160 A1 | 8/2011 | Kim et al. |
| 2011/0199342 A1 | 8/2011 | Vartanian et al. |
| 2011/0202834 A1 | 8/2011 | Mandryk et al. |
| 2011/0202859 A1 | 8/2011 | Fong |
| 2011/0202861 A1 | 8/2011 | Fritzley et al. |
| 2011/0202866 A1 | 8/2011 | Huang et al. |
| 2011/0209099 A1 | 8/2011 | Hinckley et al. |
| 2011/0209104 A1 | 8/2011 | Hinckley et al. |
| 2011/0224967 A1 | 9/2011 | Van Schaik |
| 2011/0225543 A1 | 9/2011 | Arnold et al. |
| 2011/0227810 A1 | 9/2011 | Mckinney et al. |
| 2011/0234633 A1 | 9/2011 | Ogura et al. |
| 2011/0248948 A1 | 10/2011 | Griffin et al. |
| 2011/0252062 A1 | 10/2011 | Hanatani et al. |
| 2011/0252357 A1 | 10/2011 | Chaudhri |
| 2011/0252362 A1 | 10/2011 | Cho et al. |
| 2011/0252369 A1 | 10/2011 | Chaudhri |
| 2011/0252372 A1 | 10/2011 | Chaudhri |
| 2011/0252373 A1 | 10/2011 | Chaudhri |
| 2011/0252375 A1 | 10/2011 | Chaudhri |
| 2011/0261030 A1 | 10/2011 | Bullock |
| 2011/0271183 A1 | 11/2011 | Bose et al. |
| 2011/0271233 A1 | 11/2011 | Radakovitz et al. |
| 2011/0279384 A1 | 11/2011 | Miller et al. |
| 2011/0291945 A1 | 12/2011 | Ewing et al. |
| 2011/0295879 A1 | 12/2011 | Logis et al. |
| 2011/0296312 A1 | 12/2011 | Boyer et al. |
| 2011/0296344 A1 | 12/2011 | Habib et al. |
| 2011/0298830 A1 | 12/2011 | Lam |
| 2011/0302493 A1 | 12/2011 | Runstedler et al. |
| 2011/0302513 A1 | 12/2011 | Ademar et al. |
| 2011/0307842 A1 | 12/2011 | Chiang et al. |
| 2011/0316888 A1 | 12/2011 | Sachs et al. |
| 2012/0005622 A1 | 1/2012 | Park et al. |
| 2012/0011437 A1 | 1/2012 | James et al. |
| 2012/0019513 A1 | 1/2012 | Fong et al. |
| 2012/0023438 A1 | 1/2012 | Xia et al. |
| 2012/0023462 A1 | 1/2012 | Rosing et al. |
| 2012/0026198 A1 | 2/2012 | Maesaka |
| 2012/0030627 A1 | 2/2012 | Nurmi et al. |
| 2012/0032988 A1* | 2/2012 | Katayama .............. G09G 5/346 345/684 |
| 2012/0038582 A1 | 2/2012 | Grant |
| 2012/0044267 A1 | 2/2012 | Fino |
| 2012/0050185 A1 | 3/2012 | Davydov et al. |
| 2012/0054670 A1 | 3/2012 | Rainisto |
| 2012/0056848 A1 | 3/2012 | Yamano et al. |
| 2012/0059787 A1 | 3/2012 | Brown et al. |
| 2012/0062398 A1 | 3/2012 | Durand |
| 2012/0066621 A1 | 3/2012 | Matsubara |
| 2012/0066629 A1 | 3/2012 | Lee et al. |
| 2012/0066638 A1 | 3/2012 | Ohri |
| 2012/0068925 A1 | 3/2012 | Wong et al. |
| 2012/0083260 A1 | 4/2012 | Arriola et al. |
| 2012/0084644 A1 | 4/2012 | Robert et al. |
| 2012/0084689 A1 | 4/2012 | Ledet et al. |
| 2012/0089951 A1 | 4/2012 | Cassidy |
| 2012/0092383 A1 | 4/2012 | Hysek et al. |
| 2012/0096344 A1 | 4/2012 | Ho et al. |
| 2012/0099406 A1 | 4/2012 | Lau et al. |
| 2012/0102387 A1 | 4/2012 | Badoiu et al. |
| 2012/0105484 A1 | 5/2012 | Cui |
| 2012/0112859 A1 | 5/2012 | Park et al. |
| 2012/0121185 A1 | 5/2012 | Zavesky |
| 2012/0127071 A1 | 5/2012 | Jitkoff et al. |
| 2012/0131470 A1 | 5/2012 | Wessling et al. |
| 2012/0131495 A1 | 5/2012 | Goossens et al. |
| 2012/0131504 A1 | 5/2012 | Fadell et al. |
| 2012/0133604 A1 | 5/2012 | Ishizuka et al. |
| 2012/0133677 A1 | 5/2012 | Suzuki et al. |
| 2012/0142401 A1 | 6/2012 | Murakami |
| 2012/0147052 A1* | 6/2012 | Homma .............. G06F 3/04886 345/660 |
| 2012/0155223 A1 | 6/2012 | Hoover |
| 2012/0159373 A1 | 6/2012 | Archer et al. |
| 2012/0159380 A1 | 6/2012 | Kocienda et al. |
| 2012/0162261 A1 | 6/2012 | Kim et al. |
| 2012/0162350 A1 | 6/2012 | Lee et al. |
| 2012/0166950 A1 | 6/2012 | Frumar et al. |
| 2012/0169776 A1 | 7/2012 | Rissa et al. |
| 2012/0174005 A1 | 7/2012 | Deutsch et al. |
| 2012/0174033 A1 | 7/2012 | Joo |
| 2012/0179970 A1 | 7/2012 | Hayes |

(56) References Cited

U.S. PATENT DOCUMENTS

| | | |
|---|---|---|
| 2012/0179998 A1 | 7/2012 | Nesladek et al. |
| 2012/0186951 A1 | 7/2012 | Wu et al. |
| 2012/0192068 A1 | 7/2012 | Migos et al. |
| 2012/0192102 A1 | 7/2012 | Migos et al. |
| 2012/0192110 A1 | 7/2012 | Wu et al. |
| 2012/0192118 A1 | 7/2012 | Migos et al. |
| 2012/0197743 A1 | 8/2012 | Grigg et al. |
| 2012/0204123 A1 | 8/2012 | Bauer et al. |
| 2012/0226977 A1 | 9/2012 | Lengeling et al. |
| 2012/0236037 A1 | 9/2012 | Lessing et al. |
| 2012/0240085 A1 | 9/2012 | Sim et al. |
| 2012/0256863 A1 | 10/2012 | Zhang et al. |
| 2012/0256960 A1 | 10/2012 | Chaudhri |
| 2012/0272145 A1 | 10/2012 | Ryan et al. |
| 2012/0272181 A1 | 10/2012 | Rogers et al. |
| 2012/0274550 A1 | 11/2012 | Campbell et al. |
| 2012/0278725 A1 | 11/2012 | Gordon et al. |
| 2012/0278745 A1 | 11/2012 | Kim et al. |
| 2012/0278755 A1 | 11/2012 | Lehmann et al. |
| 2012/0280908 A1 | 11/2012 | Rhoads et al. |
| 2012/0284012 A1 | 11/2012 | Rodriguez et al. |
| 2012/0289290 A1 | 11/2012 | Chae et al. |
| 2012/0290472 A1 | 11/2012 | Mullen et al. |
| 2012/0297342 A1 | 11/2012 | Jang et al. |
| 2012/0304113 A1 | 11/2012 | Patten et al. |
| 2012/0306765 A1 | 12/2012 | Moore |
| 2012/0306930 A1 | 12/2012 | Decker et al. |
| 2012/0311055 A1 | 12/2012 | Adams et al. |
| 2012/0324357 A1 | 12/2012 | Viegers et al. |
| 2012/0324390 A1 | 12/2012 | Tao |
| 2012/0327006 A1 | 12/2012 | Israr et al. |
| 2012/0327009 A1 | 12/2012 | Fleizach |
| 2013/0019182 A1 | 1/2013 | Gil et al. |
| 2013/0021362 A1 | 1/2013 | Sakurada et al. |
| 2013/0024780 A1 | 1/2013 | Sutedja et al. |
| 2013/0024811 A1 | 1/2013 | Gleadall et al. |
| 2013/0027412 A1 | 1/2013 | Roddy |
| 2013/0031507 A1 | 1/2013 | George |
| 2013/0031514 A1 | 1/2013 | Gabbert |
| 2013/0036005 A1 | 2/2013 | Rappe |
| 2013/0038636 A1 | 2/2013 | Fujiwaka |
| 2013/0046397 A1 | 2/2013 | Fadell et al. |
| 2013/0050109 A1 | 2/2013 | Ban |
| 2013/0055160 A1 | 2/2013 | Yamada et al. |
| 2013/0061175 A1 | 3/2013 | Matas et al. |
| 2013/0063383 A1 | 3/2013 | Anderssonreimer et al. |
| 2013/0067390 A1 | 3/2013 | Kwiatkowski et al. |
| 2013/0073932 A1 | 3/2013 | Migos et al. |
| 2013/0076774 A1 | 3/2013 | Yu et al. |
| 2013/0097526 A1 | 4/2013 | Stovicek et al. |
| 2013/0097556 A1 | 4/2013 | Louch et al. |
| 2013/0097566 A1 | 4/2013 | Berglund |
| 2013/0104039 A1 | 4/2013 | Ormin et al. |
| 2013/0111342 A1 | 5/2013 | Alameh et al. |
| 2013/0111384 A1 | 5/2013 | Kim et al. |
| 2013/0111396 A1 | 5/2013 | Brid |
| 2013/0111407 A1 | 5/2013 | Mullen |
| 2013/0117689 A1 | 5/2013 | Lessing et al. |
| 2013/0117698 A1 | 5/2013 | Park et al. |
| 2013/0120295 A1 | 5/2013 | Kim et al. |
| 2013/0127850 A1 | 5/2013 | Bindon |
| 2013/0132883 A1 | 5/2013 | Vayrynen |
| 2013/0135228 A1 | 5/2013 | Won et al. |
| 2013/0135234 A1 | 5/2013 | Hisano et al. |
| 2013/0135236 A1 | 5/2013 | Yano |
| 2013/0139102 A1 | 5/2013 | Miura et al. |
| 2013/0141342 A1 | 6/2013 | Bokma et al. |
| 2013/0142016 A1 | 6/2013 | Pozzo Di Borgo et al. |
| 2013/0145292 A1 | 6/2013 | Cohen et al. |
| 2013/0145316 A1 | 6/2013 | Heo |
| 2013/0147747 A1 | 6/2013 | Takagi |
| 2013/0154933 A1 | 6/2013 | Sheik-Nainar |
| 2013/0169579 A1 | 7/2013 | Havnor |
| 2013/0176020 A1 | 7/2013 | Chauvin et al. |
| 2013/0191220 A1 | 7/2013 | Dent et al. |
| 2013/0205244 A1 | 8/2013 | Decker et al. |
| 2013/0205939 A1 | 8/2013 | Meerovitsch |
| 2013/0208013 A1 | 8/2013 | Yuu et al. |
| 2013/0218517 A1 | 8/2013 | Ausserlechner |
| 2013/0222301 A1 | 8/2013 | Lee et al. |
| 2013/0226444 A1 | 8/2013 | Johansson et al. |
| 2013/0227412 A1 | 8/2013 | Ornstein et al. |
| 2013/0227419 A1 | 8/2013 | Lee et al. |
| 2013/0254708 A1 | 9/2013 | Dorcey |
| 2013/0258819 A1 | 10/2013 | Hoover |
| 2013/0262564 A1 | 10/2013 | Wall et al. |
| 2013/0275899 A1 | 10/2013 | Schubert et al. |
| 2013/0275918 A1 | 10/2013 | Antonini et al. |
| 2013/0282360 A1 | 10/2013 | Shimota et al. |
| 2013/0282459 A1 | 10/2013 | Smets et al. |
| 2013/0283204 A1 | 10/2013 | Pasquero et al. |
| 2013/0290116 A1 | 10/2013 | Hepworth et al. |
| 2013/0303087 A1 | 11/2013 | Hauser et al. |
| 2013/0305184 A1 | 11/2013 | Kim et al. |
| 2013/0305187 A1 | 11/2013 | Phillips et al. |
| 2013/0311954 A1 | 11/2013 | Minkkinen |
| 2013/0318437 A1 | 11/2013 | Jung et al. |
| 2013/0324093 A1 | 12/2013 | Santamaria et al. |
| 2013/0328786 A1 | 12/2013 | Hinckley |
| 2013/0332886 A1 | 12/2013 | Cranfill et al. |
| 2013/0339343 A1 | 12/2013 | Hierons et al. |
| 2013/0339345 A1 | 12/2013 | Soto Matamala et al. |
| 2013/0342457 A1 | 12/2013 | Cox et al. |
| 2014/0002502 A1 | 1/2014 | Han |
| 2014/0028554 A1 | 1/2014 | De Los Reyes et al. |
| 2014/0028688 A1 | 1/2014 | Houjou et al. |
| 2014/0028735 A1 | 1/2014 | Williams et al. |
| 2014/0036639 A1 | 2/2014 | Boni et al. |
| 2014/0040742 A1 | 2/2014 | Park et al. |
| 2014/0075311 A1 | 3/2014 | Boettcher et al. |
| 2014/0075368 A1 | 3/2014 | Kim et al. |
| 2014/0092037 A1 | 4/2014 | Kim |
| 2014/0092143 A1 | 4/2014 | Vanbion et al. |
| 2014/0098102 A1 | 4/2014 | Raffle et al. |
| 2014/0105278 A1 | 4/2014 | Bivolarsky |
| 2014/0106734 A1 | 4/2014 | Lee |
| 2014/0108936 A1 | 4/2014 | Khosropour et al. |
| 2014/0109002 A1 | 4/2014 | Kimball et al. |
| 2014/0132640 A1 | 5/2014 | Sharma et al. |
| 2014/0136443 A1 | 5/2014 | Kinsey et al. |
| 2014/0136981 A1 | 5/2014 | Xiang et al. |
| 2014/0137020 A1 | 5/2014 | Sharma et al. |
| 2014/0139422 A1 | 5/2014 | Mistry et al. |
| 2014/0139637 A1 | 5/2014 | Mistry et al. |
| 2014/0143678 A1 | 5/2014 | Mistry et al. |
| 2014/0143737 A1 | 5/2014 | Mistry et al. |
| 2014/0157160 A1 | 6/2014 | Cudak et al. |
| 2014/0160078 A1 | 6/2014 | Seo et al. |
| 2014/0164966 A1 | 6/2014 | Kim et al. |
| 2014/0204229 A1 | 7/2014 | Leung et al. |
| 2014/0215340 A1 | 7/2014 | Shetty et al. |
| 2014/0215457 A1 | 7/2014 | Gava et al. |
| 2014/0222916 A1 | 8/2014 | Foley et al. |
| 2014/0237382 A1 | 8/2014 | Grandhi |
| 2014/0248590 A1 | 9/2014 | Mccormick |
| 2014/0253487 A1 | 9/2014 | Bezinge et al. |
| 2014/0258935 A1 | 9/2014 | Nishida et al. |
| 2014/0260776 A1 | 9/2014 | Burleson |
| 2014/0267441 A1 | 9/2014 | Matas et al. |
| 2014/0282005 A1 | 9/2014 | Gutowitz |
| 2014/0282142 A1 | 9/2014 | Lin |
| 2014/0282214 A1 | 9/2014 | Shirzadi et al. |
| 2014/0289659 A1* | 9/2014 | Harrison ............. G06F 3/04842 715/765 |
| 2014/0292668 A1 | 10/2014 | Fricklas et al. |
| 2014/0298233 A1 | 10/2014 | Pettey et al. |
| 2014/0304389 A1 | 10/2014 | Reavis |
| 2014/0306989 A1 | 10/2014 | Doubleday et al. |
| 2014/0328147 A1 | 11/2014 | Yang et al. |
| 2014/0330435 A1 | 11/2014 | Stoner et al. |
| 2014/0333670 A1 | 11/2014 | Agnetta et al. |
| 2014/0344700 A1 | 11/2014 | Kane et al. |
| 2014/0347289 A1 | 11/2014 | Suh et al. |
| 2014/0362024 A1 | 12/2014 | Hicks |

(56) References Cited

U.S. PATENT DOCUMENTS

| | | |
|---|---|---|
| 2014/0365126 A1 | 12/2014 | Vuicano et al. |
| 2014/0372115 A1 | 12/2014 | Lebeau et al. |
| 2015/0007025 A1 | 1/2015 | Sassi et al. |
| 2015/0007048 A1 | 1/2015 | Dumans |
| 2015/0009784 A1 | 1/2015 | Cho et al. |
| 2015/0036555 A1 | 2/2015 | Shin et al. |
| 2015/0046871 A1 | 2/2015 | Lewis |
| 2015/0049591 A1 | 2/2015 | Adams et al. |
| 2015/0058723 A1 | 2/2015 | Cieplinski et al. |
| 2015/0058744 A1 | 2/2015 | Dhingra et al. |
| 2015/0065821 A1* | 3/2015 | Conrad .............. A61K 47/6921 600/309 |
| 2015/0067495 A1 | 3/2015 | Bernstein et al. |
| 2015/0067497 A1 | 3/2015 | Cieplinski et al. |
| 2015/0067513 A1 | 3/2015 | Zambetti et al. |
| 2015/0067555 A1* | 3/2015 | Joo ..................... G06F 3/04842 715/765 |
| 2015/0074615 A1 | 3/2015 | Han et al. |
| 2015/0077398 A1 | 3/2015 | Yairi et al. |
| 2015/0085621 A1 | 3/2015 | Hong et al. |
| 2015/0121224 A1 | 4/2015 | Krasnahill, Jr. |
| 2015/0121311 A1 | 4/2015 | Lou et al. |
| 2015/0148927 A1 | 5/2015 | Georges et al. |
| 2015/0149899 A1 | 5/2015 | Bernstein et al. |
| 2015/0149956 A1 | 5/2015 | Kempinski et al. |
| 2015/0160856 A1 | 6/2015 | Jang et al. |
| 2015/0178041 A1 | 6/2015 | Uskoreit |
| 2015/0185845 A1 | 7/2015 | Nagara et al. |
| 2015/0193099 A1 | 7/2015 | Murphy |
| 2015/0193951 A1 | 7/2015 | Lee et al. |
| 2015/0199012 A1 | 7/2015 | Palmer |
| 2015/0199110 A1 | 7/2015 | Nakazato |
| 2015/0205476 A1 | 7/2015 | Kuscher et al. |
| 2015/0234518 A1 | 8/2015 | Teller et al. |
| 2015/0234562 A1 | 8/2015 | Ording |
| 2015/0242989 A1 | 8/2015 | Mun et al. |
| 2015/0261310 A1 | 9/2015 | Walmsley et al. |
| 2015/0261412 A1 | 9/2015 | Guillama et al. |
| 2015/0269944 A1 | 9/2015 | Wang |
| 2015/0277559 A1 | 10/2015 | Vescovi et al. |
| 2015/0277563 A1 | 10/2015 | Huang et al. |
| 2015/0281945 A1 | 10/2015 | Seo et al. |
| 2015/0286391 A1 | 10/2015 | Jacobs et al. |
| 2015/0302301 A1 | 10/2015 | Petersen |
| 2015/0370425 A1 | 12/2015 | Chen et al. |
| 2015/0370529 A1 | 12/2015 | Zambetti et al. |
| 2015/0378447 A1 | 12/2015 | Nagano et al. |
| 2015/0378555 A1 | 12/2015 | Ramanathan et al. |
| 2015/0379476 A1 | 12/2015 | Chaudhri et al. |
| 2016/0004393 A1 | 1/2016 | Faaborg et al. |
| 2016/0011758 A1 | 1/2016 | Meggs et al. |
| 2016/0012018 A1 | 1/2016 | Do Ba |
| 2016/0028875 A1 | 1/2016 | Brown et al. |
| 2016/0034133 A1 | 2/2016 | Wilson et al. |
| 2016/0034148 A1 | 2/2016 | Wilson et al. |
| 2016/0034152 A1 | 2/2016 | Wilson et al. |
| 2016/0034153 A1 | 2/2016 | Lejeune et al. |
| 2016/0034166 A1 | 2/2016 | Wilson et al. |
| 2016/0034167 A1 | 2/2016 | Wilson et al. |
| 2016/0048296 A1 | 2/2016 | Gan et al. |
| 2016/0054710 A1 | 2/2016 | Jo et al. |
| 2016/0062466 A1 | 3/2016 | Moussette et al. |
| 2016/0062487 A1 | 3/2016 | Foss et al. |
| 2016/0062567 A1 | 3/2016 | Yang et al. |
| 2016/0062571 A1 | 3/2016 | Dascola et al. |
| 2016/0062572 A1 | 3/2016 | Yang et al. |
| 2016/0062573 A1 | 3/2016 | Dascola et al. |
| 2016/0062598 A1 | 3/2016 | Kocienda et al. |
| 2016/0062608 A1 | 3/2016 | Foss et al. |
| 2016/0063828 A1 | 3/2016 | Moussette et al. |
| 2016/0063850 A1 | 3/2016 | Yang et al. |
| 2016/0065509 A1 | 3/2016 | Yang et al. |
| 2016/0065525 A1 | 3/2016 | Dye et al. |
| 2016/0071241 A1 | 3/2016 | Karunamuni et al. |
| 2016/0077495 A1 | 3/2016 | Brown et al. |
| 2016/0091971 A1 | 3/2016 | Burr |
| 2016/0092063 A1 | 3/2016 | Lee |
| 2016/0098016 A1 | 4/2016 | Ely et al. |
| 2016/0117141 A1 | 4/2016 | Ro et al. |
| 2016/0124626 A1 | 5/2016 | Lee et al. |
| 2016/0162164 A1 | 6/2016 | Phillips et al. |
| 2016/0170436 A1 | 6/2016 | Farrar et al. |
| 2016/0170598 A1 | 6/2016 | Zambetti et al. |
| 2016/0170608 A1 | 6/2016 | Zambetti et al. |
| 2016/0170624 A1 | 6/2016 | Zambetti et al. |
| 2016/0170625 A1 | 6/2016 | Zambetti et al. |
| 2016/0180820 A1 | 6/2016 | Pascucci et al. |
| 2016/0198319 A1 | 7/2016 | Huang et al. |
| 2016/0202866 A1 | 7/2016 | Zambetti |
| 2016/0209939 A1 | 7/2016 | Zambetti et al. |
| 2016/0231883 A1 | 8/2016 | Zambetti et al. |
| 2016/0259499 A1 | 9/2016 | Kocienda et al. |
| 2016/0259530 A1 | 9/2016 | Everitt et al. |
| 2016/0259535 A1 | 9/2016 | Fleizach et al. |
| 2016/0269540 A1 | 9/2016 | Butcher et al. |
| 2016/0299912 A1 | 10/2016 | Acuna et al. |
| 2016/0327911 A1 | 11/2016 | Eim et al. |
| 2016/0357368 A1 | 12/2016 | Federighi et al. |
| 2017/0010678 A1 | 1/2017 | Tuli |
| 2017/0010751 A1 | 1/2017 | Shedletsky et al. |
| 2017/0045958 A1 | 2/2017 | Battlogg |
| 2017/0053542 A1 | 2/2017 | Wilson et al. |
| 2017/0089735 A1 | 3/2017 | Ruh |
| 2017/0104902 A1 | 4/2017 | Kim et al. |
| 2017/0208466 A1 | 7/2017 | Seo et al. |
| 2017/0242933 A1 | 8/2017 | Liu |
| 2017/0255169 A1 | 9/2017 | Lee et al. |
| 2017/0269692 A1 | 9/2017 | Eck et al. |
| 2017/0315716 A1 | 11/2017 | Zambetti et al. |
| 2017/0357317 A1 | 12/2017 | Chaudhri et al. |
| 2017/0357318 A1 | 12/2017 | Chaudhri et al. |
| 2017/0357319 A1 | 12/2017 | Chaudhri et al. |
| 2017/0357320 A1 | 12/2017 | Chaudhri et al. |
| 2017/0357426 A1 | 12/2017 | Wilson et al. |
| 2017/0357427 A1 | 12/2017 | Wilson et al. |
| 2017/0358181 A1 | 12/2017 | Moussette et al. |
| 2018/0024683 A1 | 1/2018 | Ely et al. |
| 2018/0067557 A1 | 3/2018 | Robert et al. |
| 2018/0074690 A1 | 3/2018 | Zambetti et al. |
| 2018/0074693 A1 | 3/2018 | Jones et al. |
| 2018/0081453 A1 | 3/2018 | Ely |
| 2018/0088532 A1 | 3/2018 | Ely et al. |
| 2018/0088797 A1 | 3/2018 | Mcatee et al. |
| 2018/0204425 A1 | 7/2018 | Moussette et al. |
| 2018/0210516 A1 | 7/2018 | Zambetti et al. |
| 2018/0307363 A1 | 10/2018 | Ely et al. |
| 2018/0329587 A1 | 11/2018 | Ko et al. |
| 2018/0335891 A1 | 11/2018 | Shedletsky et al. |
| 2018/0335901 A1 | 11/2018 | Manzari et al. |
| 2018/0336866 A1 | 11/2018 | Triverio et al. |
| 2018/0341344 A1 | 11/2018 | Foss et al. |
| 2018/0367489 A1 | 12/2018 | Dye et al. |
| 2018/0369691 A1 | 12/2018 | Rihn et al. |
| 2019/0012063 A1 | 1/2019 | Kocienda et al. |
| 2019/0033862 A1 | 1/2019 | Groden et al. |
| 2019/0050055 A1 | 2/2019 | Chaudhri et al. |
| 2019/0056700 A1 | 2/2019 | Matsuno et al. |
| 2019/0072912 A1 | 3/2019 | Pandya et al. |
| 2019/0080066 A1 | 3/2019 | Van os et al. |
| 2019/0080072 A1 | 3/2019 | Van os et al. |
| 2019/0101870 A1 | 4/2019 | Pandya et al. |
| 2019/0163324 A1 | 5/2019 | Shedletsky et al. |
| 2019/0163329 A1 | 5/2019 | Yang et al. |
| 2019/0172016 A1 | 6/2019 | Chaudhri et al. |
| 2019/0212885 A1 | 7/2019 | Zambetti et al. |
| 2019/0243471 A1 | 8/2019 | Foss et al. |
| 2019/0272036 A1 | 9/2019 | Grant et al. |
| 2019/0274565 A1 | 9/2019 | Soli et al. |
| 2019/0279520 A1 | 9/2019 | Wilson et al. |
| 2019/0342622 A1 | 11/2019 | Carrigan et al. |
| 2019/0354268 A1 | 11/2019 | Everitt et al. |
| 2019/0369755 A1 | 12/2019 | Roper et al. |
| 2019/0369838 A1 | 12/2019 | Josephson et al. |
| 2020/0050332 A1 | 2/2020 | Yang et al. |

(56) References Cited

U.S. PATENT DOCUMENTS

| | | | |
|---|---|---|---|
| 2020/0081538 A1 | 3/2020 | Moussette et al. |
| 2020/0081539 A1 | 3/2020 | Moussette et al. |
| 2020/0110522 A1 | 4/2020 | Zambetti et al. |
| 2020/0145361 A1 | 5/2020 | Dye et al. |
| 2020/0272287 A1 | 8/2020 | Yang et al. |
| 2020/0272293 A1 | 8/2020 | Zambetti et al. |
| 2020/0333945 A1 | 10/2020 | Wilson et al. |
| 2020/0341553 A1 | 10/2020 | Moussette et al. |
| 2020/0368616 A1 | 11/2020 | Delamont |
| 2021/0073741 A1 | 3/2021 | Chaudhri et al. |
| 2021/0208750 A1 | 7/2021 | Zambetti et al. |
| 2021/0311438 A1 | 10/2021 | Wilson et al. |
| 2021/0342017 A1 | 11/2021 | Foss et al. |
| 2022/0129858 A1 | 4/2022 | Chaudhri et al. |

FOREIGN PATENT DOCUMENTS

| | | |
|---|---|---|
| AU | 2016231505 A1 | 10/2016 |
| AU | 2018100429 A4 | 5/2018 |
| AU | 2018100429 B4 | 8/2018 |
| CH | 700242 A2 | 7/2010 |
| CN | 1263425 A | 8/2000 |
| CN | 1330310 A | 1/2002 |
| CN | 1341889 A | 3/2002 |
| CN | 1398366 A | 2/2003 |
| CN | 1549998 A | 11/2004 |
| CN | 1650251 A | 8/2005 |
| CN | 1757011 A | 4/2006 |
| CN | 1797295 A | 7/2006 |
| CN | 1811899 A | 8/2006 |
| CN | 101042300 A | 9/2007 |
| CN | 101059730 A | 10/2007 |
| CN | 101101595 A | 1/2008 |
| CN | 101202866 A | 6/2008 |
| CN | 101203821 A | 6/2008 |
| CN | 101356493 A | 1/2009 |
| CN | 101390038 A | 3/2009 |
| CN | 101431545 A | 5/2009 |
| CN | 101446802 A | 6/2009 |
| CN | 101535938 A | 9/2009 |
| CN | 101611374 A | 12/2009 |
| CN | 101625620 A | 1/2010 |
| CN | 101627349 A | 1/2010 |
| CN | 101634659 A | 1/2010 |
| CN | 101770331 A | 7/2010 |
| CN | 101776968 A | 7/2010 |
| CN | 101796478 A | 8/2010 |
| CN | 101876877 A | 11/2010 |
| CN | 101893992 A | 11/2010 |
| CN | 101976171 A | 2/2011 |
| CN | 102033710 A | 4/2011 |
| CN | 102037436 A | 4/2011 |
| CN | 102112946 A | 6/2011 |
| CN | 101241407 B | 7/2011 |
| CN | 102138120 A | 7/2011 |
| CN | 102144213 A | 8/2011 |
| CN | 102402328 A | 4/2012 |
| CN | 102479027 A | 5/2012 |
| CN | 102479053 A | 5/2012 |
| CN | 102508707 A | 6/2012 |
| CN | 102591579 A | 7/2012 |
| CN | 102612679 A | 7/2012 |
| CN | 102725724 A | 10/2012 |
| CN | 102750066 A | 10/2012 |
| CN | 102763066 A | 10/2012 |
| CN | 102812426 A | 12/2012 |
| CN | 102859482 A | 1/2013 |
| CN | 102902453 A | 1/2013 |
| CN | 102902454 A | 1/2013 |
| CN | 102905181 A | 1/2013 |
| CN | 101034328 B | 2/2013 |
| CN | 102981770 A | 3/2013 |
| CN | 103069378 A | 4/2013 |
| CN | 103076942 A | 5/2013 |
| CN | 103154878 A | 6/2013 |
| CN | 103212197 A | 7/2013 |
| CN | 103270486 A | 8/2013 |
| CN | 103460164 A | 12/2013 |
| CN | 103547987 A | 1/2014 |
| CN | 103703437 A | 4/2014 |
| CN | 103713848 A | 4/2014 |
| CN | 103777842 A | 5/2014 |
| CN | 103782252 A | 5/2014 |
| CN | 103793138 A | 5/2014 |
| CN | 103858088 A | 6/2014 |
| CN | 103870255 A | 6/2014 |
| CN | 103870282 A | 6/2014 |
| CN | 103914261 A | 7/2014 |
| CN | 103970413 A | 8/2014 |
| CN | 103995647 A | 8/2014 |
| CN | 103995724 A | 8/2014 |
| CN | 104166458 A | 11/2014 |
| CN | 105955591 A | 9/2016 |
| CN | 107710135 A | 2/2018 |
| CN | 107797657 A | 3/2018 |
| CN | 108139863 A | 6/2018 |
| CN | 108304106 A | 7/2018 |
| CN | 108334190 A | 7/2018 |
| CN | 108369455 A | 8/2018 |
| EP | 1052566 A1 | 11/2000 |
| EP | 1168149 A2 | 1/2002 |
| EP | 1406158 A2 | 4/2004 |
| EP | 1486860 A1 | 12/2004 |
| EP | 1505484 A1 | 2/2005 |
| EP | 1517228 A2 | 3/2005 |
| EP | 1571538 A1 | 9/2005 |
| EP | 1679879 A2 | 7/2006 |
| EP | 1847920 A2 | 10/2007 |
| EP | 1850213 A2 | 10/2007 |
| EP | 1942401 A1 | 7/2008 |
| EP | 1944677 A2 | 7/2008 |
| EP | 1956433 A1 | 8/2008 |
| EP | 1956446 A2 | 8/2008 |
| EP | 1959337 A2 | 8/2008 |
| EP | 2124131 A2 | 11/2009 |
| EP | 2151745 A2 | 2/2010 |
| EP | 2194452 A1 | 6/2010 |
| EP | 2207084 A2 | 7/2010 |
| EP | 2224317 A1 | 9/2010 |
| EP | 2237140 A2 | 10/2010 |
| EP | 2284646 A1 | 2/2011 |
| EP | 2302492 A2 | 3/2011 |
| EP | 2302493 A2 | 3/2011 |
| EP | 2385451 A1 | 11/2011 |
| EP | 2525282 A2 | 11/2012 |
| EP | 2547117 A1 | 1/2013 |
| EP | 2551784 A1 | 1/2013 |
| EP | 2565767 A1 | 3/2013 |
| EP | 2565769 A2 | 3/2013 |
| EP | 2610738 A2 | 7/2013 |
| EP | 2693382 A2 | 2/2014 |
| EP | 2733579 A2 | 5/2014 |
| EP | 2733598 A2 | 5/2014 |
| EP | 2741176 A2 | 6/2014 |
| EP | 2911377 A1 | 8/2015 |
| EP | 3401770 A1 | 11/2018 |
| GB | 2392773 A | 3/2004 |
| GB | 2489580 A | 10/2012 |
| JP | 55-80084 A | 6/1980 |
| JP | 5-88812 A | 4/1993 |
| JP | 6-110881 A | 4/1994 |
| JP | 6-348408 A | 12/1994 |
| JP | 7-152478 A | 6/1995 |
| JP | 7-325700 A | 12/1995 |
| JP | 8-76926 A | 3/1996 |
| JP | 10-240488 A | 9/1998 |
| JP | 11-110106 A | 4/1999 |
| JP | 2000-40158 A | 2/2000 |
| JP | 2000-503153 A | 3/2000 |
| JP | 2000-242390 A | 9/2000 |
| JP | 2000-305760 A | 11/2000 |
| JP | 2001-100905 A | 4/2001 |
| JP | 2001-101202 A | 4/2001 |
| JP | 2001-202178 A | 7/2001 |

(56) References Cited

FOREIGN PATENT DOCUMENTS

| | | |
|---|---|---|
| JP | 2001-202181 A | 7/2001 |
| JP | 2002-175139 A | 6/2002 |
| JP | 2002-288690 A | 10/2002 |
| JP | 2003-195998 A | 7/2003 |
| JP | 2003-248544 A | 9/2003 |
| JP | 2003-526820 A | 9/2003 |
| JP | 2003-330586 A | 11/2003 |
| JP | 2003-330856 A | 11/2003 |
| JP | 2004-021522 A | 1/2004 |
| JP | 2004-184396 A | 7/2004 |
| JP | 2004-259063 A | 9/2004 |
| JP | 2005-4891 A | 1/2005 |
| JP | 2005-45744 A | 2/2005 |
| JP | 2005-196077 A | 7/2005 |
| JP | 2006-11690 A | 1/2006 |
| JP | 2006-140990 A | 6/2006 |
| JP | 2006-185273 A | 7/2006 |
| JP | 2007-512635 A | 5/2007 |
| JP | 2007-170995 A | 7/2007 |
| JP | 2007-179544 A | 7/2007 |
| JP | 2008-97057 A | 4/2008 |
| JP | 2008-518539 A | 5/2008 |
| JP | 2008-157974 A | 7/2008 |
| JP | 2008-276801 A | 11/2008 |
| JP | 2008-539513 A | 11/2008 |
| JP | 2009-59382 A | 3/2009 |
| JP | 2009-510404 A | 3/2009 |
| JP | 2009-80710 A | 4/2009 |
| JP | 2009-128296 A | 6/2009 |
| JP | 2009-246553 A | 10/2009 |
| JP | 2009-265793 A | 11/2009 |
| JP | 2009-294526 A | 12/2009 |
| JP | 2010-97353 A | 4/2010 |
| JP | 2010-511939 A | 4/2010 |
| JP | 2010-515978 A | 5/2010 |
| JP | 2010-522935 A | 7/2010 |
| JP | 2010-257051 A | 11/2010 |
| JP | 2011-8540 A | 1/2011 |
| JP | 2011-90640 A | 5/2011 |
| JP | 2011-96043 A | 5/2011 |
| JP | 2011-530738 A | 12/2011 |
| JP | 2012-27797 A | 2/2012 |
| JP | 2012-58979 A | 3/2012 |
| JP | 2012-115519 A | 6/2012 |
| JP | 2012-155698 A | 8/2012 |
| JP | 2012-252384 A | 12/2012 |
| JP | 2013-114844 A | 6/2013 |
| JP | 2013-122738 A | 6/2013 |
| JP | 2013-137750 A | 7/2013 |
| JP | 2013-164700 A | 8/2013 |
| JP | 2014-42164 A | 3/2014 |
| JP | 2016-538653 A | 12/2016 |
| JP | 2017-500656 A | 1/2017 |
| JP | 2017-516163 A | 6/2017 |
| JP | 2018-508076 A | 3/2018 |
| JP | 2018-508900 A | 3/2018 |
| KR | 10-2004-0107472 A | 12/2004 |
| KR | 10-0630154 B1 | 9/2006 |
| KR | 10-2007-0024702 A | 3/2007 |
| KR | 10-2008-0095085 A | 10/2008 |
| KR | 10-2010-0003589 A | 1/2010 |
| KR | 10-2010-0019887 A | 2/2010 |
| KR | 10-0971452 B1 | 7/2010 |
| KR | 10-2010-0109277 A | 10/2010 |
| KR | 10-2011-0093090 A | 8/2011 |
| KR | 10-2011-0114294 A | 10/2011 |
| KR | 10-2012-0071468 A | 7/2012 |
| KR | 10-2012-0079707 A | 7/2012 |
| KR | 10-2013-0027017 A | 3/2013 |
| KR | 10-2013-0052751 A | 5/2013 |
| KR | 10-2015-0022599 A | 3/2015 |
| TW | I269202 B | 12/2006 |
| TW | D122820 S | 5/2008 |
| TW | 200843452 A | 11/2008 |
| TW | 201027419 A | 7/2010 |
| TW | 201119339 A1 | 6/2011 |
| TW | I349212 B | 9/2011 |
| TW | I381305 B | 1/2013 |
| TW | I384394 B1 | 2/2013 |
| TW | I394410 B1 | 4/2013 |
| TW | I395498 B | 5/2013 |
| TW | I405106 B | 8/2013 |
| TW | 201403363 A | 1/2014 |
| TW | 201403406 A | 1/2014 |
| TW | I426416 B | 2/2014 |
| TW | 201421340 A | 6/2014 |
| TW | 201426492 A | 7/2014 |
| TW | I443547 B | 7/2014 |
| TW | 201432552 A | 8/2014 |
| WO | 1993/08517 A1 | 4/1993 |
| WO | 1996/19872 A1 | 6/1996 |
| WO | 2001/69369 A1 | 9/2001 |
| WO | 2003/021568 A1 | 3/2003 |
| WO | 03/036457 A2 | 5/2003 |
| WO | 2005/055034 A1 | 6/2005 |
| WO | 2006/037545 A2 | 4/2006 |
| WO | 2006/042309 A1 | 4/2006 |
| WO | 2006/094308 A2 | 9/2006 |
| WO | 2006/094308 A3 | 12/2006 |
| WO | 2007/002621 A2 | 1/2007 |
| WO | 2008/030779 A2 | 3/2008 |
| WO | 2008/030879 A2 | 3/2008 |
| WO | 2008/033853 A2 | 3/2008 |
| WO | 2008/067498 A2 | 6/2008 |
| WO | 2008/085742 A2 | 7/2008 |
| WO | 2008/086218 A2 | 7/2008 |
| WO | 2008/090902 A1 | 7/2008 |
| WO | 2008/099251 A1 | 8/2008 |
| WO | 2008106777 A1 | 9/2008 |
| WO | 2009/026508 A1 | 2/2009 |
| WO | 2009/084368 A1 | 7/2009 |
| WO | 2009/085378 A1 | 7/2009 |
| WO | 2009/089222 A2 | 7/2009 |
| WO | 2009/097592 A1 | 8/2009 |
| WO | 2010/024969 A1 | 3/2010 |
| WO | 2010/134729 A2 | 11/2010 |
| WO | 2010/150768 A1 | 12/2010 |
| WO | 2011/084859 A1 | 7/2011 |
| WO | 2011/126502 A1 | 10/2011 |
| WO | 2012/006494 A1 | 1/2012 |
| WO | 2012/080020 A1 | 6/2012 |
| WO | 2012/103117 A1 | 8/2012 |
| WO | 2012/129359 A1 | 9/2012 |
| WO | 2013/085580 A1 | 6/2013 |
| WO | 2013/105664 A1 | 7/2013 |
| WO | 2013/114844 A1 | 8/2013 |
| WO | 2013/133901 A2 | 9/2013 |
| WO | 2013/169842 A2 | 11/2013 |
| WO | 2013/169846 A1 | 11/2013 |
| WO | 2013/169875 A2 | 11/2013 |
| WO | 2014/058816 A1 | 4/2014 |
| WO | 2014/105276 A1 | 7/2014 |
| WO | 2015/034969 A2 | 3/2015 |
| WO | 2015/057320 A1 | 4/2015 |
| WO | 2016/141057 A1 | 9/2016 |
| WO | 2016/144385 A1 | 9/2016 |
| WO | 2016/144563 A1 | 9/2016 |
| WO | 2016/144696 A2 | 9/2016 |
| WO | 2016/144975 A2 | 9/2016 |
| WO | 2017/027625 A2 | 2/2017 |
| WO | 2018/048518 A1 | 3/2018 |
| WO | 2018/048632 A1 | 3/2018 |

OTHER PUBLICATIONS

Corrected Notice of Allowance received for U.S. Appl. No. 14/641,308, dated Mar. 10, 2020, 4 pages.
Decision to Grant received for European Patent Application No. 14772002.3, dated Feb. 20, 2020, 2 pages.
Extended European Search Report received for European Patent Application No. 19195247.2, dated Mar. 9, 2020, 7 pages.
Non-Final Office Action received for U.S. Appl. No. 16/147,413, dated Mar. 11, 2020, 22 pages.

(56) References Cited

OTHER PUBLICATIONS

Notice of Allowance received for U.S. Appl. No. 16/144,950, dated Mar. 19, 2020, 14 pages.
Office Action received for Chinese Patent Application No. 201580077206.7, dated Feb. 3, 2020, 29 pages (8 pages of English Translation and 21 pages of Official Copy).
Office Action received for Indian Patent Application No. 201617009428, dated Feb. 26, 2020, 7 pages.
Office Action received for Korean Patent Application No. 10-2017-7024506, dated Feb. 19, 2020, 12 pages (5 pages of English Translation and 7 pages of Official Copy).
Applicant-Initiated Interview Summary received for U.S. Appl. No. 16/147,413, dated Jun. 2, 2020, 4 pages.
Final Office Action received for U.S. Appl. No. 16/130,838, dated May 29, 2020, 25 pages.
Baidu Experience, "iPhone how to move icon", Online available at: https://jingyan.baidu.com/article/eb9f7b6da4eacb869264e84f.html, Apr. 28, 2014, 4 pages (Official Copy Only) (See Communication under 37 CFR § 1.98(a) (3)).
Non-Final Office Action received for U.S. Appl. No. 16/525,082, dated Jul. 9, 2020, 20 pages.
Notice of Allowance received for Chinese Patent Application No. 201580046331.1, dated Jun. 24, 2020, 4 pages (1 page of English Translation and 3 pages of Official Copy).
Office Action received for Chinese Patent Application No. 201580046339.8, dated Jun. 3, 2020, 19 pages (10 pages of English Translation and 9 pages of Official Copy).
Applicant-Initiated Interview Summary received for U.S. Appl. No. 16/130,838, dated Jul. 20, 2020, 6 pages.
Applicant-Initiated Interview Summary received for U.S. Appl. No. 16/525,082, dated Jul. 28, 2020, 4 pages.
Decision to Grant received for European Patent Application No. 14772494.2, dated Jul. 23, 2020, 2 pages.
Non-Final Office Action received for U.S. Appl. No. 13/077,862, dated Jul. 17, 2020, 20 pages.
Non-Final Office Action received for U.S. Appl. No. 16/263,280, dated Jul. 27, 2020, 11 pages.
Non-Final Office Action received for U.S. Appl. No. 16/734,173, dated Jul. 23, 2020, 16 pages.
Notice of Allowance received for U.S. Appl. No. 16/147,413, dated Jul. 20, 2020, 11 pages.
Office Action received for Australian Patent Application No. 2019206101, dated Jul. 14, 2020, 4 pages.
Office Action received for Korean Patent Application No. 10-2017-7024506, dated Jul. 8, 2020, 6 pages (3 pages of English Translation and 3 pages of Official Copy).
Office Action received for Korean Patent Application No. 10-2018-7033888, dated Jul. 7, 2020, 7 pages (3 pages of English Translation and 4 pages of Official Copy).
Notice of Allowance received for U.S. Appl. No. 16/525,082, dated Aug. 20, 2020, 5 pages.
Office Action received for Australian Patent Application No. 2019216614, dated Aug. 13, 2020, 4 pages.
Office Action received for Chinese Patent Application No. 201810074876.9, dated Jul. 31, 2020, 11 pages (5 pages of English Translation and 6 pages of Official Copy).
Office Action received for Japanese Patent Application No. 2019-088503, dated Jul. 31, 2020, 7 pages (4 pages of English Translation and 3 pages of Official Copy).
Non-Final Office Action received for U.S. Appl. No. 14/913,349, dated Apr. 22, 2020, 20 pages.
Non-Final Office Action received for U.S. Appl. No. 16/358,483, dated May 1, 2020, 37 pages.
Office Action received for Chinese Patent Application No. 201910164962.3, dated Apr. 8, 2020, 25 pages (13 pages of English Translation and 12 pages of Official Copy).
Office Action received for Taiwanese Patent Application No. 103130518, dated Oct. 15, 2015, 7 pages (3 pages of English Translation and 4 pages of Official Copy).
Applicant-Initiated Interview Summary received for U.S. Appl. No. 15/818,500, dated Oct. 13, 2020, 4 pages.
Applicant-Initiated Interview Summary received for U.S. Appl. No. 16/358,483, dated Sep. 28, 2020, 6 pages.
Applicant Initiated Interview Summary received for U.S. Appl. No. 15/655,253, dated Mar. 31, 2020, 5 pages.
Applicant-Initiated Interview Summary received for U.S. Appl. No. 16/130,838, dated Mar. 26, 2020, 8 pages.
Intention to Grant received for European Patent Application No. 14772494.2, dated Mar. 16, 2020, 10 pages.
Office Action received for Taiwanese Patent Application No. 104107318, dated Feb. 18, 2020, 10 pages (4 pages of English Translation and 6 pages of Official Copy).
Corrected Notice of Allowance received for U.S. Appl. No. 14/913,345, dated Apr. 13, 2020, 4 pages.
Final Office Action received for U.S. Appl. No. 15/818,500, dated Apr. 6, 2020, 15 pages.
Notice of Allowance received for Korean Patent Application No. 10-2018-7013265, dated Apr. 1, 2020, 4 pages (1 page of English Translation and 3 pages of Official Copy).
Notice of Allowance received for U.S. Appl. No. 15/418,537, dated Apr. 6, 2020, 9 pages.
Office Action received for Australian Patent Application No. 2019216614, dated Apr. 1, 2020, 4 pages.
Office Action received for Taiwanese Patent Application No. 104107329, dated Mar. 5, 2020, 22 pages (9 pages of English Translation and 13 pages of Official Copy).
Extended European Search Report received for European Patent Application No. 19217240.1, dated May 25, 2020, 7 pages.
Notice of Allowance received for Korean Patent Application No. 10-2019-7007748, dated May 6, 2020, 5 pages (1 page of English Translation and 4 pages of Official Copy).
Office Action received for Korean Patent Application No. 10-2019-7028736, dated May 7, 2020, 8 pages (3 pages of English Translation and 5 pages of Official Copy).
Intention to Grant received for European Patent Application No. 19199004.3, dated Sep. 14, 2020, 9 pages.
Intention to Grant received for Indian Patent Application No. 201617009216, dated Aug. 27, 2020, 2 pages.
Corrected Notice of Allowance received for U.S. Appl. No. 16/147,413, dated Sep. 17, 2020, 7 pages.
Office Action received for Australian Patent Application No. 2019272034, dated Sep. 14, 2020, 4 pages.
Advisory Action received for U.S. Appl. No. 09/477,419, dated Dec. 4, 2002, 3 pages.
Advisory Action received for U.S. Appl. No. 11/069,977, dated Aug. 6, 2012, 3 pages.
Advisory Action received for U.S. Appl. No. 11/069,977, dated May 13, 2009, 2 pages.
Advisory Action received for U.S. Appl. No. 11/069,977, dated May 26, 2011, 3 pages.
Advisory Action received for U.S. Appl. No. 13/077,850, dated Apr. 24, 2014, 3 pages.
Advisory Action received for U.S. Appl. No. 13/077,855, dated Jun. 15, 2016, 4 pages.
Advisory Action received for U.S. Appl. No. 13/077,862, dated Apr. 7, 2016, 3 pages.
Advisory Action received for U.S. Appl. No. 13/077,874, dated Aug. 19, 2016, 3 pages.
Advisory Action received for U.S. Appl. No. 14/641,308, dated Nov. 14, 2019, 4 pages.
Advisory Action received for U.S. Appl. No. 14/841,646, dated Nov. 21, 2018, 5 pages.
Advisory Action received for U.S. Appl. No. 14/913,349, dated Oct. 29, 2019, 4 pages.
Advisory Action received for U.S. Appl. No. 15/049,058, dated Oct. 18, 2017, 3 pages.
Advisory Action received for U.S. Appl. No. 15/049,064, dated May 10, 2017, 3 pages.
Advisory Action received for U.S. Appl. No. 16/144,950, dated Feb. 20, 2020, 5 pages.
Advisory Action received for U.S. Appl. No. 16/147,413, dated Nov. 25, 2019, 2019, 6 pages.

(56) References Cited

OTHER PUBLICATIONS

Andrews, Phillip, "Advanced Photoshop Elements for Digital Photographers", Chapters 7.04-7.05, Feb. 20, 2004, 12 pages.
Appeal Decision received for U.S. Appl. No. 13/077,862, mailed on Mar. 22, 2019, 10 pages.
Apple, "iPhone User's Guide", Available at <http://mesnotices.20minutes.fr/manuel-notice-mode-emploi/APPLE/IPHONE%2D%5FE#>, Retrieved on Mar. 27, 2008, Jun. 2007, 137 pages.
AppleItouchreviews, "The Best Cydia Tweak For Your iPhone, iPod Touch & iPad-Iconoclasm", Available online at:—https://www.youtube.com/watch?v=EhriZRINufQ, Apr. 23, 2011, 2 pages.
Applicant Initiated Interview Summary received for U.S. Appl. No. 14/913,345, dated Nov. 4, 2019, 5 pages.
Applicant Initiated Interview Summary received for U.S. Appl. No. 14/913,349, dated Oct. 7, 2019, 4 pages.
Applicant Initiated Interview Summary received for U.S. Appl. No. 15/655,253, dated Nov. 12, 2019, 3 pages.
Applicant Initiated Interview Summary received for U.S. Appl. No. 16/147,413, dated Oct. 28, 2019, 5 pages.
Applicant-Initiated Interview Summary received for U.S. Appl. No. 14/641,308, dated Oct. 10, 2019, 5 pages.
Applicant-Initiated Interview Summary received for U.S. Appl. No. 15/418,537, dated Dec. 23, 2019, 6 pages.
Applicant-Initiated Interview Summary received for U.S. Appl. No. 15/818,500, dated Jan. 30, 2020, 5 pages.
Applicant-Initiated Interview Summary received for U.S. Appl. No. 16/144,950, dated Jan. 29, 2020, 5 pages.
Arraich, Jay, "Bevel and Emboss", Photoshop Tips, Webpage [online] www.arraich.com, Available on: <http://web.archive.org/web/20021203061806/http://www.arraich.com/effects1/bevelandemboss.htm>, Feb. 19, 2008, 8 pages.
Arraich, Jay, "Drop Shadow", Photoshop Tips, Webpage [online], www.arraich.com, Available on: <http://web.archive.org/web/20021215195819/www.arraich.com/effects1/dropshadow.htm>, Feb. 19, 2008, 7 pages.
Brinkmann, Martin, "How To Zoom In Firefox", GHacks, Available at <https://web.archive.org/web/20130804034728/https://www.ghacks.net/2009/02/23/how-to-zoom-in-firefox/>, Feb. 23, 2009, 11 pages.
Certificate of Examination received for Australian Patent Application No. 2017101561, dated Jun. 25, 2018, 2 pages.
Certificate of Examination received for Australian Patent Application No. 2018101076, dated Apr. 11, 2019, 2 pages.
Colt, Sam, "Here's One Way Apple's Smartwatch Could Be Better Than Anything Else", Business Insider, Aug. 21, 2014, pp. 1-4.
Corrected Notice of Allowance received for U.S. Appl. No. 13/077,874, dated Dec. 9, 2016, 2 pages.
Corrected Notice of Allowance received for U.S. Appl. No. 14/641,252, dated Aug. 28, 2018, 2 pages.
Corrected Notice of Allowance received for U.S. Appl. No. 14/641,252, dated Jul. 9, 2018, 25 pages.
Corrected Notice of Allowance received for U.S. Appl. No. 14/641,252, dated May 10, 2018, 10 pages.
Corrected Notice of Allowance received for U.S. Appl. No. 14/641,287, dated Aug. 9, 2018, 2 pages.
Corrected Notice of Allowance received for U.S. Appl. No. 14/641,287, dated Sep. 12, 2018, 2 pages.
Corrected Notice of Allowance received for U.S. Appl. No. 14/829,573, dated Aug. 9, 2018, 3 pages.
Corrected Notice of Allowance received for U.S. Appl. No. 14/829,573, dated Sep. 11, 2018, 3 pages.
Corrected Notice of Allowance received for U.S. Appl. No. 14/830,629, dated Feb. 13, 2019, 3 pages.
Corrected Notice of Allowance received for U.S. Appl. No. 14/841,656, dated Apr. 11, 2018, 2 pages.
Corrected Notice of Allowance received for U.S. Appl. No. 14/841,656, dated May 7, 2018, 14 pages.
Corrected Notice of Allowance received for U.S. Appl. No. 15/927,768, dated Aug. 7, 2019, 2 pages.
Corrected Notice of Allowance received for U.S. Appl. No. 15/927,768, dated Jul. 9, 2019, 2 pages.
Corrected Notice of Allowance received for U.S. Appl. No. 16/055,489, dated Feb. 26, 2019, 2 pages.
Corrected Notice of Allowance received for U.S. Appl. No. 16/109,120, dated Nov. 12, 2019, 2 pages.
"Creating a Drop Shadow Effect on Text", Developing Webs Photoshop Tutorials, Webpage [online], www.dwphotoshop.com, Avaiable on : <http://www.dwphotoshop.com/photoshop/dropshadow.php>, Feb. 19, 2008, 3 pages.
Cuyamaca LRC Computer Labs, "Topics in CommonSpace Application", Available at <http://www.cuyamaca.net/librarylab/Technical%20Help/cmspace.asp>, Retrieved on May 19, 2014, 16 pages.
Decision on Appeal received for Korean Patent Application No. 10-2016-7008449, mailed on Jul. 30, 2019, 29 pages (7 pages of English Translation and 22 pages of Official Copy).
Decision on Appeal received for Korean Patent Application No. 10-2016-7008474, mailed on Jan. 29, 2020, 21 pages (2 pages of English Translation and 19 pages of Official Copy).
Decision on Appeal received for Korean Patent Application No. 10-2016-7008488, mailed on Oct. 18, 2019, 33 pages (4 pages of English Translation and 29 pages of Official Copy).
Decision on Appeal received for Korean Patent Application No. 10-2018-7010872, mailed on Jan. 20, 2020, 20 pages (3 pages of English Translation and 17 pages of Official Copy).
Decision to Grant received for Danish Patent Application No. PA201770181, dated Mar. 7, 2018, 2 pages.
Decision to Grant received for Danish Patent Application No. PA201770794, dated Nov. 11, 2019, 2 pages.
Decision to Grant received for Danish Patent Application No. PA201870631, dated May 15, 2019, 2 pages.
Decision to Grant received for Danish Patent Application No. PA201870632, dated May 14, 2019, 2 pages.
Decision to Grant received for European Patent Application No. 12704175.4, dated Jul. 19, 2018, 2 pages.
Decision to Grant received for European Patent Application No. 14772001.5, dated Dec. 5, 2019, 2 pages.
Decision to Grant received for European Patent Application No. 15782209.9, dated Feb. 14, 2019, 2 pages.
Decision to Grant received for European Patent Application No. 18157131.6, dated May 16, 2019, 2 pages.
Dewsberry, Victor, "Designing for Small Screens", AVA Publishing, 2005, 27 pages.
Esther, "Instructions for Kobo Books: How to change to scrolling mode and do table of contents navigation—Google Groups", XP055513050, Retrieved from the Internet: URL:https://groups.google.com/forum/print/msg/viphone/-dkqODh_31N8acJK2dGPe8J?ctz=4607561_48_52_123900_48_436380 [retrieved on Oct. 5, 2018], Aug. 28, 2010, 3 pages.
European Search Report received for European Patent Application No. 19173371.6, dated Oct. 30, 2019, 7 pages.
European Search Report received for European Patent Application No. 19173886.3, dated Oct. 30, 2019, 8 pages.
European Search Report received for European Patent Application No. 19199004.3, dated Nov. 12, 2019, 6 pages.
European Search Report received for European Patent Application No. 19206249.5, dated Dec. 19, 2019, 4 pages.
Extended European Search Report received for European Patent Application No. 17810739.7, dated Mar. 22, 2019, 9 pages.
Extended European Search Report received for European Patent Application No. 18185408.4, dated Oct. 17, 2018, 10 pages.
Extended European Search Report received for European Patent Application No. 19156614.0, dated May 28, 2019, 9 pages.
Final Office Action received for U.S. Appl. No. 13/038,276, dated Mar. 11, 2016, 36 pages.
Final Office Action received for U.S. Appl. No. 10/874,788, dated Feb. 17, 2011, 10 pages.
Final Office Action received for U.S. Appl. No. 10/874,788, dated Feb. 22, 2008, 23 pages.
Final Office Action received for U.S. Appl. No. 10/874,788, dated May 12, 2010, 18 pages.
Final Office Action received for U.S. Appl. No. 09/477,419, dated Aug. 15, 2002, 13 pages.
Final Office Action received for U.S. Appl. No. 11/069,977, dated Feb. 3, 2009, 12 pages.

(56) References Cited

OTHER PUBLICATIONS

Final Office Action received for U.S. Appl. No. 11/069,977, dated Mar. 10, 2011, 18 pages.
Final Office Action received for U.S. Appl. No. 11/069,977, dated Mar. 11, 2010, 17 pages.
Final Office Action received for U.S. Appl. No. 11/069,977, dated Mar. 29, 2012, 19 pages.
Final Office Action received for U.S. Appl. No. 13/038,276, dated Mar. 27, 2014, 24 pages.
Final Office Action received for U.S. Appl. No. 13/077,850, dated Nov. 7, 2013, 14 pages.
Final Office Action received for U.S. Appl. No. 13/077,855, dated Mar. 17, 2014, 11 pages.
Final Office Action received for U.S. Appl. No. 13/077,855, dated Mar. 24, 2016, 19 pages.
Final Office Action received for U.S. Appl. No. 13/077,855, dated Nov. 7, 2013, 14 pages.
Final Office Action received for U.S. Appl. No. 13/077,862, dated Nov. 8, 2013, 15 pages.
Final Office Action received for U.S. Appl. No. 13/077,862, dated Oct. 22, 2015, 16 pages.
Final Office Action received for U.S. Appl. No. 13/077,867, dated May 23, 2013, 10 pages.
Final Office Action received for U.S. Appl. No. 13/077,874, dated Dec. 3, 2014, 23 pages.
Final Office Action received for U.S. Appl. No. 13/077,874, dated May 5, 2016, 26 pages.
Final Office Action received for U.S. Appl. No. 13/526,462, dated May 8, 2014, 19 pages.
Final Office Action received for U.S. Appl. No. 14/641,287, dated Jul. 20, 2017, 18 pages.
Final Office Action received for U.S. Appl. No. 14/641,308, dated Jul. 1, 2019, 46 pages.
Final Office Action received for U.S. Appl. No. 14/641,308, dated Mar. 14, 2018, 42 pages.
Final Office Action received for U.S. Appl. No. 14/830,629, dated Apr. 16, 2018, 27 pages.
Final Office Action received for U.S. Appl. No. 14/841,646, dated Aug. 2, 2018, 22 pages.
Final Office Action received for U.S. Appl. No. 14/913,345, dated Oct. 26, 2018, 20 pages.
Final Office Action received for U.S. Appl. No. 14/913,349, dated Jul. 22, 2019, 20 pages.
Final Office Action received for U.S. Appl. No. 15/049,049, dated Jul. 12, 2018, 24 pages.
Final Office Action received for U.S. Appl. No. 15/049,049, dated May 23, 2017, 23 pages.
Final Office Action received for U.S. Appl. No. 15/049,058, dated Aug. 8, 2018, 23 pages.
Final Office Action received for U.S. Appl. No. 15/049,058, dated May 8, 2017, 21 pages.
Final Office Action received for U.S. Appl. No. 15/049,064, dated Feb. 27, 2017, 13 pages.
Final Office Action received for U.S. Appl. No. 15/418,537, dated Sep. 23, 2019, 53 pages.
Final Office Action received for U.S. Appl. No. 15/655,253, dated Feb. 4, 2020, 20 pages.
Final Office Action received for U.S. Appl. No. 16/144,950, dated Nov. 25, 2019, 24 pages.
Final Office Action received for U.S. Appl. No. 16/147,413, dated Sep. 3, 2019, 19 pages.
Getting Started, "Qualcomm Toq—smartwatch—User Manual", Available Online At: URL:https://toq.qualcomm.com/sites/default/files/qualcomm_toq_user_manual.pdf [retrieved on Jun. 25, 20155], Nov. 27, 2013, pp. 1-38.
"Headset Button Controller v7.3 APK Full APP Download for Andriod", Blackberry, iPhone, Jan. 27, 2014, 11 pages.
"How to move and arrange icons on iPhone", Available online on:—https://www.youtube.com/watch?v=5XKAk4wSons, Dec. 11, 2011.

Intention to Grant received for Danish Patent Application No. PA201770794, dated Aug. 15, 2019, 2 pages.
Intention to Grant received for Danish Patent Application No. PA201870631, dated Apr. 5, 2019, 2 pages.
Intention to Grant received for Danish Patent Application No. PA201870632, dated Apr. 5, 2019, 2 pages.
Intention to Grant received for European Patent Application No. 12704175.4, dated Mar. 22, 2018, 8 pages.
Intention to Grant received for European Patent Application No. 14772001.5, dated Jul. 18, 2019, 16 pages.
Intention to Grant received for European Patent Application No. 14772002.3, dated Jun. 24, 2019, 9 pages.
Intention to Grant received for European Patent Application No. 14772002.3, dated Nov. 6, 2019, 9 pages.
Intention to Grant received for European Patent Application No. 15782209.9, dated Sep. 28, 2018, 8 pages.
Intention to Grant received for European Patent Application No. 18157131.6, dated Jan. 9, 2019, 9 pages.
International Preliminary Report on Patentability received for PCT Patent Application No. PCT/US2012/022401, dated Aug. 8, 2013, 12 pages.
International Preliminary Report on Patentability received for PCT Patent Application No. PCT/US2012/025519, dated Sep. 12, 2013, 6 pages.
International Preliminary Report on Patentability received for PCT Patent Application No. PCT/US2014/053951, dated Mar. 17, 2016, 9 pages.
International Preliminary Report on Patentability received for PCT Patent Application No. PCT/US2014/053958, dated Mar. 17, 2016, 8 pages.
International Preliminary Report on Patentability received for PCT Patent Application No. PCT/US2014/053961, dated Jul. 21, 2016, 24 pages.
International Preliminary Report on Patentability received for PCT Patent Application No. PCT/US2015/019322, dated Mar. 16, 2017, 11 pages.
International Preliminary Report on Patentability received for PCT Patent Application No. PCT/US2015/045936, dated Mar. 16, 2017, 9 pages.
International Preliminary Report on Patentability received for PCT Patent Application No. PCT/US2015/045965, dated Dec. 27, 2016, 10 pages.
International Preliminary Report on Patentability received for PCT Patent Application No. PCT/US2015/054310, dated Sep. 14, 2017, 7 pages.
International Preliminary Report on Patentability received for PCT Patent Application No. PCT/US2016/019637, dated Sep. 21, 2017, 12 pages.
International Preliminary Report on Patentability received for PCT Patent Application No. PCT/US2017/035331, dated Dec. 20, 2018, 13 pages.
International Preliminary Report on Patentability received for PCT Patent Application No. PCT/US2015/019303, dated Mar. 16, 2017, 22 pages.
International Preliminary Report on Patentability received for PCT Patent Application No. PCT/US2015/019320, dated Mar. 16, 2017, 10 pages.
International Preliminary Report on Patentability received for PCT Patent Application No. PCT/US2015/019321, dated Mar. 16, 2017, 8 pages.
International Search Report and Written Opinion received for PCT Patent Application No. PCT/US2012/022401, dated Jul. 6, 2012, 16 pages.
International Search Report and Written Opinion received for PCT Patent Application No. PCT/US2012/025519, dated Jun. 11, 2012, 7 pages.
International Search Report and Written Opinion received for PCT Patent Application No. PCT/US2014/053951, dated Dec. 8, 2014, 11 pages.
International Search Report and Written Opinion received for PCT Patent Application No. PCT/US2014/053958, dated Feb. 19, 2015, 10 pages.

(56) References Cited

OTHER PUBLICATIONS

International Search Report and Written Opinion received for PCT Patent Application No. PCT/US2015/019303, dated Sep. 28, 2015, 27 pages.
International Search Report and Written Opinion received for PCT Patent Application No. PCT/US2015/019320, dated Jul. 2, 2015, 14 pages.
International Search Report and Written Opinion received for PCT Patent Application No. PCT/US2015/019321, dated Jun. 3, 2015, 11 pages.
International Search Report and Written Opinion received for PCT Patent Application No. PCT/US2015/019322, dated Jun. 18, 2015, 16 pages.
International Search Report and Written Opinion received for PCT Patent Application No. PCT/US2015/045936, dated Nov. 4, 2015, 12 pages.
International Search Report and Written Opinion received for PCT Patent Application No. PCT/US2015/045965, dated Feb. 1, 2016, 20 pages.
International Search Report and Written Opinion received for PCT Patent Application No. PCT/US2015/054310, dated Jan. 20, 2016, 10 pages.
International Search Report and Written Opinion received for PCT Patent Application No. PCT/US2016/019637, dated Aug. 18, 2016, 18 pages.
International Search Report and Written Opinion received for PCT Patent Application No. PCT/US2017/035331, dated Oct. 6, 2017, 18 pages.
International Search Report and Written Opinion received for PCT Patent Application No. PCT/US2019/049237, dated Jan. 8, 2020, 21 pages.
International Search Report received for PCT Patent Application No. PCT/US2014/053961, dated Jul. 11, 2016, 10 pages.
International Written Opinion received for PCT Patent Application No. PCT/US2014/053961, dated Jul. 11, 2016, 22 pages.
Invitation to Pay Additional Fees received for PCT Patent Application No. PCT/US2017/035331, dated Aug. 7, 2017, 4 pages.
Invitation to Pay Additional Fees received for PCT Patent Application No. PCT/US2012/022401, dated May 4, 2012, 8 pages.
Invitation to Pay Additional Fees received for PCT Patent Application No. PCT/US2014/053961, dated Aug. 3, 2015, 6 pages.
Invitation to Pay Additional Fees received for PCT Patent Application No. PCT/US2016/019637, dated Jun. 1, 2016, 6 pages.
Invitation to Pay Additional Fees received for PCT Patent Application No. PCT/US2019/049237, dated Oct. 31, 2019, 18 pages.
L Dinos, "Bejeweled Blitz—PC Game", Online available at: https://www.youtube.com/watch?v=8-p3FAxjKTs, Apr. 7, 2010, 7 pages.
Non-Final Office Action received for U.S. Appl. No. 09/477,419, dated Apr. 17, 2002, 10 pages.
Non-Final Office Action received for U.S. Appl. No. 09/477,419, dated Apr. 22, 2003, 13 pages.
Non-Final Office Action received for U.S. Appl. No. 11/069,977, dated Aug. 9, 2011, 18 pages.
Non-Final Office Action received for U.S. Appl. No. 11/069,977, dated Jul. 31, 2009, 13 pages.
Non-Final Office Action received for U.S. Appl. No. 11/069,977, dated Oct. 4, 2010, 15 pages.
Non-Final Office Action received for U.S. Appl. No. 11/069,977, dated Sep. 19, 2008, 12 pages.
Non-Final Office Action received for U.S. Appl. No. 10/874,788, dated Feb. 3, 2009, 15 pages.
Non-Final Office Action received for U.S. Appl. No. 10/874,788, dated Jul. 27, 2007, 21 pages.
Non-Final Office Action received for U.S. Appl. No. 10/874,788, dated May 14, 2008, 22 pages.
Non-Final Office Action received for U.S. Appl. No. 13/038,276, dated Jul. 29, 2015, 31 pages.
Non-Final Office Action received for U.S. Appl. No. 13/038,276, dated Sep. 12, 2013, 24 pages.
Non-Final Office Action received for U.S. Appl. No. 13/077,850, dated Mar. 28, 2013, 15 pages.
Non-Final Office Action received for U.S. Appl. No. 13/077,850, dated Sep. 10, 2015, 14 pages.
Non-Final Office Action received for U.S. Appl. No. 13/077,855, dated Aug. 13, 2015, 13 pages.
Non-Final Office Action received for U.S. Appl. No. 13/077,855, dated Mar. 28, 2013, 15 pages.
Non-Final Office Action received for U.S. Appl. No. 13/077,862, dated Dec. 29, 2014, 11 pages.
Non-Final Office Action received for U.S. Appl. No. 13/077,862, dated Mar. 15, 2013, 10 pages.
Non-Final Office Action received for U.S. Appl. No. 13/077,862, dated Nov. 21, 2019, 18 pages.
Non-Final Office Action received for U.S. Appl. No. 13/077,867, dated Dec. 21, 2012, 9 pages.
Non-Final Office Action received for U.S. Appl. No. 13/077,867, dated Jul. 20, 2012, 10 pages.
Non-Final Office Action received for U.S. Appl. No. 13/077,874, dated Jun. 19, 2014, 15 pages.
Non-Final Office Action received for U.S. Appl. No. 14/641,287, dated Feb. 27, 2017, 18 pages.
Non-Final Office Action received for U.S. Appl. No. 14/641,308, dated Dec. 20, 2018, 43 pages.
Non-Final Office Action received for U.S. Appl. No. 14/641,308, dated Jun. 23, 2017, 53 pages.
Non-Final Office Action received for U.S. Appl. No. 14/829,573, dated Jan. 22, 2018, 26 pages.
Non-Final Office Action received for U.S. Appl. No. 14/830,629, dated Dec. 1, 2016, 20 pages.
Non-Final Office Action received for U.S. Appl. No. 14/830,629, dated Jun. 15, 2017, 24 pages.
Non-Final Office Action received for U.S. Appl. No. 14/841,646, dated Dec. 1, 2017, 23 pages.
Non-Final Office Action received for U.S. Appl. No. 14/841,656, dated Jul. 26, 2017, 20 pages.
Non-Final Office Action received for U.S. Appl. No. 14/913,345, dated Apr. 5, 2018, 15 pages.
Non-Final Office Action received for U.S. Appl. No. 14/913,349, dated Jan. 2, 2020, 25 pages.
Non-Final Office Action received for U.S. Appl. No. 14/913,350, dated May 14, 2018, 30 pages.
Non-Final Office Action received for U.S. Appl. No. 15/049,049, dated Dec. 15, 2017, 23 pages.
Non-Final Office Action received for U.S. Appl. No. 15/049,049, dated Feb. 6, 2019, 21 pages.
Non-Final Office Action received for U.S. Appl. No. 15/049,049, dated Nov. 9, 2016, 21 pages.
Non-Final Office Action received for U.S. Appl. No. 15/049,058, dated Feb. 20, 2018, 21 pages.
Non-Final Office Action received for U.S. Appl. No. 15/049,058, dated Jun. 5, 2019, 25 pages.
Non-Final Office Action received for U.S. Appl. No. 15/049,058, dated Nov. 16, 2016, 19 pages.
Non-Final Office Action received for U.S. Appl. No. 15/049,064, dated Oct. 27, 2016, 15 pages.
Non-Final Office Action received for U.S. Appl. No. 15/418,537, dated Dec. 13, 2018, 53 pages.
Non-Final Office Action received for U.S. Appl. No. 15/655,253, dated Jul. 10, 2019, 16 pages.
Non-Final Office Action received for U.S. Appl. No. 15/818,500, dated Aug. 30, 2019, 17 pages.
Non-Final Office Action received for U.S. Appl. No. 16/130,838, dated Jan. 7, 2020, 16 pages.
Non-Final Office Action received for U.S. Appl. No. 16/144,950, dated Mar. 6, 2019, 24 pages.
Non-Final Office Action received for U.S. Appl. No. 16/147,413, dated Feb. 7, 2019, 18 pages.
Non-Final Office Action received for U.S. Appl. No. 13/077,874, dated Dec. 3, 2015, 23 pages.
Non-Final Office Action received for U.S. Appl. No. 14/913,345, dated Jun. 26, 2019, 23 pages.

(56) References Cited

OTHER PUBLICATIONS

Notice of Acceptance received for Australian Patent Application No. 2012209199, dated Jan. 27, 2016, 3 pages.
Notice of Acceptance received for Australian Patent Application No. 2014315319, dated Oct. 12, 2017, 3 pages.
Notice of Acceptance received for Australian Patent Application No. 2014315325, dated Apr. 19, 2017, 3 pages.
Notice of Acceptance received for Australian Patent Application No. 2017277851, dated Dec. 9, 2019, 3 pages.
Notice of Acceptance received for Australian Patent Application No. 2018200289, dated Jul. 23, 2019, 3 pages.
Notice of Acceptance received for Australian Patent Application No. 2019201628, dated Sep. 10, 2019, 3 pages.
Notice of Allowance and Search Report received for Taiwanese Patent Application No. 104128687, dated Jun. 7, 2016, 4 pages (1 page of English Translation and 3 pages of Official copy).
Notice of Allowance received for Australian Patent Application No. 2016202837, dated Apr. 21, 2017, 3 pages.
Notice of Allowance received for Chinese Patent Application No. 201280006317.5, dated Feb. 17, 2017, 2 pages (1 page of English Translation and 1 page of Official Copy).
Notice of Allowance received for Chinese Patent Application No. 201480059543.9, dated Sep. 4, 2019, 2 pages (1 page of English Translation and 1 page of Official Copy).
Notice of Allowance received for Chinese Patent Application No. 201480060082.7, dated Mar. 12, 2019, 2 pages (1 page of English Translation and 1 page of Official Copy).
Notice of Allowance received for Chinese Patent Application No. 201710240907.9, dated Nov. 25, 2019, 2 pages (1 page of English Translation and 1 page of Official Copy).
Notice of Allowance received for Danish Patent Application No. PA201670118, dated Mar. 30, 2017, 2 pages.
Notice of Allowance received for Japanese Patent Application No. 2016-130565, dated Aug. 28, 2017, 3 pages (Official Copy only) {See Communication under 37 CFR § 1.98(a) (3)}.
Notice of Allowance received for Japanese Patent Application No. 2016-537945, dated Aug. 3, 2018, 4 pages (1 page of English translation and 3 pages of Official copy).
Notice of Allowance received for Japanese Patent Application No. 2016-537947, dated Jun. 5, 2017, 3 pages (Official Copy only) {See Communication under 37 CFR § 1.98(a) (3)}.
Notice of Allowance received for Japanese Patent Application No. 2016-537948, dated Nov. 11, 2019, 3 pages (1 page of English Translation and 2 pages of Official Copy).
Notice of Allowance received for Japanese Patent Application No. 2017-545561, dated Jul. 12, 2019, 4 pages (1 page of English Translation and 3 pages of Official Copy).
Notice of Allowance received for Japanese Patent Application No. 2018-083313, dated Jul. 1, 2019, 4 pages (1 page of English Translation and 3 pages of Official Copy).
Notice of Allowance received for Japanese Patent Application No. 2018-090084, dated May 24, 2019, 4 pages (1 page of English Translation and 3 pages of Official Copy).
Notice of Allowance received for Japanese Patent Application No. 2018-143982, dated Apr. 8, 2019, 4 pages (1 page of English Translation and 3 pages of Official Copy).
Notice of Allowance received for Korean Patent Application No. 10-2013-7022057, dated Apr. 27, 2015, 2 pages (Official Copy only) {See Communication under 37 CFR § 1.98(a) (3)}.
Notice of Allowance received for Korean Patent Application No. 10-2014-7033660, dated Sep. 25, 2015, 3 pages (1 page of English Translation and 2 pages of Official Copy).
Notice of Allowance received for Korean Patent Application No. 10-2015-7013849, dated Mar. 28, 2016, 3 pages (1 page of English Translation and 2 pages of Official Copy).
Notice of Allowance received for Korean Patent Application No. 10-2016-7008449, dated Aug. 9, 2019, 6 pages (2 pages of English Translation and 4 pages of Official Copy).
Notice of Allowance received for Korean Patent Application No. 10-2016-7008488, dated Oct. 25, 2019, 4 pages (2 pages of English Translation and 2 pages of Official Copy).
Notice of Allowance received for Korean Patent Application No. 10-2016-7017508, dated Apr. 27, 2017, 3 pages (1 page of English translation and 2 pages of Official Copy).
Notice of Allowance received for Korean Patent Application No. 10-2018-7002695, dated Oct. 8, 2018, 5 pages (2 pages of English Translation and 3 pages of Official Copy).
Notice of Allowance received for Korean Patent Application No. 10-2018-7010872, dated Feb. 10, 2020, 6 pages (2 pages of English Translation and 4 pages of Official Copy).
Notice of Allowance received for Korean Patent Application No. 10-2018-7032106, dated Jun. 28, 2019, 5 pages (2 pages of English Translation and 3 pages of Official Copy).
Notice of Allowance received for Taiwanese Patent Application No. 103130518, dated May 19, 2016, 2 pages (Official Copy only) {See Communication under 37 CFR § 1.98(a) (3)}.
Notice of Allowance received for Taiwanese Patent Application No. 103130519, dated Oct. 27, 2016, 3 pages (Official Copy only) {See Communication under 37 CFR § 1.98(a) (3)}.
Notice of Allowance received for Taiwanese Patent Application No. 103130520, dated Apr. 25, 2018, 4 pages (1 page of English Translation and 3 pages of Official copy).
Notice of Allowance received for Taiwanese Patent Application No. 104107317, dated Oct. 18, 2017, 7 pages (Official Copy only) {See Communication under 37 CFR § 1.98(a) (3)}.
Notice of Allowance received for Taiwanese Patent Application No. 104107327, dated Jul. 19, 2019, 5 pages (2 pages of English Translation and 3 pages of Official copy).
Notice of Allowance received for Taiwanese Patent Application No. 104107333, dated Nov. 8, 2016, 2 pages (Official Copy only) {See Communication under 37 CFR § 1.98(a) (3)}.
Notice of Allowance received for Taiwanese Patent Application No. 104107334, dated Jan. 26, 2017, 3 pages. (Official Copy only) {See Communication under 37 CFR § 1.98(a) (3)}.
Notice of Allowance received for Taiwanese Patent Application No. 104133281, dated Mar. 29, 2018, 4 pages (1 page of English Translation and 3 pages of Official copy).
Notice of Allowance received for U.S. Appl. No. 10/874,788, dated Mar. 14, 2012, 7 pages.
Notice of Allowance received for U.S. Appl. No. 09/477,419, dated May 19, 2005, 5 pages.
Notice of Allowance received for U.S. Appl. No. 11/069,977, dated Apr. 8, 2013, 16 pages.
Notice of Allowance received for U.S. Appl. No. 11/069,977, dated May 15, 2013, 13 pages.
Notice of Allowance received for U.S. Appl. No. 13/038,276, dated Nov. 3, 2016, 10 pages.
Notice of Allowance received for U.S. Appl. No. 13/038,276, dated Nov. 30, 2016, 2 pages.
Notice of Allowance received for U.S. Appl. No. 13/077,850, dated May 5, 2016, 15 pages.
Notice of Allowance received for U.S. Appl. No. 13/077,855, dated Jan. 30, 2017, 7 pages.
Notice of Allowance received for U.S. Appl. No. 13/077,862, dated Jun. 20, 2019, 9 pages.
Notice of Allowance received for U.S. Appl. No. 13/077,862, dated Sep. 20, 2019, 2 pages.
Notice of Allowance received for U.S. Appl. No. 13/077,867, dated Mar. 12, 2014, 7 pages.
Notice of Allowance received for U.S. Appl. No. 13/077,867, dated Sep. 18, 2013, 8 pages.
Notice of Allowance received for U.S. Appl. No. 13/077,874, dated Nov. 22, 2016, 13 pages.
Notice of Allowance received for U.S. Appl. No. 14/641,241, dated Apr. 13, 2017, 2 pages.
Notice of Allowance received for U.S. Appl. No. 14/641,241, dated Jan. 31, 2017, 13 pages.
Notice of Allowance received for U.S. Appl. No. 14/641,241, dated Mar. 24, 2017, 3 pages.
Notice of Allowance received for U.S. Appl. No. 14/641,252, dated Apr. 11, 2018, 14 pages.

(56) References Cited

OTHER PUBLICATIONS

Notice of Allowance received for U.S. Appl. No. 14/641,252, dated Jul. 18, 2018, 9 pages.
Notice of Allowance received for U.S. Appl. No. 14/641,287, dated Jun. 28, 2018, 8 pages.
Notice of Allowance received for U.S. Appl. No. 14/641,308, dated Jan. 15, 2020, 7 pages.
Notice of Allowance received for U.S. Appl. No. 14/829,573, dated Apr. 25, 2018, 6 pages.
Notice of Allowance received for U.S. Appl. No. 14/830,629, dated Oct. 17, 2018, 8 pages.
Notice of Allowance received for U.S. Appl. No. 14/841,646, dated Apr. 18, 2019, 7 pages.
Notice of Allowance received for U.S. Appl. No. 14/841,656, dated Feb. 12, 2018, 9 pages.
Notice of Allowance received for U.S. Appl. No. 14/841,656, dated Mar. 5, 2018, 3 pages.
Notice of Allowance received for U.S. Appl. No. 14/913,345, dated Feb. 10, 2020, 10 pages.
Notice of Allowance received for U.S. Appl. No. 14/913,350, dated Dec. 19, 2018, 27 pages.
Notice of Allowance received for U.S. Appl. No. 15/049,049, dated Jul. 25, 2019, 8 pages.
Notice of Allowance received for U.S. Appl. No. 15/049,052, dated Sep. 16, 2019, 5 pages.
Notice of Allowance received for U.S. Appl. No. 15/049,064, dated Jul. 18, 2017, 24 pages.
Notice of Allowance received for U.S. Appl. No. 15/927,768, dated May 31, 2019, 13 pages.
Notice of Allowance received for U.S. Appl. No. 16/055,489, dated Jan. 9, 2019, 24 pages.
Notice of Allowance received for U.S. Appl. No. 16/055,489, dated Jan. 25, 2019, 8 pages.
Notice of Allowance received for U.S. Appl. No. 16/055,489, dated Nov. 8, 2018, 28 pages.
Notice of Allowance received for U.S. Appl. No. 16/109,120, dated Sep. 11, 2019, 12 pages.
Office Action and Search Report received for Danish Patent Application No. PA201670118, dated Jul. 1, 2016, 7 pages.
Office Action received for Danish Patent Application No. PA201670595, dated Nov. 25, 2016, 9 pages.
Office Action received for Australian Patent Application No. 2012209199, dated Jan. 15, 2015, 3 pages.
Office Action received for Australian Patent Application No. 2012209199, dated Dec. 17, 2015, 3 pages.
Office Action received for Australian Patent Application No. 2014315234, dated Jul. 12, 2017, 4 pages.
Office Action received for Australian Patent Application No. 2014315234, dated Nov. 2, 2016, 3 pages.
Office Action received for Australian Patent Application No. 2014315319, dated Aug. 3, 2017, 3 pages.
Office Action received for Australian Patent Application No. 2014315319, dated Oct. 17, 2016, 3 pages.
Office Action received for Australian Patent Application No. 2014315325, dated Nov. 3, 2016, 3 pages.
Office Action received for Australian Patent Application No. 2016202837, dated Jan. 10, 2017, 2 pages.
Office Action received for Australian Patent Application No. 2016229407, dated Aug. 15, 2018, 4 pages.
Office Action received for Australian Patent Application No. 2016229407, dated May 27, 2019, 4 pages.
Office Action received for Australian Patent Application No. 2017100207, dated Apr. 6, 2017, 4 pages.
Office Action received for Australian Patent Application No. 2017100207, dated Jul. 10, 2017, 3 pages.
Office Action received for Australian Patent Application No. 2017101561, dated Dec. 22, 2017, 4 pages.
Office Action received for Australian Patent Application No. 2017254897, dated Aug. 29, 2018, 4 pages.
Office Action received for Australian Patent Application No. 2017254897, dated Jun. 28, 2019, 4 pages.
Office Action received for Australian Patent Application No. 2017277851, dated Jul. 5, 2019, 3 pages.
Office Action received for Australian Patent Application No. 2018101076, dated Oct. 16, 2018, 5 pages.
Office Action received for Australian Patent Application No. 2018200289, dated Apr. 9, 2019, 5 pages.
Office Action received for Australian Patent Application No. 2018200289, dated Dec. 4, 2018, 4 pages.
Office Action received for Australian Patent Application No. 2018200998, dated Jan. 30, 2019, 4 pages.
Office Action received for Australian Patent Application No. 2018200998, dated Mar. 9, 2018, 5 pages.
Office Action received for Australian Patent Application No. 2019201628, dated May 13, 2019, 2 pages.
Office Action received for Australian Patent Application No. 2019216614, dated Aug. 22, 2019, 3 pages.
Office Action received for Australian Patent Application No. 2014315234, dated Apr. 19, 2017, 4 pages.
Office Action received for Chinese Patent Application No. 201280006317.5, dated Jan. 11, 2016, 10 pages (5 pages of English Translation and 5 pages of official Copy).
Office Action received for Chinese Patent Application No. 201280006317.5, dated Jul. 11, 2016, 6 pages (1 page of English Translation and 5 pages of Official Copy).
Office Action received for Chinese Patent Application No. 201480059543.9, dated Feb. 28, 2019, 16 pages (4 pages of English Translation and 12 pages of Official Copy).
Office Action received for Chinese Patent Application No. 201480059543.9, dated Jan. 26, 2018, 17 pages (4 pages of English Translation and 13 pages of Official Copy).
Office Action received for Chinese Patent Application No. 201480059543.9, dated Sep. 19, 2018, 18 pages (5 pages of English Translation and 13 pages of Official Copy).
Office Action received for Chinese Patent Application No. 201480060082.7, dated Jan. 26, 2018, 15 pages (4 pages of English translation and 11 pages of Official Copy).
Office Action received for Chinese Patent Application No. 201480060082.7, dated Sep. 25, 2018, 6 pages (3 pages of English Translation and 3 pages of Official copy).
Office Action received for Chinese Patent Application No. 201480060083.1, dated Aug. 13, 2019, 6 pages (3 pages of English Translation and 3 pages of Official Copy).
Office Action received for Chinese Patent Application No. 201480060083.1, dated Dec. 5, 2018, 11 pages (5 pages of English Translation and 6 pages of Official Copy).
Office Action received for Chinese Patent Application No. 201580046331.1, dated Aug. 2, 2019, 18 pages (6 pages of English Translation and 12 pages of Official Copy).
Office Action received for Chinese Patent Application No. 201580046339.8, dated Feb. 26, 2019, 18 pages (6 pages of English Translation and 12 pages of Official Copy).
Office Action received for Chinese Patent Application No. 201580046339.8, dated Oct. 31, 2019, 9 pages (3 pages of English Translation and 6 pages of Official Copy).
Office Action received for Chinese Patent Application No. 201710240907.9, dated Jun. 5, 2019, 10 pages (5 pages of English Translation and 5 pages of Official Copy).
Office Action received for Chinese Patent Application No. 201910454069.4, dated Dec. 20, 2019, 6 pages (1 page of English Translation and 5 pages of Official Copy).
Office Action received for Chinese Patent Application No. 201910454076.4, dated Dec. 18, 2019, 14 pages (7 pages of English Translation and 7 pages of Official Copy).
Office Action received for Danish Patent Application No. PA201670118, dated Feb. 2, 2017, 2 pages.
Office Action received for Danish Patent Application No. PA201670118, dated Oct. 25, 2016, 3 pages.
Office Action received for Danish Patent Application No. PA201670595, dated Aug. 23, 2018, 5 pages.
Office Action received for Danish Patent Application No. PA201670595, dated May 31, 2017, 3 pages.

(56) References Cited

OTHER PUBLICATIONS

Office Action received for Danish Patent Application No. PA201670595, dated Nov. 30, 2017, 4 pages.
Office Action received for Danish Patent Application No. PA201770103, dated Dec. 11, 2018, 2 pages.
Office Action received for Danish Patent Application No. PA201770103, dated Jan. 16, 2018, 2 pages.
Office Action received for Danish Patent Application No. PA201770181, dated Jan. 3, 2018, 2 pages.
Office Action received for Danish Patent Application No. PA201770181, dated Jun. 13, 2017, 6 pages.
Office Action received for Danish Patent Application No. PA201970259, dated Jan. 15, 2020, 4 pages.
Office Action received for European Patent Application No. 14771688.0, dated Jan. 21, 2019, 8 pages.
Office Action received for European Patent Application No. 14771688.0, dated May 31, 2018, 6 pages.
Office Action received for European Patent Application No. 14771688.0, dated Nov. 30, 2017, 15 pages.
Office Action received for European Patent Application No. 14771688.0, dated Sep. 16, 2019, 7 pages.
Office Action received for European Patent Application No. 14772002.3, dated Jul. 4, 2017, 8 pages.
Office Action received for European Patent Application No. 14772494.2, dated Jun. 20, 2017, 7 pages.
Office Action received for European Patent Application No. 14772494.2, dated Oct. 2, 2018, 9 pages.
Office Action received for European Patent Application No. 16710372.0, dated Feb. 22, 2019, 7 pages.
Office Action received for European Patent Application No. 18157131.6, dated May 8, 2018, 12 pages.
Office Action received for European Patent Application No. 19173371.6, dated Nov. 12, 2019, 11 pages.
Office Action received for European Patent Application No. 19173886.3, dated Nov. 12, 2019, 9 pages.
Office Action received for European Patent Application No. 19199004.3, dated Nov. 22, 2019, 10 pages.
Office Action received for European Patent Application No. 19206249.5, dated Jan. 20, 2020, 8 pages.
Office Action received for Indian Patent Application No. 201617008291, dated Jan. 14, 2020, 7 pages.
Office Action received for Indian Patent Application No. 201617008296, dated Jan. 14, 2020, 7 pages.
Office Action received for Japanese Patent Application No. 2013-550664, dated Jun. 10, 2016, 3 pages (Official Copy only) {See Communication under 37 CFR § 1.98(a) (3)}.
Office Action received for Japanese Patent Application No. 2013-550664, dated Aug. 24, 2015, 9 pages (4 pages of English Translation and 5 pages of Official Copy).
Office Action received for Japanese Patent Application No. 2013-550664, dated Sep. 12, 2014, 10 pages (6 pages of English Translation and 4 pages of Official Copy).
Office Action received for Japanese Patent Application No. 2016-537945, dated Apr. 7, 2017, 6 pages (3 pages of English Translation and 3 pages of Official Copy).
Office Action received for Japanese Patent Application No. 2016-537945, dated Jan. 9, 2018, 5 pages (2 page of English Translation and 3 pages of Official copy).
Office Action received for Japanese Patent Application No. 2016-537947, dated Feb. 24, 2017, 6 pages (3 pages of English Translation and 3 pages of Official Copy).
Office Action received for Japanese Patent Application No. 2016-537948, dated Apr. 6, 2018, 5 pages (2 pages of English Translation and 3 pages of Official Copy).
Office Action received for Japanese Patent Application No. 2016-537948, dated Jun. 9, 2017, 10 pages (5 pages of English Translation and 5 pages of Official Copy).
Office Action received for Japanese Patent Application No. 2016-537948, dated Sep. 3, 2018, 4 pages (2 pages of English Translation and 2 pages of Official copy).
Office Action received for Japanese Patent Application No. 2017-545561, dated Aug. 6, 2018, 8 pages (4 pages of English Translation and 4 pages of Official copy).
Office Action received for Japanese Patent Application No. 2018-090084, dated Feb. 15, 2019, 6 pages (3 pages of English Translation and 3 pages of Official copy).
Office Action received for Japanese Patent Application No. 2018-143982, dated Dec. 7, 2018, 10 pages (5 pages of English Translation and 5 pages of Official Copy).
Office Action received for Korean Patent Application No. 10-2013-7022057, dated May 28, 2014, 7 pages (3 pages of English Translation and 4 pages of Official Copy).
Office Action received for Korean Patent Application No. 10-2014-7033660, dated Feb. 23, 2015, 3 pages (Official Copy only) {See Communication under 37 CFR § 1.98(a) (3)}.
Office Action received for Korean Patent Application No. 10-2015-7013849, dated Aug. 20, 2015, 5 pages (2 pages of English Translation and 3 pages of Official Copy).
Office Action received for Korean Patent Application No. 10-2016-7008474, dated Aug. 6, 2018, 10 pages (5 pages of English Translation and 5 pages of Official Copy).
Office Action received for Korean Patent Application No. 10-2016-7008474, dated Dec. 30, 2016, 10 pages (4 pages of English Translation and 6 pages of Official Copy).
Office Action received for Korean Patent Application No. 10-2016-7008474, dated May 15, 2018, 7 pages (3 pages of English Translation and 4 pages of Official Copy).
Office Action received for Korean Patent Application No. 10-2016-7008474, dated Nov. 27, 2017, 6 pages (2 pages of English Translation and 4 pages of Official Copy).
Office Action received for Korean Patent Application No. 10-2016-7008488, dated Feb. 8, 2018, 8 pages (4 pages of English Translation and 4 pages of Official Copy).
Office Action received for Korean Patent Application No. 10-2016-7008488, dated Jan. 12, 2017, 14 pages (6 pages of English Translation and 8 pages of Official Copy).
Office Action received for Korean Patent Application No. 10-2016-7008488, dated Nov. 27, 2017, 6 pages (3 pages of English Translation and 3 pages of Official Copy).
Office Action received for Korean Patent Application No. 10-2016-7008682, dated Dec. 30, 2016, 11 pages (4 pages of English Translation and 7 pages of Official Copy).
Office Action received for Korean Patent Application No. 10-2016-7008682, dated Feb. 8, 2018, 7 pages (3 pages of English Translation and 4 pages of Official Copy).
Office Action received for Korean Patent Application No. 10-2016-7008682, dated Nov. 27, 2017, 7 pages (3 page of English Translation and 4 pages of Official Copy).
Office Action received for Korean Patent Application No. 10-2016-7017508, dated Oct. 20, 2016, 5 pages (2 pages of English Translation and 3 pages of Official Copy).
Office Action received for Korean Patent Application No. 10-2017-7024506, dated Aug. 12, 2019, 6 pages (2 pages of English Translation and 4 pages of Official Copy).
Office Action received for Korean Patent Application No. 10-2017-7024506, dated Sep. 28, 2018, 11 pages (4 pages of English Translation and 7 pages of Official Copy).
Office Action received for Korean Patent Application No. 10-2018-7002695, dated Feb. 27, 2018, 12 pages (5 pages of English Translation and 7 pages of Official Copy).
Office Action received for Korean Patent Application No. 10-2018-7002695, dated Jun. 19, 2018, 8 pages (4 pages of English Translation and 4 pages of Official Copy).
Office Action received for Korean Patent Application No. 10-2018-7013265, dated Aug. 10, 2018, 12 pages (5 pages of English Translation and 7 pages of Official copy).
Office Action received for Korean Patent Application No. 10-2018-7013265, dated Jun. 14, 2019, 6 pages (2 pages of English Translation and 4 pages of official copy).
Office Action received for Korean Patent Application No. 10-2018-7032106, dated Dec. 26, 2018, 10 pages (4 pages of English translation and 6 pages of Official Copy).

(56) References Cited

OTHER PUBLICATIONS

Office Action received for Korean Patent Application No. 10-2018-7033888, dated Nov. 28, 2019, 10 pages (4 pages of English Translation and 6 pages of Official Copy).
Office Action received for Korean Patent Application No. 10-2019-7007748, dated Nov. 15, 2019, 9 pages (3 pages of English Translation and 6 pages of Official Copy).
Office Action received for Korean Patent Application No. 10-2019-7028736, dated Nov. 28, 2019, 8 pages (3 pages of English Translation and 5 pages of Official Copy).
Office Action received for Taiwanese Patent Application No. 103130519, dated Mar. 25, 2016, 14 pages (6 pages of English Translation and 8 pages of Official Copy).
Office Action received for Taiwanese Patent Application No. 103130520, dated Apr. 17, 2017, 8 pages (3 pages of English Translation and 5 pages of Official Copy).
Office Action received for Taiwanese Patent Application No. 103130520, dated Jan. 23, 2018, 5 pages (2 pages of English Translation and 3 pages of Official Copy).
Office Action received for Taiwanese Patent Application No. 103130520, dated May 23, 2016, 38 pages (15 pages of English Translation and 23 pages of Official Copy).
Office Action received for Taiwanese Patent Application No. 103130520, dated Oct. 1, 2015, 58 pages (22 pages of English Translation and 36 pages of Official copy).
Office Action received for Taiwanese Patent Application No. 103130520, dated Sep. 29, 2016, 39 pages (16 pages of English Translation and 23 pages of Official Copy).
Office Action received for Taiwanese Patent Application No. 104107317, dated Mar. 28, 2017, 39 pages (11 pages of English Translation and 28 pages of Official Copy).
Office Action received for Taiwanese Patent Application No. 104107318, dated Dec. 26, 2018, 33 pages (9 pages of English Translation and 24 pages of Official Copy).
Office Action received for Taiwanese Patent Application No. 104107327, dated Sep. 28, 2018, 7 pages (3 pages of English Translation and 4 pages of Official Copy).
Office Action received for Taiwanese Patent Application No. 104107333, dated May 17, 2016, 6 pages (3 pages of English Translation and 3 pages of Official Copy).
Office Action received for Taiwanese Patent Application No. 104107334, dated Sep. 19, 2016, 15 pages (6 pages of English Translation and 9 pages of Official Copy only).
Office Action received for Taiwanese Patent Application No. 104133281, dated Mar. 30, 2017, 10 pages (4 pages of English translation and 6 pages of official copy).
Office Action received for Taiwanese Patent Application No. 104133281, dated Sep. 1, 2016, 10 pages (4 pages of English Translation and 6 pages of Official Copy).
Partial European Search Report received for European Patent Application No. 19173371.6, dated Jul. 18, 2019, 17 pages.
Partial European Search Report received for European Patent Application No. 19173886.3, dated Jul. 18, 2019, 15 pages.
Patel, Amit, "Amit's Thoughts on Grids", Available online at:—http://www-cs-students.stanford.edu/~amitp/game-programming/grids/, Jan. 9, 2006, 22 pages.
Patel, Amit, "Hexagonal Grids", Available online at:—http://www.redblobgames.com/grids/hexagons/, 36 pages.
Raghunath et al., "User Interfaces for Applications on a Wrist Watch", Journal of Personal and Ubiquitous Computing, vol. 6, 2002, pp. 17-30.
Restriction Requirement received for U.S. Appl. No. 10/874,788, dated Nov. 9, 2010, 6 pages.
Search Report and Opinion received for Danish Patent Application No. PA201870631, dated Dec. 6, 2018, 8 pages.
Search Report and Opinion received for Danish Patent Application No. PA201870632, dated Dec. 3, 2018, 8 pages.
Search Report and Opinion received for Danish Patent Application No. PA201970259, dated Jul. 19, 2019, 10 pages.
Search Report received for Danish Patent Application No. PA201770103, dated Jun. 9, 2017, 9 pages.
Search Report received for European Patent Application No. 18157131.6, dated Apr. 19, 2018, 4 pages.
Shestopalyuk, Ruslan, "Hexagonal grid math", Feb. 15, 2011, 7 pages.
"The interview with a key person. IBM and Citizen met and applied Linux to a watch", ASCII Corporation, vol. 25, No. 12, Dec. 12, 2001, pp. 136-143 (Official Copy only) {See Communication under 37 CFR § 1.98(a) (3)}.
Verth et al., "Essential Mathematics for Games and Interactive Applications", Programmer's Guide, Morgan Kaufmann publishers, Mar. 25, 2004, 37 pages.
"Watchpad 1.5 Demo", YouTube.com, Online Available at <https://www.youtube.com/watch?v=7xjvVbeUn80>, Uploaded on Jun. 20, 2010, 2 pages.
"WatchPad 1.5", Online Available at http://web.archive.org/web/20011205071448/http://www.trl.IBM.com:80/projects/ngm/index_e.htm, Dec. 5, 2001, 2 pages.
Wikipedia, "Rotary Encoder", Online Available at <https://en.wikipedia.org/wiki/Rotary_encoder>, Retrieved on May 17, 2017, 17 pages (10 pages of English Translation and 7 pages of Official Copy).
Wolfe, Joanna, "Annotation Technologies: A Software and Research Review", Computers and Composition, vol. 19, No. 4, 2002, pp. 471-497.
Applicant-Initiated Interview Summary received for U.S. Appl. No. 15/930,300, dated Oct. 27, 2020, 3 pages.
Examiner-Initiated Interview Summary received for U.S. Appl. No. 14/913,349, dated Oct. 27, 2020, 3 pages.
Feng, Lipeng, "Bound for computer lovers", Dec. 31, 2009, 2 pages (Official Copy Only) (See Communication under 37 CFR § 1.98(a)(3)).
Final Office Action received for U.S. Appl. No. 14/913,349, dated Oct. 30, 2020, 33 pages.
Office Action received for Australian Patent Application No. 2019257521, dated Oct. 21, 2020, 6 pages.
Office Action received for Chinese Patent Application No. 201910164962.3, dated Sep. 18, 2020, 19 pages (6 pages of English Translation and 13 pages of Official Copy).
Office Action received for Japanese Patent Application No. 2019-138053, dated Oct. 2, 2020, 6 pages (3 pages of English Translation and 3 pages of Official Copy).
Office Action received for Korean Patent Application No. 10-2018-7033888, dated Oct. 19, 2020, 10 pages (4 pages of English Translation and 6 pages of Official Copy).
Office Action received for Korean Patent Application No. 10-2019-7028736, dated Oct. 22, 2020, 6 pages (3 pages of English Translation and 3 pages of Official Copy).
Rev. Some Culture, "It's super easy for middle-aged and elderly people to learn compute", Jul. 31, 2013, 2 pages (Official Copy Only) (See Communication under 37 CFR § 1.98(a) (3)).
WZ Science Alliance, "Very simple geriatrics computer and Internet bestselling upgrade", Sep. 30, 2013, 3 pages (Official Copy Only) (See Communication under 37 CFR § 1.98(a)(3)).
Pedersen, Isabel, "Ready to Wear (or Not) Examining the Rhetorical Impact of Proposed Wearable Devices", 2013 IEEE International Symposium on Technology and Society (ISTAS) Social Implications of Wearable Computing and Augmediated Reality III Everyday Life, Dec. 31, 2013, pp. 201-202.
Tong et al., "Discussion About the Influence of Wearable Device on Mobile Operators' Service", Telecom science, Oct. 31, 2014, pp. 134-142 (Official Copy Only) (See Communication under 37 CFR § 1.98(a) (3)).
Notice of Allowance received for U.S. Appl. No. 15/930,300, dated Aug. 5, 2020, 14 pages.
Office Action received for Australian Patent Application No. 2019257521, dated Aug. 7, 2020, 5 pages.
Office Action received for Chinese Patent Application No. 201680012759.9, dated Jun. 19, 2020, 20 pages (9 pages of English Translation and 11 pages of Official Copy).

(56) References Cited

OTHER PUBLICATIONS

Office Action received for Chinese Patent Application No. 201910454069.4, dated Jul. 24, 2020, 8 pages (5 pages of English Translation and 3 pages of Official Copy).
Advisory Action received for U.S. Appl. No. 14/839,912, dated Nov. 14, 2019, 6 pages.
Advisory Action received for U.S. Appl. No. 15/049,052, dated Sep. 11, 2017, 2 pages.
Agarwal, Deepesh, "DexClock—Live Clock and Date Blended into Beautiful Artwork as Your Desktop Wallpaper", available at: https://www.megaleecher.net/DexCiock_Wallpaper_Designs, Jul. 6, 2013, 4 pages.
Applicant Initiated Interview Summary received for U.S. Appl. No. 14/839,912, dated Nov. 5, 2019, 5 pages.
Decision to Grant received for Danish Patent Application No. PA201570781, dated Jul. 17, 2017, 2 pages.
Decision to Grant received for Danish Patent Application No. PA201670117, dated Nov. 20, 2017, 2 pages.
Final Office Action received for U.S. Appl. No. 14/913,349, dated Jul. 30, 2018, 18 pages.
Final Office Action received for U.S. Appl. No. 15/049,052, dated Mar. 1, 2018, 15 pages.
Final Office Action received for U.S. Appl. No. 15/049,052, dated May 17, 2017, 13 pages.
Final Office Action received for U.S. Appl. No. 15/049,052, dated Oct. 2, 2018, 16 pages.
Final Office Action received for U.S. Appl. No. 14/839,912, dated Jul. 30, 2019, 42 pages.
Final Office Action received for U.S. Appl. No. 14/839,912, dated Sep. 13, 2018, 31 pages.
Intention to Grant received for Danish Patent Application No. PA201570776, dated Dec. 8, 2016, 2 pages.
Intention to Grant received for Danish Patent Application No. PA201570781, dated Dec. 8, 2016, 2 pages.
Intention to Grant received for Danish Patent Application No. PA201670117, dated Apr. 21, 2017, 2 pages.
Intention to Grant received for European Patent Application No. 14772001.5, dated Mar. 22, 2019, 17 pages.
International Preliminary Report on Patentability received for PCT Patent Application No. PCT/US2014/053957, dated Mar. 17, 2016, 8 pages.
International Preliminary Report on Patentability received for PCT Patent Application No. PCT/US2015/047704, dated Mar. 16, 2017, 19 pages.
International Search Report and Written Opinion received for PCT Patent Application No. PCT/US2014/053957, dated Feb. 19, 2015, 11 pages.
International Search Report and Written Opinion received for PCT Patent Application No. PCT/US2015/047704, dated Feb. 22, 2016, 25 pages.
Invitation to Pay Additional Fees received for PCT Patent Application No. PCT/US2015/047704, dated Dec. 16, 2015, 10 pages.
NDTV, "Sony Smartwatch 2 Launched in India for Rs. 14,990", available at <http://gadgets.ndtv.com/others/news/sony-smartwatch-2-launched-in-india-for-rs-14990-420319>, Sep. 18, 2013, 4 pages.
Non-Final Office Action received for U.S. Appl. No. 14/839,912, dated Feb. 26, 2019, 36 pages.
Non-Final Office Action received for U.S. Appl. No. 14/839,914, dated Oct. 19, 2017, 46 pages.
Non-Final Office Action received for U.S. Appl. No. 14/913,349, dated Apr. 2, 2019, 15 pages.
Non-Final Office Action received for U.S. Appl. No. 14/913,349, dated Jan. 11, 2018, 6 pages.
Non-Final Office Action received for U.S. Appl. No. 15/049,052, dated May 31, 2018, 15 pages.
Non-Final Office Action received for U.S. Appl. No. 15/049,052, dated Nov. 29, 2016, 13 pages.
Non-Final Office Action received for U.S. Appl. No. 15/049,052, dated Sep. 21, 2017, 14 pages.
Non-Final Office Action received for U.S. Appl. No. 14/839,912, dated Feb. 12, 2018, 30 pages.
Non-Final Office Action received for U.S. Appl. No. 14/839,912, dated Jun. 8, 2017, 26 pages.
Notice of Acceptance received for Australian Patent Application No. 2014315324, dated Sep. 28, 2017, 3 pages.
Notice of Acceptance received for Australian Patent Application No. 2017276285, dated Apr. 3, 2019, 3 pages.
Notice of Allowance received for Chinese Patent Application No. 201480060044.1, dated Mar. 29, 2019, 3 pages.
Notice of Allowance received for Danish Patent Application No. PA201570776, dated Feb. 8, 2017, 2 pages.
Notice of Allowance received for Japanese Patent Application No. 2016-537946, dated Mar. 26, 2018, 4 pages.
Notice of Allowance received for Taiwanese Patent Application No. 103130517, dated May 14, 2018, 5 pages.
Notice of Allowance received for U.S. Appl. No. 14/839,914, dated Jun. 22, 2018, 12 pages.
Office Action received for Australian Patent Application No. 2014315324, dated Aug. 8, 2017, 3 pages.
Office Action received for Australian Patent Application No. 2014315324, dated Oct. 21, 2016, 3 pages.
Office Action received for Australian Patent Application No. 2017276285, dated Nov. 26, 2018, 2 pages.
Office Action received for Chinese Patent Application No. 201480060044.1, dated Jan. 26, 2018, 15 pages.
Office Action received for Chinese Patent Application No. 201480060044.1, dated Sep. 25, 2018, 6 pages.
Office Action received for Danish Patent Application No. PA201570776, dated Aug. 19, 2016, 3 pages.
Office Action received for Danish Patent Application No. PA201570776, dated Jan. 26, 2016, 12 pages.
Office Action received for Danish Patent Application No. PA201570781, dated Aug. 19, 2016, 3 pages.
Office Action received for Danish Patent Application No. PA201670117, dated Jan. 12, 2017, 3 pages.
Office Action received for Danish Patent Application No. PA201670117, dated Jun. 13, 2016, 10 pages.
Office Action received for Danish Patent Application No. PA201770794, dated Apr. 5, 2018, 4 pages.
Office Action received for Danish Patent Application No. PA201770794, dated Dec. 19, 2017, 8 pages.
Office Action received for Danish Patent Application No. PA201770794, dated Jun. 13, 2019, 2 pages.
Office Action received for Danish Patent Application No. PA201770794, dated Oct. 30, 2018, 3 pages.
Office Action received for European Patent Application No. 14772001.5, dated Feb. 14, 2018, 5 pages.
Office Action received for European Patent Application No. 14772001.5, dated May 30, 2017, 10 pages.
Office Action received for Indian Patent Application No. 201617009216, dated Jan. 24, 2020, 6 pages.
Office Action received for Japanese Patent Application No. 2016-537946, dated Aug. 7, 2017, 8 pages.
Office Action received for Japanese Patent Application No. 2016-537946, dated Jan. 30, 2017, 12 pages.
Office Action received for Japanese Patent Application No. 2018-083313, dated Feb. 12, 2019, 4 pages.
Office Action received for Korean Patent Application No. 10-2016-7008449, dated Jan. 12, 2017, 15 pages.
Office Action received for Korean Patent Application No. 10-2016-7008449, dated Jan. 16, 2018, 10 pages.
Office Action received for Korean Patent Application No. 10-2016-7008449, dated Nov. 27, 2017, 6 pages.
Office Action received for Korean Patent Application No. 10-2018-7010872, dated Dec. 21, 2018, 7 pages.
Office Action received for Korean Patent Application No. 10-2018-7010872, dated May 21, 2018, 10 pages.
Office Action received for Korean Patent Application No. 10-2018-7010872, dated Feb. 13, 2019, 7 pages.
Office Action received for Taiwanese Patent Application No. 103130517, dated Feb. 22, 2016, 7 pages.

(56) References Cited

OTHER PUBLICATIONS

Office Action received for Taiwanese Patent Application No. 103130517, dated Jul. 29, 2016, 7 pages.
Office Action received for Taiwanese Patent Application No. 103130517, dated Feb. 6, 2018, 5 pages.
Office Action received for Taiwanese Patent Application No. 104128701, dated Jul. 22, 2016, 25 pages.
Office Action received for Taiwanese Patent Application No. 104128701, dated Mar. 16, 2017, 8 pages.
Search Report received for Danish Patent Application No. PA201570781, dated Mar. 8, 2016, 10 pages.
Summons to Attend Oral Proceedings received for European Patent Application No. 14772001.5, mailed on Nov. 14, 2018, 5 pages.
Summons to Attend Oral Proceedings received for European Patent Application No. 14772001.5, mailed on Oct. 4, 2018, 15 pages.
The Window Club, "Howto Set GIF as Background Windows 7", Online Available at <https://www.youtube.com/watch?v=tUec42Qd7ng>, Dec. 24, 2012, pp. 1-5.
Non-Final Office Action received for U.S. Appl. No. 15/655,253, dated Sep. 10, 2020, 17 pages.
Office Action received for Korean Patent Application No. 10-2020-7019035, dated Aug. 28, 2020, 6 pages (2 pages of English Translation and 4 pages of Official Copy).
Office Action received for Korean Patent Application No. 10-2020-7022802, dated Aug. 28, 2020, 7 pages (2 pages of English Translation and 5 pages of Official Copy).
Office Action received for Taiwanese Patent Application No. 104107329, dated Jul. 24, 2020, 7 pages (3 pages of English Translation and 4 pages of Official Copy).
Non-Final Office Action received for U.S. Appl. No. 16/384,726, dated May 14, 2020, 16 pages.
Office Action received for Chinese Patent Application No. 201580046331.1, dated Apr. 23, 2020, 15 pages (9 pages of English Translation and 6 pages of Official Copy).
Corrected Notice of Allowance received for U.S. Appl. No. 16/147,413, dated Jan. 8, 2021, 7 pages.
Non-Final Office Action received for U.S. Appl. No. 16/130,838, dated Dec. 31, 2020, 29 pages.
Non-Final Office Action received for U.S. Appl. No. 16/734,173, dated Jan. 6, 2021, 14 pages.
Notice of Acceptance received for Australian Patent Application No. 2019272034, dated Dec. 14, 2020, 3 pages.
Notice of Allowance received for Chinese Patent Application No. 201810074876.9, dated Jan. 12, 2021, 2 pages (1 page of English Translation and 1 page of Official Copy).
Notice of Allowance received for U.S. Appl. No. 16/358,483, dated Jan. 19, 2021, 9 Pages.
Office Action received for European Patent Application No. 19206249.5, dated Jan. 11, 2021, 8 pages.
Applicant-Initiated Interview Summary received for U.S. Appl. No. 16/263,280, dated Apr. 26, 2021, 2 pages.
Non-Final Office Action received for U.S. Appl. No. 16/871,995, dated Apr. 26, 2021, 14 pages.
Office Action received for Australian Patent Application No. 2019257521, dated Apr. 8, 2021, 6 pages.
Office Action received for Korean Patent Application No. 10-2021-7001482, dated Apr. 9, 2021, 10 pages (4 pages of English Translation and 6 pages of Official Copy).
Applicant-Initiated Interview Summary received for U.S. Appl. No. 15/655,253, dated Nov. 30, 2020, 5 pages.
Applicant-Initiated Interview Summary received for U.S. Appl. No. 16/263,280, dated Nov. 25, 2020, 3 pages.
Corrected Notice of Allowance received for U.S. Appl. No. 16/147,413, dated Nov. 25, 2020, 7 pages.
Office Action received for Danish Patent Application No. PA201970259, dated Nov. 23, 2020, 3 pages.
Office Action received for European Patent Application No. 17810739.7, dated Nov. 25, 2020, 4 pages.
Decision to Grant received for European Patent Application No. 19199004.3, dated Jan. 21, 2021, 2 pages.
Notice of Allowance received for Chinese Patent Application No. 201910454076.4, dated Feb. 4, 2021, 2 pages (1 page of English Translation and 1 page of Official Copy).
Applicant Initiated Interview Summary received for U.S. Appl. No. 16/384,726, dated Nov. 5, 2020, 3 pages.
Extended European Search Report received for European Patent Application No. 20190670.8, dated Nov. 2, 2020, 10 pages.
Notice of Allowance received for Chinese Patent Application No. 201910454069.4, dated Nov. 2, 2020, 7 pages (3 pages of English Translation and 4 pages of Official Copy).
Notice of Allowance received for U.S. Appl. No. 16/147,413, dated Nov. 5, 2020, 10 pages.
Notice of Allowance received for U.S. Appl. No. 16/525,082, dated Nov. 17, 2020, 7 pages.
Office Action received for Chinese Patent Application No. 201580046339.8, dated Oct. 19, 2020, 12 pages (4 pages of English Translation and 8 pages of Official Copy).
Office Action received for Chinese Patent Application No. 201910454076.4, dated Oct. 16, 2020, 14 pages (8 pages of English Translation and 6 pages of Official Copy).
Office Action received for Japanese Patent Application No. 2019-116590, dated Oct. 5, 2020, 6 pages (3 pages of English Translation and 3 pages of Official Copy).
Applicant-Initiated Interview Summary received for U.S. Appl. No. 16/130,838, dated Apr. 19, 2021, 5 pages.
Board Opinion received for Chinese Patent Application No. 201580046339.8, dated Mar. 19, 2021, 11 pages (3 pages of English Translation and 8 pages of Official Copy).
European Search Report received for European Patent Application No. 20217518.8, dated Apr. 16, 2021, 4 pages.
Office Action received for Japanese Patent Application No. 2019-116590, dated Mar. 15, 2021, 6 pages (3 pages of English Translation and 3 pages of Official Copy).
Office Action received for Korean Patent Application No. 10-2021-7005523, dated Mar. 31, 2021, 8 pages (3 pages of English Translation and 5 pages of Official Copy).
Corrected Notice of Allowance received for U.S. Appl. No. 16/358,483, dated Feb. 12, 2021, 4 pages.
Final Office Action received for U.S. Appl. No. 15/655,253, dated Feb. 9, 2021, 16 pages.
Notice of Allowance received for Chinese Patent Application No. 201580077206.7, dated Feb. 3, 2021, 2 pages (1 page of English Translation and 1 page of Official Copy).
Notice of Allowance received for U.S. Appl. No. 15/818,500, dated Feb. 22, 2021, 11 pages.
Office Action received for Australian Patent Application No. 2020201723, dated Feb. 4, 2021, 6 pages.
Applicant-Initiated Interview Summary received for U.S. Appl. No. 15/655,253, dated Mar. 29, 2021, 4 pages.
Corrected Notice of Allowance received for U.S. Appl. No. 16/384,726, dated Apr. 2, 2021, 2 pages.
Intention to Grant received for Danish Patent Application No. PA201970259, dated Mar. 23, 2021, 2 pages.
International Preliminary Report on Patentability received for PCT Patent Application No. PCT/US2019/049237, dated Mar. 25, 2021, 15 pages.
Notice of Allowance received for U.S. Appl. No. 16/918,855, dated Apr. 6, 2021, 7 pages.
Office Action received for Australian Patent Application No. 2019337519, dated Mar. 18, 2021, 5 pages.
Applicant-Initiated Interview Summary received for U.S. Appl. No. 16/734,173, dated Feb. 25, 2021, 3 pages.
Final Office Action received for U.S. Appl. No. 16/263,280, dated Mar. 4, 2021, 13 pages.
Office Action received for Chinese Patent Application No. 201910164962.3, dated Jan. 12, 2021, 14 pages (7 pages of English Translation and 7 pages of Official Copy).
Office Action received for Chinese Patent Application No. 201911127193.6, dated Dec. 17, 2020, 21 pages (10 pages of English Translation and 11 pages of Official Copy).
Supplemental Notice of Allowance received for U.S. Appl. No. 15/818,500, dated Mar. 5, 2021, 2 pages.

(56) References Cited

OTHER PUBLICATIONS

Corrected Notice of Allowance received for U.S. Appl. No. 15/930,300, dated Dec. 24, 2020, 3 pages.
Notice of Acceptance received for Australian Patent Application No. 2019206101, dated Dec. 11, 2020, 3 pages.
Office Action received for Chinese Patent Application No. 201580077206.7, dated Nov. 11, 2020, 11 pages (5 pages of English Translation and 6 pages of Official Copy).
Notice of Allowance received for Korean Patent Application No. 10-2020-7022802, dated Mar. 4, 2021, 6 pages (2 pages of English Translation and 4 pages of Official Copy).
Notice of Allowance received for U.S. Appl. No. 16/384,726, dated Mar. 17, 2021, 9 pages.
Office Action received for European Patent Application No. 19173371.6, dated Mar. 15, 2021, 6 pages.
Office Action received for European Patent Application No. 19173886.3, dated Mar. 16, 2021, 6 pages.
Office Action received for Indian Patent Application No. 201818001531, dated Mar. 12, 2021, 6 pages.
Applicant Initiated Interview Summary received for U.S. Appl. No. 16/871,995, dated Jul. 16, 2021, 4 pages.
Android Central, "Gmail on iOS versus Android", Online Available at: https://www.youtube.com/watch?v=w2aVeZLxU5Q&t=80s, Nov. 2, 2011, 3 pages.
Applicant-Initiated Interview Summary received for U.S. Appl. No. 15/818,500, dated Aug. 9, 2021, 6 pages.
Board Decision received for Chinese Patent Application No. 201580046339.8, dated Jun. 22, 2021, 12 pages (1 page of English Translation and 11 pages of Official Copy).
Corrected Notice of Allowance received for U.S. Appl. No. 16/263,280, dated Aug. 5, 2021, 4 pages.
Decision of Appeal received for Korean Patent Application No. 10-2019-7028736, mailed on May 24, 2021, 16 pages (2 pages of English Translation and 14 pages of Official Copy).
Final Office Action received for U.S. Appl. No. 16/734,173, dated Jul. 13, 2021, 12 pages.
Final Office Action received for U.S. Appl. No. 16/871,995, dated Aug. 20, 2021, 25 pages.
FTScroller v0.2.2, Online available at https://github.com/ftlabs/ftscroller/tree/v0.2.2, Mar. 18, 2013, 9 pages.
Narayanaswami et al., "Challenges and considerations for the design and production of a purpose-optimized body-worn wristwatch computer", Online available at https://www.spiedigitallibrary.org/conference-proceedings-of-spie/5443/0000/Challenges-and-considerations-for-the-design-and-production-of-a/10.1117/12.561263.short?SSO=1, Defense and Security, Florida, United States, Sep. 15, 2004, 13 pages.
Non-Final Office Action received for U.S. Appl. No. 15/818,500, dated Jul. 12, 2021, 18 pages.
Notice of Allowance received for Chinese Patent Application No. 201911127193.6, dated May 8, 2021, 4 pages (1 page of English Translation and 3 pages of Official Copy).
Notice of Allowance received for Japanese Patent Application No. 2019-138053, dated Jul. 2, 2021, 4 pages (1 page of English Translation and 3 pages of Official Copy).
Notice of Allowance received for Korean Patent Application No. 10-2020-7019035, dated Jun. 18, 2021, 4 pages (1 page of English Translation and 3 pages of Official Copy).
Notice of Allowance received for U.S. Appl. No. 16/130,838, dated Jun. 16, 2021, 12 pages.
Notice of Allowance received for U.S. Appl. No. 16/263,280, dated Jun. 8, 2021, 8 pages.
Office Action received for Australian Patent Application No. 2019257521, dated Jul. 27, 2021, 6 pages.
Office Action received for European Patent Application No. 19156614.0, dated Jul. 16, 2021, 10 pages.
Office Action received for Korean Patent Application No. 10-2021-7017259, dated Jul. 19, 2021, 10 pages (4 pages of English Translation and 6 pages of Official Copy).

Office Action received for Taiwanese Patent Application No. 104107318, dated Jul. 9, 2021, 5 pages (2 pages of English Translation and 3 pages of Official Copy).
Supplemental Notice of Allowance received for U.S. Appl. No. 16/130,838, dated Jun. 28, 2021, 2 pages.
Advisory Action received for U.S. Appl. No. 15/655,253, dated May 11, 2021, 6 pages.
Notice of Acceptance received for Australian Patent Application No. 2020201723, dated May 6, 2021, 3 pages.
Notice of Allowance received for U.S. Appl. No. 16/358,483, dated May 17, 2021, 5 pages.
Office Action received for European Patent Application No. 20217518.8, dated Apr. 30, 2021, 8 pages.
Office Action received for Japanese Patent Application No. 2019-088503, dated Apr. 2, 2021, 6 pages (3 pages of English Translation and 3 pages of Official Copy).
Office Action received for Korean Patent Application No. 10-2021-7001918, dated May 7, 2021, 5 pages (2 pages of English Translation and 3 pages of Official Copy).
Applicant-Initiated Interview Summary received for U.S. Appl. No. 17/212,850, dated Jan. 13, 2022, 5 pages.
Office Action received for Chinese Patent Application No. 201910447678.7, dated Nov. 29, 2021, 17 pages (7 pages of English Translation and 10 pages of Official Copy).
"Accepted Outlook Meetings Move to Deleted Folder", Available online at: https://social.technet.microsoft.com/Forums/office/en-US/f3301c9a-a93f-49f7-be13-c642e285f150/accepted-outlook-meetings-move-to-deleted-folder?forum=outlook, Jan. 12, 2011, 4 pages.
Advisory Action received for U.S. Appl. No. 14/752,776, dated Aug. 31, 2018, 3 pages.
Advisory Action received for U.S. Appl. No. 16/734,173, dated Oct. 14, 2021, 3 pages.
"Android 2.3.4 User's Guide", Online available at: https://static.googleusercontent.com/media/www.google.com/en//help/hc/pdfs/mobile/AndroidUsersGuide-2.3.4.pdf, May 20, 2011, 384 pages.
Applicant Initiated Interview Summary received for U.S. Appl. No. 16/265,938, dated Mar. 11, 2020, 5 pages.
Applicant-Initiated Interview Summary received for U.S. Appl. No. 16/265,938, dated May 28, 2020, 5 pages.
Applicant-Initiated Interview Summary received for U.S. Appl. No. 17/103,436, dated Sep. 22, 2021, 2 pages.
"Clock & Calendar for Smartwatch 2", https://www.youtube.com/watch?v=Uj-K2vMnrj8, Nov. 20, 2013, 2 pages.
Decision to Grant received for European Patent Application No. 15739110.3, dated Sep. 19, 2019, 2 pages.
Ellis Benus, "Use a Phone Number in the Google Calendar Where Line for One Click Calling", Available online at: https://ellisbenus.com/ellis-benus/use-a-phone-number-in-the-google-calender-where-line-for-one-click-calling, Ellis Benus-Small Business Web Guru, Oct. 3, 2012, 2 pages.
Extended European Search Report (includes Partial European Search Report and European Search Opinion) received for European Patent Application No. 16190252.3, dated Mar. 1, 2017, 10 pages.
Extended European Search Report for European Application No. 19185318.3, dated Nov. 20, 2019, 8 pages.
Final Office Action received for U.S. Appl. No. 14/752,776, dated May 29, 2018, 36 pages.
Final Office Action received for U.S. Appl. No. 16/265,938, dated Apr. 7, 2020, 45 pages.
Intention to Grant received for European Patent Application No. 15739110.3, dated Mar. 7, 2019, 8 pages.
Intention to Grant received for European Patent Application No. 15739110.3, dated Sep. 11, 2019, 6 pages.
International Preliminary Report on Patentability received for PCT Patent Application No. PCT/US2015/038173, dated Jan. 5, 2017, 10 pages.
International Preliminary Report on Patentability received for PCT Patent Application No. PCT/US2015/038174, dated Jan. 5, 2017, 27 pages.
International Search Report and Written Opinion received for PCT Patent Application No. PCT/US2015/038173 dated Sep. 25, 2015, 13 pages.

(56) References Cited

OTHER PUBLICATIONS

International Search Report and Written Opinion received for PCT Patent Application No. PCT/US2015/038174, dated Jan. 18, 2016, 38 pages.
Invitation to Pay Additional Fees received for PCT Patent Application No. PCT/US2015/038174, dated Oct. 5, 2015, 5 pages.
Jepson, Tom, "How to auto-forward specific emails in gmail?", Available online at: <http://www.tomjepson.co.uk/how-to-auto-forward-specific-emails-in-gmail/>, May 19, 2013, 7 pages.
Lyons et al., "Facet: A Multi-Segment Wrist Worn System", Online available at: <http://fetlab.io/publications/2012-Facet-a%20multi-segment%20wrist%20worn%20system.pdf>, Oct. 7-10, 2012, pp. 123-129.
"Microsoft Outlook 2010(TM) A Beginners Guide", Available online at: http://www.reading.ac.uk/web/files/its/outlook2010.pdf, Apr. 1, 2012, 24 pages.
Netsapiens, "Click to Call in MS Outlook", Available online at: <https://netsapiens.com/click-to-call-in-ms-outlook-windows-apps/>, May 4, 2012, 8 pages.
Non-Final Office Action received for U.S. Appl. No. 14/752,776, dated Jan. 2, 2018, 30 pages.
Non-Final Office Action received for U.S. Appl. No. 14/752,776, dated Nov. 5, 2018, 48 pages.
Non-Final Office Action received for U.S. Appl. No. 16/265,938, dated Nov. 4, 2019, 28 pages.
Non-Final Office Action received for U.S. Appl. No. 17/103,436, dated Aug. 18, 2021, 16 pages.
Non-Final Office Action received for U.S. Appl. No. 17/212,850, dated Oct. 8, 2021, 14 pages.
Notice of Acceptance received for Australian Patent Application No. 2015279544, dated Mar. 1, 2018, 3 pages.
Notice of Acceptance received for Australian Patent Application No. 2016231598, dated Mar. 1, 2018, 3 pages.
Notice of Acceptance received for Australian Patent Application No. 2018204286, dated Feb. 27, 2020, 3 pages.
Notice of Acceptance received for Australian Patent Application No. 2020203919, dated Sep. 3, 2021, 3 pages.
Notice of Acceptance received for Australian Patent Application No. 2015279545, dated Feb. 9, 2018, 3 pages.
Notice of Allowance received for Chinese Patent Application No. 201580029054.3, dated Jul. 19, 2019, 2 pages (1 page of English Translation and 1 page of Official Copy).
Notice of Allowance received for U.S. Appl. No. 16/265,938, dated Oct. 15, 2020, 8 pages.
Office Action received for Australian Patent Application No. 2015279544, dated Apr. 18, 2017, 4 pages.
Office Action received for Australian Patent Application No. 2015279544, dated Feb. 13, 2018, 5 pages.
Office Action received for Australian Patent Application No. 2016231598, dated Apr. 7, 2017, 5 pages.
Office Action received for Australian Patent Application No. 2018204286, dated Apr. 17, 2019, 5 pages.
Office Action received for Australian Patent Application No. 2018204286, dated Nov. 12, 2019, 5 pages.
Office Action received for Australian Patent Application No. 2018204286, dated Sep. 5, 2019, 5 pages.
Office Action received for Australian Patent Application No. 2019337519, dated Oct. 8, 2021, 7 pages.
Office Action received for Australian Patent Application No. 2020203919, dated Dec. 23, 2020, 5 pages.
Office Action received for Australian Patent Application No. 2020203919, dated Jul. 19, 2021, 7 pages.
Office Action received for Australian Patent Application No. 2020203919, dated Mar. 30, 2021, 5 pages.
Office Action received for Australian Patent Application No. 2020203919, dated Oct. 19, 2020, 5 pages.
Office Action received for Australian Patent Application No. 2015279545, dated Apr. 13, 2017, 3 pages.

Office Action received for Chinese Patent Application No. 201580029054.3, dated Dec. 5, 2018, 12 pages (6 pages of English Translation and 6 pages of Official Copy).
Office Action Received for European Patent Application No. 15739109.5, dated Jan. 31, 2018, 7 pages.
Office Action Received for European Patent Application No. 15739110.3, dated Jan. 31, 2018, 8 pages.
Office Action received for European Patent Application No. 16190252.3, dated Feb. 19, 2018, 7 pages.
Office Action received for Taiwanese Patent Application No. 104120843, dated Jan. 30, 2016, 5 pages (1 page of English Translation of Search Report and 4 pages of Official Copy).
"Remote Phone Call", Available online at: <https://web.archive.org/web/20140625104844/https://www.justremotephone.com/>, Jun. 25, 2014, 22 pages.
"Responding to a meeting invitation", Available online at: https://web.archive.org/web/20121128174157/https://www.zimbra.com/desktop7/help/en_US/Calendar/Responding_to_an_invitation.htm, Nov. 28, 2012, 1 page.
Summons to Attend Oral Proceedings received for European Patent Application No. 15739109.5, mailed on Aug. 23, 2018, 9 pages.
Summons to Attend Oral Proceedings received for European Patent Application No. 15739109.5, mailed on Oct. 4, 2018, 3 pages.
Summons to Attend Oral Proceedings received for European Patent Application No. 15739110.3, mailed on Aug. 23, 2018, 10 pages.
Summons to Attend Oral Proceedings received for European Patent Application No. 15739110.3, mailed on Oct. 2, 2018, 3 pages.
Summons to Attend Oral Proceedings received for European Patent Application No. 16190252.3, mailed on Jan. 8, 2019, 3 pages.
Summons to Attend Oral Proceedings received for European Patent Application No. 16190252.3, mailed on Oct. 30, 2018, 13 pages.
Tablet Talk, "Tablet Talk App: Frequently Asked Questions—Tablet Talk.", Online available at: https://web.archive.org/web/20140625102903/http://1www.tablettalapp.com/faq, Jun. 25, 2014, pp. 1-6.
Applicant-Initiated Interview Summary received for U.S. Appl. No. 15/818,500, dated Jan. 24, 2022, 4 pages.
Applicant-Initiated Interview Summary received for U.S. Appl. No. 16/734,173, dated Jan. 25, 2022, 4 pages.
Non-Final Office Action received for U.S. Appl. No. 16/703,486, dated Jan. 27, 2022, 13 pages.
Non-Final Office Action received for U.S. Appl. No. 16/871,995, dated Feb. 1, 2022, 18 pages.
Non-Final Office Action received for U.S. Appl. No. 16/926,512, dated Jan. 21, 2022, 20 pages.
Office Action received for Korean Patent Application No. 10-2021-7017259, dated Jan. 10, 2022, 6 pages (3 pages of English Translation and 3 pages of Official Copy).
Applicant-Initiated Interview Summary received for U.S. Appl. No. 16/734,173, dated Sep. 9, 2021, 2 pages.
Notice of Allowance received for Korean Patent Application No. 10-2021-7005523, dated Aug. 26, 2021, 4 pages (1 page of English Translation and 3 pages of Official Copy).
Office Action received for Chinese Patent Application No. 202110396782.5, dated Nov. 11, 2021, 10 pages (4 pages of English Translation and 6 pages of Official Copy).
Applicant Initiated Interview Summary received for U.S. Appl. No. 16/871,995, dated Dec. 6, 2021, 4 pages.
Corrected Notice of Allowance received for U.S. Appl. No. 17/103,436, dated Dec. 22, 2021, 2 pages.
Intention to Grant received for European Patent Application No. 19185318.3, dated Dec. 10, 2021, 12 pages.
Notice of Acceptance received for Australian Patent Application No. 2019337519, dated Dec. 15, 2021, 3 pages.
Notice of Allowance received for U.S. Appl. No. 17/103,436, dated Dec. 8, 2021, 12 pages.
Office Action received for European Patent Application No. 19217240.1, dated Dec. 17, 2021, 8 pages.
Non-Final Office Action received for U.S. Appl. No. 16/734,173, dated Nov. 2, 2021, 13 pages.
Notice of Allowance received for Taiwanese Patent Application No. 104107318, dated Oct. 19, 2021, 5 pages (2 page of English Translation and 3 pages of Official Copy).

(56) References Cited

OTHER PUBLICATIONS

Office Action received for Indian Patent Application No. 202018012249, dated Nov. 1, 2021, 6 pages.
Office Action received for Japanese Patent Application No. 2021-510409, dated Oct. 8, 2021, 9 pages (5 pages of English Translation and 4 pages of Official Copy).
Applicant-Initiated Interview Summary received for U.S. Appl. No. 16/734,173, dated Sep. 27, 2021, 2 pages.
Board Opinion received for Chinese Patent Application No. 201910164962.3, dated Sep. 16, 2021, 16 pages (6 pages of English Translation and 10 pages of Official Copy).
Decision to Grant received for Danish Patent Application No. PA201970259, dated Sep. 17, 2021, 2 pages.
Examiner-Initiated Interview Summary received for U.S. Appl. No. 14/913,349, dated Sep. 22, 2021, 2 pages.
Examiner's Answer to Appeal Brief received for U.S. Appl. No. 14/913,349, dated Sep. 30, 2021, 23 pages.
Notice of Allowance received for U.S. Appl. No. 16/263,280, dated Sep. 17, 2021, 8 pages.
Decision on Appeal received for Korean Patent Application No. 10-2018-7033888, mailed on Oct. 27, 2021, 34 pages (4 pages of English Translation and 30 pages of Official Copy).
Final Office Action received for U.S. Appl. No. 15/818,500, dated Nov. 30, 2021, 14 pages.
Office Action received for Indian Patent Application No. 202018015998, dated Nov. 17, 2021, 6 pages.
Office Action received for Indian Patent Application No. 202018016000, dated Nov. 16, 2021, 6 pages.
Office Action received for Korean Patent Application No. 10-2021-7001918, dated Nov. 16, 2021, 12 pages (5 pages of English Translation and 7 pages of Official Copy).
Advisory Action received for U.S. Appl. No. 15/818,500, dated Feb. 18, 2022, 4 pages.
Advisory Action received for U.S. Appl. No. 16/734,173, dated Apr. 4, 2022, 5 pages.
Applicant-Initiated Interview Summary received for U.S. Appl. No. 16/734,173, dated Mar. 21, 2022, 3 pages.
Applicant-Initiated Interview Summary received for U.S. Appl. No. 16/871,995, dated Apr. 5, 2022, 5 pages.
Applicant-Initiated Interview Summary received for U.S. Appl. No. 16/926,512, dated Apr. 21, 2022, 4 pages.
Corrected Notice of Allowance received for U.S. Appl. No. 17/378,451, dated May 4, 2022, 2 pages.
Decision on Appeal received for U.S. Appl. No. 14/913,349, dated Apr. 20, 2022, 13 pages.
Decision to Grant received for European Patent Application No. 19185318.3, dated Mar. 31, 2022, 3 pages.
Examiner's Answer to Appeal Brief received for U.S. Appl. No. 15/655,253, dated Mar. 10, 2022, 16 pages.
Final Office Action received for U.S. Appl. No. 16/734,173, dated Feb. 22, 2022, 16 pages.
Notice of Allowance received for Chinese Patent Application No. 202110396782.5, dated Mar. 30, 2022, 5 pages (1 page of English Translation and 4 pages of Official Copy).
Notice of Allowance received for Japanese Patent Application No. 2019-088503, dated Feb. 18, 2022, 4 pages (1 page of English Translation and 3 pages of Official Copy).
Notice of Allowance received for U.S. Appl. No. 17/378,451, dated Apr. 4, 2022, 8 pages.
Office Action received for Australian Patent Application No. 2021201748, dated Mar. 18, 2022, 6 pages.
Office Action received for Australian Patent Application No. 2021201780, dated Mar. 22, 2022, 3 pages.
Office Action received for Australian Patent Application No. 2022202044, dated Apr. 6, 2022, 3 pages.
Office Action received for Chinese Patent Application No. 201910438645.6, dated Mar. 2, 2022, 11 pages (5 pages of English Translation and 6 pages of Official Copy).
Office Action received for Chinese Patent Application No. 201910446753.8, dated Mar. 2, 2022, 11 pages (5 pages of English Translation and 6 pages of Official Copy).
Office Action received for Chinese Patent Application No. 201910447678.7, dated Mar. 21, 2022, 14 pages (6 pages of English Translation and 8 pages of Official Copy).
Office Action received for Indian Patent Application No. 202018011347, dated Mar. 2, 2022, 6 pages.
Office Action received for Indian Patent Application No. 202018014953, dated Mar. 7, 2022, 7 pages.
Office Action received for Japanese Patent Application No. 2021-510409, dated Apr. 8, 2022, 5 pages (2 pages of English Translation and 3 pages of Official Copy).
Office Action received for Korean Patent Application No. 10-2021-7017259, dated Mar. 3, 2022, 8 pages (4 pages of English Translation and 4 pages of Official Copy).
Applicant-Initiated Interview Summary received for U.S. Appl. No. 16/703,486, dated May 12, 2022, 4 pages.
Notice of Allowance received for U.S. Appl. No. 16/926,512, dated May 18, 2022, 9 pages.
Office Action received for Korean Patent Application No. 10-2021-7001918, dated Apr. 28, 2022, 7 pages (3 pages of English Translation and 4 pages of Official Copy).

* cited by examiner

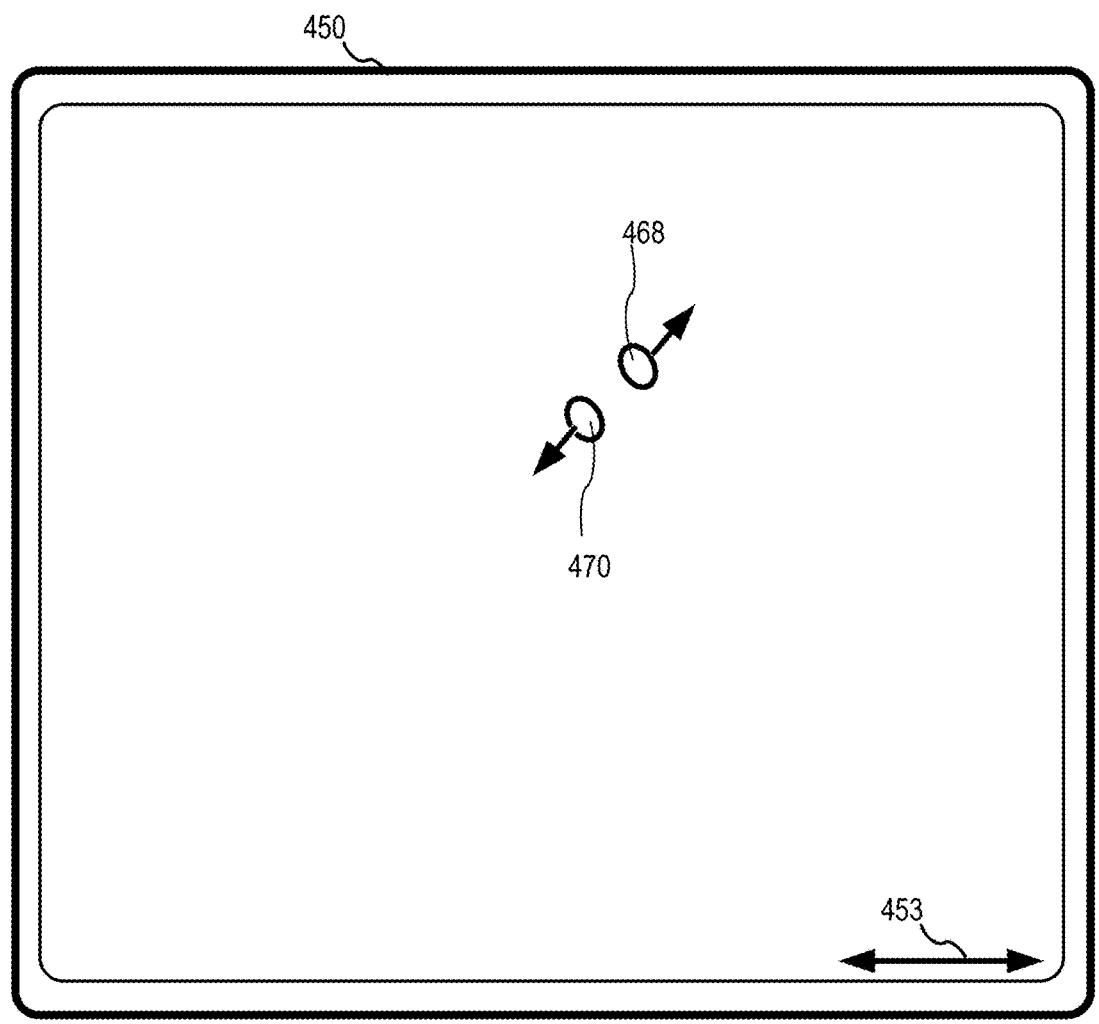
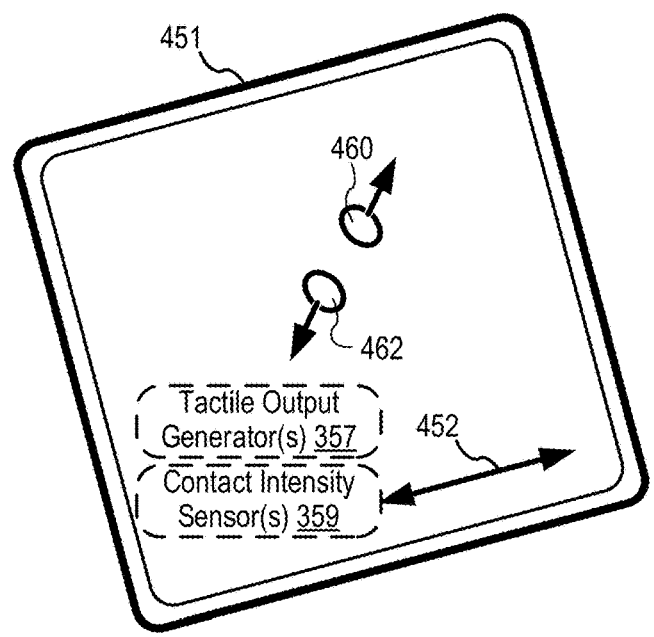
FIG. 4B

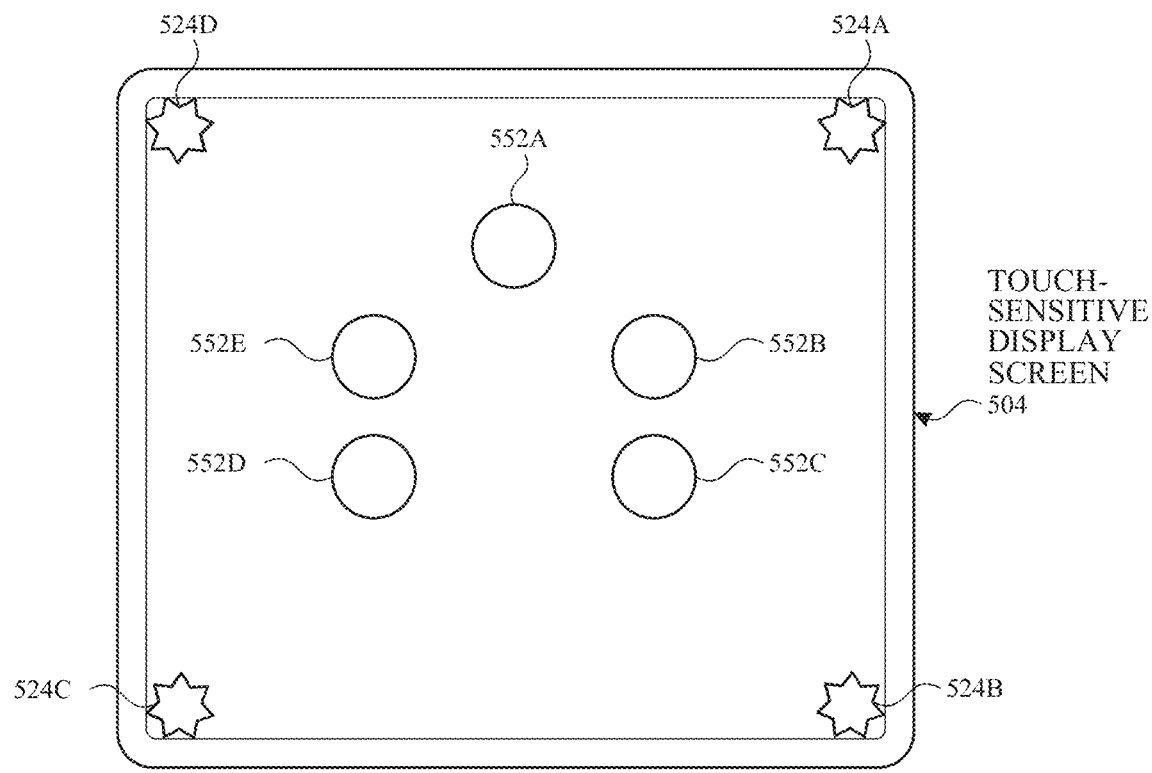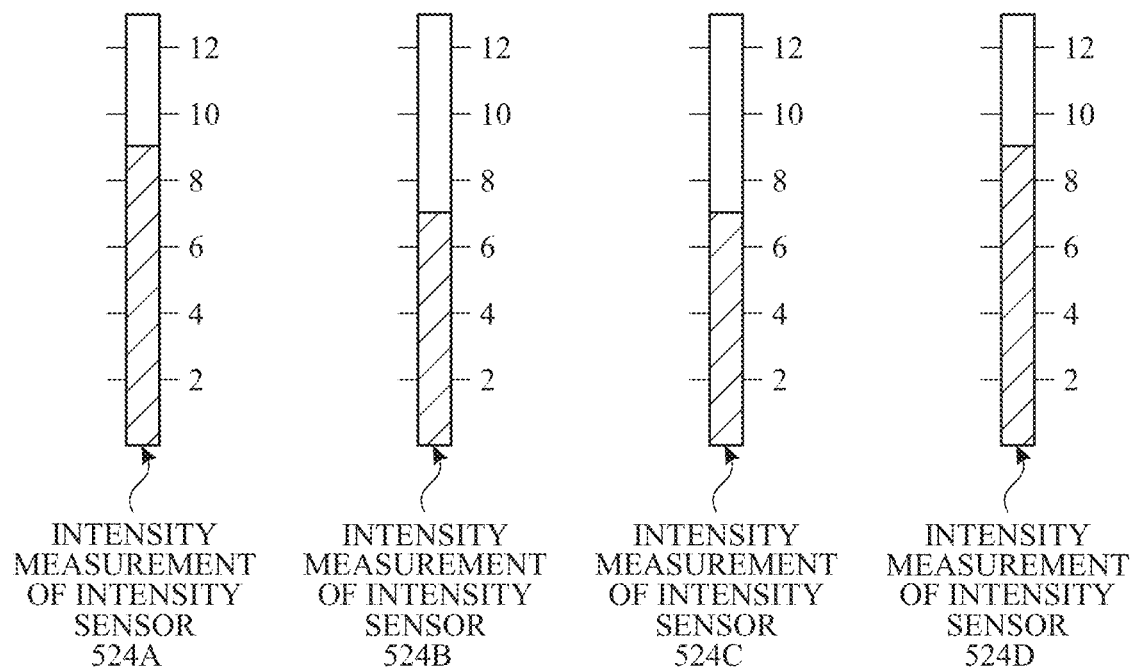
FIG. 5C

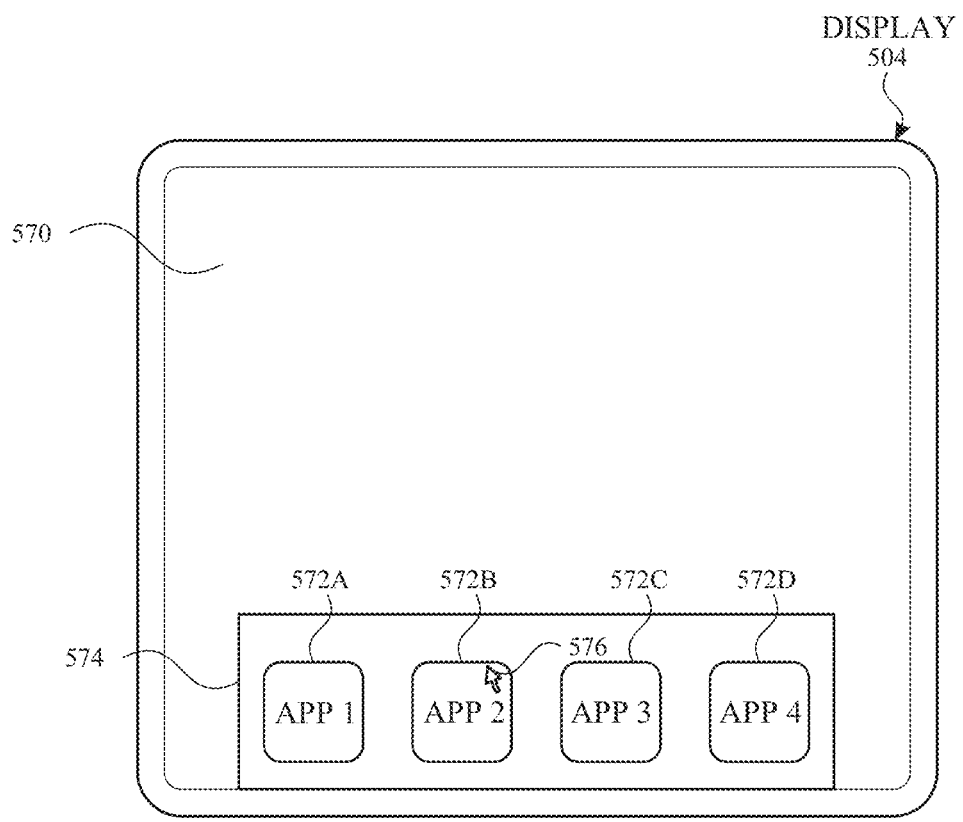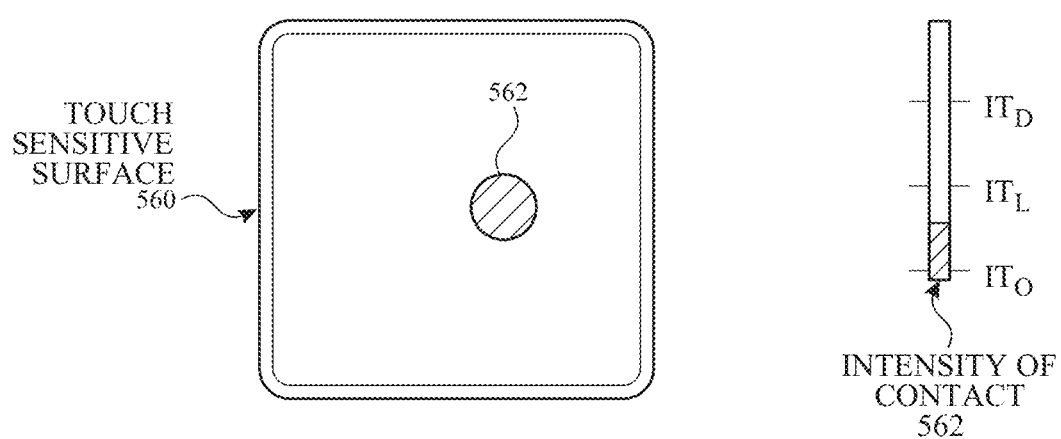
FIG. 5E

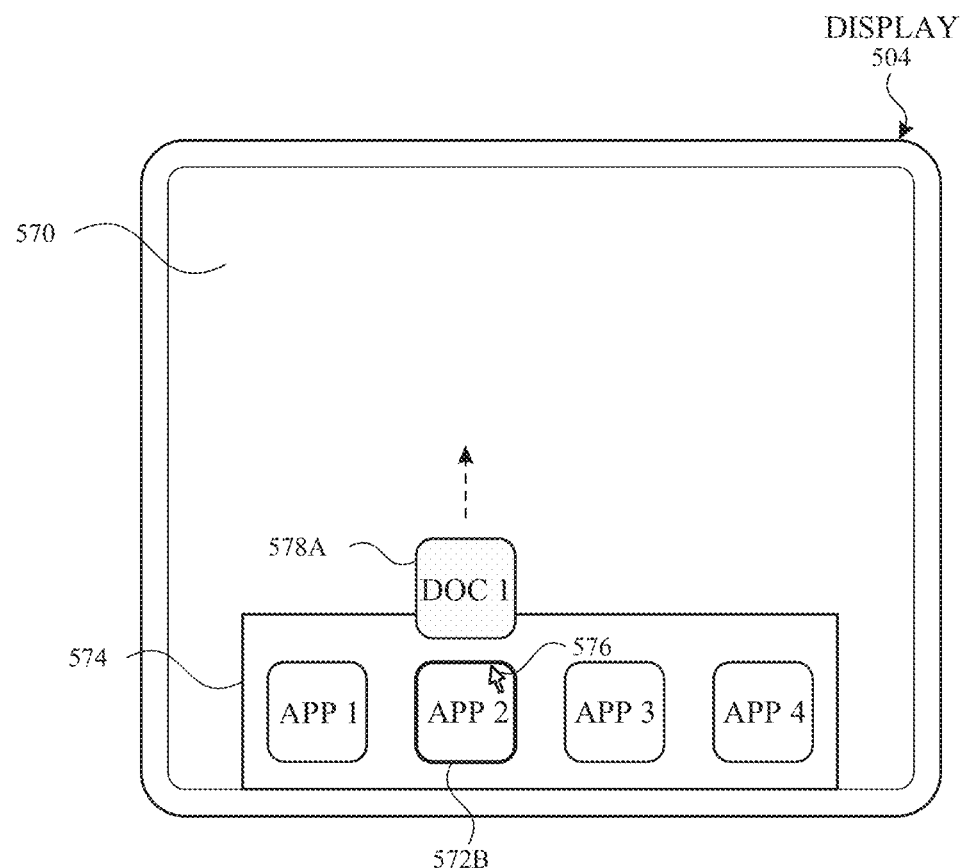
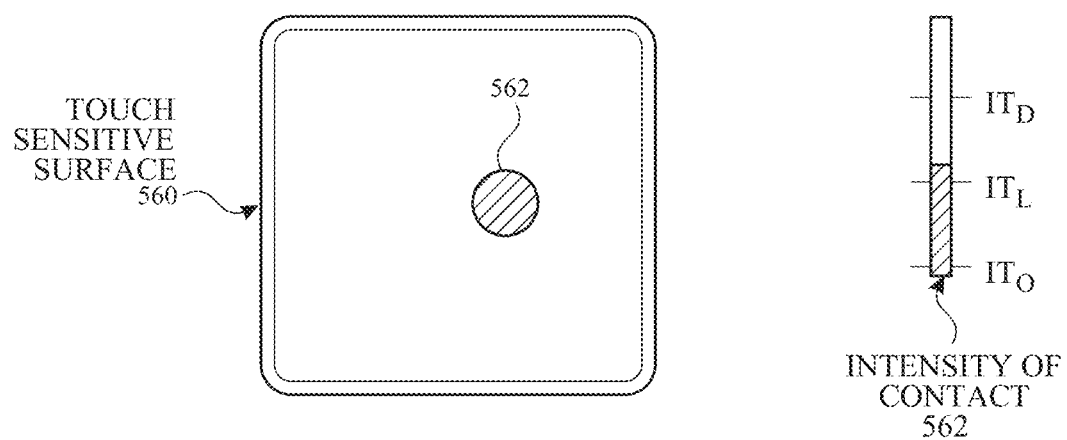
FIG. 5F

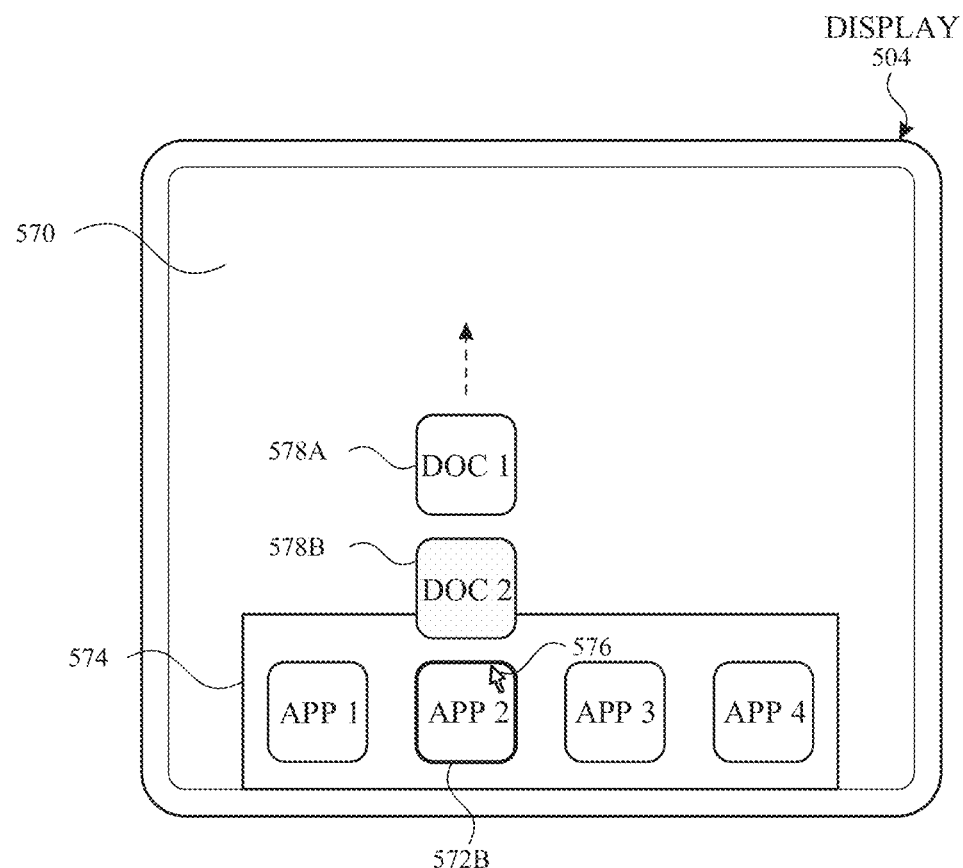
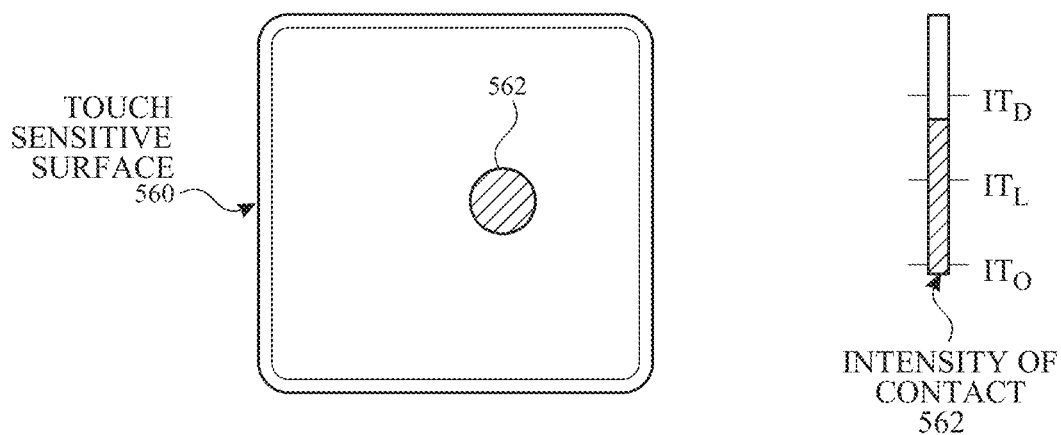
FIG. 5G

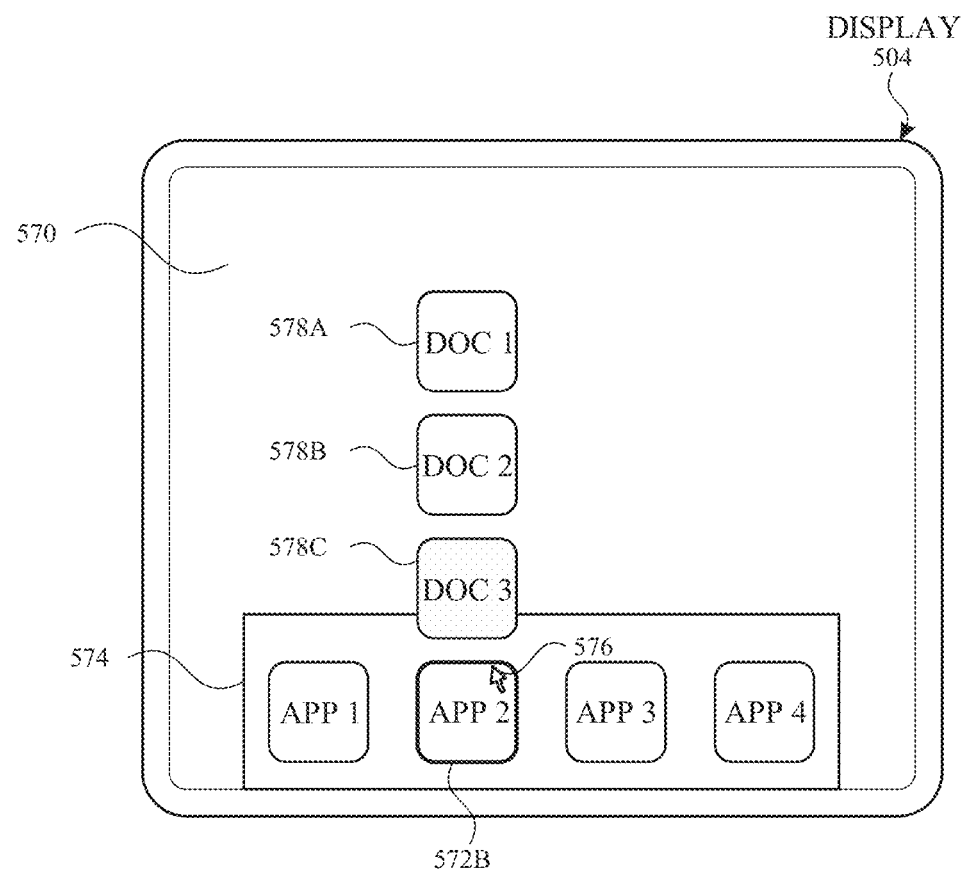
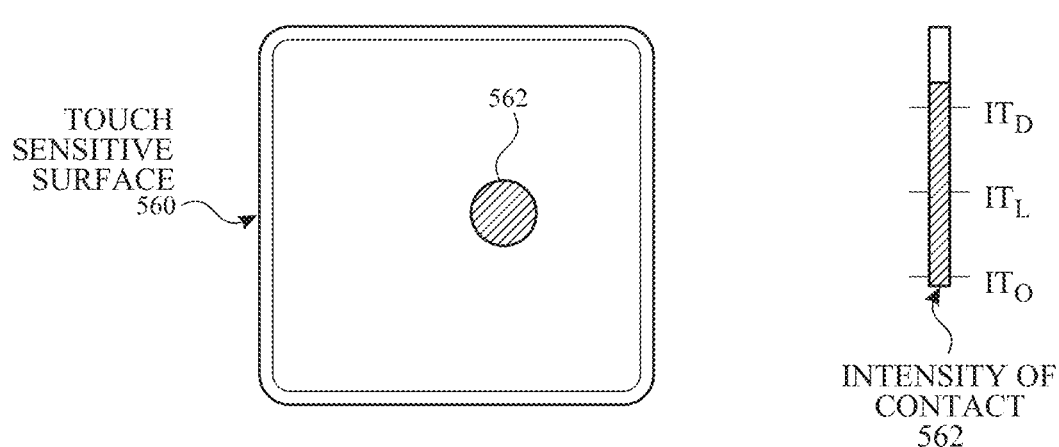
*FIG. 5H*

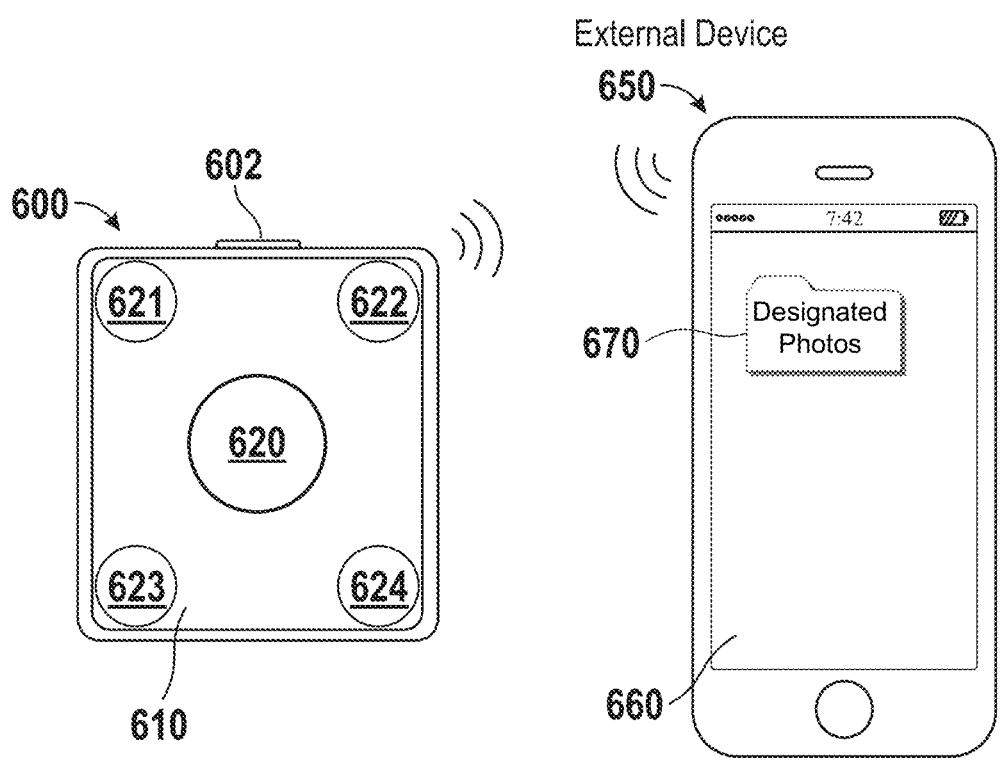
FIG. 6A                    FIG. 6B

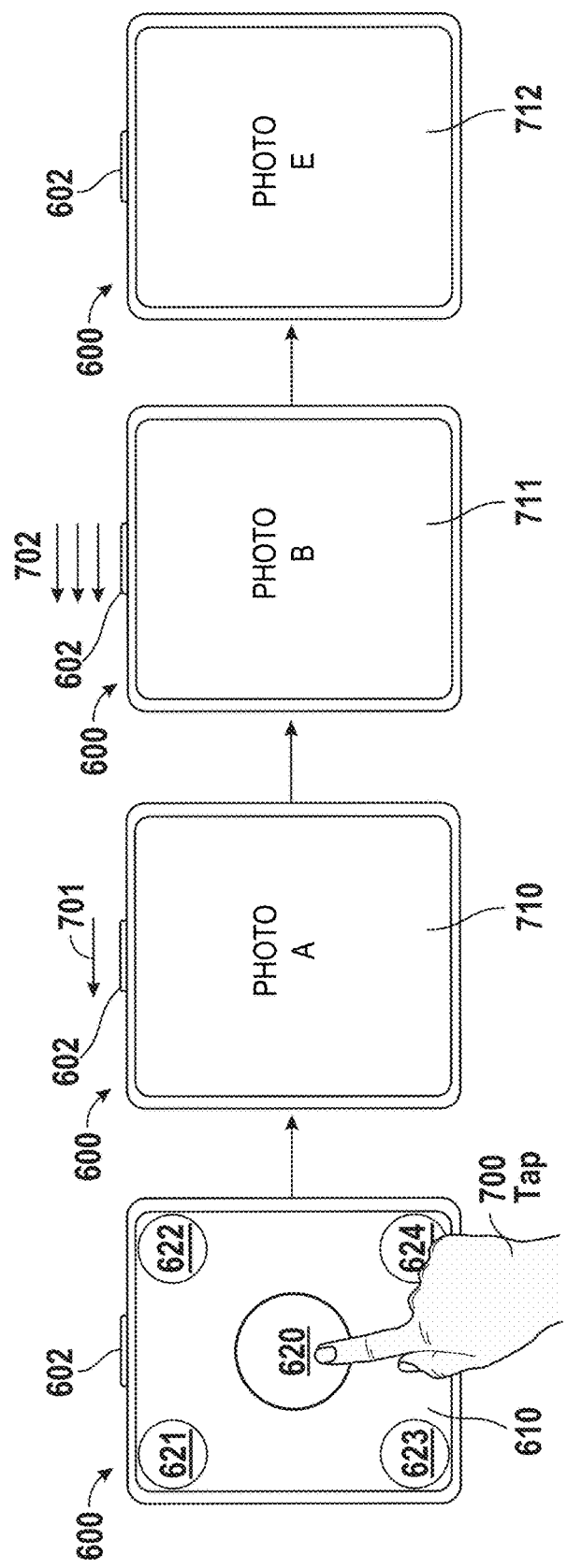

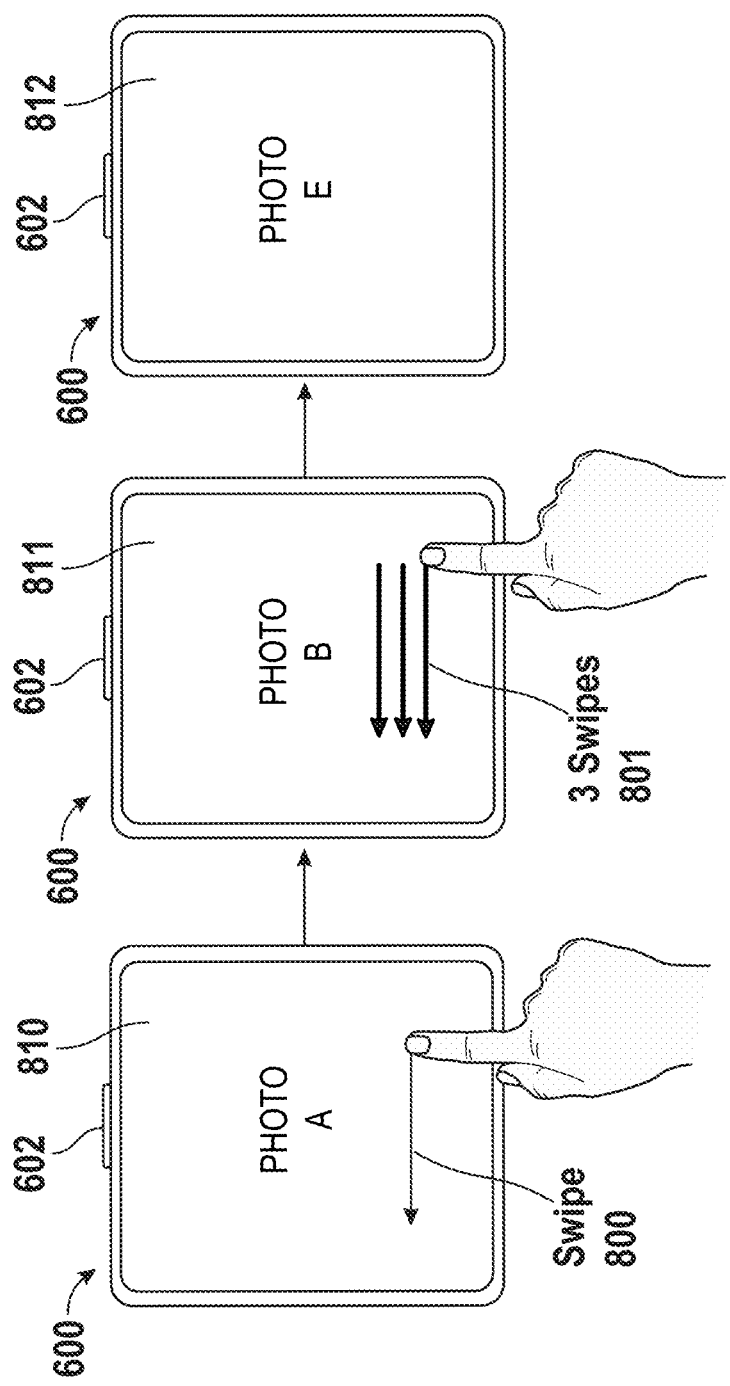

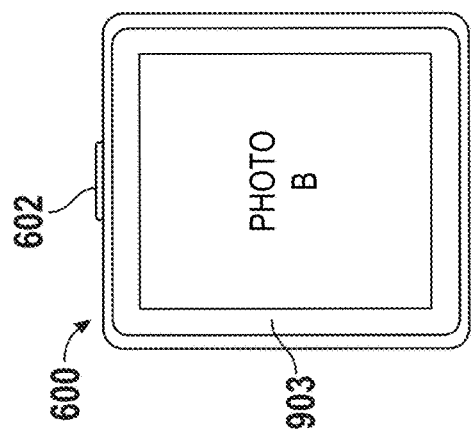
FIG. 9A
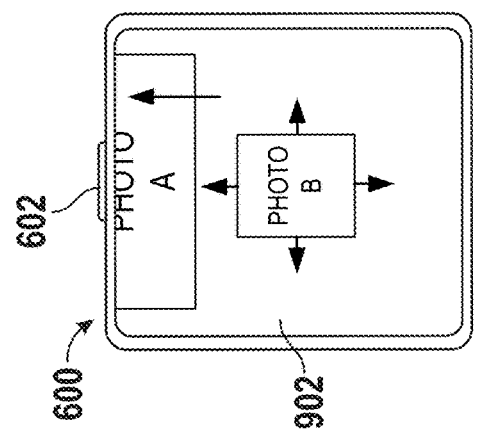
FIG. 9B
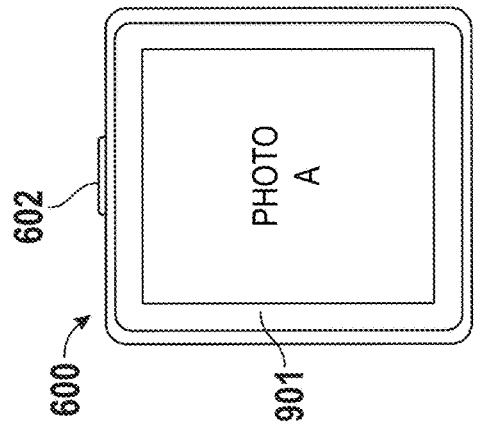
FIG. 9C
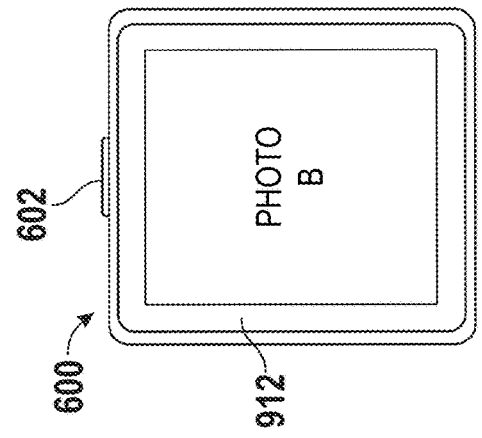
FIG. 9D
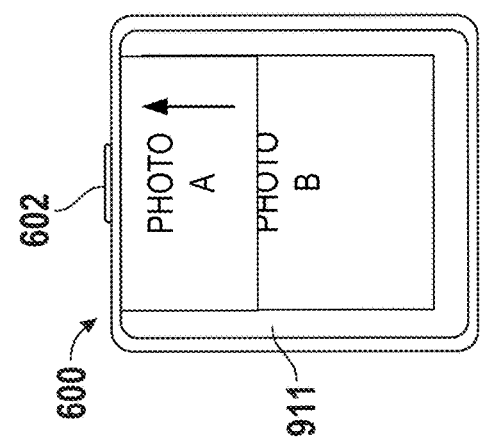
FIG. 9E
FIG. 9F

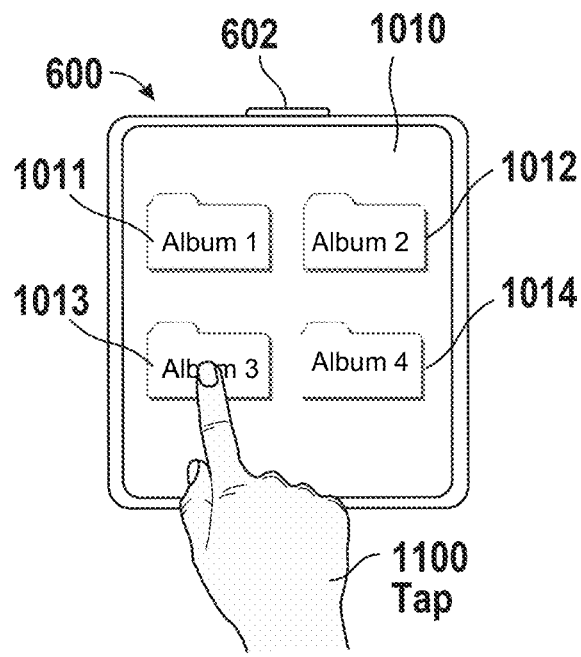
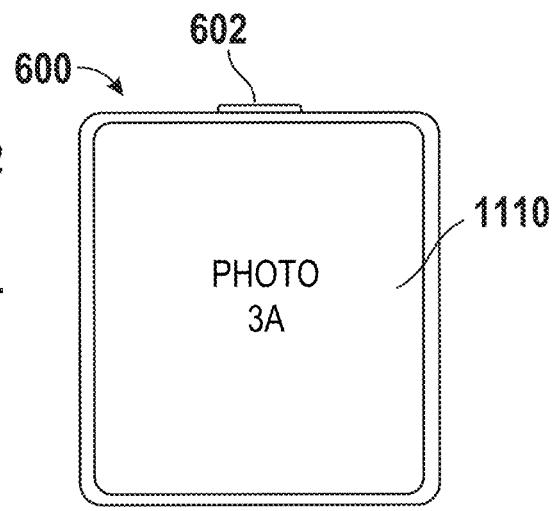
FIG. 11A
FIG. 11B
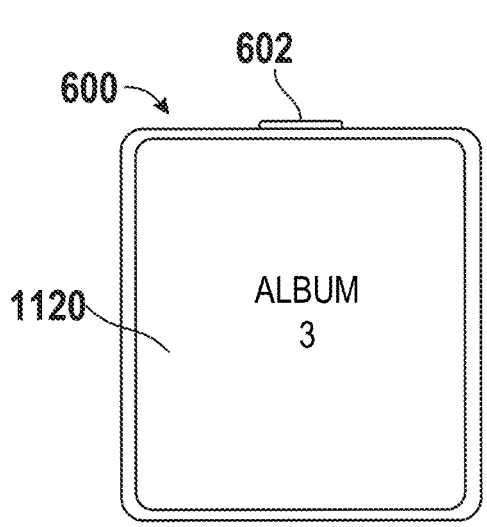
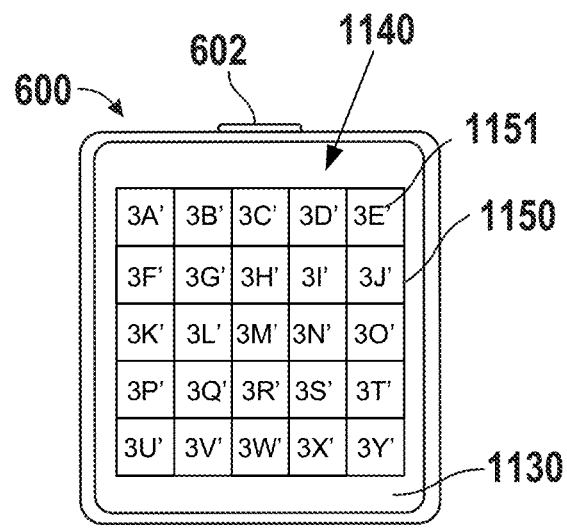
FIG. 11C
FIG. 11D

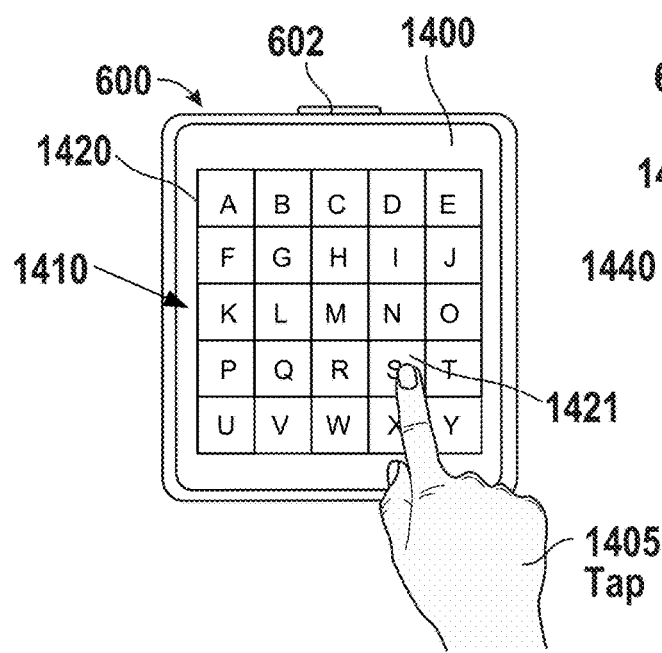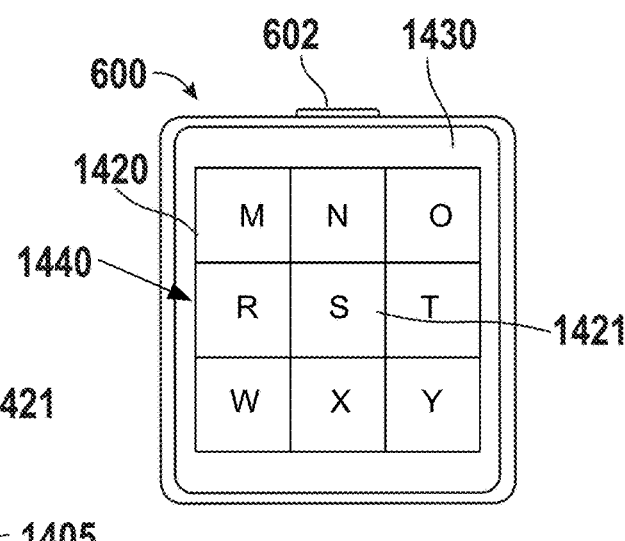
*FIG. 14A*     *FIG. 14B*

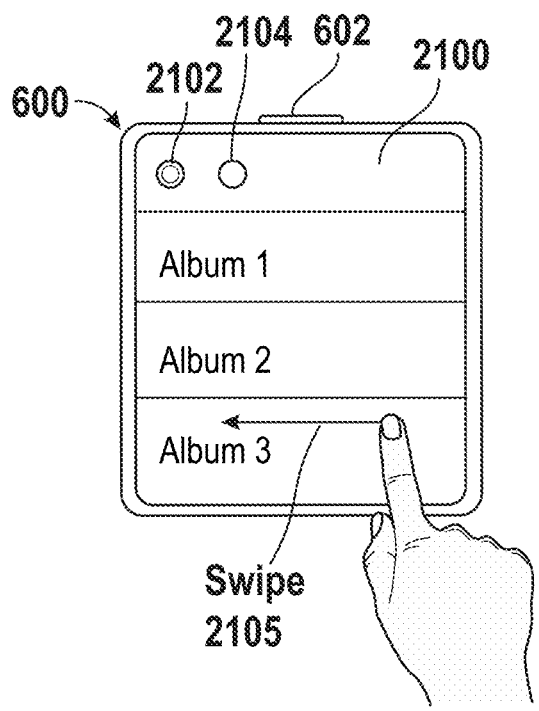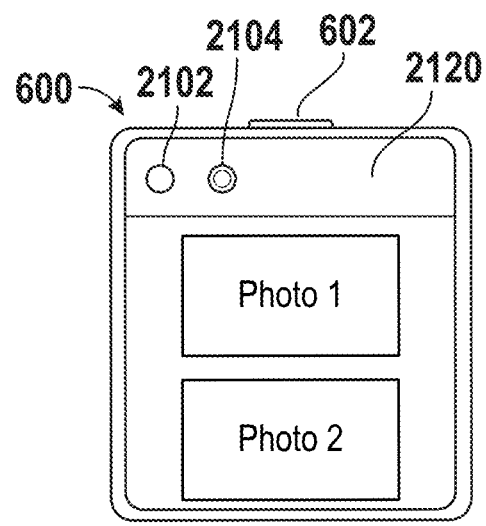
*FIG. 21A*  *FIG. 21B*
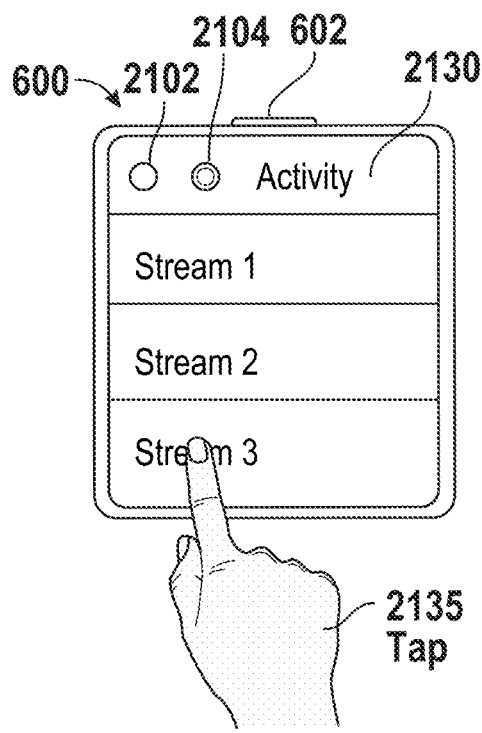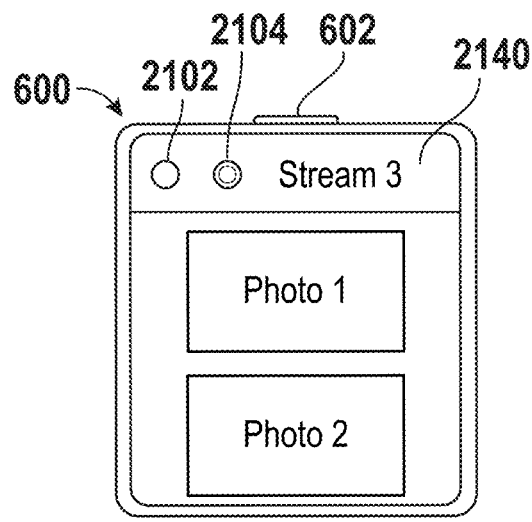
*FIG. 21C*  *FIG. 21D*

REDUCED SIZE USER IN INTERFACE

CROSS-REFERENCE TO RELATED APPLICATIONS

This application is a continuation of U.S. patent application Ser. No. 14/839,912, "Reduced Size User Interface," filed Aug. 28, 2015, which claims priority to U.S. Provisional Application Ser. No. 62/172,223, "Reduced Size User Interface," filed Jun. 7, 2015; U.S. Provisional Application Ser. No. 62/129,754, "Reduced Size User Interface," filed Mar. 6, 2015; and U.S. Provisional Application Ser. No. 62/044,959, "Reduced Size User Interface," filed Sep. 2, 2014, the contents of which are hereby incorporated by reference in their entireties.

This application also relates to the following provisional applications: U.S. Patent Application Ser. No. 62/005,793, entitled "Companion Application for Activity Cooperation," filed May 30, 2014; and U.S. Patent Application Ser. No. 62/005,751, entitled "Predefined Wireless Pairing," filed May 30, 2014. This application relates to the following applications: International Patent Application Serial No. PCT/US2013/040087, entitled "Device, Method, and Graphical User Interface for Moving a User Interface Object Based on an Intensity of a Press Input," filed May 8, 2013; International Patent Application Serial No. PCT/US2013/040072, entitled "Device, Method, and Graphical User Interface for Providing Feedback for Changing Activation States of a User Interface Object," filed May 8, 2013; International Patent Application Serial No. PCT/US2013/040070, entitled "Device, Method, and Graphical User Interface for Providing Tactile Feedback for Operations Performed in a User Interface," filed May 8, 2013; International Patent Application Serial No. PCT/US2013/040067, entitled "Device, Method, and Graphical User Interface for Facilitating User Interaction with Controls in a User Interface," filed May 8, 2013; International Patent Application Serial No. PCT/US2013/040061, entitled "Device, Method, and Graphical User Interface for Displaying User Interface Objects Corresponding to an Application," filed May 8, 2013; International Patent Application Serial No. PCT/US2013/040058, entitled "Device, Method, and Graphical User Interface for Displaying Additional Information in Response to a User Contact," filed May 8, 2013; International Patent Application Serial No. PCT/US2013/040056, entitled "Device, Method, and Graphical User Interface for Scrolling Nested Regions," filed May 8, 2013; International Patent Application Serial No. PCT/US2013/040054, entitled "Device, Method, and Graphical User Interface for Manipulating Framed Graphical Objects," filed May 8, 2013; International Patent Application Serial No. PCT/US2013/069489, entitled "Device, Method, and Graphical User Interface for Switching Between User Interfaces," filed Nov. 11, 2013; International Patent Application Serial No. PCT/US2013/069486, entitled "Device, Method, and Graphical User Interface for Determining Whether to Scroll or Select Content," filed Nov. 11, 2013; International Patent Application Serial No. PCT/US2013/069484, entitled "Device, Method, and Graphical User Interface for Moving a Cursor According to a Change in an Appearance of a Control Icon with Simulated Three-Dimensional Characteristics," filed Nov. 11, 2013; International Patent Application Serial No. PCT/US2013/069483, entitled "Device, Method, and Graphical User Interface for Transitioning Between Touch Input to Display Output Relationships," filed Nov. 11, 2013; International Patent Application Serial No. PCT/US2013/069479, entitled "Device, Method, and Graphical User Interface for Forgoing Generation of Tactile Output for a Multi-Contact Gesture," filed Nov. 11, 2013; International Patent Application Serial No. PCT/US2013/069472, entitled "Device, Method, and Graphical User Interface for Navigating User Interface Hierarchies," filed Nov. 11, 2013; International Patent Application Serial No. PCT/US2013/040108, entitled "Device, Method, and Graphical User Interface for Moving and Dropping a User Interface Object," filed May 8, 2013; International Patent Application Serial No. PCT/US2013/040101, entitled "Device, Method, and Graphical User Interface for Selecting User Interface Objects," filed May 8, 2013; International Patent Application Serial No. PCT/US2013/040098, entitled "Device, Method, and Graphical User Interface for Displaying Content Associated with a Corresponding Affordance," filed May 8, 2013; International Patent Application Serial No. PCT/US2013/040093, entitled "Device, Method, and Graphical User Interface for Transitioning Between Display States in Response to a Gesture," filed May 8, 2013; International Patent Application Serial No. PCT/US2013/040053, entitled "Device, Method, and Graphical User Interface for Selecting Object within a Group of Objects," filed May 8, 2013; U.S. Patent Application Ser. No. 61/778,211, entitled "Device, Method, and Graphical User Interface for Facilitating User Interaction with Controls in a User Interface," filed Mar. 12, 2013; U.S. Patent Application Ser. No. 61/778,191, entitled "Device, Method, and Graphical User Interface for Displaying User Interface Objects Corresponding to an Application," filed Mar. 12, 2013; U.S. Patent Application Ser. No. 61/778,171, entitled "Device, Method, and Graphical User Interface for Displaying Additional Information in Response to a User Contact," filed Mar. 12, 2013; U.S. Patent Application Ser. No. 61/778,179, entitled "Device, Method and Graphical User Interface for Scrolling Nested Regions," filed Mar. 12, 2013; U.S. Patent Application Ser. No. 61/778,156, entitled "Device, Method, and Graphical User Interface for Manipulating Framed Graphical Objects," filed Mar. 12, 2013; U.S. Patent Application Ser. No. 61/778,125, entitled "Device, Method, And Graphical User Interface for Navigating User Interface Hierarchies," filed Mar. 12, 2013; U.S. Patent Application Ser. No. 61/778,092, entitled "Device, Method, and Graphical User Interface for Selecting Object Within a Group of Objects," filed Mar. 12, 2013; U.S. Patent Application Ser. No. 61/778,418, entitled "Device, Method, and Graphical User Interface for Switching Between User Interfaces," filed Mar. 13, 2013; U.S. Patent Application Ser. No. 61/778,416, entitled "Device, Method, and Graphical User Interface for Determining Whether to Scroll or Select Content," filed Mar. 13, 2013; U.S. Patent Application Ser. No. 61/747,278, entitled "Device, Method, and Graphical User Interface for Manipulating User Interface Objects with Visual and/or Haptic Feedback," filed Dec. 29, 2012; U.S. Patent Application Ser. No. 61/778,414, entitled "Device, Method, and Graphical User Interface for Moving and Dropping a User Interface Object," filed Mar. 13, 2013; U.S. Patent Application Ser. No. 61/778,413, entitled "Device, Method, and Graphical User Interface for Selecting User Interface Objects," filed Mar. 13, 2013; U.S. Patent Application Ser. No. 61/778,412, entitled "Device, Method, and Graphical User Interface for Displaying Content Associated with a Corresponding Affordance," filed Mar. 13, 2013; U.S. Patent Application Ser. No. 61/778,373, entitled "Device, Method, and Graphical User Interface for Managing Activation of a Control Based on Contact Intensity," filed Mar. 12, 2013; U.S. Patent Application Ser. No. 61/778,265, entitled "Device, Method, and Graphical User Interface for Transitioning Between Display States in Response to a Gesture," filed Mar. 12, 2013; U.S. Patent Application Ser. No. 61/778,367, entitled "Device, Method, and Graphical User Interface for Moving a User Interface Object Based on an Intensity of a Press Input," filed Mar. 12, 2013; U.S. Patent Application Ser. No. 61/778,363, entitled "Device, Method, and Graphical User Interface for Transitioning Between Touch Input to Display Output Relationships," filed Mar. 12, 2013; U.S. Patent Application Ser. No. 61/778,287, entitled "Device, Method, and Graphical User Interface for Providing Feedback for Changing Activation States of a User Interface Object," filed Mar. 12, 2013; U.S. Patent Application Ser. No. 61/778,284, entitled "Device, Method, and Graphical User Interface for Providing Tactile Feedback for Operations Performed in a User Interface," filed Mar. 12, 2013; U.S. Patent Application Ser. No. 61/778,239, entitled "Device, Method, and Graphical User Interface for Forgoing Generation of Tactile Output for a Multi-Contact Gesture," filed Mar. 12, 2013; U.S. Patent Application Ser. No. 61/688,227, entitled "Device, Method, and Graphical User Interface for Manipulating User Interface Objects with Visual and/or Haptic Feedback," filed May 9, 2012; U.S. Patent Application No. 62/005,958, "Canned Answers in Messages," filed May 30, 2014. The content of these applications are hereby incorporated by reference in their entirety.

FIELD

The present disclosure relates generally to computer user interfaces, and more specifically to techniques for providing a multimedia application on a reduced size user interface.

BACKGROUND

Modern electronic devices may include the ability to run various programs, including applications that allow a user to navigate and view photos on a display of the device (e.g., a touch-sensitive display). Recent advances in computer technology have enabled manufacturers to produce such electronic devices in relatively small form factors. One challenge created by a small form factor, is that the display may be small, which can make it difficult for a user to navigate and view photos on the device.

Another challenge is that a small form factor may limit the storage capacity of a device. Furthermore, due to the increased size of modern imaging arrays, photo image files often require large amounts of memory to store. The lack of memory on a small device may permit storage of only a limited number of photos.

BRIEF SUMMARY

The present disclosure provides, inter alia, the benefit of user-friendly techniques and reduced size user interfaces for accessing, navigating, and displaying photos on devices with small form factors.

In some embodiments, a method comprises: at an electronic device with a touch-sensitive display and a rotatable input mechanism: receiving, via wireless communication, data representing a collection of photos stored on an external device; displaying, on the touch-sensitive display, a user interface including a user interface object, the user interface object representing the collection of photos; detecting a first user interaction with the displayed user interface object; in response to detecting the first user interaction with the displayed user interface object, replacing the display of the user interface with a display of a first view of an image, the image comprising a first representation including a visual representation of a first photo in the collection of photos and a second representation including a visual representation of a second photo in the collection of photos, wherein the first representation and the second representation are arranged in the image in fixed positions with respect to each other, and wherein, in the first view, the first representation and the second representation are displayed at a first size; detecting a first movement of the rotatable input mechanism; and in response to detecting the first movement of the rotatable input mechanism, transitioning the display of the first view of the image to a display of a second view of the image, wherein, in the second view, the first representation and the second representation are displayed at a second size different than the first size.

In some embodiments, a method comprises: at an electronic device with a touch-sensitive display and a rotatable input mechanism: receiving, via wireless communication, data representing a collection of photos stored on an external device; displaying, on the touch-sensitive display, a user interface including a user interface object, the user interface object representing the collection of photos; detecting a user interaction with the displayed user interface object; in response to detecting the user interaction with the displayed user interface object, replacing the display of the user interface with a display of a first view of an image, the image comprising a first representation including a visual representation of a first photo in the collection of photos and a second representation including a visual representation of a second photo in the collection of photos, wherein the first representation and the second representation are arranged in the image in fixed positions with respect to each other, and wherein, in the first view, the first representation and the second representation are displayed at a first size; detecting a contact on the touch-sensitive display while the first view is displayed; determining whether the contact represents a selection of the first representation; and in response to a determination that the contact represents a selection of the first representation, transitioning the display of the first view of the image to a display of a second view of the image, wherein, in the second view, the first representation and the second representation are displayed at a second size that is larger than the first size, and wherein the first representation is displayed at the center of the second view of the image.

In some embodiments, a method comprises: at an electronic device with a touch-sensitive display and a rotatable input mechanism: receiving, via wireless communication, data representing a collection of photos stored on an external device; displaying, on the touch-sensitive display, a user interface including a user interface object, the user interface object representing the collection of photos; detecting a user interaction with the displayed user interface object; in response to detecting the user interaction with the displayed user interface object, replacing the display of the user interface with an image comprising a first representation including a visual representation of a first photo in the collection of photos and a second representation including a visual representation of a second photo in the collection of photos, wherein the first representation and the second representation are arranged in the image in fixed positions with respect to each other; detecting a first point of contact of a contact on the touch-sensitive display, wherein the first point of contact corresponds to a first location on the image; determining whether the duration of the contact exceeds a predetermined threshold; and in response to a determination that the duration of the contact exceeds the predetermined threshold, displaying an enlarged view of a portion of the image surrounding or adjacent to the first location.

In some embodiments, a method comprises: at an electronic device with a touch-sensitive display and a rotatable input mechanism, wherein the touch-sensitive display comprises one or more sensors to detect the intensity of contacts with the touch-sensitive display: receiving, via wireless communication, data representing a first collection of photos and a second collection photos, wherein the first and second collections are stored on an external device; displaying, on the touch-sensitive display, a user interface including a user interface object representing the first collection; detecting a user interaction with the user interface object; in response to detecting the user interaction with the user interface object, replacing the display of the user interface with a display of a first image representative of the first collection of photos; detecting, while the first image is displayed, a contact on the touch-sensitive display; determining whether the contact has a characteristic intensity above a threshold intensity; and in response to a determination that the characteristic intensity is above the threshold intensity, replacing the display of the first image with a display of a second image representative of the second collection of photos.

In some embodiments, a method comprises: at an electronic device with a touch-sensitive display and a rotatable input mechanism, wherein the touch-sensitive display comprises one or more sensors to detect the intensity of contacts with the touch-sensitive display: receiving, via wireless communication, data representing a collection of photos stored on an external device; displaying, on the touch-sensitive display, at least one of the photos in the collection; detecting a contact on the touch-sensitive display at a location of a first photo of the at least one displayed photos; determining whether the contact has a characteristic intensity above a threshold intensity; and in response to a determination that the characteristic intensity is above the threshold intensity, displaying a user interface menu including at least one user interface object, wherein the user interface object represents an option to share the first photo or display the first photo as a background of a user interface on the display of the electronic device.

In some embodiments, an electronic device comprises: a touch-sensitive display unit configured to display a graphic user interface and receive contacts; a rotatable input mechanism unit configured to receive rotational input; a wireless communication unit configured to transmit and receive wireless communication; and a processing unit coupled to the touch-sensitive display unit, the rotatable input mechanism unit, and the wireless communication unit, the processing unit configured to: receive, via wireless communication by the wireless communication unit, data representing a collection of photos stored on an external device; enable display, on the touch-sensitive display unit, of a user interface including a user interface object, the user interface object representing the collection of photos; detect a first user interaction with the displayed user interface object; in response to detecting the first user interaction with the displayed user interface object, enable replacement of the display of the user interface with a display of a first view of an image, the image comprising a first representation including a visual representation of a first photo in the collection of photos and a second representation including a visual representation of a second photo in the collection of photos, wherein the first representation and the second representation are arranged in the image in fixed positions with respect to each other, and wherein, in the first view, the first representation and the second representation are displayed at a first size; detect a first movement of the rotatable input mechanism unit; and in response to detecting the first movement of the rotatable input mechanism unit, enable transition from the display of the first view of the image to a display of a second view of the image, wherein, in the second view, the first representation and the second representation are displayed at a second size different than the first size.

In some embodiments, an electronic device comprises: a touch-sensitive display unit configured to display a graphic user interface and receive contacts; a rotatable input mechanism unit configured to receive rotational input; a wireless communication unit configured to transmit and receive wireless communication; and a processing unit coupled to the touch-sensitive display unit, the rotatable input mechanism unit, and the wireless communication unit, the processing unit configured to: receive, via wireless communication by the wireless communication unit, data representing a collection of photos stored on an external device; enable display, on the touch-sensitive display unit, of a user interface including a user interface object, the user interface object representing the collection of photos; detect a user interaction with the displayed user interface object; in response to detecting the user interaction with the displayed user interface object, enable replacement of the display of the user interface with a display of a first view of an image, the image comprising a first representation including a visual representation of a first photo in the collection of photos and a second representation including a visual representation of a second photo in the collection of photos, wherein the first representation and the second representation are arranged in the image in fixed positions with respect to each other, and wherein, in the first view, the first representation and the second representation are displayed at a first size; detect a contact on the touch-sensitive display unit while the first view is displayed; determine whether the contact represents a selection of the first representation; and in response to a determination that the contact represents a selection of the first representation, enable transition from the display of the first view of the image to a display of a second view of the image, wherein, in the second view, the first representation and the second representation are displayed at a second size that is larger than the first size, and wherein the first representation is displayed at the center of the second view of the image.

In some embodiments, an electronic device comprises: a touch-sensitive display unit configured to display a graphic user interface and receive contacts; a rotatable input mechanism unit configured to receive rotational input; a wireless communication unit configured to transmit and receive wireless communication; and a processing unit coupled to the touch-sensitive display unit, the rotatable input mechanism unit, and the wireless communication unit, the processing unit configured to: receive, via wireless communication by the wireless communication unit, data representing a collection of photos stored on an external device; enable display, on the touch-sensitive display unit, of a user interface including a user interface object, the user interface object representing the collection of photos; detect a user interaction with the displayed user interface object; in response to detecting the user interaction with the displayed user interface object, enable replacement of the display of the user interface with an image comprising a first representation including a visual representation of a first photo in the collection of photos and a second representation including a visual representation of a second photo in the collection of photos, wherein the first representation and the second representation are arranged in the image in fixed positions with respect to each other; detect a first point of contact of a contact on the touch-sensitive display unit, wherein the first point of contact corresponds to a first location on the image; determine whether the duration of the contact exceeds a predetermined threshold; and in response to a determination that the duration of the contact exceeds the predetermined threshold, enable display of an enlarged view of a portion of the image surrounding or adjacent to the first location.

In some embodiments, an electronic device comprises: a touch-sensitive display unit configured to display a graphic user interface and receive contacts, wherein the touch-sensitive display unit comprises one or more intensity sensor units to detect the intensity of contacts with the touch-sensitive display unit; a rotatable input mechanism unit configured to receive rotational input; a wireless communication unit configured to transmit and receive wireless communication; and a processing unit coupled to the touch-sensitive display unit, the one or more intensity sensor units, the rotatable input mechanism unit, and the wireless communication unit, the processing unit configured to: receive, via wireless communication by the wireless communication unit, data representing a first collection of photos and a second collection photos, wherein the first and second collections are stored on an external device; enable display, on the touch-sensitive display unit, of a user interface including a user interface object representing the first collection; detect a user interaction with the user interface object; in response to detecting the user interaction with the user interface object, enable replacement of the display of the user interface with a display of a first image representative of the first collection of photos; detect, while the first image is displayed, a contact on the touch-sensitive display unit; determine whether the contact has a characteristic intensity above a threshold intensity; and in response to a determination that the characteristic intensity is above the threshold intensity, enable replacement of the display of the first image with a display of a second image representative of the second collection of photos.

In some embodiments, an electronic device comprises: a touch-sensitive display unit configured to display a graphic user interface and receive contacts, wherein the touch-sensitive display unit comprises one or more intensity sensor units to detect the intensity of contacts with the touch-sensitive display unit; a rotatable input mechanism unit configured to receive rotational input; a wireless communication unit configured to transmit and receive wireless communication; and a processing unit coupled to the touch-sensitive display unit, the one or more intensity sensor units, the rotatable input mechanism unit, and the wireless communication unit, the processing unit configured to: receive, via wireless communication by the wireless communication unit, data representing a collection of photos stored on an external device; enable display, on the touch-sensitive display unit, of at least one of the photos in the collection; detect a contact on the touch-sensitive display unit at a location of a first photo of the at least one displayed photos; determine whether the contact has a characteristic intensity above a threshold intensity; and in response to a determination that the characteristic intensity is above the threshold intensity, enable display of a user interface menu including at least one user interface object, wherein the user interface object represents an option to share the first photo or display the first photo as a background of a user interface on the display of the electronic device.

In some embodiments, an electronic device comprises: a touch-sensitive display; a rotatable input mechanism; one or more processors; a memory; and one or more programs, wherein the one or more programs are stored in the memory and configured to be executed by the one or more processors, the one or more programs including instructions for: receiving, via wireless communication, data representing a collection of photos stored on an external device; displaying, on the touch-sensitive display, a user interface including a user interface object, the user interface object representing the collection of photos; detecting a first user interaction with the displayed user interface object; in response to detecting the first user interaction with the displayed user interface object, replacing the display of the user interface with a display of a first view of an image, the image comprising a first representation including a visual representation of a first photo in the collection of photos and a second representation including a visual representation of a second photo in the collection of photos, wherein the first representation and the second representation are arranged in the image in fixed positions with respect to each other, and wherein, in the first view, the first representation and the second representation are displayed at a first size; detecting a first movement of the rotatable input mechanism; and in response to detecting the first movement of the rotatable input mechanism, transitioning the display of the first view of the image to a display of a second view of the image, wherein, in the second view, the first representation and the second representation are displayed at a second size different than the first size.

In some embodiments, an electronic device comprises: a touch-sensitive display; a rotatable input mechanism; one or more processors; a memory; and one or more programs, wherein the one or more programs are stored in the memory and configured to be executed by the one or more processors, the one or more programs including instructions for: receiving, via wireless communication, data representing a collection of photos stored on an external device; displaying, on the touch-sensitive display, a user interface including a user interface object, the user interface object representing the collection of photos; detecting a user interaction with the displayed user interface object; in response to detecting the user interaction with the displayed user interface object, replacing the display of the user interface with a display of a first view of an image, the image comprising a first representation including a visual representation of a first photo in the collection of photos and a second representation including a visual representation of a second photo in the collection of photos, wherein the first representation and the second representation are arranged in the image in fixed positions with respect to each other, and wherein, in the first view, the first representation and the second representation are displayed at a first size; detecting a contact on the touch-sensitive display while the first view is displayed; determining whether the contact represents a selection of the first representation; and in response to a determination that the contact represents a selection of the first representation, transitioning the display of the first view of the image to a display of a second view of the image, wherein, in the second view, the first representation and the second representation are displayed at a second size that is larger than the first size, and wherein the first representation is displayed at the center of the second view of the image.

In some embodiments, an electronic device comprises: a touch-sensitive display; a rotatable input mechanism; one or more processors; a memory; and one or more programs, wherein the one or more programs are stored in the memory and configured to be executed by the one or more processors, the one or more programs including instructions for: receiving, via wireless communication, data representing a collection of photos stored on an external device; displaying, on the touch-sensitive display, a user interface including a user interface object, the user interface object representing the collection of photos; detecting a user interaction with the displayed user interface object; in response to detecting the user interaction with the displayed user interface object, replacing the display of the user interface with an image comprising a first representation including a visual representation of a first photo in the collection of photos and a second representation including a visual representation of a second photo in the collection of photos, wherein the first representation and the second representation are arranged in the image in fixed positions with respect to each other; detecting a first point of contact of a contact on the touch-sensitive display, wherein the first point of contact corresponds to a first location on the image; determining whether the duration of the contact exceeds a predetermined threshold; and in response to a determination that the duration of the contact exceeds the predetermined threshold, displaying an enlarged view of a portion of the image surrounding or adjacent to the first location.

In some embodiments, an electronic device comprises: a touch-sensitive display, wherein the touch-sensitive display comprises one or more sensors to detect the intensity of contacts with the touch-sensitive display; a rotatable input mechanism; one or more processors; a memory; and one or more programs, wherein the one or more programs are stored in the memory and configured to be executed by the one or more processors, the one or more programs including instructions for: receiving, via wireless communication, data representing a first collection of photos and a second collection photos, wherein the first and second collections are stored on an external device; displaying, on the touch-sensitive display, a user interface including a user interface object representing the first collection; detecting a user interaction with the user interface object; in response to detecting the user interaction with the user interface object, replacing the display of the user interface with a display of a first image representative of the first collection of photos; detecting, while the first image is displayed, a contact on the touch-sensitive display; determining whether the contact has a characteristic intensity above a threshold intensity; and in response to a determination that the characteristic intensity is above the threshold intensity, replacing the display of the first image with a display of a second image representative of the second collection of photos.

In some embodiments, an electronic device comprises: a touch-sensitive display, wherein the touch-sensitive display comprises one or more sensors to detect the intensity of contacts with the touch-sensitive display; a rotatable input mechanism; one or more processors; a memory; and one or more programs, wherein the one or more programs are stored in the memory and configured to be executed by the one or more processors, the one or more programs including instructions for: receiving, via wireless communication, data representing a collection of photos stored on an external device; displaying, on the touch-sensitive display, at least one of the photos in the collection; detecting a contact on the touch-sensitive display at a location of a first photo of the at least one displayed photos; determining whether the contact has a characteristic intensity above a threshold intensity; and in response to a determination that the characteristic intensity is above the threshold intensity, displaying a user interface menu including at least one user interface object, wherein the user interface object represents an option to share the first photo or display the first photo as a background of a user interface on the display of the electronic device.

In some embodiments, a non-transitory computer-readable storage medium stores one or more programs, the one or more programs comprising instructions, which when executed by one or more processors of an electronic device with a touch-sensitive display and a rotatable input mechanism, cause the electronic device to: receive, via wireless communication, data representing a collection of photos stored on an external device; display, on the touch-sensitive display, a user interface including a user interface object, the user interface object representing the collection of photos; detect a first user interaction with the displayed user interface object; in response to detecting the first user interaction with the displayed user interface object, replace the display of the user interface with a display of a first view of an image, the image comprising a first representation including a visual representation of a first photo in the collection of photos and a second representation including a visual representation of a second photo in the collection of photos, wherein the first representation and the second representation are arranged in the image in fixed positions with respect to each other, and wherein, in the first view, the first representation and the second representation are displayed at a first size; detect a first movement of the rotatable input mechanism; and in response to detecting the first movement of the rotatable input mechanism, transition the display of the first view of the image to a display of a second view of the image, wherein, in the second view, the first representation and the second representation are displayed at a second size different than the first size.

In some embodiments, a non-transitory computer-readable storage medium stores one or more programs, the one or more programs comprising instructions, which when executed by one or more processors of an electronic device with a touch-sensitive display and a rotatable input mechanism, cause the electronic device to: receive, via wireless communication, data representing a collection of photos stored on an external device; display, on the touch-sensitive display, a user interface including a user interface object, the user interface object representing the collection of photos; detect a user interaction with the displayed user interface object; in response to detecting the user interaction with the displayed user interface object, replace the display of the user interface with a display of a first view of an image, the image comprising a first representation including a visual representation of a first photo in the collection of photos and a second representation including a visual representation of a second photo in the collection of photos, wherein the first representation and the second representation are arranged in the image in fixed positions with respect to each other, and wherein, in the first view, the first representation and the second representation are displayed at a first size; detect a contact on the touch-sensitive display while the first view is displayed; determine whether the contact represents a selection of the first representation; and in response to a determination that the contact represents a selection of the first representation, transition the display of the first view of the image to a display of a second view of the image, wherein, in the second view, the first representation and the second representation are displayed at a second size that is larger than the first size, and wherein the first representation is displayed at the center of the second view of the image.

In some embodiments, a non-transitory computer-readable storage medium stores one or more programs, the one or more programs comprising instructions, which when executed by one or more processors of an electronic device with a touch-sensitive display and a rotatable input mechanism, cause the electronic device to: receive, via wireless communication, data representing a collection of photos stored on an external device; display, on the touch-sensitive display, a user interface including a user interface object, the user interface object representing the collection of photos; detect a user interaction with the displayed user interface object; in response to detecting the user interaction with the displayed user interface object, replace the display of the user interface with an image comprising a first representation including a visual representation of a first photo in the collection of photos and a second representation including a visual representation of a second photo in the collection of photos, wherein the first representation and the second representation are arranged in the image in fixed positions with respect to each other; detect a first point of contact of a contact on the touch-sensitive display, wherein the first point of contact corresponds to a first location on the image; determine whether the duration of the contact exceeds a predetermined threshold; and in response to a determination that the duration of the contact exceeds the predetermined threshold, display an enlarged view of a portion of the image surrounding or adjacent to the first location.

In some embodiments, a non-transitory computer-readable storage medium stores one or more programs, the one or more programs comprising instructions, which when executed by one or more processors of an electronic device with a touch-sensitive display and a rotatable input mechanism, wherein the touch-sensitive display comprises one or more sensors to detect the intensity of contacts with the touch-sensitive display, cause the electronic device to: receive, via wireless communication, data representing a first collection of photos and a second collection photos, wherein the first and second collections are stored on an external device; display, on the touch-sensitive display, a user interface including a user interface object representing the first collection; detect a user interaction with the user interface object; in response to detecting the user interaction with the user interface object, replace the display of the user interface with a display of a first image representative of the first collection of photos; detect, while the first image is displayed, a contact on the touch-sensitive display; determine whether the contact has a characteristic intensity above a threshold intensity; and in response to a determination that the characteristic intensity is above the threshold intensity, replace the display of the first image with a display of a second image representative of the second collection of photos.

In some embodiments, a non-transitory computer-readable storage medium stores one or more programs, the one or more programs comprising instructions, which when executed by one or more processors of an electronic device with a touch-sensitive display and a rotatable input mechanism, wherein the touch-sensitive display comprises one or more sensors to detect the intensity of contacts with the touch-sensitive display, cause the electronic device to: receive, via wireless communication, data representing a collection of photos stored on an external device; display, on the touch-sensitive display, at least one of the photos in the collection; detect a contact on the touch-sensitive display at a location of a first photo of the at least one displayed photos; determine whether the contact has a characteristic intensity above a threshold intensity; and in response to a determination that the characteristic intensity is above the threshold intensity, display a user interface menu including at least one user interface object, wherein the user interface object represents an option to share the first photo or display the first photo as a background of a user interface on the display of the electronic device.

In some embodiments, a transitory computer-readable medium includes one or more programs comprising instructions, which when executed by one or more processors of an electronic device with a touch-sensitive display and a rotatable input mechanism, cause the electronic device to: receive, via wireless communication, data representing a collection of photos stored on an external device; display, on the touch-sensitive display, a user interface including a user interface object, the user interface object representing the collection of photos; detect a first user interaction with the displayed user interface object; in response to detecting the first user interaction with the displayed user interface object, replace the display of the user interface with a display of a first view of an image, the image comprising a first representation including a visual representation of a first photo in the collection of photos and a second representation including a visual representation of a second photo in the collection of photos, wherein the first representation and the second representation are arranged in the image in fixed positions with respect to each other, and wherein, in the first view, the first representation and the second representation are displayed at a first size; detect a first movement of the rotatable input mechanism; and in response to detecting the first movement of the rotatable input mechanism, transition the display of the first view of the image to a display of a second view of the image, wherein, in the second view, the first representation and the second representation are displayed at a second size different than the first size.

In some embodiments, a transitory computer-readable medium includes one or more programs comprising instructions, which when executed by one or more processors of an electronic device with a touch-sensitive display and a rotatable input mechanism, cause the electronic device to: receive, via wireless communication, data representing a collection of photos stored on an external device; display, on the touch-sensitive display, a user interface including a user interface object, the user interface object representing the collection of photos; detect a user interaction with the displayed user interface object; in response to detecting the user interaction with the displayed user interface object, replace the display of the user interface with a display of a first view of an image, the image comprising a first representation including a visual representation of a first photo in the collection of photos and a second representation including a visual representation of a second photo in the collection of photos, wherein the first representation and the second representation are arranged in the image in fixed positions with respect to each other, and wherein, in the first view, the first representation and the second representation are displayed at a first size; detect a contact on the touch-sensitive display while the first view is displayed; determine whether the contact represents a selection of the first representation; and in response to a determination that the contact represents a selection of the first representation, transition the display of the first view of the image to a display of a second view of the image, wherein, in the second view, the first representation and the second representation are displayed at a second size that is larger than the first size, and wherein the first representation is displayed at the center of the second view of the image.

In some embodiments, a transitory computer-readable medium includes one or more programs comprising instructions, which when executed by one or more processors of an electronic device with a touch-sensitive display and a rotatable input mechanism, cause the electronic device to: receive, via wireless communication, data representing a collection of photos stored on an external device; display, on the touch-sensitive display, a user interface including a user interface object, the user interface object representing the collection of photos; detect a user interaction with the displayed user interface object; in response to detecting the user interaction with the displayed user interface object, replace the display of the user interface with an image comprising a first representation including a visual representation of a first photo in the collection of photos and a second representation including a visual representation of a second photo in the collection of photos, wherein the first representation and the second representation are arranged in the image in fixed positions with respect to each other; detect a first point of contact of a contact on the touch-sensitive display, wherein the first point of contact corresponds to a first location on the image; determine whether the duration of the contact exceeds a predetermined threshold; and in response to a determination that the duration of the contact exceeds the predetermined threshold, display an enlarged view of a portion of the image surrounding or adjacent to the first location.

In some embodiments, a transitory computer-readable medium includes one or more programs comprising instructions, which when executed by one or more processors of an electronic device with a touch-sensitive display and a rotatable input mechanism, wherein the touch-sensitive display comprises one or more sensors to detect the intensity of contacts with the touch-sensitive display, cause the electronic device to: receive, via wireless communication, data representing a first collection of photos and a second collection photos, wherein the first and second collections are stored on an external device; display, on the touch-sensitive display, a user interface including a user interface object representing the first collection; detect a user interaction with the user interface object; in response to detecting the user interaction with the user interface object, replace the display of the user interface with a display of a first image representative of the first collection of photos; detect, while the first image is displayed, a contact on the touch-sensitive display; determine whether the contact has a characteristic intensity above a threshold intensity; and in response to a determination that the characteristic intensity is above the threshold intensity, replace the display of the first image with a display of a second image representative of the second collection of photos.

In some embodiments, a transitory computer-readable medium includes one or more programs comprising instructions, which when executed by one or more processors of an electronic device with a touch-sensitive display and a rotatable input mechanism, wherein the touch-sensitive display comprises one or more sensors to detect the intensity of contacts with the touch-sensitive display, cause the electronic device to: receive, via wireless communication, data representing a collection of photos stored on an external device; display, on the touch-sensitive display, at least one of the photos in the collection; detect a contact on the touch-sensitive display at a location of a first photo of the at least one displayed photos; determine whether the contact has a characteristic intensity above a threshold intensity; and in response to a determination that the characteristic intensity is above the threshold intensity, display a user interface menu including at least one user interface object, wherein the user interface object represents an option to share the first photo or display the first photo as a background of a user interface on the display of the electronic device.

In some embodiments, an electronic device comprises: a touch-sensitive display; a rotatable input mechanism; and means for receiving, via wireless communication, data representing a collection of photos stored on an external device; means for displaying, on the touch-sensitive display, a user interface including a user interface object, the user interface object representing the collection of photos; means for detecting a first user interaction with the displayed user interface object; means responsive to detecting the first user interaction with the displayed user interface object for: replacing the display of the user interface with a display of a first view of an image, the image comprising a first representation including a visual representation of a first photo in the collection of photos and a second representation including a visual representation of a second photo in the collection of photos, wherein the first representation and the second representation are arranged in the image in fixed positions with respect to each other, and wherein, in the first view, the first representation and the second representation are displayed at a first size; means for detecting a first movement of the rotatable input mechanism; and means responsive to detecting the first movement of the rotatable input mechanism for: transitioning the display of the first view of the image to a display of a second view of the image, wherein, in the second view, the first representation and the second representation are displayed at a second size different than the first size.

In some embodiments, an electronic device comprises: a touch-sensitive display; a rotatable input mechanism; and means for receiving, via wireless communication, data representing a collection of photos stored on an external device; means for displaying, on the touch-sensitive display, a user interface including a user interface object, the user interface object representing the collection of photos; means for detecting a user interaction with the displayed user interface object; means responsive to detecting the user interaction with the displayed user interface object for: replacing the display of the user interface with a display of a first view of an image, the image comprising a first representation including a visual representation of a first photo in the collection of photos and a second representation including a visual representation of a second photo in the collection of photos, wherein the first representation and the second representation are arranged in the image in fixed positions with respect to each other, and wherein, in the first view, the first representation and the second representation are displayed at a first size; means for detecting a contact on the touch-sensitive display while the first view is displayed; means for determining whether the contact represents a selection of the first representation; and means responsive to a determination that the contact represents a selection of the first representation for: transitioning the display of the first view of the image to a display of a second view of the image, wherein, in the second view, the first representation and the second representation are displayed at a second size that is larger than the first size, and wherein the first representation is displayed at the center of the second view of the image.

In some embodiments, an electronic device comprises: a touch-sensitive display; a rotatable input mechanism; means for receiving, via wireless communication, data representing a collection of photos stored on an external device; means for displaying, on the touch-sensitive display, a user interface including a user interface object, the user interface object representing the collection of photos; means for detecting a user interaction with the displayed user interface object; means responsive to detecting the user interaction with the displayed user interface object for: replacing the display of the user interface with an image comprising a first representation including a visual representation of a first photo in the collection of photos and a second representation including a visual representation of a second photo in the collection of photos, wherein the first representation and the second representation are arranged in the image in fixed positions with respect to each other; means for detecting a first point of contact of a contact on the touch-sensitive display, wherein the first point of contact corresponds to a first location on the image; means for determining whether the duration of the contact exceeds a predetermined threshold; and means responsive to a determination that the duration of the contact exceeds the predetermined threshold for: displaying an enlarged view of a portion of the image surrounding or adjacent to the first location.

In some embodiments, an electronic device comprises: a touch-sensitive display, wherein the touch-sensitive display comprises one or more sensors to detect the intensity of contacts with the touch-sensitive display; a rotatable input mechanism; and means for receiving, via wireless communication, data representing a first collection of photos and a second collection photos, wherein the first and second collections are stored on an external device; means for displaying, on the touch-sensitive display, a user interface including a user interface object representing the first collection; means for detecting a user interaction with the user interface object; means responsive to detecting the user interaction with the user interface object for: replacing the display of the user interface with a display of a first image representative of the first collection of photos; means for detecting, while the first image is displayed, a contact on the touch-sensitive display; means for determining whether the contact has a characteristic intensity above a threshold intensity; and means responsive to a determination that the characteristic intensity is above the threshold intensity for: replacing the display of the first image with a display of a second image representative of the second collection of photos.

In some embodiments, an electronic device comprises: a touch-sensitive display, wherein the touch-sensitive display comprises one or more sensors to detect the intensity of contacts with the touch-sensitive display; a rotatable input mechanism; and means for receiving, via wireless communication, data representing a collection of photos stored on an external device; means for displaying, on the touch-sensitive display, at least one of the photos in the collection; means for detecting a contact on the touch-sensitive display at a location of a first photo of the at least one displayed photos; means for determining whether the contact has a characteristic intensity above a threshold intensity; and means responsive to a determination that the characteristic intensity is above the threshold intensity for: displaying a user interface menu including at least one user interface object, wherein the user interface object represents an option to share the first photo or display the first photo as a background of a user interface on the display of the electronic device.

In some embodiments, a method includes: at an electronic device with a touch-sensitive display, a rotatable input mechanism, and a motion sensor configured to sense motion indicative of a wrist raise gesture, wherein the touch-sensitive display comprises one or more sensors to detect the intensity of contacts with the touch-sensitive display: receiving, via wireless communication, data representing a sequence of images stored on an external device; displaying, on the touch-sensitive display, a representation of the sequence of images; detecting a contact on the touch-sensitive display at a location of the representation of the sequence of images; determining whether the contact has a characteristic intensity above a threshold intensity; in response to a determination that the characteristic intensity is above the threshold intensity, displaying a user interface menu including a user interface object, where the user interface object represents an option to display a background of a user interface on the display of the electronic device based on the sequence of images; detecting a selection of the user interface object; detecting, with the motion sensor, a motion indicative of a wrist raise gesture; and in response to detecting the motion indicative of a wrist raise gesture, displaying the background of the user interface on the display of the electronic device based on the sequence of images.

In some embodiments, an electronic device includes: a touch-sensitive display unit configured to display a graphic user interface and receive contacts, wherein the touch-sensitive display unit comprises one or more intensity sensor units to detect the intensity of contacts with the touch-sensitive display unit; a rotatable input mechanism unit configured to receive rotational input; a wireless communication unit configured to transmit and receive wireless communication; a motion sensor unit configured to sense motion indicative of a wrist raise gesture; and a processing unit coupled to the touch-sensitive display unit, the one or more intensity sensor units, the rotatable input mechanism unit, the motion sensor unit, and the wireless communication unit, the processing unit configured to: receive, via the wireless communication unit, data representing a sequence of images stored on an external device; enable, on the touch-sensitive display unit, display of a representation of the sequence of images; detect a contact on the touch-sensitive display unit at a location of the representation of the sequence of images; determine whether the contact has a characteristic intensity above a threshold intensity; in response to a determination that the characteristic intensity is above the threshold intensity, enable display of a user interface menu including a user interface object, where the user interface object represents an option to display a background of a user interface on the touch-sensitive display unit of the electronic device based on the sequence of images; detect a selection of the user interface object; detect, with the motion sensor unit, a motion indicative of a wrist raise gesture; and in response to detecting the motion indicative of a wrist raise gesture, enable display of the background of the user interface on the touch-sensitive display unit of the electronic device based on the sequence of images.

In some embodiments, an electronic device includes: a touch-sensitive display; a rotatable input mechanism; a motion sensor configured to sense motion indicative of a wrist raise gesture; one or more processors; a memory; and one or more programs, wherein the one or more programs are stored in the memory and configured to be executed by the one or more processors, the one or more programs including instructions for: receiving, via wireless communication, data representing a sequence of images stored on an external device; displaying, on the touch-sensitive display, a representation of the sequence of images; detecting a contact on the touch-sensitive display at a location of the representation of the sequence of images; determining whether the contact has a characteristic intensity above a threshold intensity; in response to a determination that the characteristic intensity is above the threshold intensity, displaying a user interface menu including a user interface object, where the user interface object represents an option to display a background of a user interface on the display of the electronic device based on the sequence of images; detecting a selection of the user interface object; detecting, with the motion sensor, a motion indicative of a wrist raise gesture; and in response to detecting the motion indicative of a wrist raise gesture, displaying the background of the user interface on the display of the electronic device based on the sequence of images.

In some embodiments, a non-transitory computer-readable storage medium includes one or more programs, the one or more programs comprising instructions, which when executed by one or more processors of an electronic device with a touch-sensitive display and a rotatable input mechanism, cause the electronic device to: receive, via wireless communication, data representing a sequence of images stored on an external device; display, on the touch-sensitive display, a representation of the sequence of images; detect a contact on the touch-sensitive display at a location of the representation of the sequence of images; determine whether the contact has a characteristic intensity above a threshold intensity; in response to a determination that the characteristic intensity is above the threshold intensity, display a user interface menu including a user interface object, where the user interface object represents an option to display a background of a user interface on the display of the electronic device based on the sequence of images; detect a selection of the user interface object; detect, with the motion sensor, a motion indicative of a wrist raise gesture; and in response to detecting the motion indicative of a wrist raise gesture, display the background of the user interface on the display of the electronic device based on the sequence of images.

In some embodiments, a transitory computer-readable medium includes one or more programs, the one or more programs comprising instructions, which when executed by one or more processors of an electronic device with a touch-sensitive display and a rotatable input mechanism, cause the electronic device to: receive, via wireless communication, data representing a sequence of images stored on an external device; display, on the touch-sensitive display, a representation of the sequence of images; detect a contact on the touch-sensitive display at a location of the representation of the sequence of images; determine whether the contact has a characteristic intensity above a threshold intensity; in response to a determination that the characteristic intensity is above the threshold intensity, display a user interface menu including a user interface object, where the user interface object represents an option to display a background of a user interface on the display of the electronic device based on the sequence of images; detect a selection of the user interface object; detect, with the motion sensor, a motion indicative of a wrist raise gesture; and in response to detecting the motion indicative of a wrist raise gesture, display the background of the user interface on the display of the electronic device based on the sequence of images.

In some embodiments, an electronic device includes: a touch-sensitive display; a rotatable input mechanism; and means for receiving, via wireless communication, data representing a sequence of images stored on an external device; means for displaying, on the touch-sensitive display, a representation of the sequence of images; means for detecting a contact on the touch-sensitive display at a location of the representation of the sequence of images; means for determining whether the contact has a characteristic intensity above a threshold intensity; means for, in response to a determination that the characteristic intensity is above the threshold intensity, displaying a user interface menu including a user interface object, where the user interface object represents an option to display a background of a user interface on the display of the electronic device based on the sequence of images; means for detecting a selection of the user interface object; means for detecting, with the motion sensor, a motion indicative of a wrist raise gesture; and means for, in response to detecting the motion indicative of a wrist raise gesture, displaying the background of the user interface on the display of the electronic device based on the sequence of images.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 4B illustrates an exemplary user interface for a multifunction device with a touch-sensitive surface that is separate from the display in accordance with some embodiments.

FIGS. 5C-5D illustrate exemplary components of a personal electronic device having a touch-sensitive display and intensity sensors in accordance with some embodiments.

FIGS. 5E-5H illustrate exemplary components and user interfaces of a personal electronic device in accordance with some embodiments.

FIG. 6A illustrates an exemplary user interface for launching a photos application.

FIG. 6B illustrates an exemplary user interface with a representation of a collection of photos.

FIGS. 7A-7D illustrate exemplary photos application user interfaces in accordance with some embodiments.

FIGS. 8A-8C illustrate exemplary photos application user interfaces in accordance with some embodiments.

FIGS. 9A-9F illustrate exemplary photos application user interfaces in accordance with some embodiments.

FIG. 11A-11D illustrate exemplary photos application user interfaces in accordance with some embodiments.

FIGS. 14A-14B illustrate exemplary photos application user interfaces in accordance with some embodiments.

FIG. 21A-21D illustrates exemplary photos application user interfaces in accordance with some embodiments.

DESCRIPTION OF EMBODIMENTS

Figure 1A:
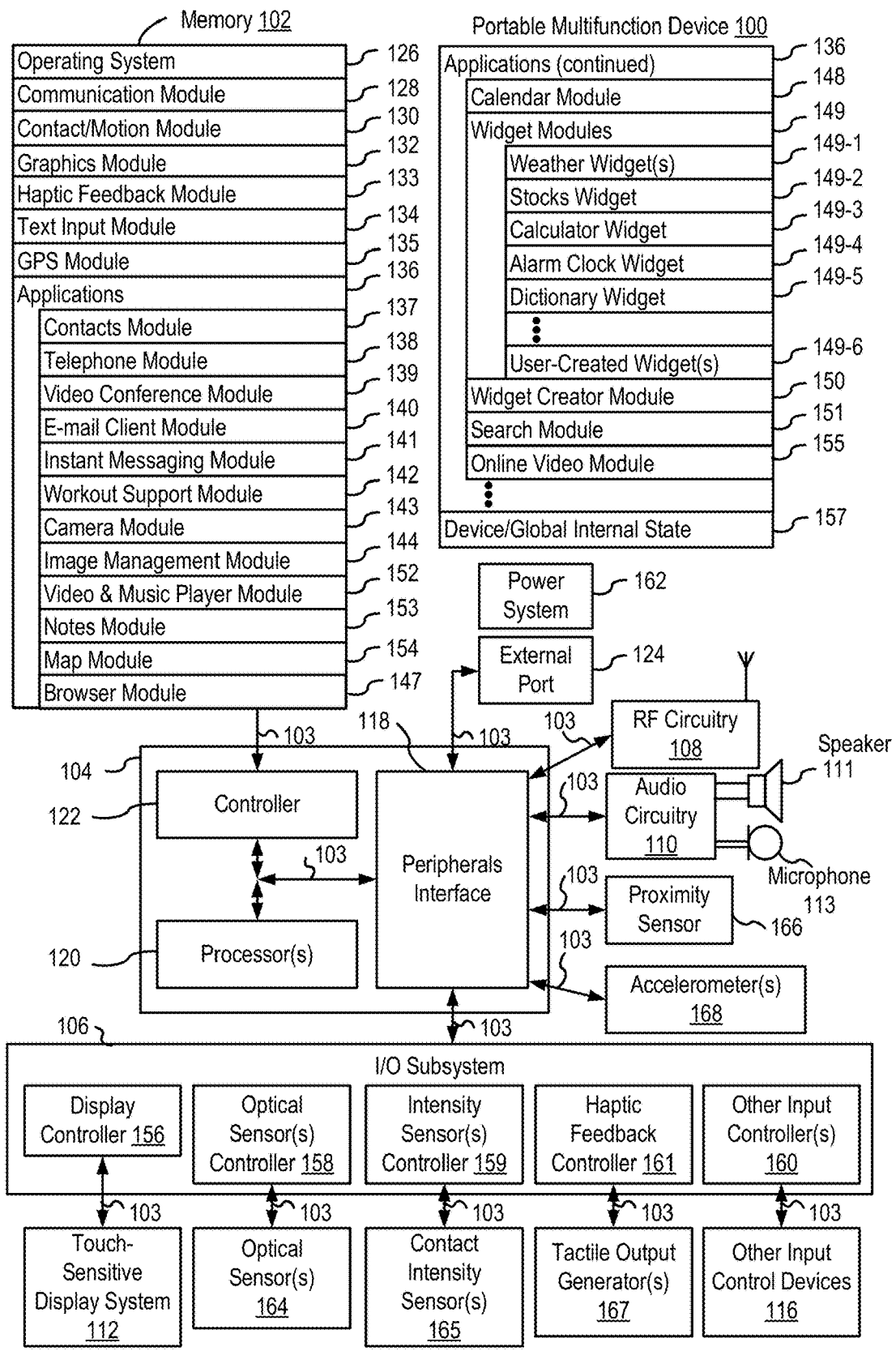
FIG. 1A is a block diagram illustrating a portable multifunction device with a touch-sensitive display in accordance with some embodiments.

The following description sets forth exemplary methods, parameters and the like. It should be recognized, however, that such description is not intended as a limitation on the scope of the present disclosure but is instead provided as a description of exemplary embodiments.

The present disclosure provides, inter alia, the benefit of electronic devices that provide efficient methods and interfaces for accessing, navigating, and displaying photos on devices with small form factors. Such techniques can reduce the cognitive burden on a user who accesses, navigates, and displays photos on devices with small form factors, thereby enhancing productivity. Such methods and interfaces may also reduce the number of unnecessary, extraneous, repetitive, and/or redundant inputs, and may create a faster and more efficient user interface arrangement, which may reduce the number of required inputs, reduce processing power, and reduce the amount of time for which user interfaces need to be displayed in order for desired functions to be accessed and carried out. Further, such techniques can reduce processor and battery power otherwise wasted on redundant user inputs.

It should be recognized that certain aspects of this disclosure may be applied to various types of media including, for example, image files, video files, audio files, sequences of images (e.g., stored as a single file), animated Graphics Interchange Format (GIF) files. For example, a photos application or other multimedia application may provide the capability to access, navigate, and display a combination of photos, videos, sequences of images, animated GIF files, and/or collections thereof.

Below, FIGS. 1A-1B, 2, 3, 4A-4B, 5A-5B, and 27-31 provide a description of exemplary devices for performing techniques associated with a photos application (e.g., accessing, browsing, navigating, and/or displaying photos). FIGS. 6A-21D illustrate exemplary user interfaces for performing techniques associated with a photos application (e.g., accessing, browsing, navigating, and/or displaying photos). FIGS. 22-26 are flow diagrams illustrating methods of performing techniques associated with a photos application (e.g., accessing, browsing, navigating, and/or displaying photos) in accordance with some embodiments. The user interfaces in FIGS. 6A-21D are used to illustrate the processes described below, including the processes in FIGS. 22-26.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a", "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device may support a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application specific integrated circuits.

Memory 102 may include one or more computer-readable storage mediums. The computer-readable storage mediums may be tangible and non-transitory. Memory 102 may include high-speed random access memory and may also include non-volatile memory, such as one or more magnetic disk storage devices, flash memory devices, or other non-volatile solid-state memory devices. Memory controller 122 may control access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button may disengage a lock of touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) may turn power to device 100 on or off. The user may be able to customize a functionality of one or more of the buttons. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 may be analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 may have a video resolution in excess of 100 dpi. In some embodiments, the touch screen has a video resolution of approximately 160 dpi. The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors 164. FIG. 1A shows an optical sensor coupled to optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device so that the touch screen display may be used as a viewfinder for still and/or video image acquisition. In some embodiments, an optical sensor is located on the front of the device so that the user's image may be obtained for video conferencing while the user views the other video conference participants on the touch screen display. In some embodiments, the position of optical sensor 164 can be changed by the user (e.g., by rotating the lens and the sensor in the device housing) so that a single optical sensor 164 may be used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 may also include one or more proximity sensors 166. FIG. 1A shows proximity sensor 166 coupled to peripherals interface 118. Alternately, proximity sensor 166 may be coupled to input controller 160 in I/O subsystem 106. Proximity sensor 166 may perform as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 may also include one or more accelerometers 168. FIG. 1A shows accelerometer 168 coupled to peripherals interface 118. Alternately, accelerometer 168 may be coupled to an input controller 160 in I/O subsystem 106. Accelerometer 168 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
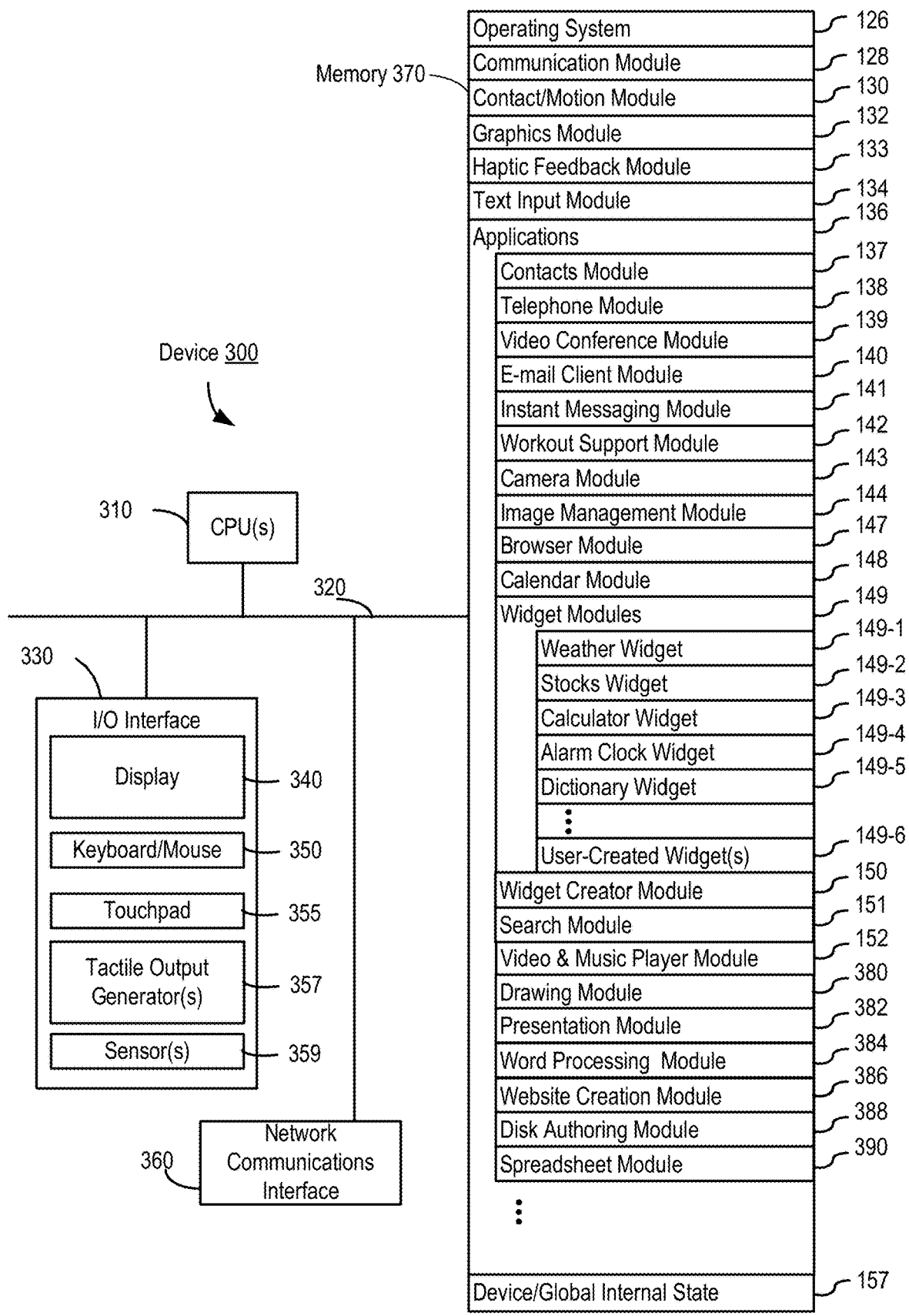
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 may include the following modules (or sets of instructions), or a subset or superset thereof:
  Contacts module 137 (sometimes called an address book or contact list);
  Telephone module 138;
  Video conference module 139;
  E-mail client module 140;
  Instant messaging (IM) module 141;
  Workout support module 142;
  Camera module 143 for still and/or video images;
  Image management module 144;
  Video player module;
  Music player module;
  Browser module 147;
  Calendar module 148;
  Widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;
  Widget creator module 150 for making user-created widgets 149-6;
  Search module 151;
  Video and music player module 152, which merges video player module and music player module;
  Notes module 153;
  Map module 154; and/or
  Online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 may be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 may be used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication may use any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages may include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 may be used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 may be used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules may be combined or otherwise rearranged in various embodiments. For example, video player module may be combined with music player module into a single module (e.g., video and music player module 152, FIG. 1A). In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
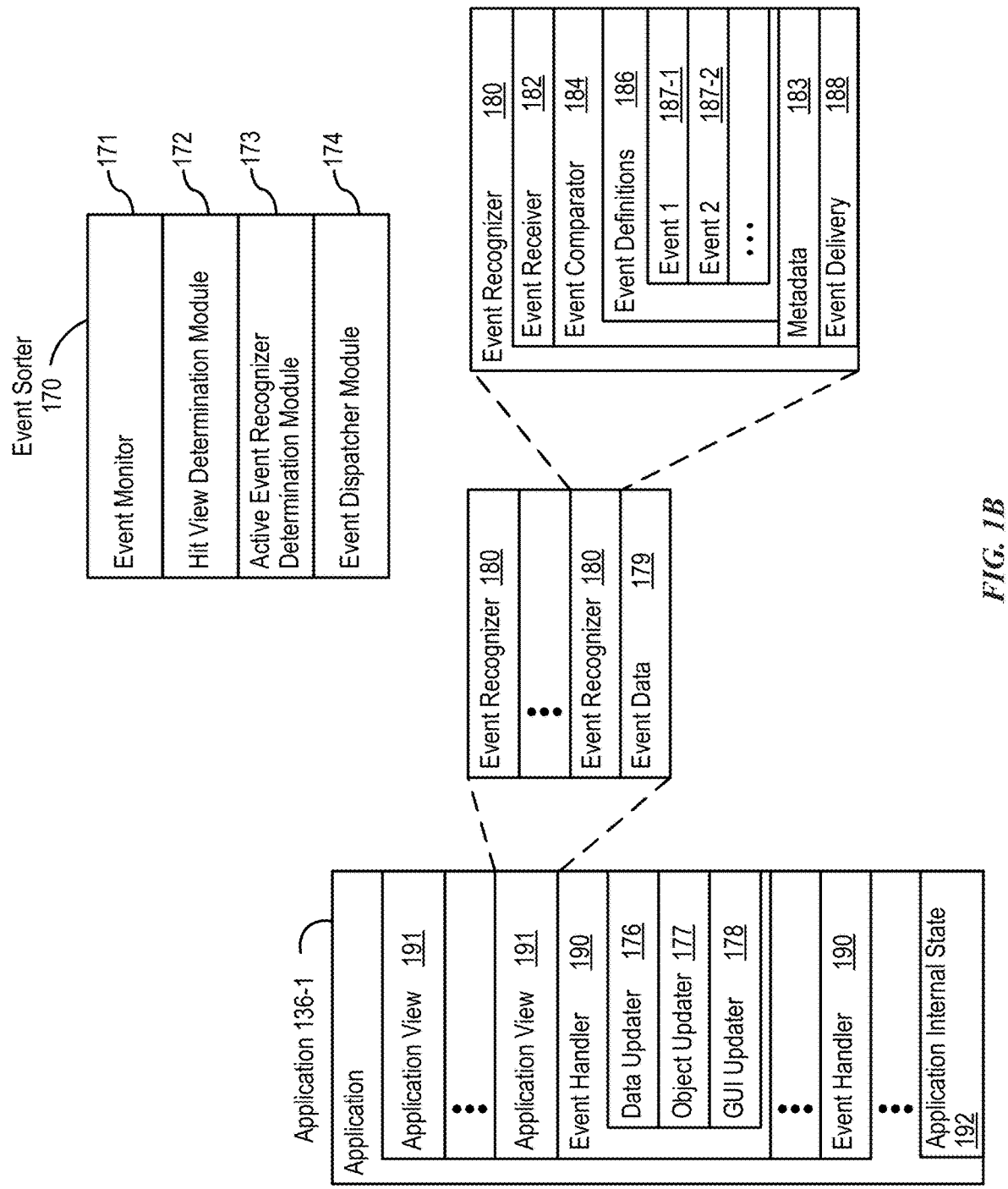
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 may utilize or call data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which may include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers may interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
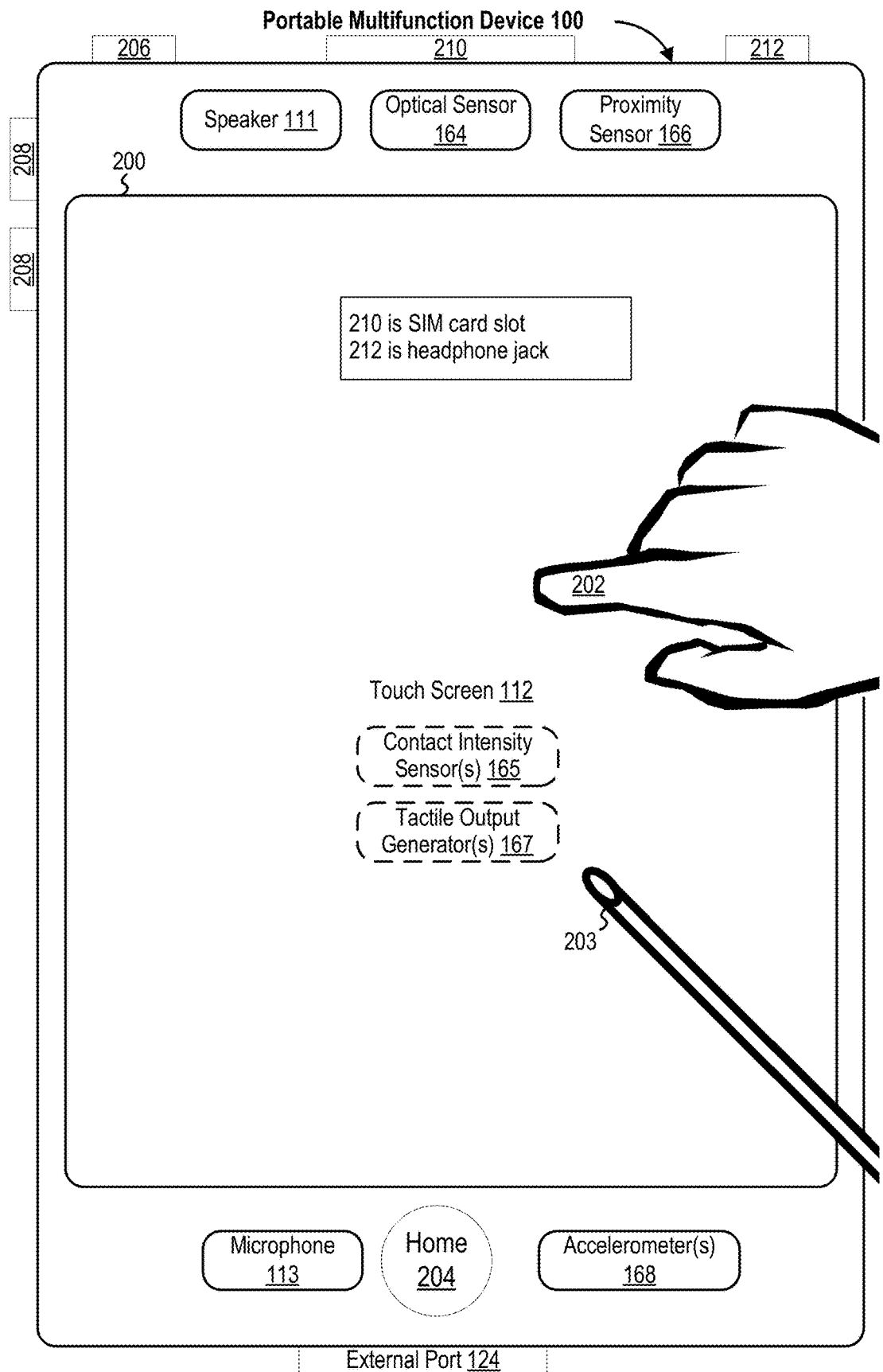
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 may be stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules may be combined or otherwise rearranged in various embodiments. In some embodiments, memory 370 may store a subset of the modules and data structures identified above. Furthermore, memory 370 may store additional modules and data structures not described above.

Attention is now directed towards embodiments of user interfaces that may be implemented on, for example, portable multifunction device 100.

Figure 4A:
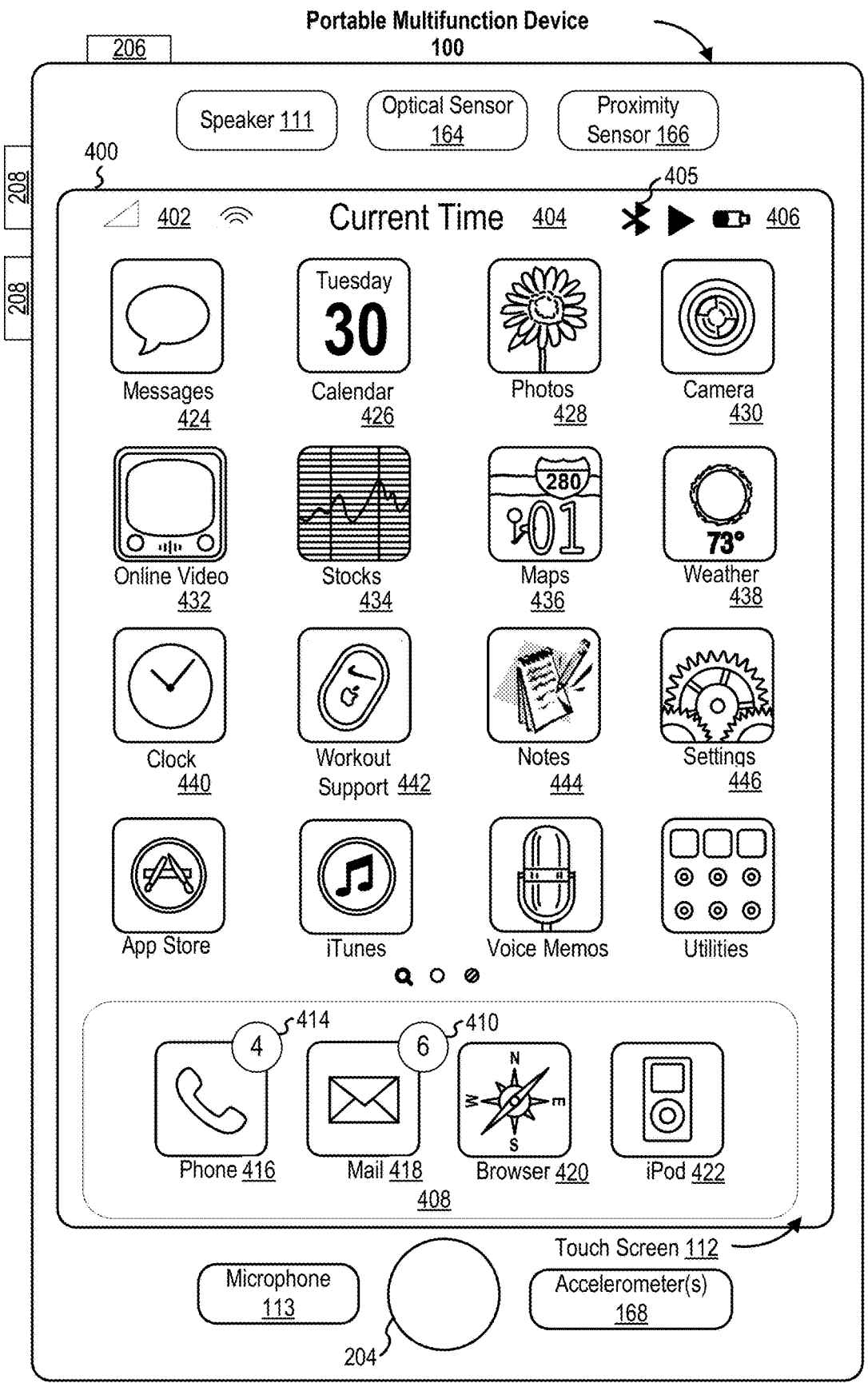
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces may be implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 may optionally be labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

Although some of the examples which follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
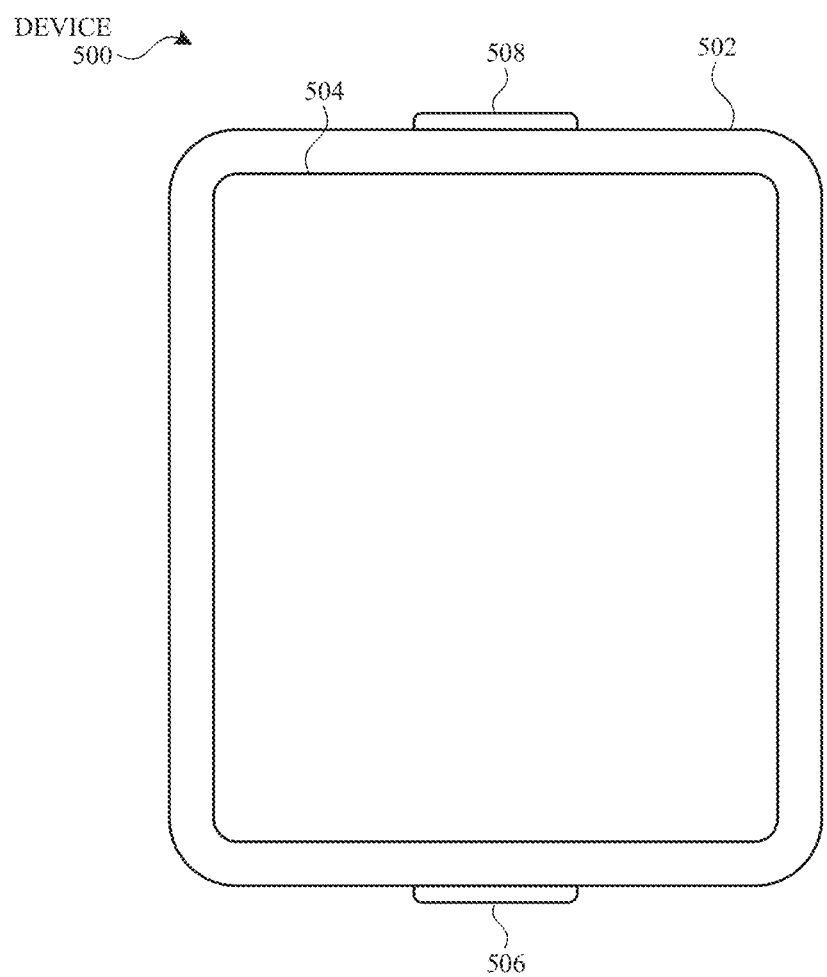
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) may have one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Techniques for detecting and processing touch intensity may be found, for example, in related applications: International Patent Application Serial No. PCT/US2013/040061, titled "Device, Method, and Graphical User Interface for Displaying User Interface Objects Corresponding to an Application," filed May 8, 2013, and International Patent Application Serial No. PCT/US2013/069483, titled "Device, Method, and Graphical User Interface for Transitioning Between Touch Input to Display Output Relationships," filed Nov. 11, 2013, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms may permit device 500 to be worn by a user.

Figure 5B:
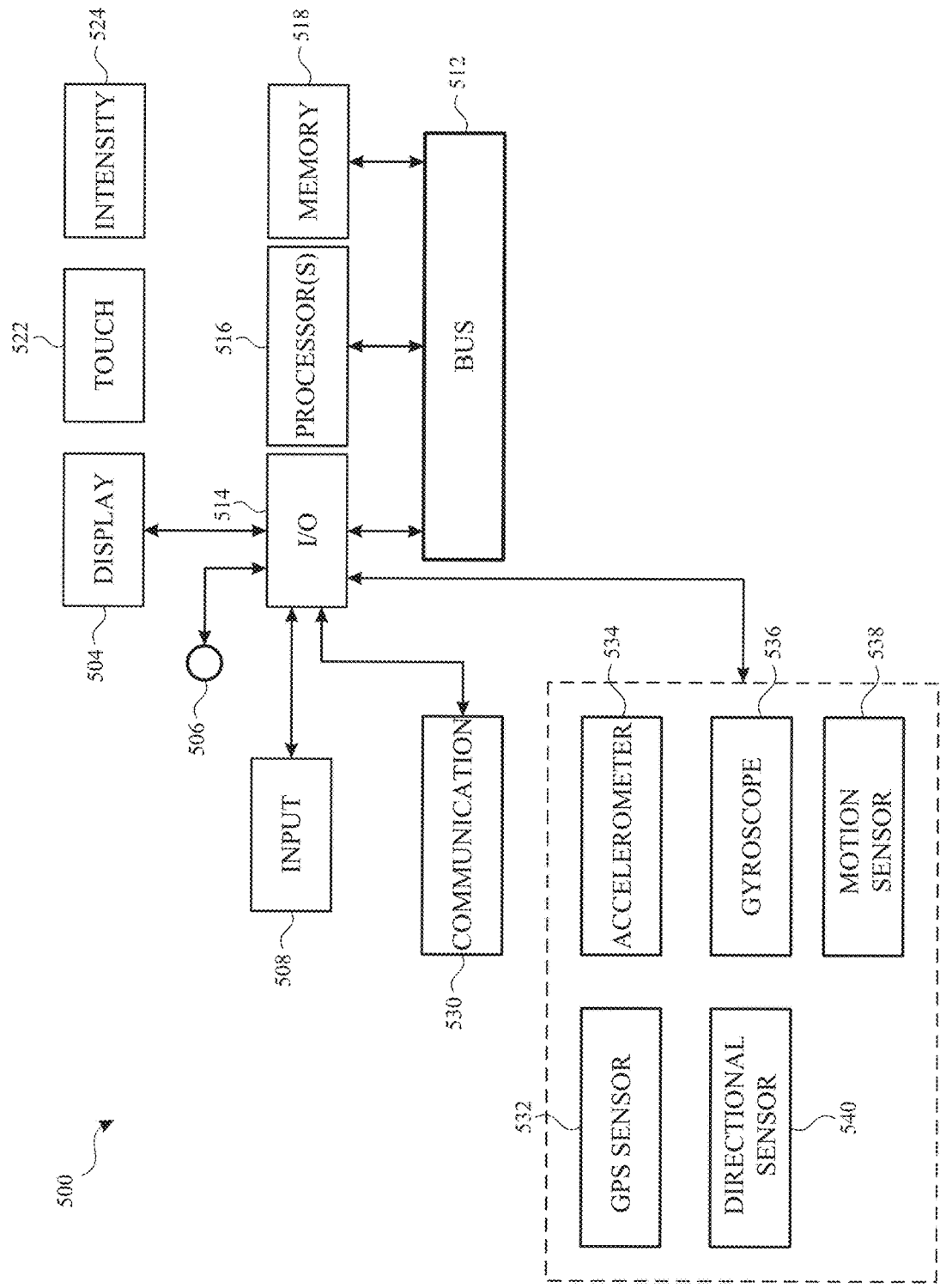
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, touch-intensity sensitive component 524. In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 may be a rotatable input device or a depressible and rotatable input device, for example. Input mechanism 508 may be a button, in some examples.

Input mechanism 508 may be a microphone, in some examples. Personal electronic device 500 can include various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can be a non-transitory computer-readable storage medium, for storing computer-executable instructions, which, when executed by one or more computer processors 516, for example, can cause the computer processors to perform the techniques described above, including processes 2200-2600 (FIGS. 22-26). The computer-executable instructions can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. For purposes of this document, a "non-transitory computer-readable storage medium" can be any medium that can tangibly contain or store computer-executable instructions for use by or in connection with the instruction execution system, apparatus, or device. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that may be displayed on the display screen of devices 100, 300, and/or 500 (FIGS. 1, 3, and 5). For example, an image (e.g., icon), a button, and text (e.g., hyperlink) may each constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen display acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds may include a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation) rather than being used to determine whether to perform a first operation or a second operation.

Figure 5D:
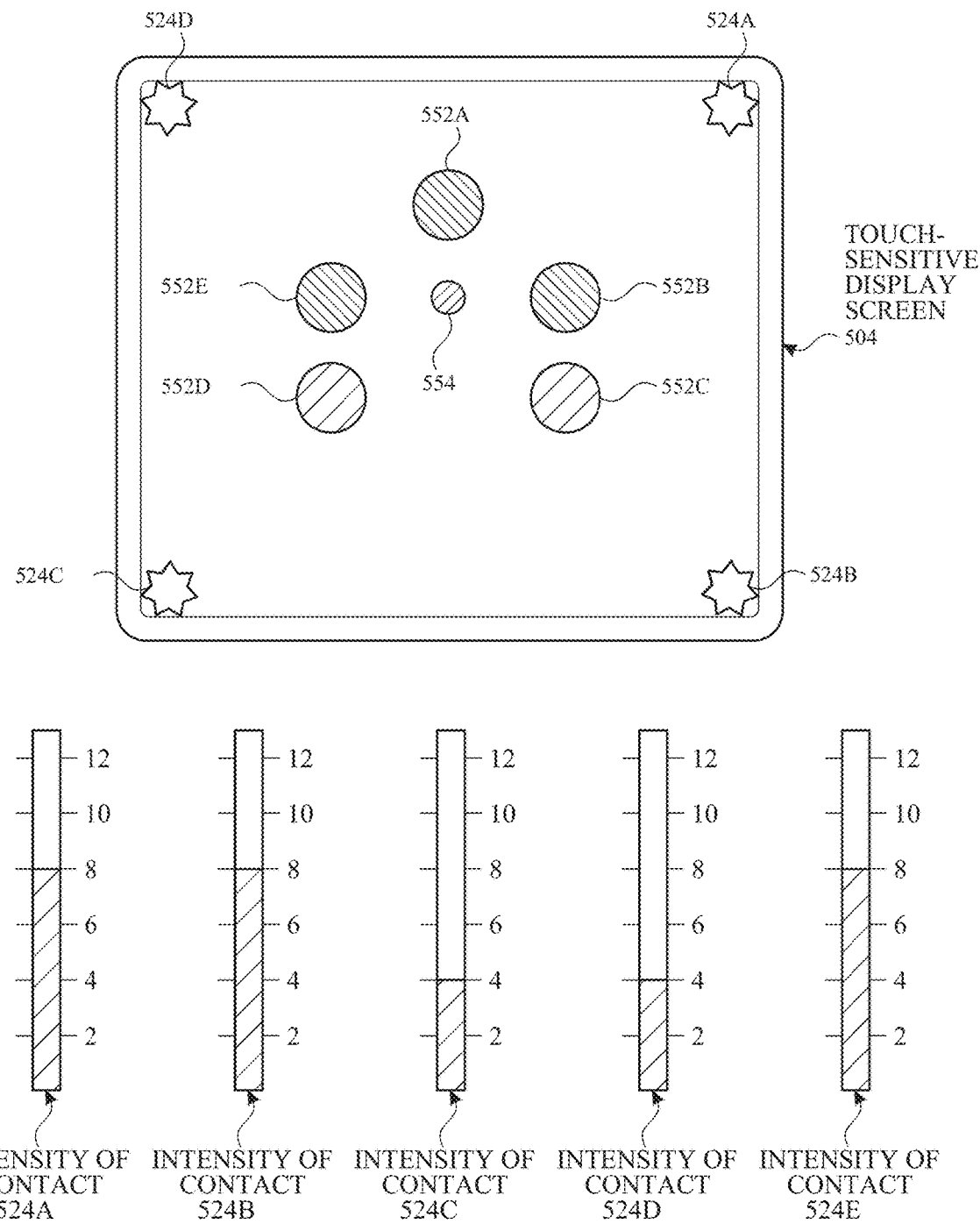

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity Ij that is a portion of the aggregate intensity, A, in accordance with a predefined mathematical function, $Ij=A \cdot (Dj/\Sigma Di)$, where Dj is the distance of the respective contact j to the center of force, and $\Sigma Di$ is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface may receive a continuous swipe contact transitioning from a start location and reaching an end location, at which point the intensity of the contact increases. In this example, the characteristic intensity of the contact at the end location may be based on only a portion of the continuous swipe contact, and not the entire swipe contact (e.g., only the portion of the swipe contact at the end location). In some embodiments, a smoothing algorithm may be applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface may be characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

FIGS. 5E-5H illustrate detection of a gesture that includes a press input that corresponds to an increase in intensity of a contact 562 from an intensity below a light press intensity threshold (e.g., "ITL") in FIG. 5E, to an intensity above a deep press intensity threshold (e.g., "ITD") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "ITD"). Contact 562 is maintained on touch-sensitive surface 560. In response to the detection of the gesture, and in accordance with contact 562 having an intensity that goes above the deep press intensity threshold (e.g., "ITD") during the gesture, reduced-scale representations 578A-578C (e.g., thumbnails) of recently opened documents for App 2 are displayed, as shown in FIGS. 5F-5H. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "ITD"). In some embodiments the intensity, on which the progress of the animation is based, is the characteristic intensity of the contact. The operations described with reference to FIGS. 5E-5H can be performed using an electronic device similar or identical to device 100, 300, or 500.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Attention is now directed to user interfaces and associated processes that may be implemented on a multifunction device with a display and a touch-sensitive surface, such as devices 100, 300, and/or 500 (FIGS. 1A, 3A, and/or 5A), to provide functionalities of a photos application.

FIG. 6A illustrates exemplary electronic device 600. Device 600 may be device 500 (FIG. 5A) in some embodiments. In the illustrated example, device 600 is a wearable electronic device. As shown, device 600 may display user interface 610 having user interface objects 620-624. On user interface 610, user interface objects 620-624 are displayed as icons. Icons 620-624 may correspond to applications executable on device 600, meaning device 600 may launch a corresponding applications in response to a user's selection of an icon. In the illustrated example, icon 620 corresponds to a photos application.

A photos application may provide the capability to display photos and/or collections of photos (or representations thereof) on the display of device 600. A collection of photos may include a set of one or more photos that are associated in some way. For example, a collection of photos may share a common memory location (e.g., drive, directory, folder, album, etc.) or metadata associating the photos with a common event, day, time, location, etc. In some embodiments, a collection of photos includes a set of photos that have been designated by a user.

Photos may be stored in the form of digital images on an electronic device. In some embodiments, a photos application accesses photos stored in memory on device 600. In some embodiments, a photos application receives and/or accesses photos stored in memory on an external device. An external device may include a smartphone, desktop computer, laptop computer, network server, webserver, or the like.

A photos application may also provide the capability to select a collection of photos (e.g., an album) to display, change the selected collection of photos, display a photo or collection of photos, browse through a collection of photos, display a preview of a photo, share photos or collections of photos, post a comment on and/or like photos or collections of photos (e.g., on a social media website), set a photo as a wallpaper or background of a user interface, add metadata to a photo and/or collection of photos, etc. Exemplary techniques and user interfaces for performing various capabilities, including but not limited to those listed above, are described in greater detail below.

Notably, the availability of rotatable input mechanism 602 on device 600 may improve the speed of man-machine interactions. For example, as described in greater detail below, a user may rotate the input mechanism 602 to quickly "flip" through the photos in a collection or zoom in/zoom out on a displayed image. In this way, device 600 may reduce (and in some instances eliminate) the need for touch-based gestures in navigating through a collection of photos. Importantly, this combination of the available software user interface and hardware input mechanism permit efficient browsing of photos.

Although many of the exemplary user interfaces and techniques provided in this disclosure are described with respect to photos, it should be recognized that certain aspects may be applied to various types of media including, for example, image files, video files, audio files, sequences of images (e.g., stored as a single file), animated Graphics Interchange Format (GIF) files. For example, a photos application or other multimedia application may provide the capability to display a combination of photos, videos, sequences of images, animated GIF files, and/or collections thereof.

Turning to FIG. 6B, an exemplary external device 650 is described. Device 650 may be device 100 or 300 (FIG. 1A or 3A) in some embodiments. In the illustrated example, external device 650 is a phone. External device 650 may have photos, videos, sequences of images, or other media stored in local memory. External device 650 may also be capable of accessing photos or other media stored on another external device (e.g., a cloud server). The photos or other media may be organized into folders, directories, albums, or the like, that contain collections of photos. In some embodiments, external device 650 stores and/or accesses a collection of designated photo. FIG. 6B shows an exemplary user interface 660 that may be displayed by external device 650. User interface 660 includes an icon 670 representing a folder containing a collection of designated photos stored in local memory and/or the memory of another external device to which external device 650 has access.

In some embodiments, device 650 transmits data representing photos or other media stored on an external device. Device 600 may receive the transmitted data to display images of the photos on the display of device 600. In some embodiments, devices 600 and 650 are paired. As used herein, pairing two electronic devices includes establishing a means of communication between the two devices. The means of communication may include those described in U.S. Patent Application Ser. No. 62/005,751, "Predefined Wireless Pairing," filed May 30, 2014. Once the devices are paired, they may exchange data, including photo images and information associated with the photos (e.g., metadata). When device 600 is paired with external device 650, device 600 may be able to receive via wireless communication data representing the designated photos included in folder 670.

Attention is now directed to techniques and user interfaces for displaying photos on device 600. FIGS. 7A-7D illustrate exemplary user interfaces for displaying photos or other media on device 600. FIG. 7A shows an exemplary user interaction 700 with the photos application icon 620 displayed on exemplary user interface 610, which was described previously with reference to FIG. 6A. As shown in FIG. 7A, the user interaction 700 is a tap. In some embodiments, the user interaction includes another type of touch-based gesture (e.g., tap and hold, swipe, flick, etc.). In some embodiments, the user interaction includes a movement of a mechanical input mechanism (e.g., a press or rotation of rotatable input mechanism 602).

Device 600 may detect tap 700 and, in response, launch the photos application associated with icon 620. Upon launching, the photos application may causes device 600 to receive data representing a collection of photos or other media. The data may represent a collection of photos (e.g., designated photos) stored on an external device. Device 600 may receive the data via wireless communication.

Upon launching, the photos application may also cause device 600 to replace the display of user interface 610 with a display of a photo or other media from the received collection of photos. The display of the photo or other media may include, for example, a digital image of a photo, a digital representation of a photo (e.g., a thumbnail image), a digital representation of a sequence of images (e.g., a representative image of the sequence of images), or the like. FIG. 7B shows exemplary user interface 710, which includes a display of an image of a photo from the collection of photos. For purposes of simplicity, text (e.g., "PHOTO A") is used to represent an actual digital image of the indicated photo. Also, it should be recognized that a photo in the examples that follow could alternatively be a video, a sequence of images, or other media.

The collection of photos received by device 600 may include one or more photos. In some embodiments, another photo in the collection is displayed in response to detecting a user interaction. FIG. 7B indicates a user interaction 701 by an arrow above the rotational input mechanism 602. In the illustrated example, user interaction 701 is a movement (e.g., rotation) of rotational input mechanism 602. Movement of rotational input mechanism 602 may cause device 600 to replace the display of PHOTO A with a display of another photo. For example, device 600 may detect user interaction 701 and, in response, replace the display of PHOTO A with a display of another photo in the received collection of photos.

In some embodiments, the photos in a collection are associated with a sequence (e.g., PHOTO A, PHOTO B, PHOTO C, etc.). Upon launching a photos application, device 600 may display the first photo in the sequence (e.g., PHOTO A). Furthermore, in FIG. 7B, the single arrow above rotational input mechanism 602 indicates that user interaction 701 represents a single unit of movement of rotational input mechanism 602. In response to a single unit of movement, device 600 may display a photo in the sequence adjacent to the photo currently displayed. For example, in response to a clockwise rotation of the rotational input mechanism 602, device 600 may display a subsequent photo in the sequence. FIG. 7C shows an exemplary user interface 711 on device 600 with the next photo in the sequence, PHOTO B, displayed as a result of user interaction 701 of rotational input mechanism 602. In some embodiments, a counter-clockwise rotation of the rotational input mechanism 602 causes device 600 to display a previous photo in the sequence. For example, a single-unit, counter-clockwise rotation of the rotational input mechanism 602 while photo B is displayed may cause device 600 to re-display photo A. Alternatively, in response to a clockwise rotation of the rotational input mechanism 602, device 600 may display a previous photo in the sequence. And in response to a counter-clockwise rotation of the rotational input mechanism 602, device 600 may display a subsequent photo in the sequence.

Turning again to FIG. 7C, another movement 702 of rotational input mechanism 602 is illustrated by the three arrows above rotational input mechanism 602. Movement 702 represents three units of rotation of rotational input mechanism 602 which may cause device 600 to replace the currently displayed photo (PHOTO B) with a photo three positions away in the sequence. FIG. 7D shows an exemplary user interface 712 on device 600 with a photo three positions away from photo B (i.e., PHOTO E) displayed in place of PHOTO B as a result of movement 702 of rotational input mechanism 602.

In some embodiments, a user causes device 600 to change a displayed photo using a touch-based gesture on the touch-sensitive display. FIG. 8A shows exemplary user interface 810 displayed on device 600, which includes a display of a photo A. In FIG. 8A, the horizontal arrow next to the depicted finger indicates a user interaction 800. In the illustrated example, the user interaction 800 is a single swipe gesture on the touch-sensitive display. Swipe 800 may cause device 600 to replace the display of PHOTO A with a display of a different photo. That is, device 600 may detect swipe 800 and, in response, replace the display of photo A with a display of another photo in the collection of designated photos.

In some embodiments, a single swipe causes device 600 to display a photo adjacent to the photo currently displayed based on the sequence of photos. For example, in response to a swipe from right to left, device 600 may display a subsequent photo in the sequence. FIG. 8B shows an exemplary user interface 811 on device 600 with the next photo in the sequence, PHOTO B, displayed as a result of swipe 800. In some embodiments, a swipe from left to right causes device 600 to display a previous photo in the sequence. For example, a single swipe from left to right while photo B is displayed may cause device 600 to re-display photo A. In some embodiments, a swipe from bottom to top causes device 600 to display a subsequent photo in the sequence. And a swipe from top to bottom may cause device 600 to display a previous photo in the sequence.

Turning again to FIG. 8B, another touch-based gesture 801 is illustrated by three horizontal arrows. Touch-based gesture 801 represents three swipes from right to left on the touch-sensitive display of device 600. Detection of the three swipes 801 may cause device 600 to replace the currently displayed photo (PHOTO B) with a photo three positions away in the sequence. FIG. 8C shows an exemplary user interface 812 on device 600 with a photo three positions away from photo B (i.e., PHOTO E) displayed in place of PHOTO B as a result of user interaction 801.

Attention is now directed to techniques for displaying a transition between photos (e.g., replacing a display of a photo with a display of another photo). In some embodiments, a transition includes an animation. FIGS. 9A-9C depict exemplary user interfaces 901-903 animating a transition from a full-size display of a photo A (FIG. 9A) to a full-size display of a photo B (FIG. 9C). FIG. 9B shows an intermediate user interface 902 that illustrates the exemplary animation. In user interface 902, PHOTO A is translated upward off of the display to reveal a display of PHOTO B. In some embodiments, PHOTO A is translated right, left, down, or diagonally. The initial display of PHOTO B may be centered on the display and is displayed as a smaller, reduced-size image than the larger full-size images displayed on user interfaces 901 and 903. The display of PHOTO B may then be animated to enlarge PHOTO B from the reduced-size to the larger full-size. This animation may create the appearance that PHOTO B is being zoomed in along an axis normal to the display of device 600 (e.g., a z-axis).

FIGS. 9D-9F depict user interfaces 910-912, which illustrate an alternative animation for transitioning from the display of one photo to another. As shown in intermediate user interface 911, the display of PHOTO A is translated upward off of the display to reveal a full-sized display of PHOTO B. In this case, the animation may provide the appearance of flipping through a deck of cards or a physical stack of photos.

Attention is now directed to techniques and user interfaces related to selecting a collection of photos and displaying photos from the selected collection.

Figure 10A:
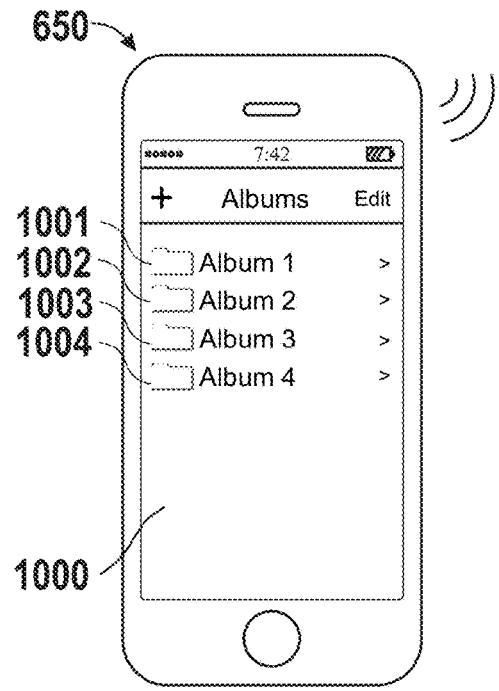
FIG. 10A-10D illustrate exemplary photos application user interfaces in accordance with some embodiments.

FIG. 10A shows an exemplary user interface 1000 that may be displayed on external device 650. User interface 1000 includes user interface objects 1001-1004 corresponding to collections of photos stored on an external device, which are referred to as Albums 1-4, respectively. In some embodiments, the photos are stored in local memory of external device 650 and/or the memory of another external device to which external device 650 has access. External device 650 may transmit via wireless communication data representing Albums 1-4 and their respective photos.

Figure 10B:
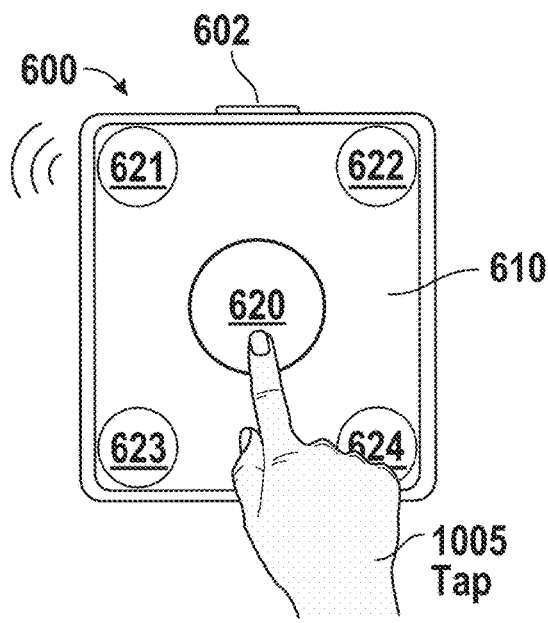

In some embodiments, device 600 receives (e.g., via wireless communication) the data transmitted by external device 650 and is capable of displaying the albums and photos represented by the data. FIG. 10B shows an exemplary user interaction 1005 that may cause device 600 to launch a photos application associated with icon 620 as described previously with reference to FIGS. 6A and 7A. As shown in FIG. 10B, the user interaction 1005 is a tap.

Upon launching, the photos application may causes device 600 to receive the data transmitted by external device 650. The photos application may also cause device 600 to replace the display of user interface 610 with a display of a user interface including user interface objects that represent the collections of photos of the received data.

Figure 10C:
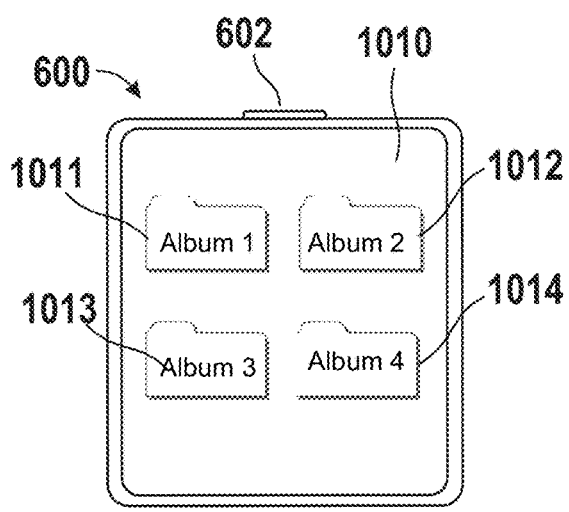
Figure 10D:
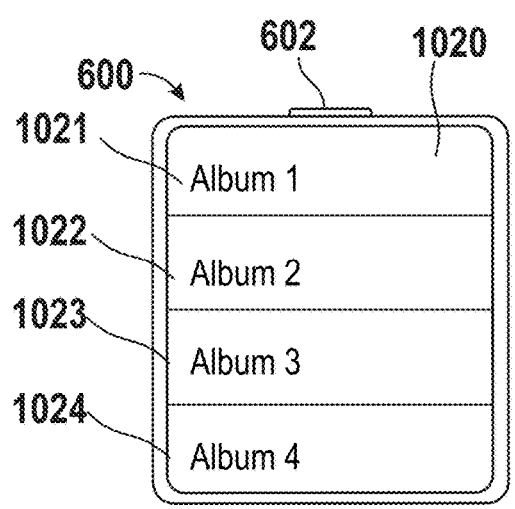

FIG. 10C shows an exemplary user interface 1010 including user interface objects 1011-1014 representing the collections of photos on external device 650, Albums 1-4. In user interface 1010, the interface objects 1011-1014 are displayed as folders. FIG. 10D shows an alternative exemplary user interface 1020 with user interface objects representing Albums 1-4.

In some embodiments, a user can select one of the collections of photos by selecting the user interface object corresponding to a desired collection. FIG. 11A depicts an exemplary user interaction 1100 with user interface 1010 described above with reference to FIG. 10C. In FIG. 11A, user interaction 1100 is depicted as a tap on folder 1013 corresponding to Album 3.

In some embodiments, device 600 detects the user interaction 1100 with user interface object 1013 and, in response, replaces user interface 1010 with a display of a photo in Album 3. FIG. 11B shows an exemplary user interface 1110 including a display of a photo from Album 3, PHOTO 3A.

In some embodiments, device 600 detects the user interaction 1100 with user interface object 1013 and, in response, replaces user interface 1010 with a display of a user interface that includes a user interface object (e.g., an image) representing the selected collection of photos (e.g., the photos in Album 3).

In some embodiments, the user interface object representing the selected collection of photos includes a cover image. That is, in response to detecting a user interaction with user interface object 1013, device 600 may replace the display of user interface 1010 with a user interface including a cover image indicative of Album 3. FIG. 11C depicts an exemplary user interface 1120 including a cover image indicative of Album 3.

In some embodiments, the user interface object representing the selected collection of photos includes a composite image. That is, in response to detecting a user interaction with user interface object 1013, device 600 may replace the display of user interface 1010 with a display of a composite image indicative of the photos in Album 3.

FIG. 11D depicts an exemplary user interface 1130 including a display of a view 1140 of an exemplary composite image 1150. Composite image 1150 depicted in FIG. 11D is representative of the collection of photos in Album 3, and comprises representations associated with individual photos in the album. For example, composite image 1150 includes representation 1151 associated with photo E in Album 3, as indicated by the reference 3E'. A representation may include an indication (e.g., a label) and/or a visual representation (e.g., a thumbnail image) of the corresponding photo. The representations may be arranged in a rectilinear grid as depicted in exemplary composite image 1150, and may resemble a mosaic image comprising the individual photos in a collection.

In some embodiments, the representations are arranged in fixed positions with respect to each other. That is, the representations may maintain their positions with respect to each other despite operations otherwise affecting the view of the composite image, such as translation and scaling (e.g., zooming in and zooming out). In FIG. 11D for example, representation 3L' may be fixed adjacent to the left of representation 3M', which is fixed to the upper left of representation 3S'.

User interface 1130 includes a view 1140 of composite image 1150 in the sense that user interface 1130 may display the entire image 1150 or only a portion thereof (i.e., less than the entire image). For example, view 1140 shows representations of 25 photos (photos 3A-3Y). However, if Album 3 includes more than 25 photos, composite image 1150 may include additional representations that are not shown in view 1140. In some embodiments, portions of the composite image extends beyond the top, bottom, and/or sides of the display and be hidden from view.

In some embodiments, a drag or swipe gesture on a display of a composite image causes device 600 to translate the image and display a hidden portion. For example, if an image extends beyond the bottom of the displayed view, a movement of a contact from the bottom of the display towards the top of the display may cause device 600 to translate the composite image upward revealing a previously hidden lower portion (e.g., previously hidden representations) of the image.

In some embodiments, device 600 incorporates a "rubberband" feature when the edge of an image is reached while translating the image. That is, in response to an edge of the image being reached while translating the image in an initial direction while the contact is still detected on the touch screen display, device 600 may display an area beyond the edge of the image and display a reduced portion of the image. Device 600 may also detect that the contact is no longer on the touch screen display. In response to detecting that the contact is no longer on the touch screen display, device 600 may translate the image in a direction opposite the initial direction until the area beyond the edge of the image is no longer displayed and display a portion of the image that is different from the initially displayed view.

Described in another way, device 600 may detect a movement of a physical object on or near the touch screen display (e.g., a swipe gesture performed with one or more contacts). While detecting the movement, device 600 may translate the image displayed on the touch screen display in an initial direction to display a previously hidden edge of the image. In response to display of the previously hidden edge of the image and continued detection of the movement, device 600 may display an area beyond the edge of the image. After the movement is no longer detected (e.g., in response to detecting liftoff of the one or more contacts from the touch screen display), device 600 may translate the image in another direction until the area beyond the edge of the image is no longer displayed.

It should also be recognized that although the displayed view 1140 of image 1150 in FIG. 11D includes only entire photo representations, a view may be cut off at one or more edge such that only part of the representations along the cut off edges are displayed. Also, a view may include any number of rows and/or columns of representations (e.g., 7×7, 10×10, or 7×10).

Figure 12A:
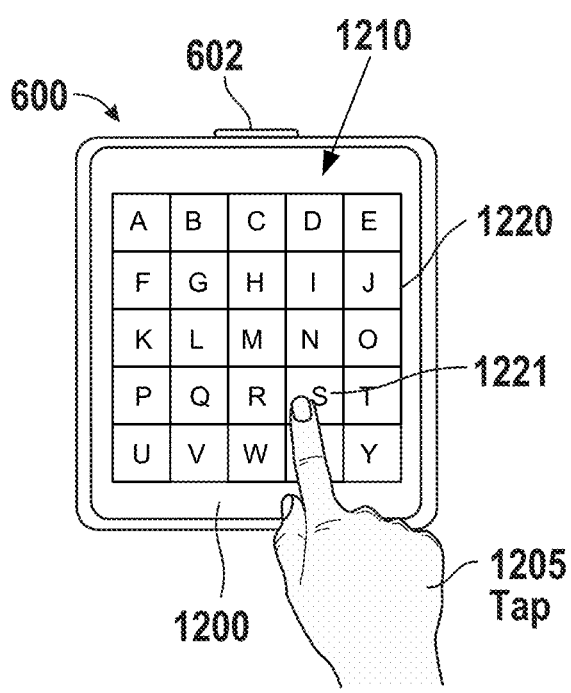
FIGS. 12A-12B illustrate exemplary photos application user interfaces in accordance with some embodiments.
Figure 12B:
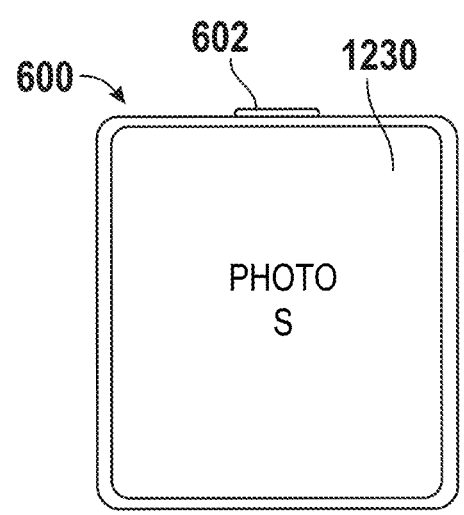

Turning now to FIGS. 12A-12B, an exemplary technique for selecting a photo by interacting with a composite image is described. FIGS. 12A-12B illustrate a selection of a photo on device 600 from a composite image comprising a plurality of representations associated with photos. FIG. 12A shows user interface 1200 including view 1210 of composite image 1220. Image 1220 includes a representation 1221 associated with a photo S.

The representation 1221 may include an affordance that allows the user to interact with the image 1220 via the representation. In some embodiments, device 600 detects a user interaction (e.g., a user touch detected as a contact on the touch-sensitive display) and determines whether it represents a selection of an affordance corresponding to a representation in the composite image. In response to a determination that the user interaction represents a selection of an affordance associated with a representation of a photo, device 600 may replace the display of the composite image with a display of the corresponding photo.

FIG. 12A depicts a user interaction 1205 in the form of a tap gesture at representation 1221. Device 600 may detect user interaction 1205, determine that it represents a selection of an affordance of representation 1221, and in response, replace the display of composite image 1220 (or the view 1210 of composite image 1220) with a display of photo S, as depicted by user interface 1230 in FIG. 12B.

In some embodiments, device 600 has a small form factor. Due to its size, device 600 may not lend itself to displaying large numbers of highly detailed (e.g., high resolution) graphical user interface elements (e.g., representations of photos). If a large number of representations are displayed in a view of the composite image, the size of the representations may be relatively small, which may make viewing difficult. The small size may also make it difficult to reliably select (e.g., via a touch-based gesture) the representation of an intended photo. It may therefore be desirable to provide techniques that allow a user to zoom in on the view of the image to increase the displayed size and/or resolution of the representations.

Figure 13A:
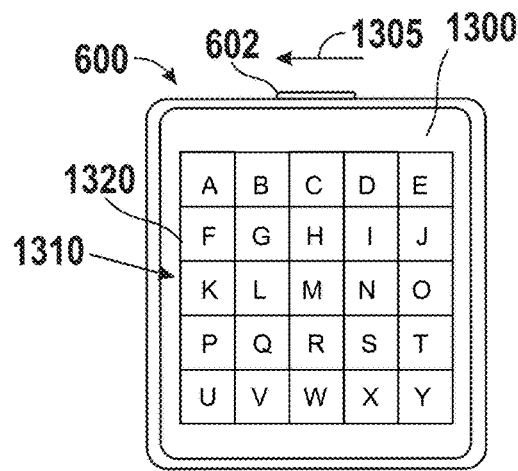
FIGS. 13A-13D illustrate exemplary photos application user interfaces in accordance with some embodiments.
Figure 13B:
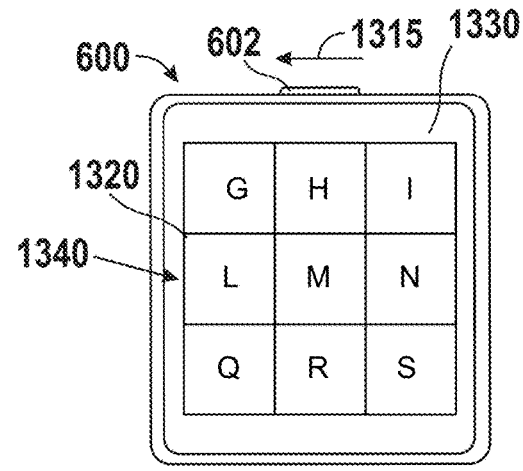

In some embodiments, a view of a composite image displayed on device 600 can be zoomed by moving rotatable input mechanism 602. FIG. 13A shows an exemplary user interface 1300 including view 1310 of composite image 1320. Composite image 1320 includes representations of photos arranged in a rectilinear grid pattern. A movement 1305 (e.g., rotation) of the rotatable input mechanism 602 is represented by an arrow above rotatable input mechanism 602. Device 600 may detect movement 1305 and, in response, transition the display of view 1310 of image 1320 to a zoomed-in view in which the representations of image 1320 are displayed at a larger size. FIG. 13B shows an exemplary user interface 1330 including a zoomed in view 1340 of image 1320. View 1340 is zoomed such that the portion of the composite image 1320 at the center of the zoomed out view 1310 is also at the center of the zoomed-in view 1340.

In FIGS. 13A-13B, user interaction 1305 causes device 600 to transition the display from a view with five rows and five columns (i.e., a 5×5 view) to a 3×3 view with fewer representations displayed at a larger size and in greater detail (resolution). It should be recognized that device 600 may zoom in by transitioning from a view of any size grid to a view of any smaller sized grid with the same row-to-column ratio (e.g., 9×9 to 4×4 or 8×4 to 4×2). In some embodiments, zooming can be continuous or performed in increments of less than whole rows and/or columns, which may result in views with partial representations displayed along the edges of the view.

In some embodiments, movement of the rotatable input mechanism 602 in a first direction (e.g., clockwise) causes the view of the image to be zoomed in, and rotation in a second direction opposite the first direction (e.g. counter-clockwise) causes the view to be zoomed out. For example, movement of rotatable input mechanism 602 in a direction opposite to the direction of movement 1305 may cause device 600 to switch the display from user interface 1330 back to user interface 1300.

Figure 13C:
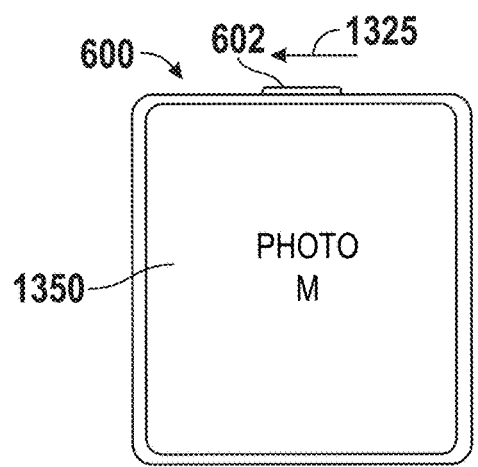

In some embodiments, movement of rotational input mechanism while zoomed in view 1340 is displayed causes device 600 to replace the display of the composite image 1320 with a display of a photo in the collection represented by composite image 1320. User interaction 1315, represented by the arrow above rotatable input mechanism 602 in FIG. 13B, indicates a movement of rotational input mechanism while view 1340 of image 1320 is displayed. In some embodiments, device 600 replaces the user interface including the view of the composite image with a display of a photo in the collection represented by the composite image. For example, as shown in FIG. 13C, in response to user interaction 1315, device 600 may display the photo at the center of the view displayed at the time of the user interaction (i.e., photo M). In some embodiments, the display of the composite image is replaced with a photo corresponding to a representation at a location in the view other than the center (e.g., the photo corresponding to a representation in the top left corner of the view).

In some embodiments, movement of rotational input mechanism while zoomed in view 1340 is displayed causes device 600 to zoom in the view even further. The decision whether to displays a photo or zoom the view of the composite image may depend on various factors, such as the displayed size of the representations in the current view and the number of rows and/or columns displayed in the current view. For example, if the representations are displayed at a size larger than a predetermined size (e.g., ⅓ the height of the display), or if the number of rows of representations appearing in the view of the composite image is less than a predetermined value (e.g., 4 rows), device 600 may display a photo instead of zooming the view of the composite image in response to detecting movement of the rotational input mechanism. Optionally, if the representations are displayed at a size smaller than the predetermined size, or if the number of rows of representations appearing in the view of the composite image is greater than the predetermined value, movement of the rotational input mechanism may cause the view to be zoomed in further.

Figure 13D:
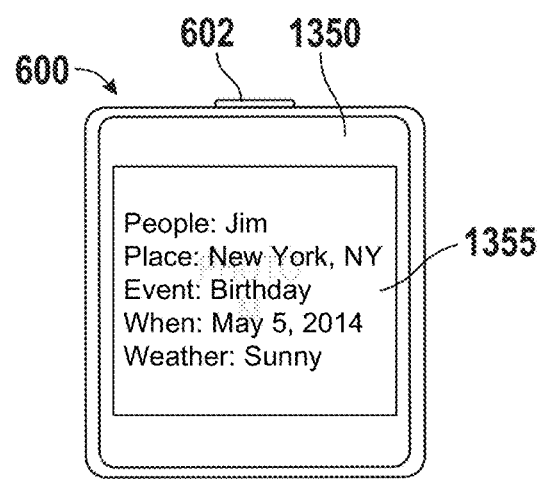

FIG. 13C also indicates a movement 1325 of rotational input mechanism (represented by the arrow above rotatable input mechanism 602) while user interface 1350 including photo M is displayed. In some embodiments, movement of the rotational input mechanism while a photo is displayed causes device 600 to display metadata associated with the displayed photo. FIG. 13D illustrates an exemplary user interface object 1355 that may be displayed in response to movement 1325. User interface object 1355 includes metadata associated with photo M. The metadata may include people, a place, an event, a date and/or time, and weather status associated with photo M.

In some embodiments, a displayed view of a composite image can be zoomed in by a touch-based gesture on the touch-sensitive display. FIG. 14A shows an exemplary user interface 1400 including a view 1410 of composite image 1420. A user performs a tap gesture 1405 on a representation 1421 corresponding to a photo S. Device 600 may detect the tap gesture 1405 and, in response, transition the display of view 1401 to a zoomed-in view in which the representations of image 1420 are displayed at a larger size. In some embodiments, device 600 centers the zoomed-in view on the representation or portion of the image located at the position of the tap. FIG. 14B shows an exemplary user interface 1430 including a zoomed in view 1440 of image 1420 with the representation of photo S at the center of the view. In other embodiments, in response to a tap on user interface 1400, device 600 may zoom in on the center of the view (e.g., representation M) regardless of the location of the tap.

In some embodiments, a pinching gesture (e.g., two points of contact coming closer together) on the touch-sensitive display causes device 600 to zoom out the view of the composite image, and a de-pinching gesture (e.g., two points of contact separating) may cause the view to be zoomed in, or vice versa.

In some embodiments, different types of inputs can be combined to navigate between various user interfaces and displays of photos. For example, in response to a tap gesture at representation M in FIG. 13A, device 600 may replace view 1310 of composite image 1320 with zoomed-in view 1340 (FIG. 13B). Then, in response to a movement (e.g., rotation) of the rotatable input mechanism 602, device 600 may replace view 1340 with a display of photo M 1350 (FIG. 13C). Further, in response to a de-pinching gesture on the display of photo M, device 600 may display user interface object 1355 (FIG. 13D) showing metadata of the photo.

Figure 15C:
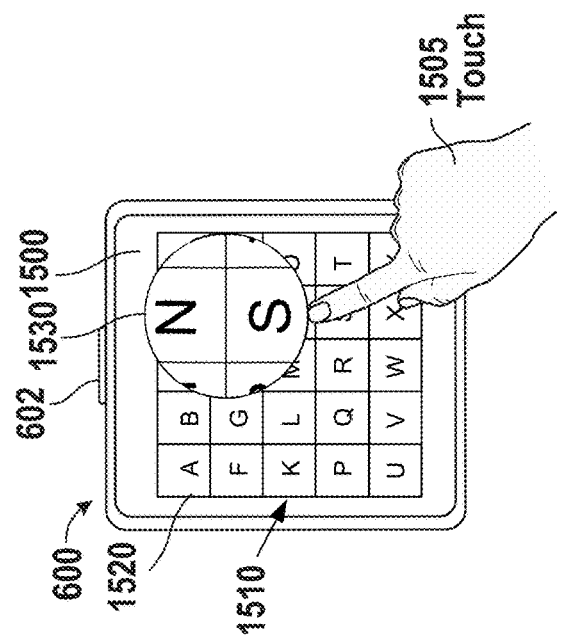
FIGS. 15A-15C illustrate exemplary photos application user interfaces in accordance with some embodiments.
Figure 15B:
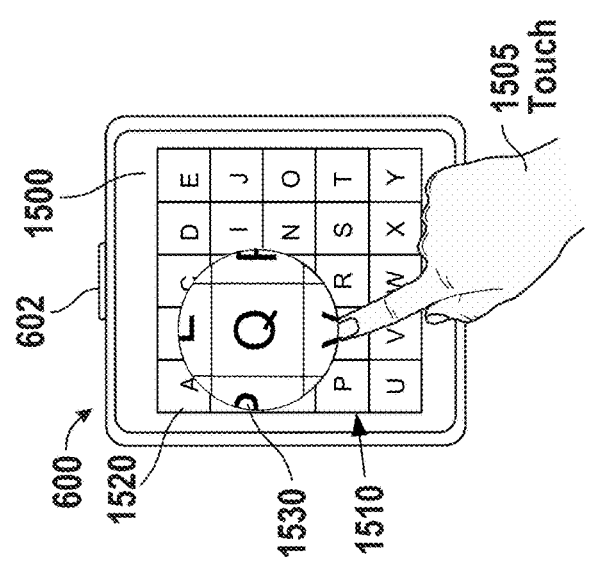
Figure 15A:
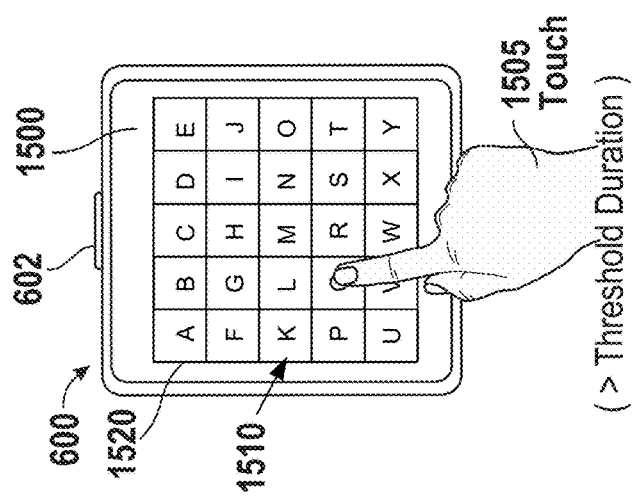

FIGS. 15A-15C illustrate another technique to assist a user in viewing the composite image when the representations are displayed at a relatively small size. FIG. 15A depicts user interface 1500, which includes a view 1510 of composite image 1520. A user provides a touch 1505 on the touch-sensitive display of device 600 and holds the touch for a duration of time. Device 600 detects a contact associated with touch 1505 and determines whether the duration of the contact exceeds a predetermined threshold. In response to determining that the duration of the contact exceeds the predetermined threshold, device 600 may display an enlarged view (e.g., a preview) of a portion of image 1520 surrounding or adjacent to the location of the point of contact.

FIG. 15B illustrates user interface 1500 with an exemplary user interface object 1530 that includes an enlarged view of a portion of image 1520. User interface object 1530 shows an enlarged view of a circular portion of image 1520 surrounding the location at which the user touches the display. In FIG. 15B, the user touches the screen at a location corresponding to the center of the representation of a photo Q. Based on the location of the detected contact associated with touch 1505, user interface object 1530 shows an enlarged view of the image 1520 surrounding the center of the representation of photo Q.

In some embodiments, it is possible for a user to scan along the image to view an enlarged view of a different portion of the image. Without releasing the touch 1505, a user may drag (e.g., slide) the touch to a different point on the display. In FIG. 15C, the position of touch 1505 has been slid (e.g., translated) from the center of the representation of photo Q to a location between the representations for photo N and photo S. While continuing to detect the contact associated with touch 1505, device 600 may detect the translation of the contact along the touch-sensitive display. In response to detecting the translation of the contact to the new point of contact, device 600 may replace the display of the enlarged view of the portion of the composite image surrounding photo Q with an enlarged view of a portion of the image surrounding or adjacent to the updated point of contact. FIG. 15C shows user interface object 1530 with the view in FIG. 15B replaced with an enlarged view of image 1520 centered between the representation of photo N and the representation of photo S in response to the contact being translated.

In the embodiment illustrated in FIGS. 15B and 15C, the enlarged view is displayed above the point of contact. In some embodiments, the enlarged view is displayed in an absolute location (e.g., top center of the display) or in a position relative to the point of contact. In some embodiments, the location of the enlarged view changes based on the point of contact. For example, if the contact is close to the right edge of the display, the enlarged view may be displayed to the left of the point of contact so that it is not cut off by the side of the display. In some embodiments, the enlarged view is removed if the contact ends.

Figure 16A:
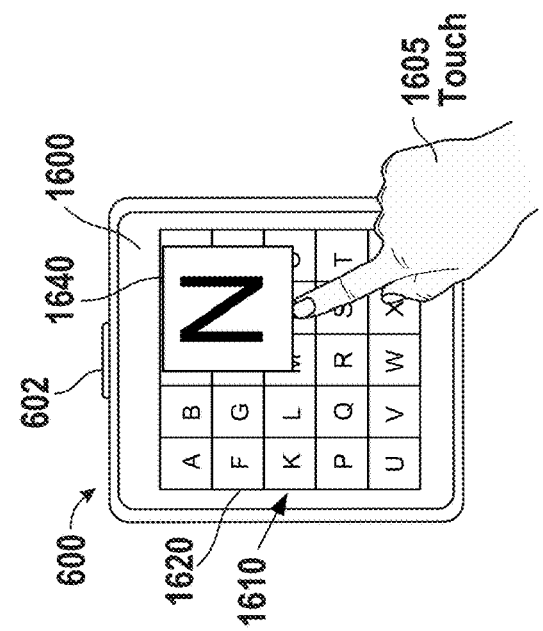
FIG. 16A-16C illustrates exemplary photos application user interfaces in accordance with some embodiments.

In some embodiments, in response to a user input detected on the touch-sensitive display, device 600 displays an enlarged view (e.g., a preview) of a representation of a photo. FIG. 16A depicts user interface 1600, which includes a view 1610 of composite image 1620. Composite image 1620 includes representations of photos arranged in a rectangular grid. A user provides a touch 1605 on the touch-sensitive display of device 600 and holds the touch for a duration of time. Device 600 detects a contact associated with touch 1605 and determines whether the duration of the contact exceeds a predetermined threshold. Device 600 may also determine a representation in image 1620 corresponding to the point of contact.

Figure 16B:
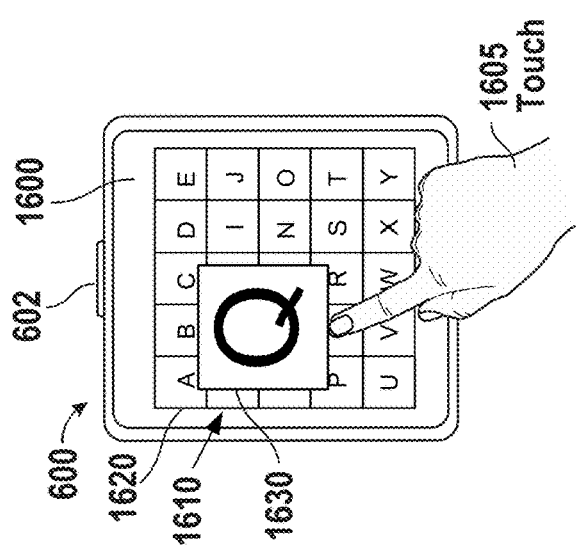

In response to determining that the duration of the contact exceeds the predetermined threshold, device 600 may display a user interface object showing an enlarged view (e.g., a preview) of the representation in image 1620 determined to correspond to the point of contact. FIG. 16B illustrates an exemplary user interface showing a user interface object 1630 that includes an enlarged view of the representation located at the point of contact. In some embodiments, user interface object 1630 includes a preview or image of a photo corresponding to the representation associated with the point of contact determined by device 600. In the depicted example, the point of contact is at a location corresponding to the representation of photo Q, and the user interface object 1630 shows an enlarged view only of the representation of photo Q.

Figure 16C:
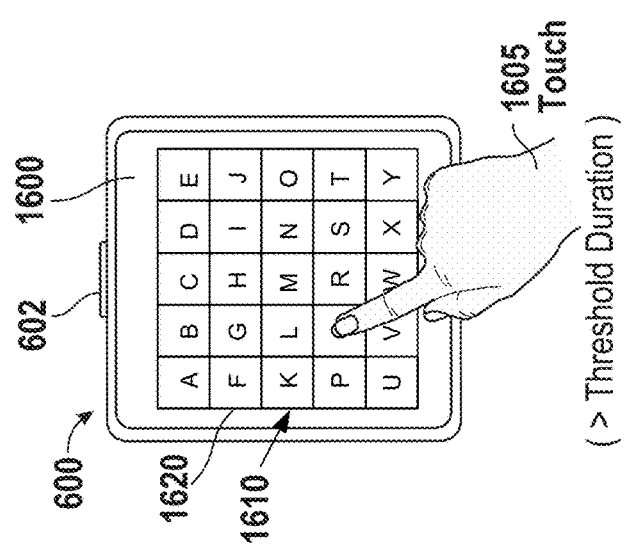

In some embodiments, it is possible for a user to scan along the image to view an enlarged view of a different representation. Without releasing the touch 1605, a user may drag the touch to a different point on the display. In FIG. 16C, the position of touch 1605 has been moved (e.g., translated) from the representation of photo Q to a location on the representations for photo N. While continuing to detect the contact associated with touch 1605, device 600 detects the translation of the contact along the touch-sensitive display. In response to detecting the translation of the contact to the new point of contact, device 600 may replace the display of the enlarged view of the representation of photo Q with an enlarged view of the representation at the updated point of contact. FIG. 16C shows user interface object 1640 with an enlarged view of the representation of photo N.

Figure 17A:
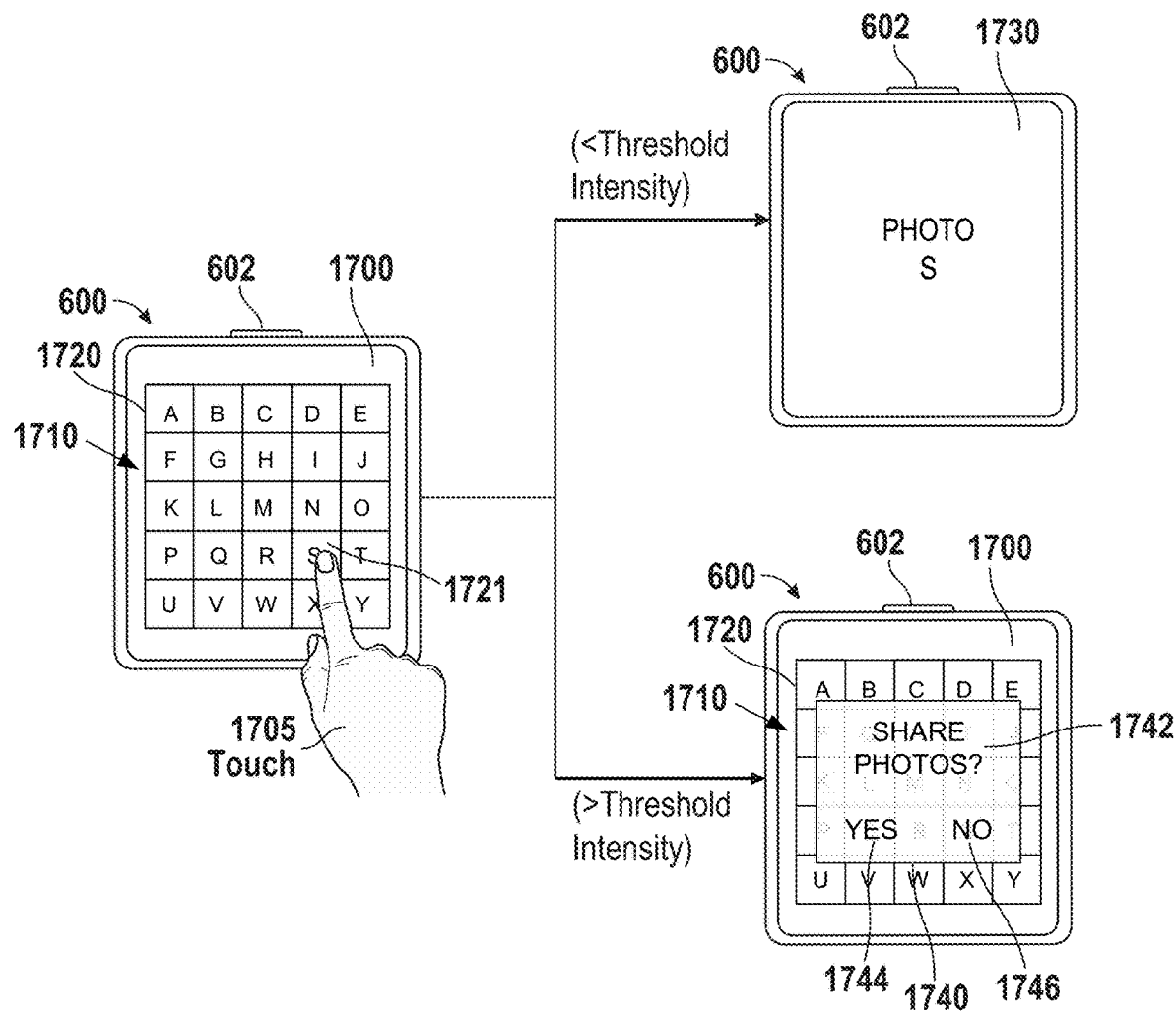
FIG. 17A-17L illustrates exemplary photos application user interfaces in accordance with some embodiments.

Attention is now drawn to techniques in which the photo application of device 600 may invoke different responses based on the intensity of a detected contact. FIG. 17A depicts user interface 1700, which includes a view 1710 of composite image 1720. Composite image 1720 includes representations of photos arranged in a rectangular grid. A user provides a touch 1705 on the touch-sensitive display of device 600 at a representation 1721 corresponding to photo S. Device 600 detects a contact associated with touch 1705 and determines a measurement of an intensity (e.g., a characteristic intensity) of the contact. In some embodiments, device 600 provides different responses based on the intensity of the contact.

As illustrated in FIG. 17A, if the characteristic intensity of the contact is below a threshold, device 600 replaces the display of user interface 1700 with a display of user interface 1730 including a display of photo S. In some embodiments, if the characteristic intensity of the contact is below the threshold, device 600 replaces view 1710 with a zoomed-in view of composite image 1720 centered on the representation 1721 at the point of contact (e.g., view 1421 shown in FIG. 14B). In some embodiments, if the characteristic intensity of the contact is below the threshold, device 600 replaces view 1710 with a view of composite image 1720 having the same scale but which is centered on the representation 1721 at the point of contact.

In some embodiments, if the characteristic intensity of the contact is above the threshold, device 600 maintains the display of user interface 1700 and adds a display of a user interface object representing a menu of one or more selectable options. As shown for example in FIG. 17A, device 600 may display a menu object 1740, which includes text 1742 to prompt a user to decide whether to share the collection of photos represented by image 1720. That is, in response to a determination that a characteristic intensity of the contact is above the threshold intensity, device 600 displays a user interface menu including at least one user interface object, where the user interface object represents an option to share the collection of photos. Optionally, menu object 1740 may prompt a user to decide whether to share the photo corresponding to the selected representation (e.g., photo S). A sharing operation may include sending one or more photos via email, text message, or the like. Sharing may also include posting one or more photos and/or a link to one or more photos on a social media website (e.g., Facebook, Twitter, etc.).

Menu object 1740 also includes affordance 1744 representing the option "YES" and affordance 1746 representing the option "NO". Selection of affordance 1744 indicates that the user desires to share the photos, and may cause device 600 and/or a paired external device (e.g., external device 650) to share the photos. Selection of affordance 1746 indicates that the user does not desire to share the photos, and may cause the device 600 to remove the display of menu object 1740 from user interface 1700.

Figure 17B:
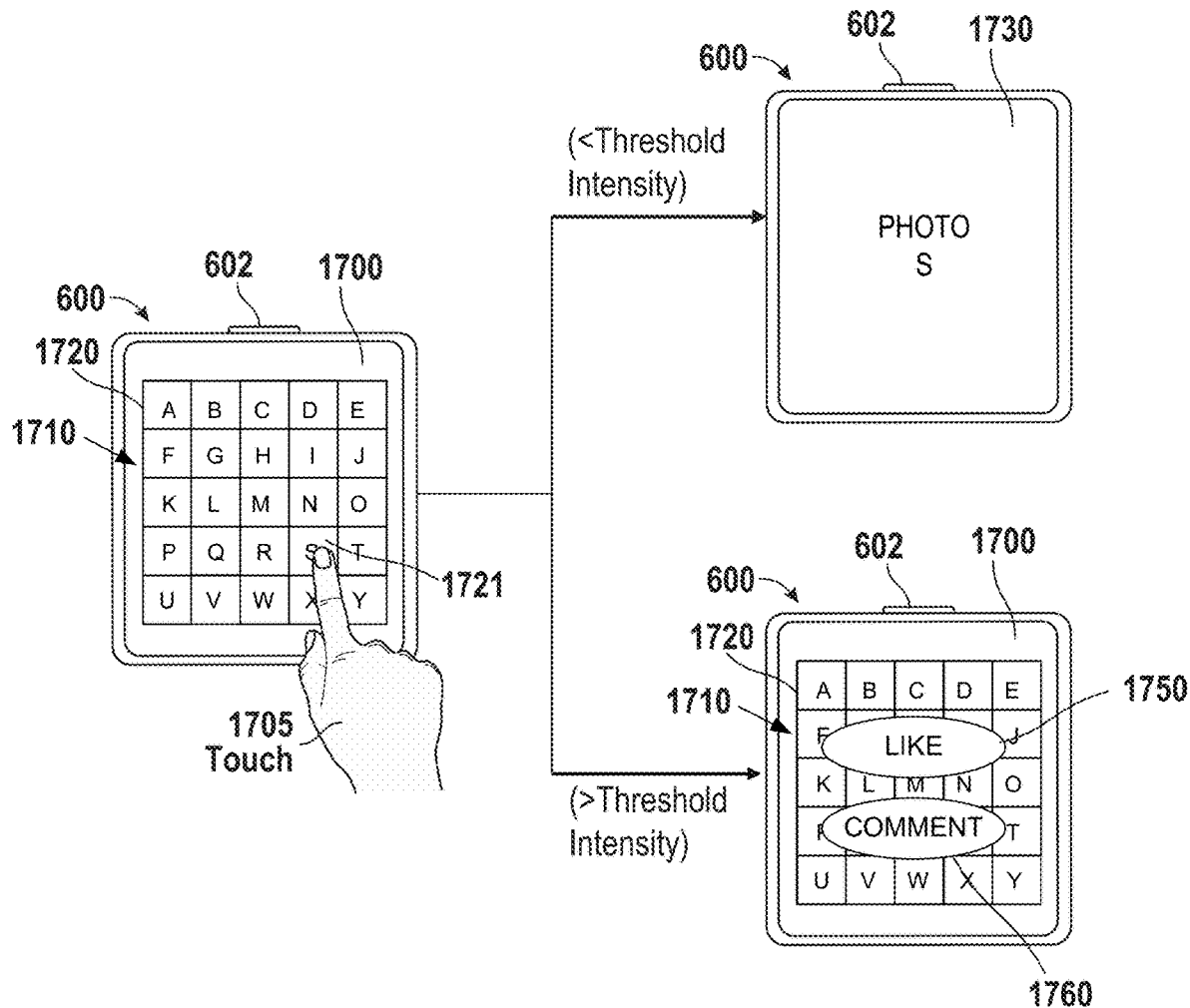

In some embodiments, if the characteristic intensity of the contact is above the threshold, device 600 displays one or more user interface objects representing an option to comment on and/or express an opinion about a photo or collection of photos. FIG. 17B illustrates an alternative exemplary response of device 600 to an input on the touch-sensitive display while user interface 1700 is displayed. As illustrated in FIG. 17B, if the characteristic intensity of the contact is below a threshold, device 600 replaces the display of user interface 1700 with a display of photo S, as described with reference to FIG. 17A.

If the characteristic intensity of the contact is above the threshold, device 600 maintains the display of user interface 1700 and adds a display of user interface objects 1750 and 1760. User interface object 1750 represents an option to express an opinion about the collection of photos represented in image 1720. For example, selection of affordance 1750 may cause device 600 and/or a paired external device to "Like" the collection of photos on a social media website (e.g., Facebook) on behalf of the user. User interface object 1760 represents an option to comment on the collection of photos represented in image 1100. For example, selection of affordance 1760 may cause the device 600 to display a text input box to input comments.

Figure 17C:
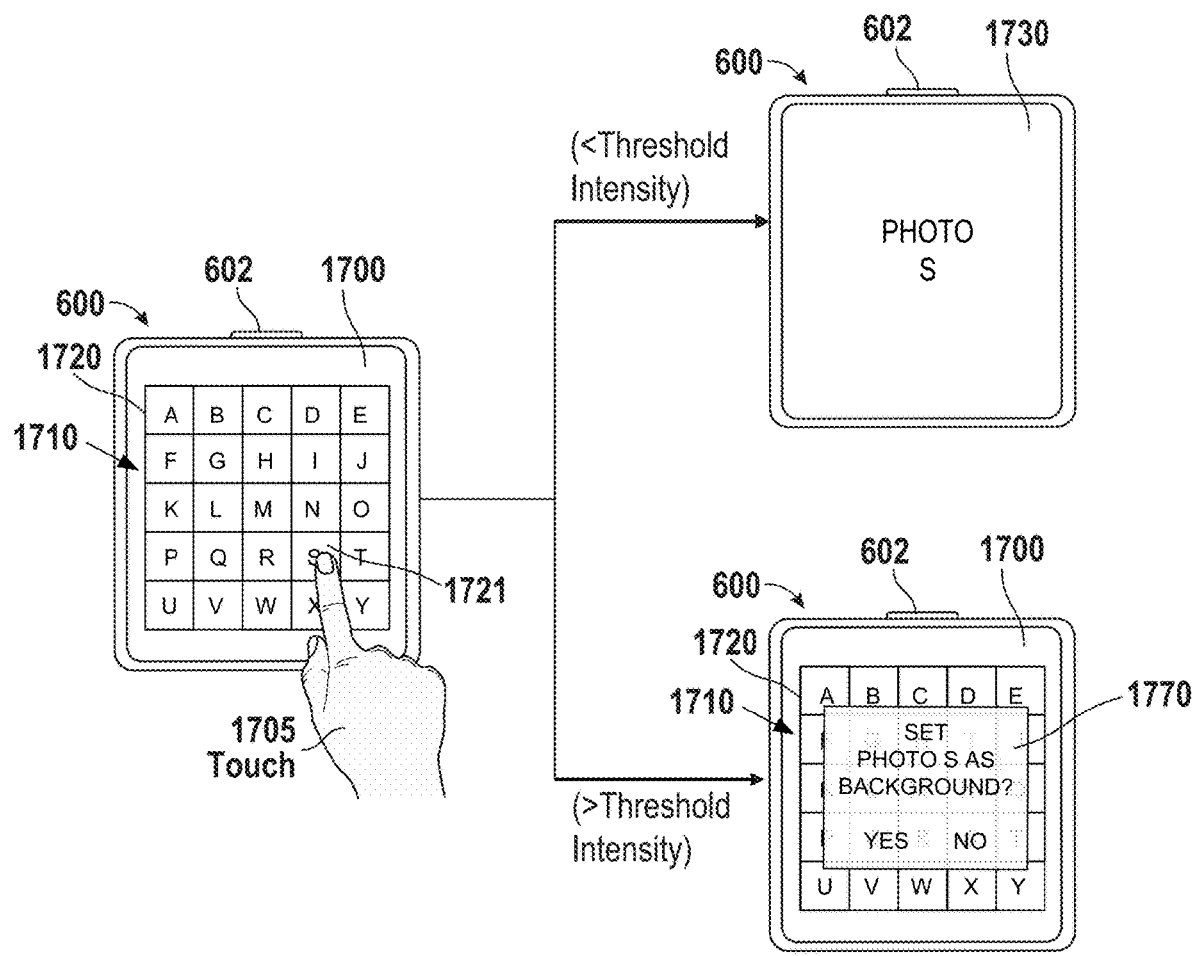

In some embodiments, if the characteristic intensity of the contact is above the threshold, device 600 displays a user interface menu including a user interface object representing an option to display a selected photo as a background of a user interface on the display of device 600. As illustrated in FIG. 17C, if the characteristic intensity of the contact is below a threshold, device 600 replaces the display of user interface 1700 with a display of photo S, as described above with reference to FIG. 17A. If the characteristic intensity of the contact is above the threshold, device 600 maintains the display of user interface 1700 and adds a display of user interface object 1770. User interface object 1700 represents an option to display the photo corresponding to the selected affordance (i.e., PHOTO S in FIG. 17C) as a background of a user interface on the display of device 600.

In some embodiments, device 600 is a wearable electronic device that is configured to display a user interface that represents a clock face. The clock face may comprise the selected photo as a background, a user interface object indicating a time of day, and another user interface object indicating a date. In some embodiments, the appearance of the user interface object indicating the date is blended with the background photo to create a more subtle or aesthetically appealing display of the date.

In some embodiments, the response of device 600 to touch 1705 depends on the measured characteristic intensity of the detected contact associated with the touch relative to more than one threshold. In some embodiments, if the characteristic intensity is below a first threshold, device 600 responds in a first manner; if the characteristic intensity is above the first threshold and below a second threshold, device 600 responds in a second manner; and if the characteristic intensity is above the second threshold, device 600 responds in a third manner. For example, if the characteristic intensity is below a first threshold, device 600 replaces the display of user interface 1700 with a display of user interface 1730 including a display of photo S (e.g., 1730 in FIG. 17A); if the characteristic intensity is above the first threshold and below a second threshold, device 600 displays a user interface object representing an option to share the collection of photos (e.g., 1740 in FIG. 17A); and if the characteristic intensity is above the second threshold, device 600 displays a user interface object (e.g., 1770 in FIG. 17C) representing an option to display the photo corresponding to the selected affordance (i.e., PHOTO S) as a background of a user interface on the display of device 600.

As mentioned above, certain techniques described herein can be applied to media other than a single photo. In some embodiments, a composite image (e.g., 1720 in FIG. 17C) includes at least one representation of a sequence of images (e.g., a plurality of images in a particular order) in addition to or instead of photos as described above. For example, in some embodiments, representation 1721 selected by touch 1705 corresponds to a sequence of images instead of PHOTO S, and display 1730 includes a representation of the sequence of images (e.g., a representative image of the sequence of images). Furthermore, in some embodiments, the sequence of images can be selected to be used as a background in accordance with the techniques described with reference to FIG. 17C (e.g., instead of PHOTO S).

Figure 17D:
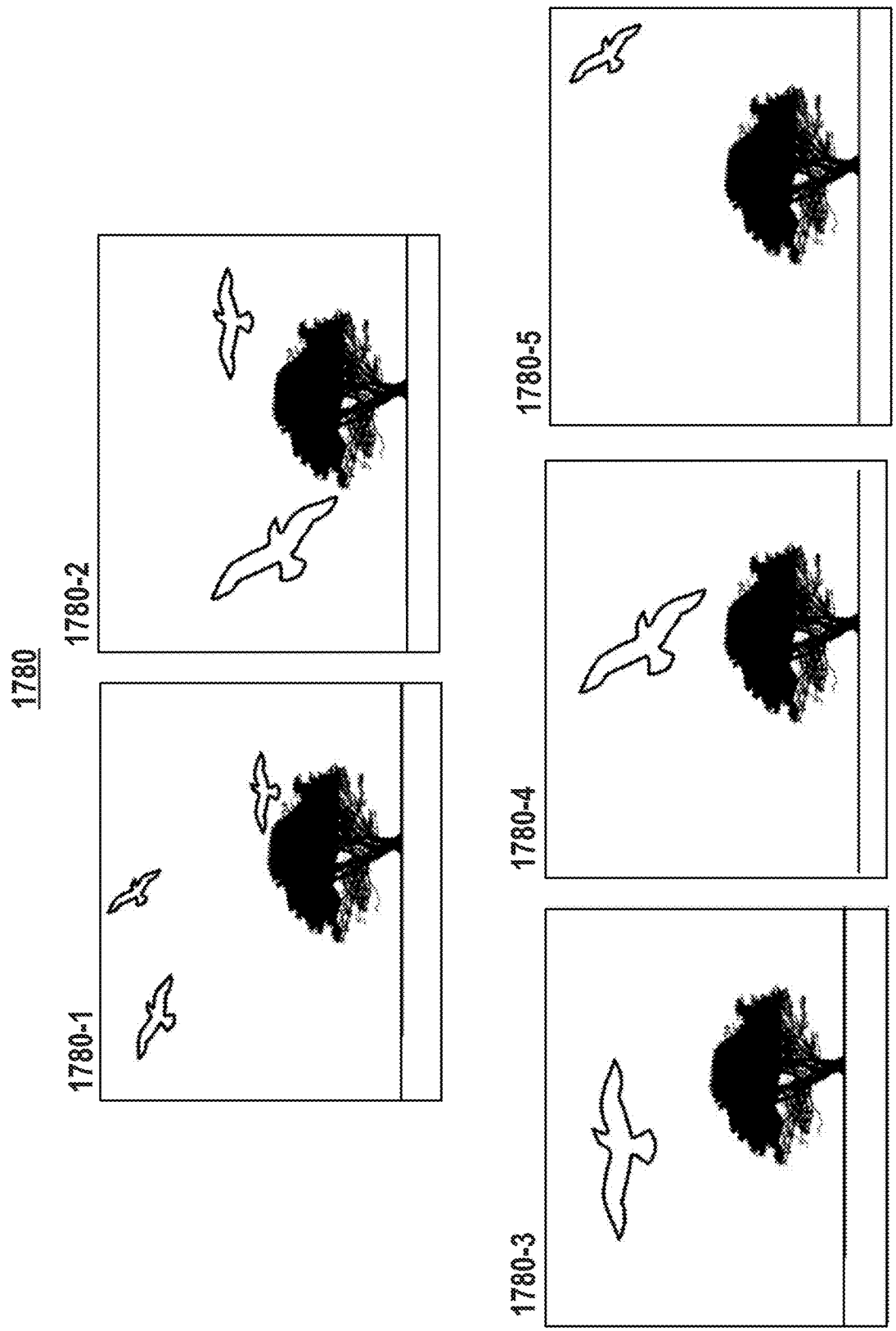

FIG. 17D illustrates an exemplary sequence 1780 of images 1780-1 through 1780-5 including a first image 1780-1 and a last image 1780-5. One of images 1780-1 through 1780-5 is designated as a representative image. For purposes of illustration, image 1780-3 is referred to as the representative image in the following examples. The representative image may be determined in various ways. In some embodiments, the representative image is the image at a predetermined location of the sequence (e.g., the first, middle, or last). In some embodiments, the representative image is determined based on how the images of the sequence were captured. In some embodiments, a user selects the representative image using a graphical interface. Exemplary methods and user interfaces for acquiring a sequence of images and determining the representative image are also described in Appendix A (titled "Devices and Method for Capturing and Interacting with Enhanced Digital Images") and Appendix B (titled "Method and Apparatus For Finding And Using Video Portions That Are Relevant To Adjacent Still Images") filed with U.S. Provisional Application Ser. No. 62/172,223, which is incorporated by reference above in its entirety, including Appendices A and B.

Various ways in which a sequence of images such as sequence 1780 can be used as a background (e.g., a background of a clock face) will now be described with reference to FIGS. 17E-17L. In some embodiments, in response to selection of sequence 1780 as a background, representative image 1780-3 of sequence 1780 is used as a background for device 600.

In some embodiments, wearable electronic device 600 is a watch configured to be worn on a user's wrist and to detect motion input indicative of the user's wrist being raised (e.g., to detect a wrist raise gesture). Exemplary techniques for detecting a wrist raise gesture are described in U.S. Provisional Patent Application Ser. No. 62/026,532, "Raise Gesture Detection in a Device," filed Jul. 18, 2014.

In some embodiments, device 600 detects an input indicative of a wrist raise gesture, and in response, displays one or more of the images of the sequence of images. Optionally, device 600 displays the images of a sequence such that they appear as an animation.

Figure 17E:
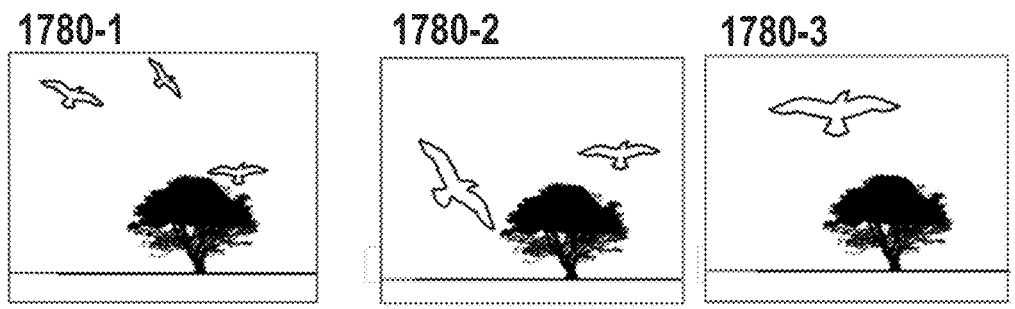

In one example, in response to detecting a first input indicative of a wrist raise gesture, device 600 displays, in sequence, a first set of one or more images from sequence 1780 that are positioned before representative image 1780-3 and representative image 1780-3 (e.g., first image 1780-1 through representative image 1780-3 depicted in FIG. 17E). Optionally, device 600 maintains the display of representative image 1780-3 until further input is received. In this way, upon detecting a wrist raise gesture, device 600 can display the beginning of sequence 1780 (e.g., starting at first image 1780-1) up to representative image 1780-3.

Figure 17F:
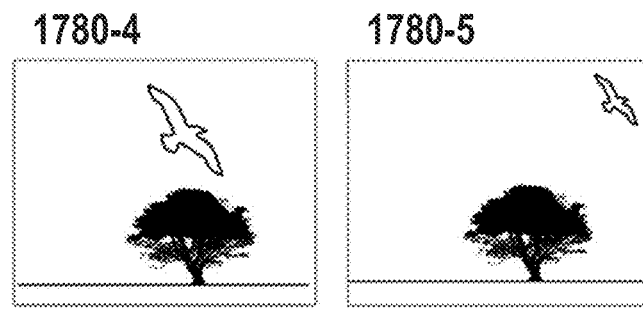

In some embodiments, after display of the first set of images, device 600 detects a second input (e.g., a press and hold or tap on the touch-sensitive display) and, in response, displays, in sequence, a second set of one or more images from sequence 1780 that are positioned after representative image 1780-3 (e.g., image 1780-4 and last image 1780-5 as depicted in FIG. 17F). In this way, device 600 allows the user to view the end of sequence 1780 by providing further input after raising his or her wrist.

In some embodiments, the second input includes a first portion and a second portion (e.g., a back and forth rotation of the wrist detected by a gyro in device 600). In response to the first portion of the second input, device 600 displays, in sequence, a second set of one or more images from sequence 1780 that are positioned after representative image 1780-3 (e.g., image 1780-4); and in response to the second portion of the second input, device 600 displays, in sequence, a third set of one or more images from sequence 1780 that are positioned after representative image 1780-3 (e.g., image 1780-5), where the third set is after the second set and includes last image 1780-5. In this way, device 600 allows the user to display the remaining images of sequence 1780 by performing a compound input.

Figure 17G:
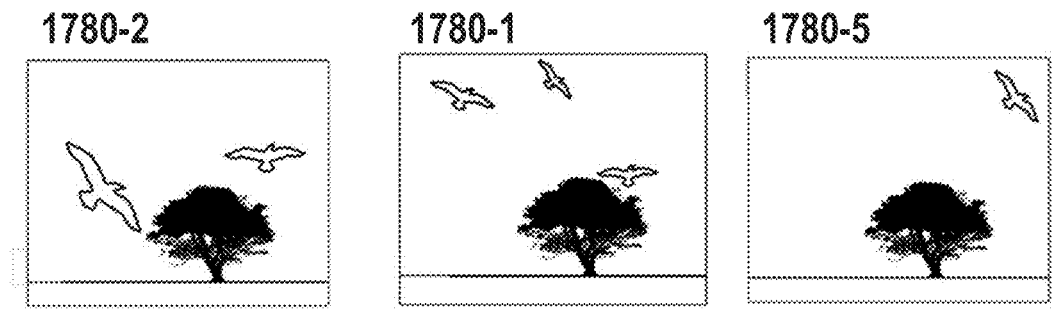

In some embodiments, the second input includes a rotation of rotatable input mechanism 602. In response to the rotation of rotatable input mechanism 602, device 600 replaces the display of representative image 1780-3 with another image from sequence 1780. In the present example, the other image is image 1780-5. Optionally, device 600 also displays the images between representative image 1780-3 and image 1780-5 (e.g., image 1780-4). In some embodiments, in response to a rotation of the rotatable input mechanism in a first direction, the images between representative image 1780-3 and image 1780-5 are displayed in sequence (e.g., image 1780-4 to image 1780-5 as depicted in FIG. 17F); and in response to a rotation of the rotatable input mechanism in a second direction opposite the first direction, the images between representative image 1780-3 and image 1780-5 are displayed in reverse sequence (e.g., 1780-2 to 1780-1 to 1780-5 as depicted in FIG. 17G). In this way, after the initial display of the first set of images upon detection of the wrist raise gesture, device 600 can allow a user to scroll through the images of sequence 1780 using rotatable input mechanism 602 to display another image.

In some embodiments, while displaying image 1780-5, device 600 receives a third input representing selection of image 1780-5 as the representative image (e.g., a touch having a characteristic intensity greater than a threshold intensity or a press of rotatable input mechanism 602). In response to further inputs, device 600 performs the methods described herein with image 1780-5 as the representative image.

Figure 17H:
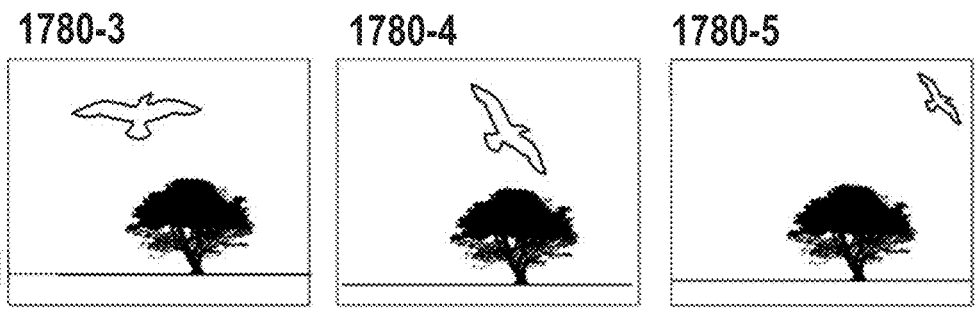

In another example, in response to detecting the first input indicative of a wrist raise gesture, device 600 displays, in sequence, representative image 1780-3 and a first set of one or more images from sequence 1780 that are positioned after representative image 1780-3 (e.g., representative image 1780-3 through last image 1870-5 as depicted in FIG. 17H). Optionally, device 600 displays last image 1780-5 and maintains the display of last image 1780-5 until further input is received. In this way, device 600 can display the end of sequence 1780, starting from representative image 1780-3, in response to a wrist raise by a user.

Figure 17I:
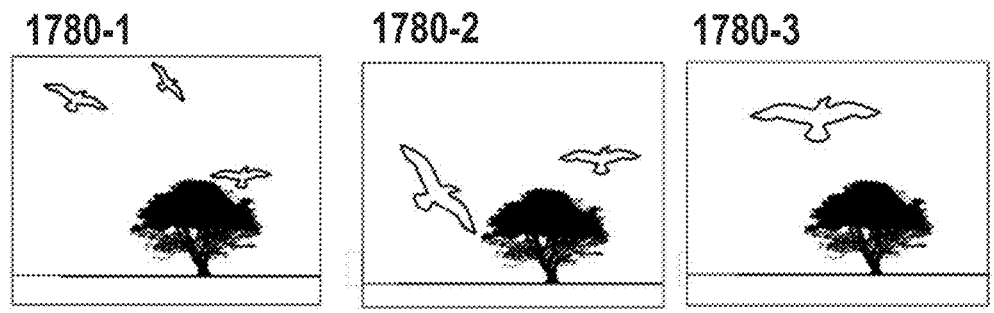

In some embodiments, after display of the first set of images, device 600 detects a second input (e.g., a press and hold or tap on the touch-sensitive display) and, in response, displays, in sequence, a second set of one or more images from sequence 1780 that are positioned before representative image 1780-3 and representative image 1780-3 (e.g., first image 1780-1 through representative image 1780-3 as depicted in FIG. 17I). In this way, device 600 allows the user to view the beginning of the sequence, which was not displayed upon the wrist raise.

Figure 17J:
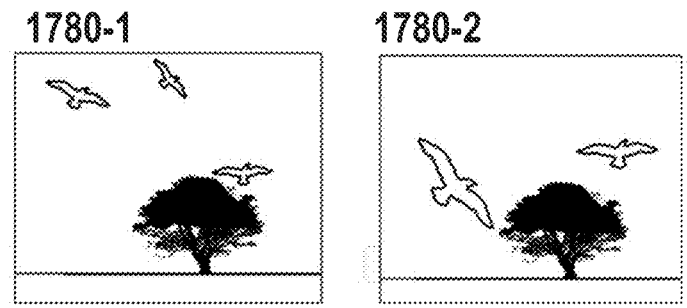
Figure 17K:

In some embodiments, the second input includes a first portion and a second portion after the first portion (e.g., back and forth wrist rotation). In response to the first portion of the second input, device 600 displays, in sequence, a second set of one or more images from sequence 1780 that are positioned before representative image 1780-3 (e.g., first image 1780-1); and in response to the second portion of the second input, device 600 displays, in sequence, a third set of one or more images from sequence 1780 that are positioned before or includes representative image 1780-3 (e.g., image 1780-2 and 1780-3), where the second set is before the third set, the second set includes first image 1780-1, and the third set includes representative image 1780-3. In this way, device allows the user to display the beginning of sequence 1780, which was not displayed upon detection of the wrist raise gesture, by performing a compound input In embodiments in which the second input includes a rotation of rotatable input mechanism 602, in response to the rotation of rotatable input mechanism 602, device 600 replaces the display of last image 1780-5 with another image from sequence 1780. In the present example, image 1780-2 is the other image. Optionally, device 600 also displays the images between last image 1780-5 and image 1780-2 (e.g., image 1780-1). In this way, after the initial display of the first set of images upon detection of the wrist raise gesture, device 600 can allow a user to scroll through sequence 1780 using rotatable input mechanism 602 to display another image. In some embodiments, in response to a rotation of the rotatable input mechanism in a first direction, the images between last image 1780-5 and image 1780-2 are displayed in sequence (e.g., image 1780-1 to image 1780-2 as depicted in FIG. 17J); and in response to a rotation of the rotatable input mechanism in a second direction opposite the first direction, the images between last image 1780-5 and image 1780-2 are displayed in reverse sequence (e.g., 1780-4 to 1780-3 to 1780-2 as depicted in FIG. 17K).

In some embodiments, while displaying image 1780-2, device 600 receives a third input selecting image 1780-2 as the representative image (e.g., a touch having a characteristic intensity greater than a threshold intensity or a press of rotatable input mechanism 602). In response to further inputs, device 600 performs the methods described herein with image 1780-2 as the representative image.

Figure 17L:
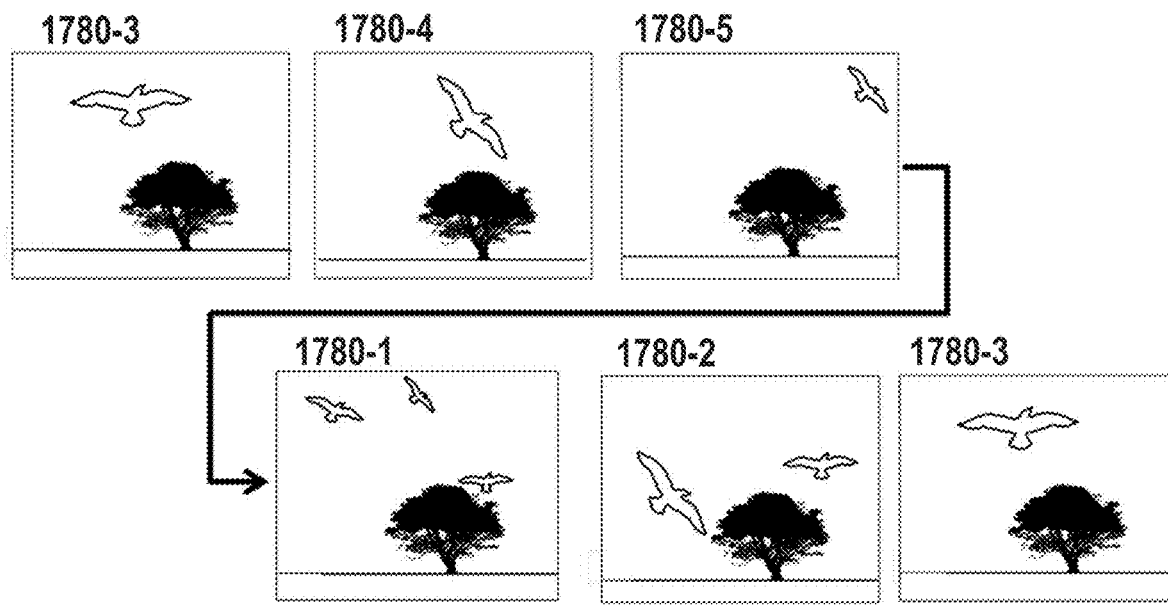

In another example, in response to detecting the first input indicative of a wrist raise gesture, device 600 displays, in sequence, a first set of images from sequence 1780 including representative image 1780-3, one or more images positioned after representative image 1780-3 (e.g., 1870-4 and last image 1870-5), one or more images positioned before representative image 1780-3 (e.g., first image 1870-1 and image 1870-2), and representative image 1780-3 again (e.g., FIG. 17L). Optionally, device 600 maintains the display of representative image 1780-3 until further input is received. In this way, device 600 presents the full sequence, beginning and ending with representative image 1780-3, in response to a wrist raise.

In some embodiments, after display of the first set of images, device 600 detects a second input (e.g., a press and hold or tap on the touch-sensitive display) and, in response, displays, in sequence, a second set of one or more images from sequence 1780 that are positioned after representative image 1780-3 (e.g., image 1780-4 and last image 1780-5 as depicted in FIG. 17F). In this way, device 600 allows the user to view the end of sequence 1780 after representative image 1780-3 by providing further input after a wrist raise.

In embodiments in which the second input includes a first portion and a second portion (e.g., back and forth wrist rotation), in response to the first portion of the second input, device 600 displays, in sequence, a second set of one or more images from sequence 1780 that are positioned after representative image 1780-3 (e.g., image 1780-4); and in response to the second portion of the second input, device 600 displays, in sequence, a third set of one or more images from sequence 1780 that are positioned after representative image 1780-3 (e.g., image 1780-5), where the third set is after the second set and includes last image 1780-5. In this way, device 600 allows the user to display the remaining images of sequence 1780 after representative image 1780-3 by performing a compound input.

In embodiments in which the second input includes a rotation of rotatable input mechanism 602, in response to the rotation of rotatable input mechanism 602, device 600 replaces the display of representative image 1780-3 with another image from sequence 1780. In the present example, image 1780-5 is the other image. Optionally, device 600 also displays the images between representative image 1780-3 and image 1780-5 (e.g., image 1780-4). In this way, after the initial display of the first set of images upon detection of the wrist raise gesture, device 600 can allow a user to scroll through sequence 1780 using rotatable input mechanism 602 to display another image. In some embodiments, in response to a rotation of the rotatable input mechanism in a first direction, the images between representative image 1780-3 and image 1780-5 are displayed in sequence (e.g., image 1780-4 to image 1780-5 as depicted in FIG. 17F); and in response to a rotation of the rotatable input mechanism in a second direction opposite the first direction, the images between representative image 1780-3 and image 1780-5 are displayed in reverse sequence (e.g., 1780-2 to 1780-1 to 1780-5 as depicted in FIG. 17G).

In some embodiments, while displaying image 1780-5, device 600 receives a third input selecting the image as the representative image (e.g., a touch having a characteristic intensity greater than a threshold intensity or a press of rotatable input mechanism 602). In response to further inputs, device 600 performs the methods described herein with image 1780-5 as the representative image.

In addition to the techniques described in the present disclosure, in some embodiments, the images in the sequence may be displayed according to techniques described in Appendix A and Appendix B filed with U.S. Provisional Application Ser. No. 62/172,223.

Figure 18A:
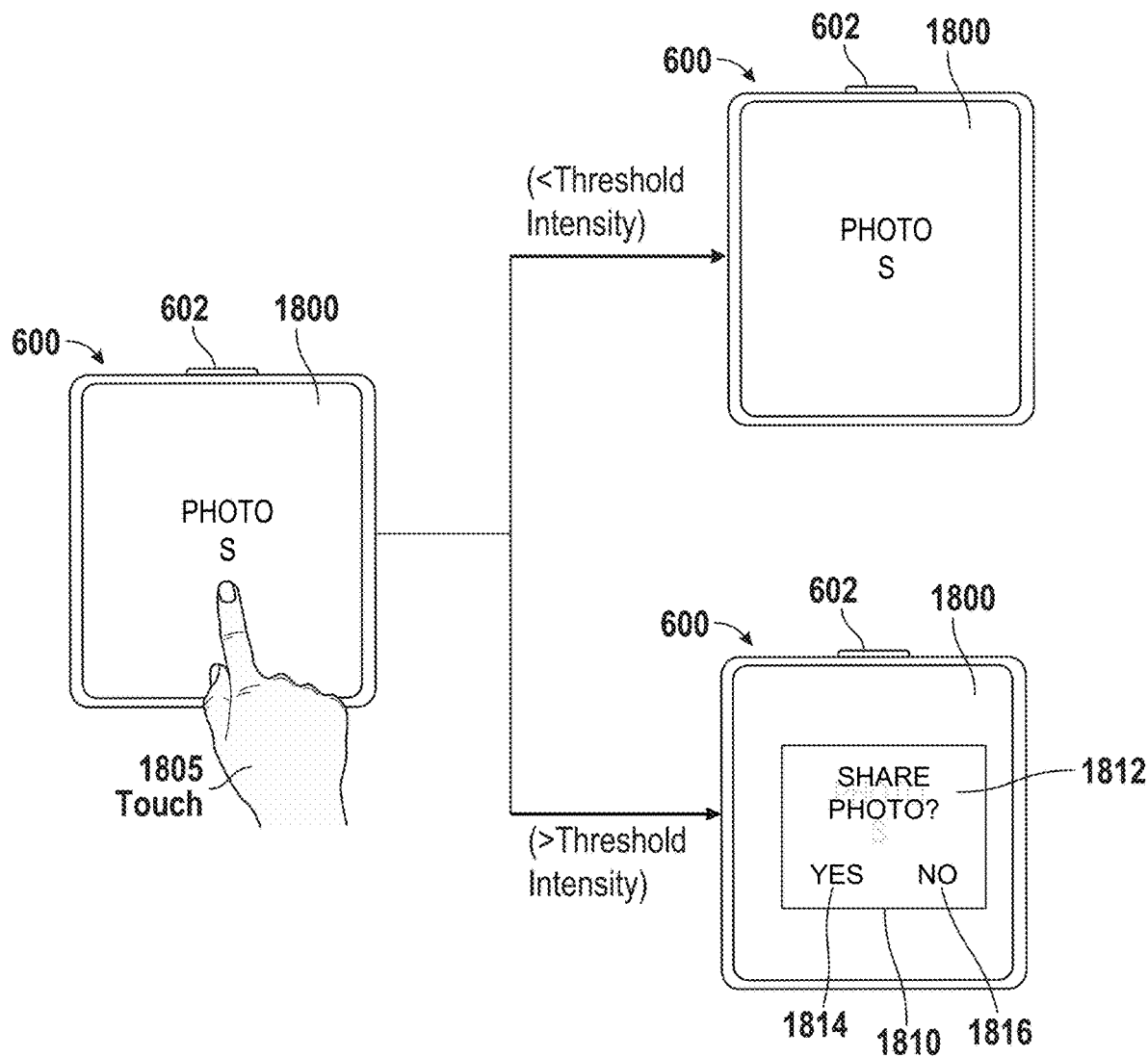
FIG. 18A-18D illustrates exemplary photos application user interfaces in accordance with some embodiments.

Turning now to FIG. 18A, in some embodiments, device 600 determines a measurement of the characteristic intensity of a contact while a photo is displayed (e.g., user interface 710, 1110, or 1730) and provides different responses based on the intensity. FIG. 18A illustrates an exemplary response of device 600 to touch 1805 on the touch-sensitive display while displaying user interface 1800. User interface 1800 includes a display of a photo S. Device 600 detects a contact associated with touch 1805. As indicated in FIG. 18A, if device 600 determines that the characteristic intensity of the detected contact is below a threshold, device 600 continues to display user interface 1800 including photo S. In some embodiments, device 600 replaces the display of photo S with a display of a different photo (e.g., photo T in the same collection). If device 600 determines that the characteristic intensity of the contact is above the threshold, device 600 may add a display of user interface object 1810 to user interface 1800 prompting a user to decide whether to share photo S. User interface object 1810 may be analogous to user interface object 1740 described above with reference to FIG. 17A.

Figure 18B:
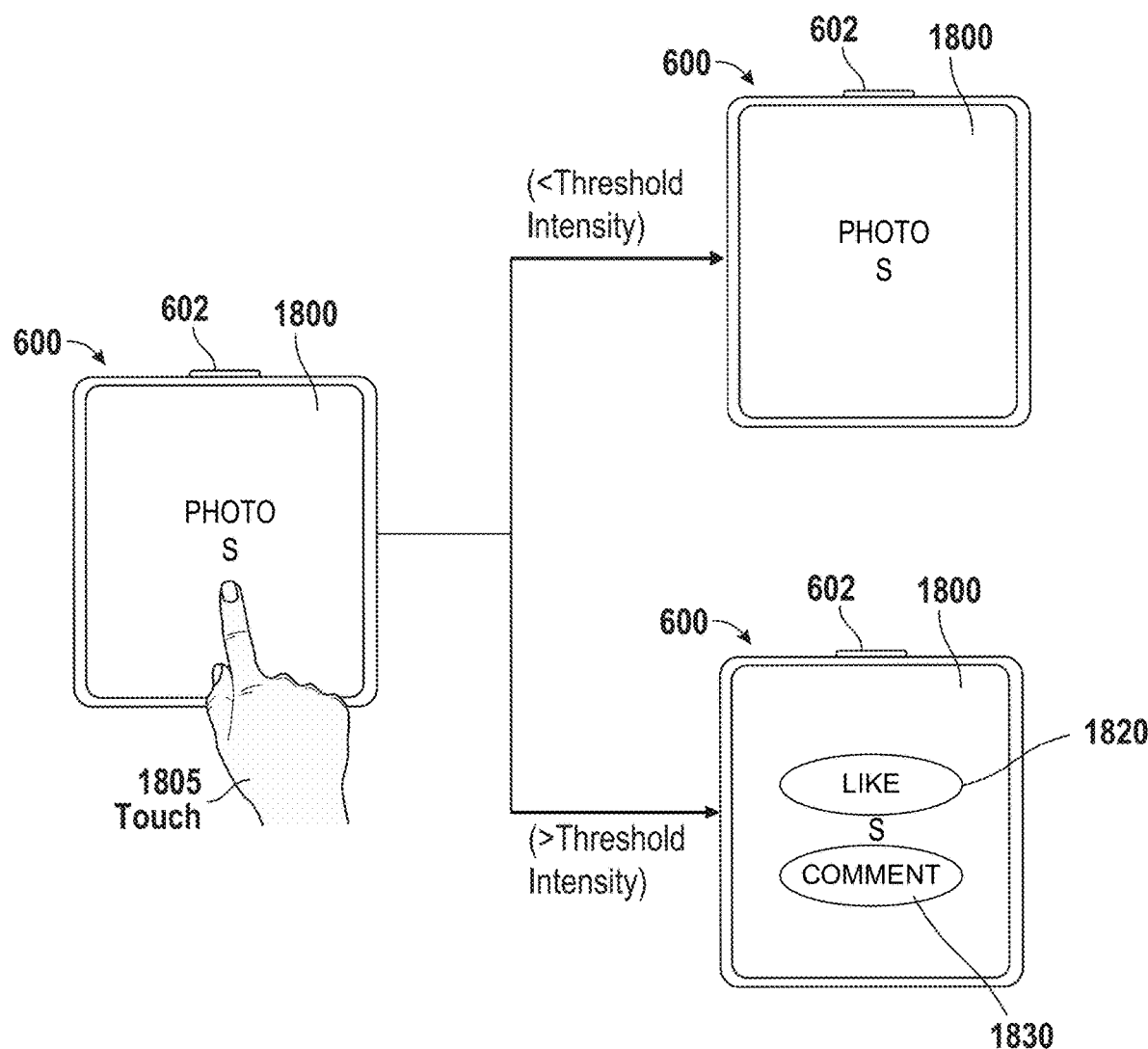

FIG. 18B illustrates another exemplary response of device 600 to touch 1805 on the touch-sensitive display while displaying user interface 1800. As illustrated in FIG. 18B, if device 600 determines that the characteristic intensity of the contact is below a threshold, device 600 continues to display photo S. In some embodiments, device 600 replaces the display of photo S with a display of a different photo. If device 600 determines that the characteristic intensity of the contact is above the threshold, device 600 may add a display of user interface objects 1820 and 1830 to user interface 1800 representing options to comment on and/or express an opinion about photo S. User interface objects 1820 and 1830 may be analogous to user interface objects 1750 and 1760 described above with reference to FIG. 17B.

Figure 18C:
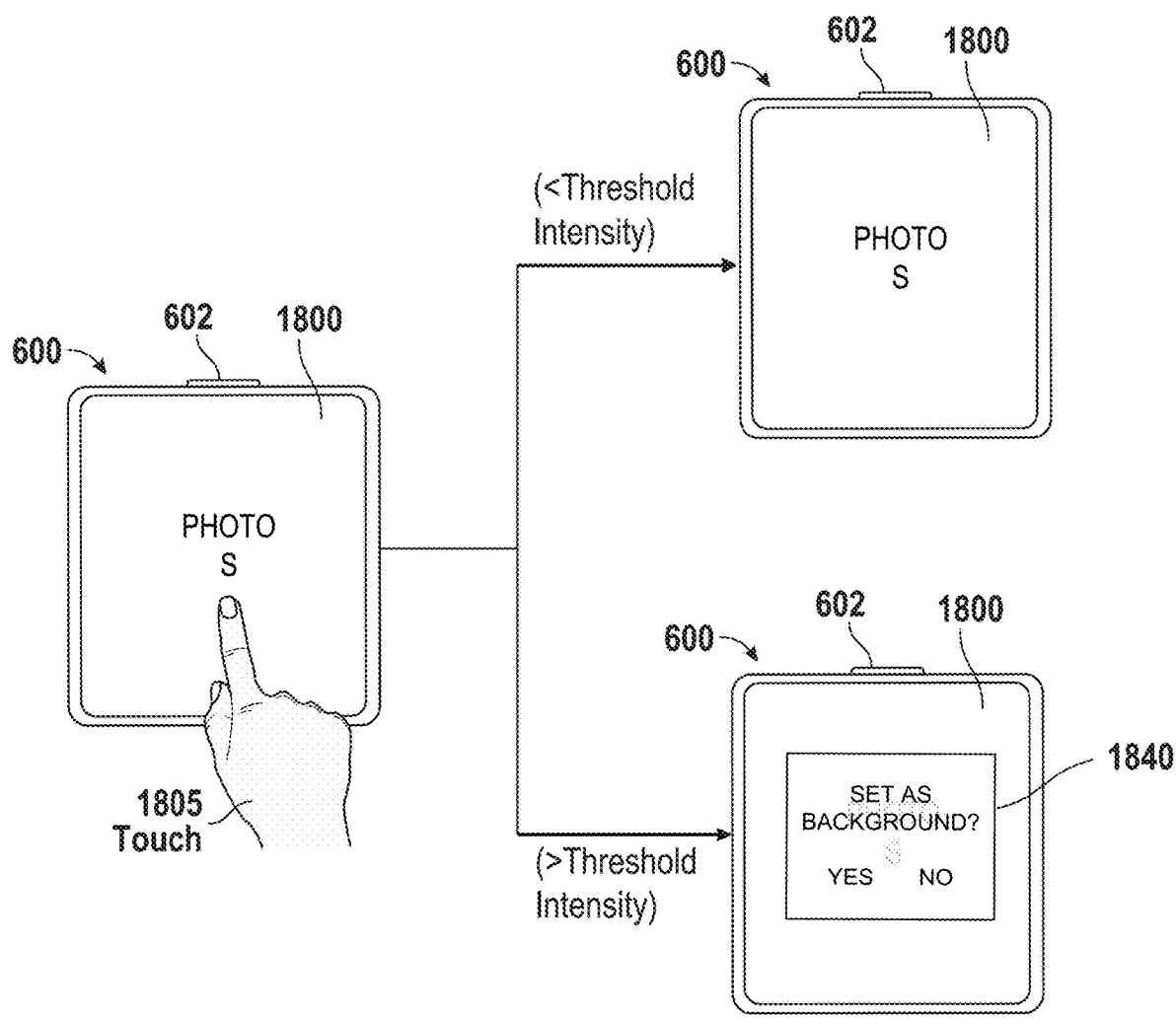

FIG. 18C illustrates another exemplary response of device 600 to touch 1805 on the touch-sensitive display while user interface 1800 is displayed. As illustrated in FIG. 18C, if device 600 determines that the characteristic intensity of the contact is below a threshold, device 600 continues to display photo S. In some embodiments, device 600 replaces the display of PHOTO S with a display of a different photo. If device 600 determines that the characteristic intensity of the contact is above the threshold, device 600 may add a display of user interface object 1840 to user interface 1800 to provide the option of setting photo S as the background of a user interface of device 600. User interface object may be analogous to user interface object 1770 described above with reference to FIG. 17C.

In some embodiments, the response of device 600 to touch 1805 depends on the measured characteristic intensity of the contact relative to more than one threshold. In some embodiments, if the characteristic intensity is below a first threshold, device 600 responds in a first manner; if the characteristic intensity is above the first threshold and below a second threshold, device 600 responds in a second manner; and if the characteristic intensity is above the second threshold, device 600 responds in a third manner. For example, if the characteristic intensity is below a first threshold, device 600 displays a different photo; if the characteristic intensity is above the first threshold and below a second threshold, device 600 displays a user interface object representing an option to share the photo (e.g., 1810 in FIG. 18A); and if the characteristic intensity is above the second threshold, device 600 displays a user interface object (e.g., 1840 in FIG. 18C) representing an option to display the photo as a background of a user interface on the display of device 600.

However, photos often do not match the size of a display or may include unwanted area that a user does not want to be part of the background. Additional exemplary user interfaces for selecting a photo as a background are described below with reference to FIG. 18D. The described techniques provide the benefit of efficient methods and user interfaces for zooming and cropping a photo to allow a user to select a desired portion of the photo as a background.

Figure 18D:
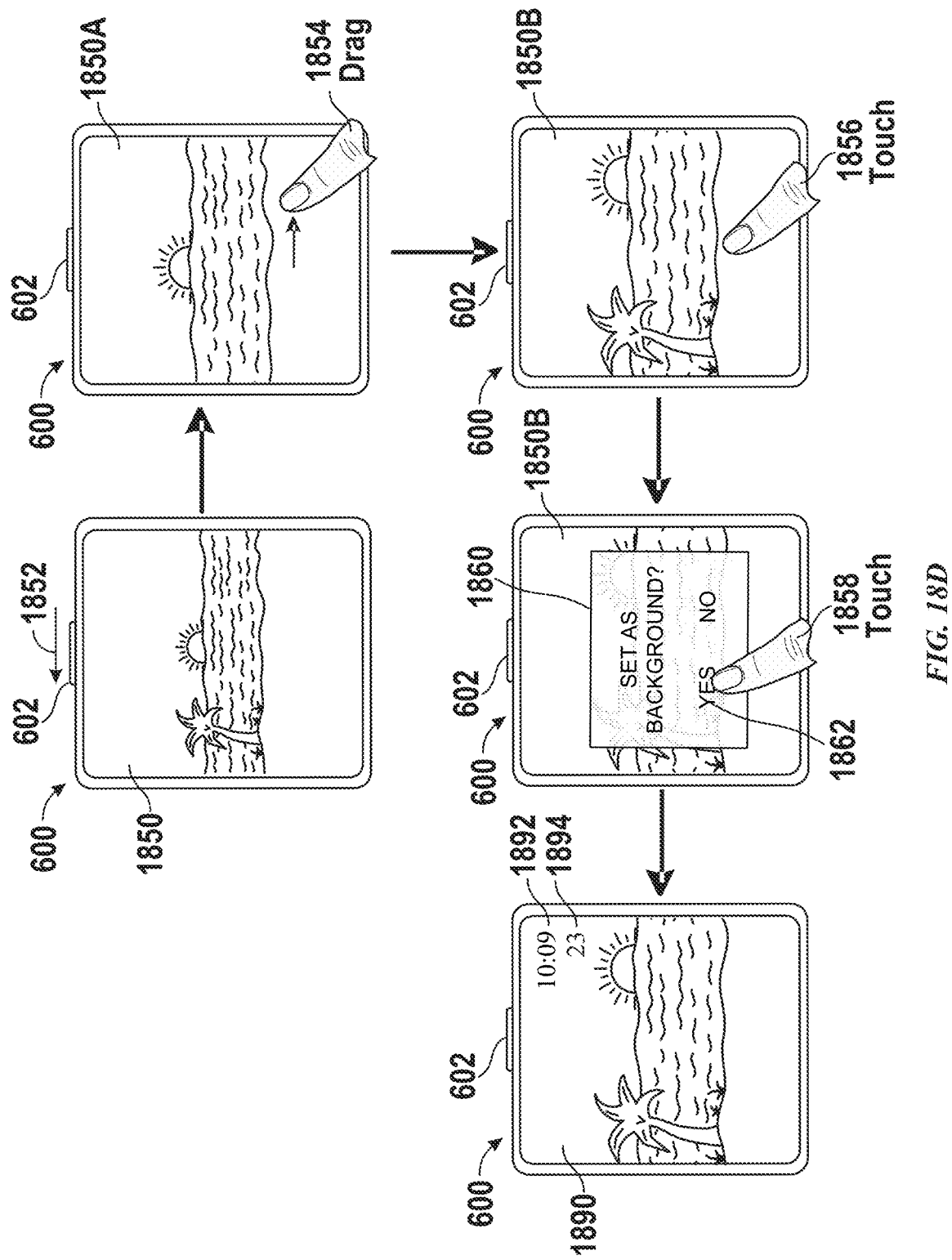

Turning to FIG. 18D, a photo 1850 is displayed. In some embodiments, a user can select photo 1850 according to the techniques described above with reference to FIGS. 13A-13C. For example, a user can zoom a view of a composite image (e.g., a 9×9 grid including representations of photos or other media) by moving rotatable input mechanism 602 and, by further rotating the rotatable input mechanism, cause device 600 to replace the display of the composite image with a display of a photo in the collection represented by the composite image. Accordingly, photo 1850 can be displayed by using rotatable input mechanism 602 to zoom in to photo 1850 from a composite image including a representation of photo 1850.

As indicated in FIG. 18D, device 600 receives further movement 1852 of rotatable input mechanism 602 while displaying photo 1850. In response to further movement 1852, device 600 zooms photo 1850 and displays a first portion 1850A of an enlarged view of photo 1850. Device 600 then receives a drag gesture 1854 that moves horizontally from left to right across the display. In response to drag gesture 1854, device 600 translates the enlarged view of photo 1850 to the right in the direction of drag gesture 1854 to display a second portion 1850B of the enlarged view of photo 1850.

After photo 1850 has been zoomed and translated, device 600 receives a user interaction, touch 1856. Similar to the response described with reference to FIG. 18C, in accordance with a determination that a characteristic intensity of touch 1856 exceeds a predetermined threshold, device 600 displays user interface object 1860 which includes an affordance 1862 for setting the currently displayed view, e.g., second portion 1850B of photo 1850, as the background of a user interface of device 600. In the illustrated embodiment, in response to selection of affordance 1862, device 600 uses second portion 1850B as the background of a clock face 1890 on device 600.

In some embodiments, in response to selection of affordance 1862, device 600 replaces the display of photo 1850 and user interface object 1860 with clock face 1890 which includes portion 1850B as the background, as shown in FIG. 18D. Clock face 1890 also includes user interface objects 1892 and 1894, which indicate the time and day of the month, respectively.

In some embodiments, in response to selection of affordance 1862, device 600 remains in a photo viewing mode. For example, device 600 may remove the display of user interface object 1860 and, optionally, reset (e.g., un-zoom and re-center) the display of photo 1850. Upon exiting the photo viewing mode and entering a clock face mode, device 600 displays clock face 1890 with portion 1850B as the background.

Although selection of the enlarged portion of photo 1850 is described above with reference to the intensity of touch 1856 and selection of affordance 1858, it should be recognized that various alternative techniques are possible. In some embodiments, device 600 directly sets portion 1850B as a background in response to touch 1856 without requiring display of user interface object 1860 and selection of affordance 1862. For example, device 600 may directly set portion 1850B as a background if touch 1856 is a multi-finger gesture or a multi-tap gesture, or in accordance with a determination that a characteristic intensity of touch 1856 exceeds a predetermined threshold.

Figure 19:
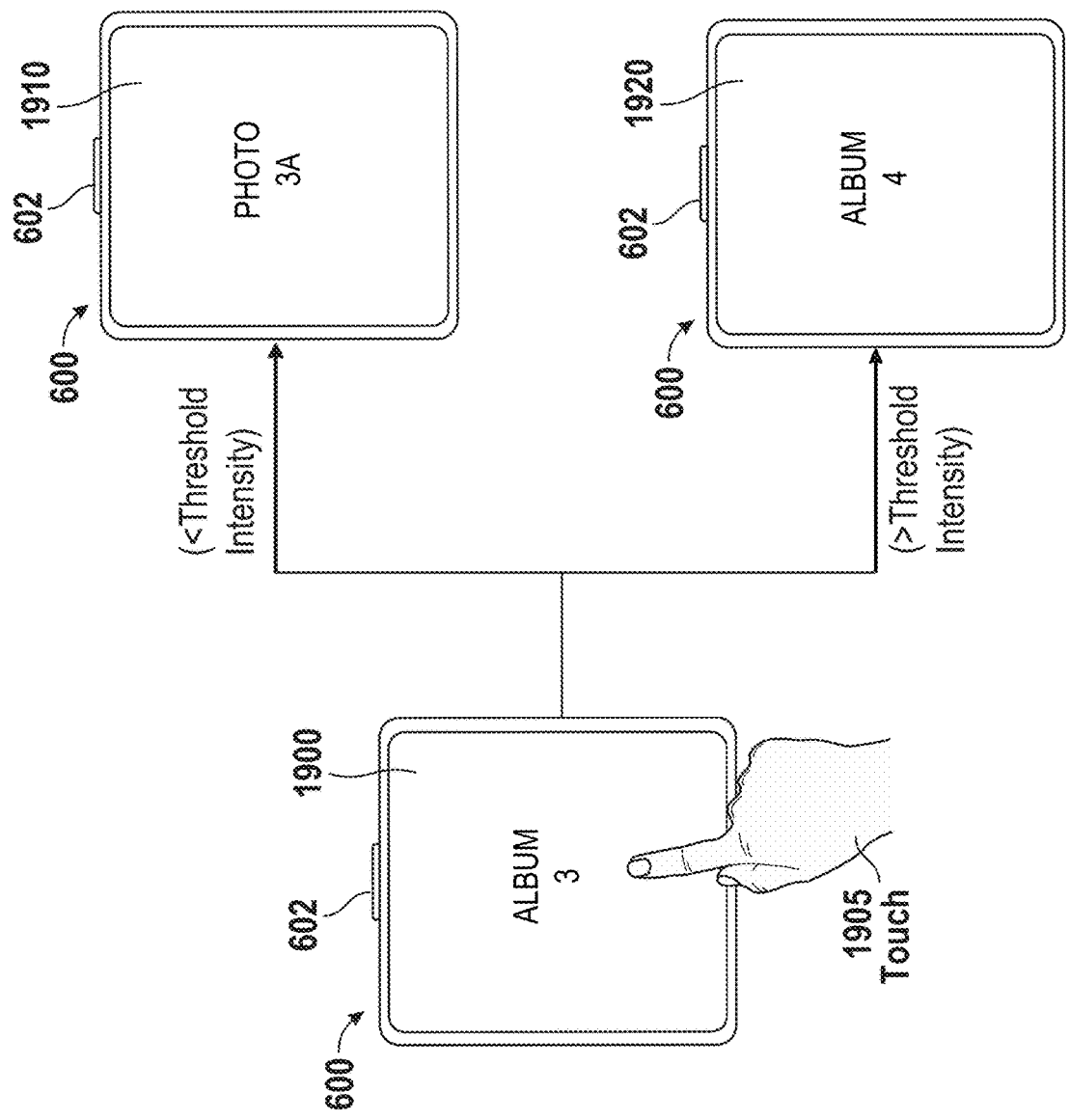
FIG. 19 illustrates exemplary photos application user interfaces in accordance with some embodiments.

In some embodiments, device 600 determines a measurement of the characteristic intensity of a contact while a cover image is displayed and provides different responses based on the intensity. FIG. 19 illustrates an exemplary response of device 600 to touch 1905 on the touch-sensitive display while cover image 1900 for an album is displayed. Cover image 1900 is indicative of a collection of photos labeled Album 3. Device 600 detects a contact associated with touch 1905. As indicated in FIG. 19, if device 600 determines that the characteristic intensity of the contact is below a threshold, device 600 replaces cover image 1900 with a user interface displaying a photo from the album indicated by the cover image. In FIG. 18, device 600 displays photo 3A, which may be the first photo in Album 3. If device 600 determines that the characteristic intensity of the contact is above the threshold, device 600 replaces cover image 1900 with a display of a cover image indicative of a different collection of photos. In the depicted example, device 600 replaces cover image 1900 with a display of a cover image 1920 indicative of a collection labeled Album 4. In some embodiments, device 600 replaces cover image 1900 with a display of a cover image indicative of a different collection of photos in response to a swipe gesture (e.g., from right to left) on the touch-sensitive display while cover image 1900 is displayed.

Figure 20:
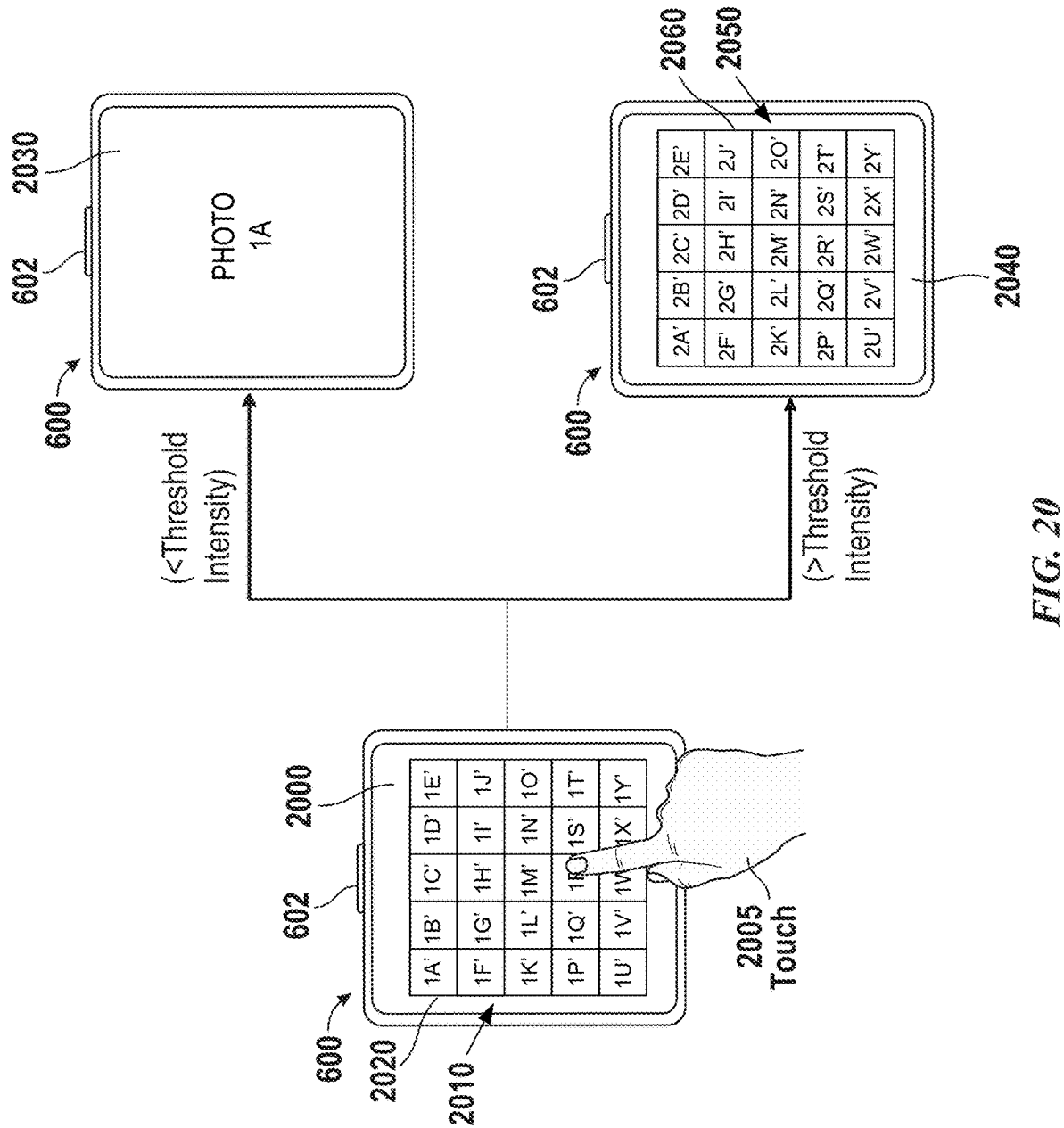
FIG. 20 illustrates exemplary photos application user interfaces in accordance with some embodiments.

In some embodiments, device 600 determines a measurement of the characteristic intensity of a contact while a composite image is displayed and provides different responses based on the intensity. FIG. 20 illustrates an exemplary response of device 600 to touch 2005 on the touch-sensitive display while user interface 2000 including view 2010 of composite image 2020 is displayed. Composite image 2020 may include representations of photos in a first collection of photos. Device 600 detects a contact associated with touch 2005. As illustrated in FIG. 20, if device 600 determines that the characteristic intensity of the contact is below a threshold, device 600 replaces the display of user interface 2000 (including composite image 2020) with a display of a photo from the collection represented by the displayed composite image (e.g., image 2020). In FIG. 20, device 600 displays photo 1A, which may be the first photo in the corresponding collection. If device 600 determines that the characteristic intensity of the contact is above the threshold, device 600 replaces the display of user interface 2000 with a display of a user interface including a composite image corresponding to a different collection of photos. In the example illustrated in FIG. 20, device 600 replaces composite image 2020 with a display of composite image 2060 corresponding to a second collection. In some embodiments, device 600 replaces the display of a first composite image associated with a collection of photos with a display of a second composite image associated with another collection of photos in response to a swipe gesture (e.g., from right to left) on the touch-sensitive display while the first composite image is displayed.

Attention is now directed to techniques for indicating the position of a user interface among a plurality of user interfaces. FIG. 21A shows an exemplary user interface 2100 including a vertical list of affordances corresponding to different collections of photos. User interface 2100 also includes affordances 2102 and 2104 indicating the position of user interface 2100 among a plurality of user interfaces. Affordances 2012 and 2104 may enlarge, darken, or otherwise change in visual appearance when the corresponding user interface is displayed. In the exemplary implementation illustrated by user interface 2100, affordances 2102 and 2104 are paging dots. The number of dots may indicate the number of user interfaces in the plurality of user interfaces. On user interface 2100, affordance 2102 is highlighted to indicate that user interface 2100 is the first of two user interfaces, the user interfaces being in order from left to right.

FIG. 21B shows an exemplary user interface 2120 including displayed photos. In some embodiments, the photos displayed on user interface 2120 include photos designated by a user (e.g., "favorites") and/or photos from a photo stream. Photos may be designated or added to a photo stream using an external device for viewing on device 600. User interface 2120 also includes affordances 2102 and 2104 indicating the position of user interface 2120 with respect to user interface 2100. On user interface 2120, affordance 2104 is highlighted to indicate that user interface 2120 is the second of the two user interfaces depicted in FIGS. 21A-21B.

Device 600 may replace the display of user interface 2100 with the display of user interface 2120 in response to a user interaction with the touch-sensitive display. As indicated by FIGS. 21A-21B, a user may switch the display from user interface 2100 to 2120 with a swipe gesture indicated by swipe 2105.

FIG. 21C shows another exemplary user interface 2130 that may be displayed on the display of device 600 in response to swipe 2105 on user interface 2100. Instead of displaying photos as in user interface 2120, user interface 2130 includes a list of affordances corresponding to photo streams that may be available for display. Also, affordance 2104 is highlighted to indicate that user interface 2130 is the second of two available user interfaces.

FIG. 21C also depicts a tap 2135 on an affordance associated with a photo stream, Stream 3. FIG. 21D shows user interface 2140, which may be displayed in response to tap 2135. User interface 2140 includes a display of photos included in Stream 3. That is, in response to selection of an affordance corresponding to a photo stream (e.g., Stream 3), device 600 may replace the display of user interface 2130 with the display of user interface 2140.

Figure 22:
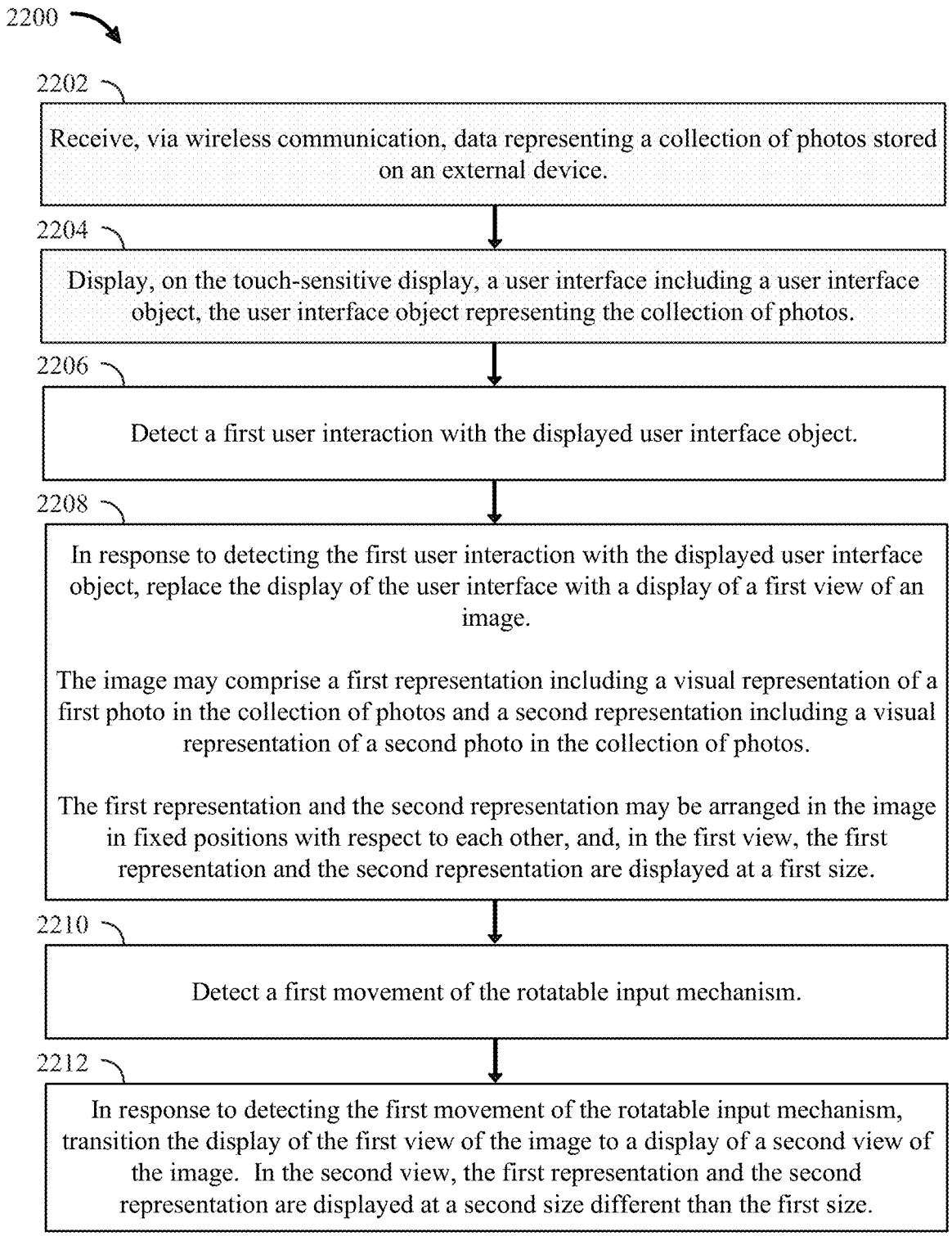
FIG. 22 is a flow diagram illustrating a process for displaying photos on an electronic device in accordance with some embodiments.

FIG. 22 is a flow diagram illustrating a method 2200 for accessing, navigating, and displaying photos using an electronic device in accordance with some embodiments. Method 2200 is performed at a device (e.g., 100, 300, 500) with a touch-sensitive display and a rotatable input mechanism. Some operations in method 2200 may be combined, the order of some operations may be changed, and some operations may be omitted.

As described below, method 2200 provides an intuitive way to access and view a collection of photos, which allows a user to quickly and easily locate a desired photo on a reduced size user interface. The method reduces the cognitive burden on a user when browsing a collection of photos, thereby creating a more efficient human-machine interface. For battery-operated computing devices, enabling a user to view photos more quickly and more efficiently conserves power and increases the time between battery charges.

At block 2202, the electronic device receives, via wireless communication, data representing a collection of photos stored on an external device (e.g., 650). At block 2204, the electronic device displays, on the touch-sensitive display (e.g., 112, 340, 504), a user interface (e.g., 610, 1010, 1020) including a user interface object (e.g., 620, 1011-1014 1021-1024, 1120), the user interface object representing the collection of photos. At block 2206, the electronic device detects a first user interaction (e.g., 700, 1005, 1100) with the displayed user interface object. At block 2208, in response to detecting the first user interaction with the displayed user interface object, the electronic device replaces the display of the user interface with a display of a first view (e.g., 1140, 1210, 1310, 1410, 1510, 1610, 1710, 2010) of an image (e.g., 1150, 1220, 1320, 1420, 1520, 1620, 1720, 2020). The image may comprise a first representation (e.g., 1151, 1221, 1421) including a visual representation of a first photo in the collection of photos and a second representation including a visual representation of a second photo in the collection of photos. The first representation and the second representation may be arranged in the image in fixed positions with respect to each other, and, in the first view, the first representation and the second representation are displayed at a first size. At block 2210, the electronic device detects a first movement (e.g., 1315) of the rotatable input mechanism (e.g., 506, 602). At block 2212, in response to detecting the first movement of the rotatable input mechanism, the electronic device transitions the display of the first view of the image to a display of a second view of the image (e.g., 1340). In the second view, the first representation and the second representation are displayed at a second size different than the first size.

Note that details of the processes described above with respect to method 2200 (e.g., FIG. 22) are also applicable in an analogous manner to the methods described below. For example, methods 2300-2600 may include one or more of the characteristics of the various methods described above with reference to method 2200. For example, the user interface objects, views of an image, visual representations, and other user interface elements described above with reference to method 2200 optionally have one or more of the characteristics of the user interface objects, views of an image, visual representations, and other user interface elements described herein (e.g., methods 2300-2600). For brevity, these details are not repeated below.

Figure 23:
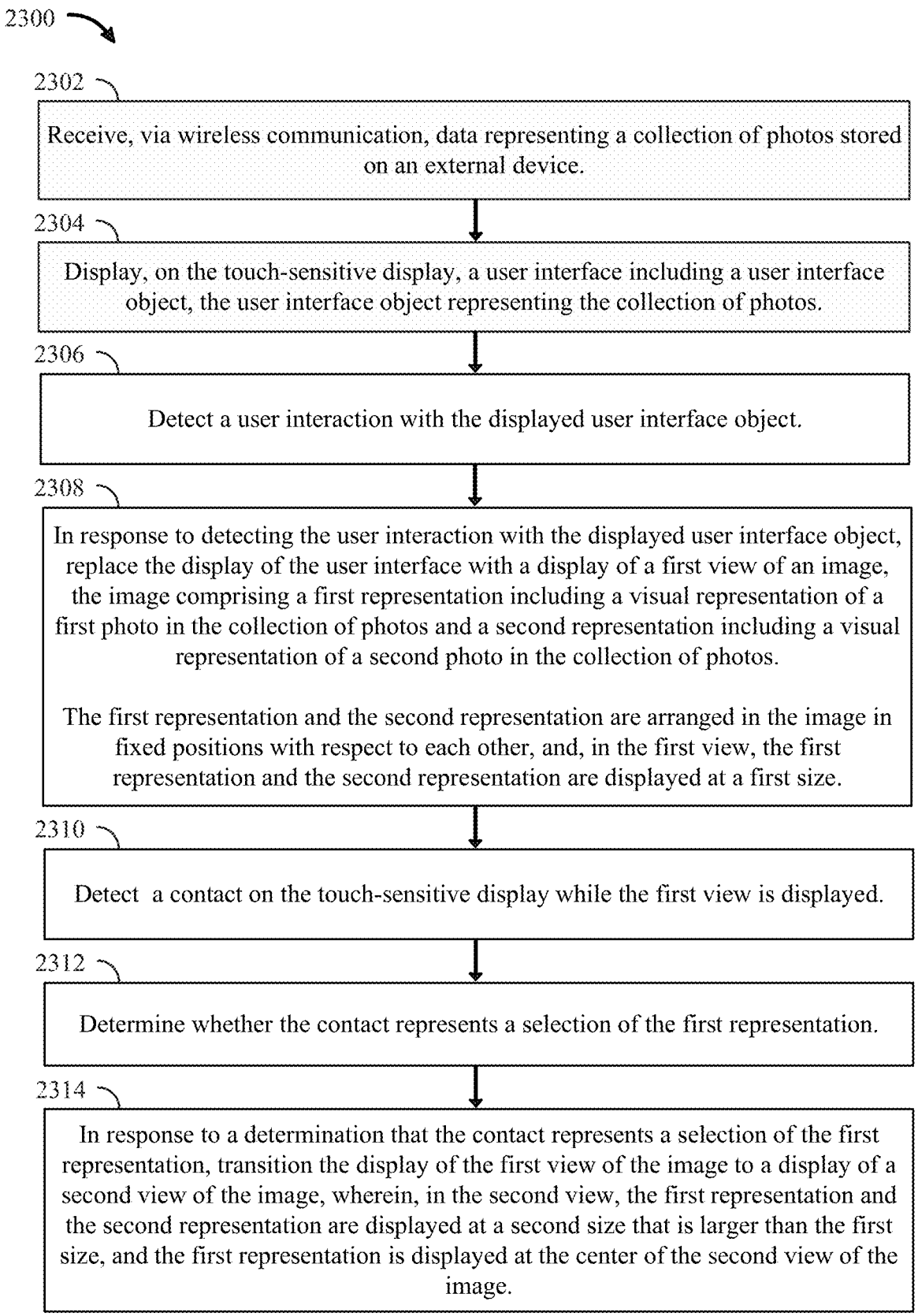
FIG. 23 is a flow diagram illustrating a process for displaying photos on an electronic device in accordance with some embodiments.

FIG. 23 is a flow diagram illustrating a method 2300 for accessing, navigating, and displaying photos using an electronic device in accordance with some embodiments. Method 2300 is performed at a device (e.g., 100, 300, 500) with a touch-sensitive display and a rotatable input mechanism. Some operations in method 2300 may be combined, the order of some operations may be changed, and some operations may be omitted.

As described below, method 2300 provides an intuitive way to access and view a collection of photos, which allows a user to quickly and easily locate a desired photo on a reduced size user interface. The method reduces the cognitive burden on a user when browsing a collection of photos, thereby creating a more efficient human-machine interface. For battery-operated computing devices, enabling a user to view photos more quickly and more efficiently conserves power and increases the time between battery charges.

At block 2302, the electronic device receives, via wireless communication, data representing a collection of photos stored on an external device (e.g., 650). At block 2304, the electronic device displays, on the touch-sensitive display (e.g., 112, 340, 504), a user interface (e.g., 610, 1010, 1020) including a user interface object (e.g., 620, 1011-1014 1021-1024, 1120), the user interface object representing the collection of photos. At block 2306, the electronic device detects a user interaction (e.g., 700, 1005, 1100) with the displayed user interface object. At block 2308, in response to detecting the user interaction with the displayed user interface object, the electronic device replaces the display of the user interface with a display of a first view (e.g., 1140, 1210, 1310, 1410, 1510, 1610, 1710, 2010) of an image (e.g., 1150, 1220, 1320, 1420, 1520, 1620, 1720, 2020), the image comprising a first representation (e.g., 1151, 1221, 1421) including a visual representation of a first photo in the collection of photos and a second representation including a visual representation of a second photo in the collection of photos. The first representation and the second representation are arranged in the image in fixed positions with respect to each other, and, in the first view, the first representation and the second representation are displayed at a first size. At block 2310, the electronic device detects a contact (e.g., 1405) on the touch-sensitive display while the first view is displayed. At block 2312, the electronic device determines whether the contact represents a selection of the first representation (e.g., 1421). At block 2314, in response to a determination that the contact represents a selection of the first representation, the electronic device transitions the display of the first view of the image to a display of a second view (e.g., 1440) of the image, wherein, in the second view, the first representation and the second representation are displayed at a second size that is larger than the first size, and the first representation is displayed at the center of the second view of the image.

Note that details of the processes described above with respect to method 2300 (e.g., FIG. 23) are also applicable in an analogous manner to the methods described below. For example, methods 2200 and 2400-2600 may include one or more of the characteristics of the various methods described above with reference to method 2300. For example, the user interface objects, views of an image, visual representations, and other user interface elements described above with reference to method 2300 optionally have one or more of the characteristics of the user interface objects, views of an image, visual representations, and other user interface elements described herein (e.g., methods 2200 and 2400-2600). For brevity, these details are not repeated below.

Figure 24:
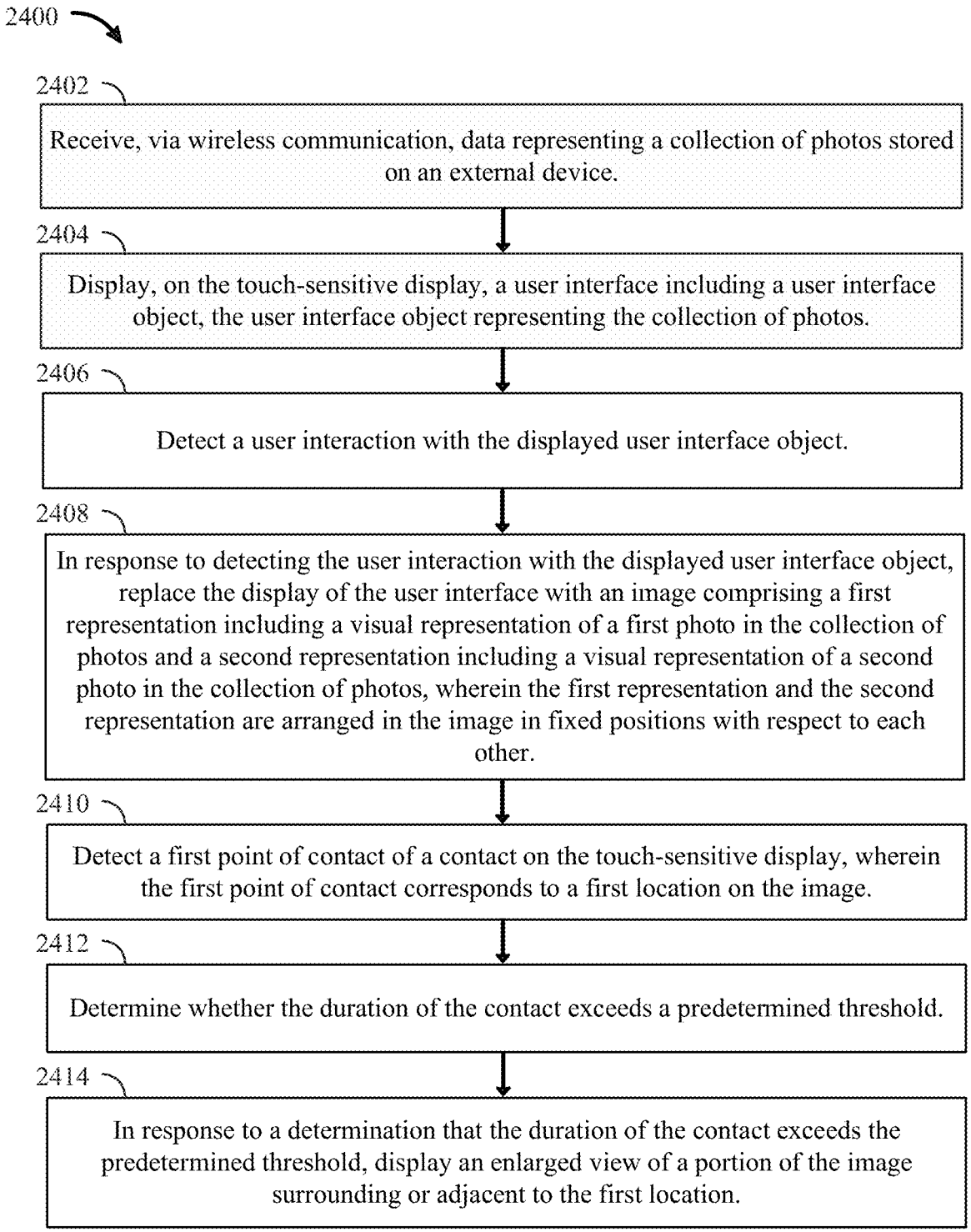
FIG. 24 is a flow diagram illustrating a process for displaying photos on an electronic device in accordance with some embodiments.

FIG. 24 is a flow diagram illustrating a method 2400 for accessing, navigating, and displaying photos using an electronic device in accordance with some embodiments. Method 2400 is performed at a device (e.g., 100, 300, 500) with a touch-sensitive display and a rotatable input mechanism. Some operations in method 2400 may be combined, the order of some operations may be changed, and some operations may be omitted.

As described below, method 2400 provides an intuitive way to access and view a collection of photos, which allows a user to quickly and easily locate a desired photo on a reduced size user interface. The method reduces the cognitive burden on a user when browsing a collection of photos, thereby creating a more efficient human-machine interface. For battery-operated computing devices, enabling a user to view photos more quickly and more efficiently conserves power and increases the time between battery charges.

At block 2402, the electronic device receives, via wireless communication, data representing a collection of photos stored on an external device (e.g., 650). At block 2404, the electronic device displays, on the touch-sensitive display (e.g., 112, 340, 504), a user interface (e.g., 610, 1010, 1020) including a user interface object (e.g., 620, 1011-1014 1021-1024, 1120), the user interface object representing the collection of photos. At block 2406, the electronic device detects a user interaction (e.g., 700, 1005, 1100) with the displayed user interface object. At block 2408, in response to detecting the user interaction with the displayed user interface object, the electronic device replaces the display of the user interface with an image (e.g., 1150, 1220, 1320, 1420, 1520, 1620, 1720, 2020) comprising a first representation (e.g., 1151, 1221, 1421) including a visual representation of a first photo in the collection of photos and a second representation including a visual representation of a second photo in the collection of photos, wherein the first representation and the second representation are arranged in the image in fixed positions with respect to each other. At block 2410, the electronic device detects a first point of contact of a contact (e.g., 1505) on the touch-sensitive display, wherein the first point of contact corresponds to a first location on the image. At block 2412, the electronic device determines whether the duration of the contact exceeds a predetermined threshold. At block 2414, in response to a determination that the duration of the contact exceeds the predetermined threshold, the electronic device displays an enlarged view (e.g., 1530) of a portion of the image surrounding or adjacent to the first location.

Note that details of the processes described above with respect to method 2400 (e.g., FIG. 24) are also applicable in an analogous manner to the methods described below. For example, methods 2200, 2300 and 2500-2600 may include one or more of the characteristics of the various methods described above with reference to method 2400. For example, the user interface objects, views of an image, visual representations, and other user interface elements described above with reference to method 2400 optionally have one or more of the characteristics of the user interface objects, views of an image, visual representations, and other user interface elements described herein (e.g., methods 2200, 2300 and 2500-2600). For brevity, these details are not repeated below.

Figure 25:
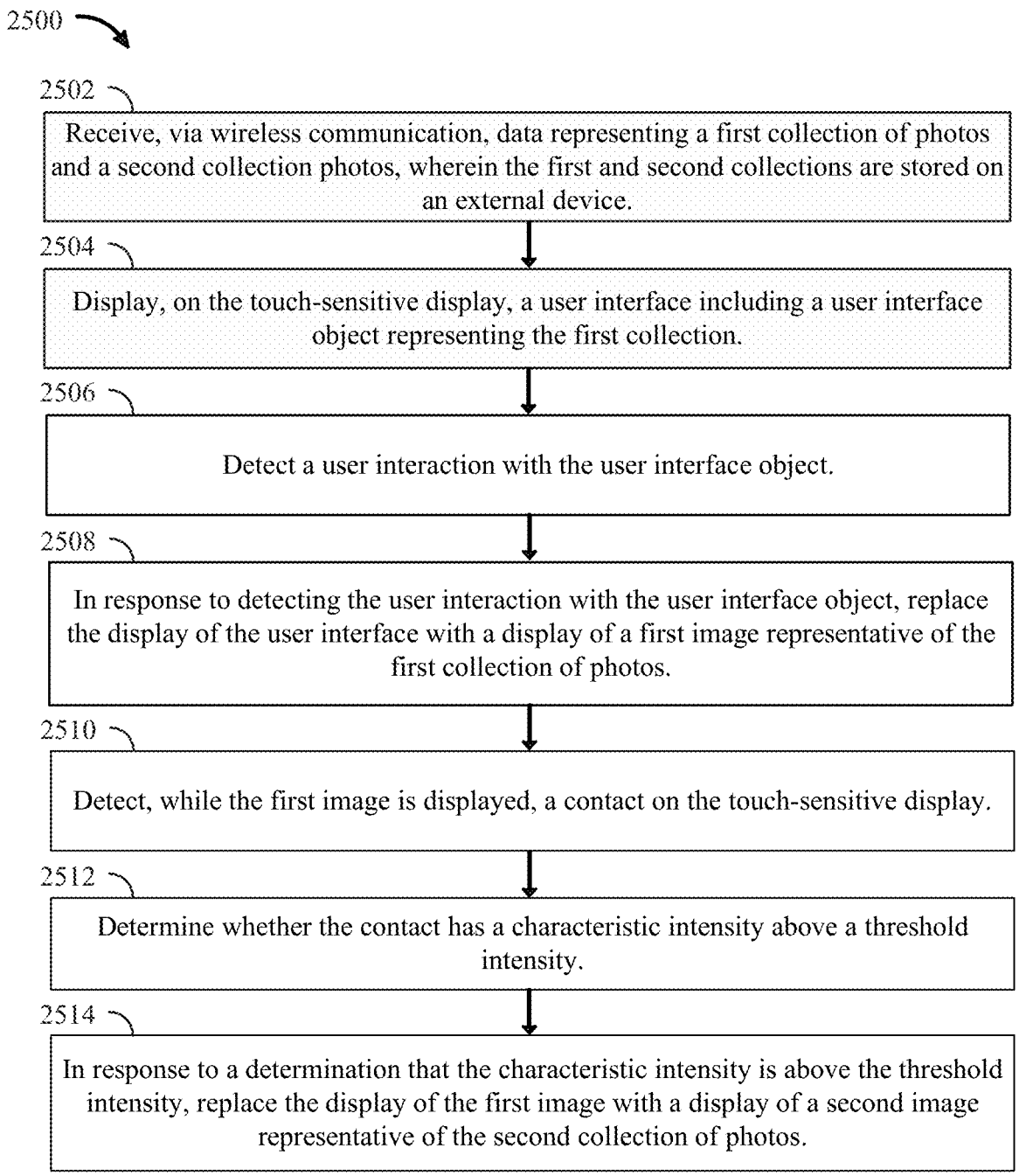
FIG. 25 is a flow diagram illustrating a process for displaying photos on an electronic device in accordance with some embodiments.

FIG. 25 is a flow diagram illustrating a method 2500 for accessing, navigating, and displaying photos using an electronic device in accordance with some embodiments. Method 2500 is performed at a device (e.g., 100, 300, 500) with a touch-sensitive display and a rotatable input mechanism. Some operations in method 2500 may be combined, the order of some operations may be changed, and some operations may be omitted.

As described below, method 2500 provides an intuitive way to access and view a collection of photos, which allows a user to quickly and easily locate a desired photo on a reduced size user interface. The method reduces the cognitive burden on a user when browsing a collection of photos, thereby creating a more efficient human-machine interface. For battery-operated computing devices, enabling a user to view photos more quickly and more efficiently conserves power and increases the time between battery charges.

At block 2502, the electronic device receives, via wireless communication, data representing a first collection of photos and a second collection of photos, wherein the first and second collections are stored on an external device (e.g., 650). At block 2504, the electronic device displays, on the touch-sensitive display (e.g., 112, 340, 504), a user interface (e.g., 610, 1010, 1020) including a user interface object (e.g., 620, 1011-1014 1021-1024, 1120) representing the first collection. At block 2506, the electronic device detects a user interaction (e.g., 700, 1005, 1100) with the user interface object. At block 2508, in response to detecting the user interaction with the user interface object, the electronic device replaces the display of the user interface with a display of a first image (e.g., 1120, 1150, 1220, 1320, 1420, 1520, 1620, 1720, 1900, 2020) representative of the first collection of photos. At block 2510, the electronic device detects, while the first image is displayed, a contact, on the touch-sensitive display. At block 2512, the electronic device determines whether the contact has a characteristic intensity above a threshold intensity. At block 2514, in response to a determination that the characteristic intensity is above the threshold intensity, the electronic device replaces the display of the first image with a display of a second image (e.g., 1920, 2060) representative of the second collection of photos.

Note that details of the processes described above with respect to method 2500 (e.g., FIG. 25) are also applicable in an analogous manner to the methods described below. For example, methods 2200-2400 and 2600 may include one or more of the characteristics of the various methods described above with reference to method 2500. For example, the user interface objects, views of an image, visual representations, and other user interface elements described above with reference to method 2500 optionally have one or more of the characteristics of the user interface objects, views of an image, visual representations, and other user interface elements described herein (e.g., methods 2200-2400 and 2600). For brevity, these details are not repeated below.

Figure 26:
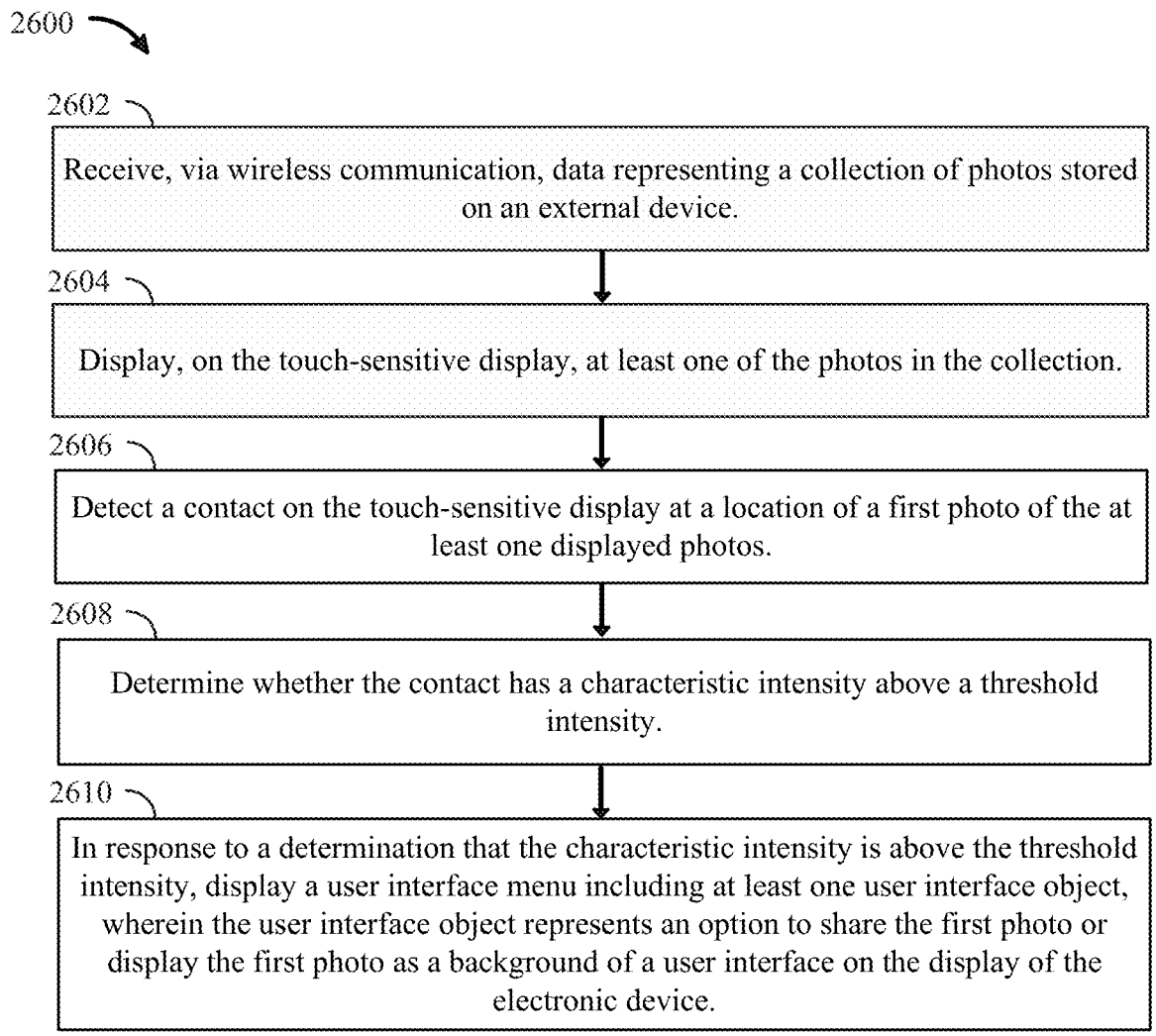
FIG. 26 is a flow diagram illustrating a process for displaying photos on an electronic device in accordance with some embodiments.

FIG. 26 is a flow diagram illustrating a method 2600 for accessing, navigating, and displaying photos using an electronic device in accordance with some embodiments. Method 2600 is performed at a device (e.g., 100, 300, 500) with a touch-sensitive display and a rotatable input mechanism. Some operations in method 2600 may be combined, the order of some operations may be changed, and some operations may be omitted.

As described below, method 2600 provides an intuitive way to access and view a collection of photos, which allows a user to quickly and easily locate a desired photo on a reduced size user interface. The method reduces the cognitive burden on a user when browsing a collection of photos, thereby creating a more efficient human-machine interface. For battery-operated computing devices, enabling a user to view photos more quickly and more efficiently conserves power and increases the time between battery charges.

At block 2602, the electronic device receives, via wireless communication, data representing a collection of photos stored on an external device (e.g., 650). At block 2604, the electronic device displays, on the touch-sensitive display (e.g., 112, 340, 504), at least one of the photos in the collection. At block 2606, the electronic device detects a contact on the touch-sensitive display at a location of a first photo of the at least one displayed photos. At block 2608, the electronic device determines whether the contact has a characteristic intensity above a threshold intensity. At block 2610, in response to a determination that the characteristic intensity is above the threshold intensity, the electronic device displays a user interface menu (e.g., 1810, 1840) including at least one user interface object, wherein the user interface object represents an option to share the first photo or display the first photo as a background of a user interface on the display of the electronic device.

Process 2600 provides an intuitive way to access an options menu while viewing a photo on a reduced size user interface, which allows a user to quickly and easily share the photo or set the photo as a background on the device. The method reduces the cognitive burden on a user when selecting an option associated with the photo, thereby creating a more efficient human-machine interface. For battery-operated computing devices, enabling a user to view photos more quickly and more efficiently conserves power and increases the time between battery charges.

Note that details of the processes described above with respect to method 2600 (e.g., FIG. 26) are also applicable in an analogous manner to the methods described below. For example, methods 2200-2500 may include one or more of the characteristics of the various methods described above with reference to method 2600. For example, the user interface objects, views of an image, visual representations, and other user interface elements described above with reference to method 2600 optionally have one or more of the characteristics of the user interface objects, views of an image, visual representations, and other user interface elements described herein (e.g., methods 2200-2500). For brevity, these details are not repeated below.

Figure 27:
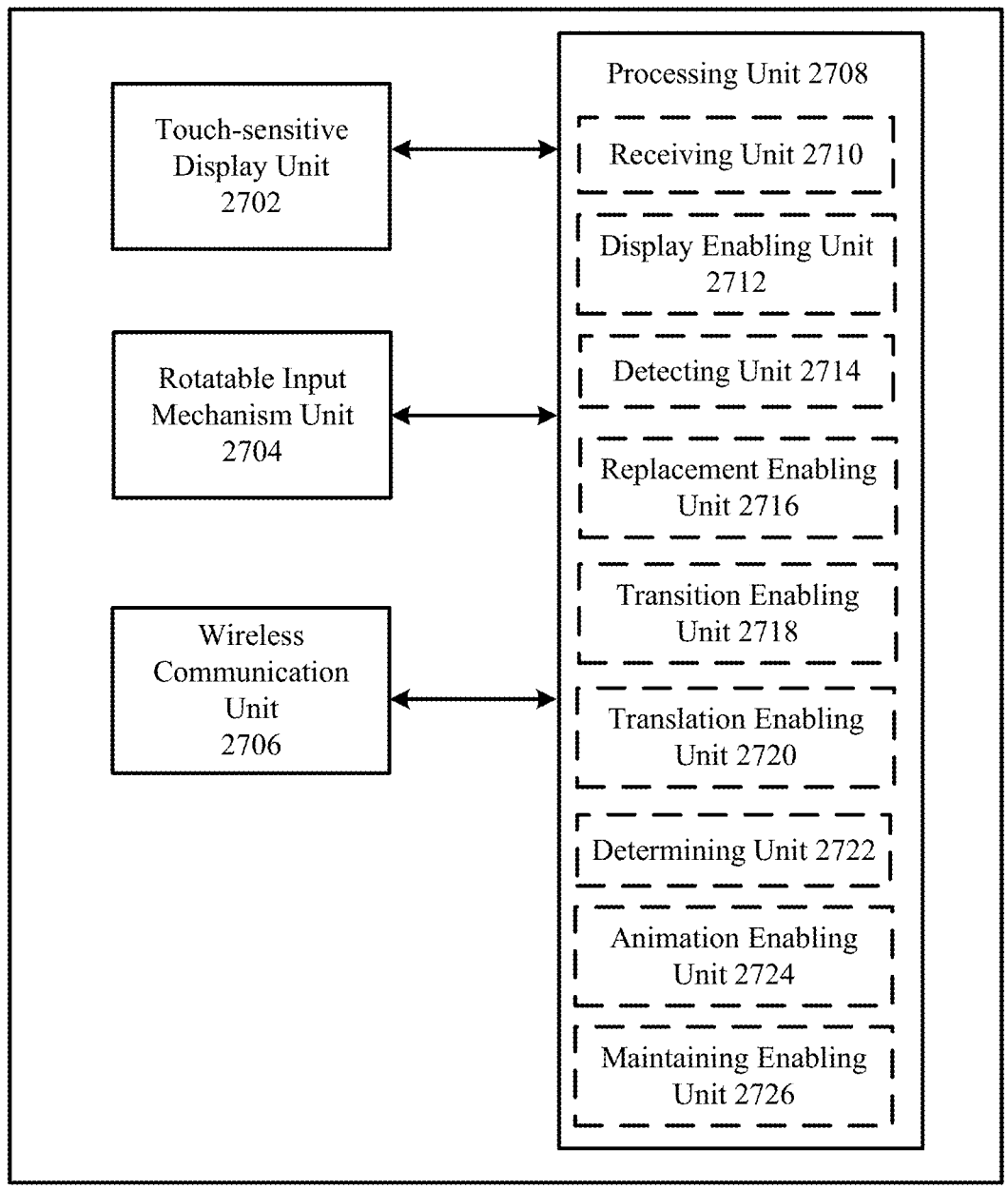
FIG. 27 is a functional block diagram of an electronic device in accordance with some embodiments.

In accordance with some embodiments, FIG. 27 shows a functional block diagram of an electronic device 2700 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 27 are, optionally, combined or separated into sub-blocks to implement the principles of the various described embodiments. Therefore, the description herein optionally supports any possible combination or separation or further definition of the functional blocks described herein.

As shown in FIG. 27, an electronic device 2700 includes a touch-sensitive display unit 2702 configured to display a graphic user interface, a rotatable input mechanism unit 2704 configured to receive rotational input, wireless communication unit 2706 configured to transmit and receive wireless communication, and a processing unit 2708 coupled to the touch-sensitive display unit 2702, the rotatable input mechanism unit 2704, and the wireless communication unit 2706. In some embodiments, the processing unit 2708 includes a receiving unit 2710, a display enabling unit 2712, a detecting unit 2714, a replacement enabling unit 2716, a transition enabling unit 2718, a translation enabling unit 2720, a determining unit 2722, an animation enabling unit 2724, and a maintaining enabling unit 2726.

Processing unit 2708 is configured to receive (e.g., with receiving unit 2710), via wireless communication by the wireless communication unit 2706, data representing a collection of photos stored on an external device; enable display (e.g., with display enabling unit 2712), on the touch-sensitive display unit 2702, of a user interface including a user interface object, the user interface object representing the collection of photos; and detect (e.g., with detecting unit 2714) a first user interaction with the displayed user interface object. The processing unit 2708 is further configured to, in response to detecting the first user interaction with the displayed user interface object, enable replacement of the display (e.g., with replacement enabling unit 2716) of the user interface with a display of a first view of an image, the image comprising a first representation including a visual representation of a first photo in the collection of photos and a second representation including a visual representation of a second photo in the collection of photos, where the first representation and the second representation are arranged in the image in fixed positions with respect to each other, and where, in the first view, the first representation and the second representation are displayed at a first size. The processing unit 2708 is further configured to detect (e.g., with detecting unit 2714) a first movement of the rotatable input mechanism unit 2704; and, in response to detecting the first movement of the rotatable input mechanism unit 2704, enable transition (e.g., with transition enabling unit 2718) from the display of the first view of the image to a display of a second view of the image, where, in the second view, the first representation and the second representation are displayed at a second size different than the first size.

In some embodiments, the first size is larger than the second size.

In some embodiments, the first size is smaller than the second size.

In some embodiments, the portion of the image displayed at the center of the first view is displayed at the center of the second view.

In some embodiments, the image further comprises a third representation, where, in the first view, the third representation includes a visual representation of the entire third photo, and where, in the second view, the third representation includes a visual representation of less than the entire third photo.

In some embodiments, processing unit 2708 is further configured to detect (e.g., with detecting unit 2714) a first movement of a physical object on or near the touch-sensitive display unit 2702; and, while detecting the first movement, enable translation (e.g., with translation enabling unit 2720) of the image displayed on the touch-sensitive display unit 2702 in a first direction to enable display of a previously hidden edge of the image. Processing unit 2708 is further configured to, in response to display of the previously hidden edge of the image and continued detection of the first movement, enable display (e.g., by display enabling unit 2712) of an area beyond the edge of the image, and, after the first movement is no longer detected, enable translation (e.g., by translation enabling unit 2718) of the image in a second direction until the area beyond the edge of the image is no longer displayed.

In some embodiments, the first representation includes a first affordance, and processing unit 2708 is further configured to detect (e.g., with detecting unit 2714) a contact on the touch-sensitive display unit 2702 while the image is displayed, determine (e.g., with determining unit 2722) whether the contact represents a selection of the first affordance, and, in response to a determination that the contact represents a selection of the first affordance, enable replacement (e.g., with replacement enabling unit 2716) of the display of the image with a display of the first photo.

In some embodiments, processing unit 2708 is further configured to detect (e.g., with detecting unit 2714), while the first photo is displayed, a second user interaction, and, in response to detecting the second user interaction, enable replacement (e.g., with replacement enabling unit 2716) of the display of the first photo with a display of a fourth photo, wherein the fourth photo corresponds to a fourth representation that is adjacent to the first representation in the image.

In some embodiments, the second user interaction is a tap gesture on the touch-sensitive display unit 2702.

In some embodiments, the second user interaction is a swipe on the touch-sensitive display unit 1702.

In some embodiments, the second user interaction is a movement of the rotatable input mechanism unit 2704.

In some embodiments, enabling replacement of the display of the first photo with the display of the fourth photo comprises enabling translation (e.g., with translation enabling unit 2720) of the display of the first photo off of the display to reveal the fourth photo displayed at a third size, and enabling transition (e.g., with transition enabling unit 2718) of the display of the fourth photo from the third size to a fourth size, wherein the fourth size is larger than the third size.

In some embodiments, enabling transition of the display of the fourth photo from the third size to the fourth size includes enabling animation (e.g., with animation enabling unit 2724) of the fourth photo enlarging from the third size to the fourth size.

In some embodiments, processing unit 2708 is further configured to, in response to a determination that the contact does not represent a selection of the first affordance, enable maintaining the display of the image on the display.

In some embodiments, the user interface object is an icon representing a photos application program.

In some embodiments, the user interface object is an icon representing an electronic folder containing the collection of photos.

In some embodiments, the first user interaction with the displayed user interface object is a tap gesture.

In some embodiments, the first representation and the second representation are thumbnail images of the corresponding photos.

In some embodiments, the electronic device is a wearable electronic device.

In some embodiments, the external device is a smartphone.

In some embodiments, the first representation and the second representation are arranged in a rectilinear grid pattern.

The operations described above with reference to FIG. 22 are, optionally, implemented by components depicted in FIGS. 1A-1B, and 27. For example, the operations described with reference to blocks 2206 and/or 2208 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B, and 27.

Figure 28:
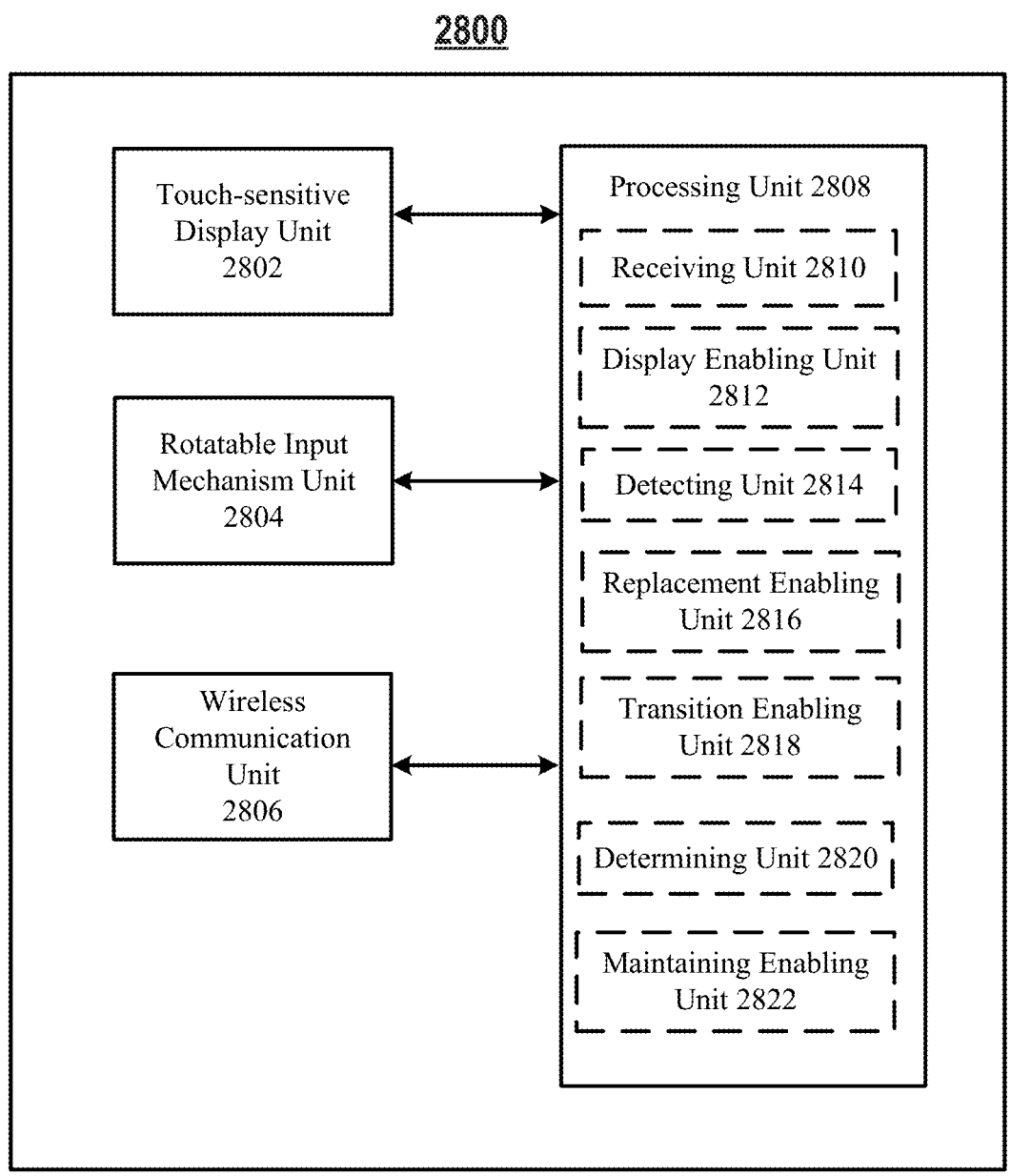
FIG. 28 is a functional block diagram of an electronic device in accordance with some embodiments.

In accordance with some embodiments, FIG. 28 shows a functional block diagram of an electronic device 2800 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 28 are, optionally, combined or separated into sub-blocks to implement the principles of the various described embodiments. Therefore, the description herein optionally supports any possible combination or separation or further definition of the functional blocks described herein.

As shown in FIG. 28, an electronic device 2800 includes a touch-sensitive display unit 2802 configured to display a graphic user interface and receive contacts, a rotatable input mechanism unit 2804 configured to receive rotational input, a wireless communication unit 2806 configured to transmit and receive wireless communication, and a processing unit 2808 coupled to the touch-sensitive display unit 2802, the rotatable input mechanism unit 2804, and the wireless communication unit 2806.

Processing unit 2808 is configured to receive (e.g., with receiving unit 2810), via wireless communication by the wireless communication unit 2806, data representing a collection of photos stored on an external device; enable display (e.g., with display enabling unit 2812), on the touch-sensitive display unit 2802, of a user interface including a user interface object, the user interface object representing the collection of photos; and detect (e.g., with detecting unit 2814) a user interaction with the displayed user interface object. Processing unit 2808 is further configured to, in response to detecting the user interaction with the displayed user interface object, enable replacement (e.g., with replacement enabling unit 2816) of the display of the user interface with a display of a first view of an image, the image comprising a first representation including a visual representation of a first photo in the collection of photos and a second representation including a visual representation of a second photo in the collection of photos, where the first representation and the second representation are arranged in the image in fixed positions with respect to each other, and where, in the first view, the first representation and the second representation are displayed at a first size. Processing unit 2808 is further configured to detect (e.g., with detecting unit 2814) a contact on the touch-sensitive display unit 2802 while the first view is displayed; determine (e.g., with determining unit 2820) whether the contact represents a selection of the first representation; and, in response to a determination that the contact represents a selection of the first representation, enable transition (e.g., with transition enabling unit 2818) from the display of the first view of the image to a display of a second view of the image, where, in the second view, the first representation and the second representation are displayed at a second size that is larger than the first size, and where the first representation is displayed at the center of the second view of the image.

In some embodiments, processing unit 2808 is further configured to, in response to a determination that the contact does not represent a selection of the first representation, enable maintaining (e.g., with maintaining enabling unit 2822) the display of the first view of the image on the touch-sensitive display unit 2802.

In some embodiments, the user interface object is an icon representing a photos application program.

In some embodiments, the user interface object is an icon representing an electronic folder containing the collection of photos.

In some embodiments, the first user interaction with the displayed user interface object is a tap gesture.

In some embodiments, the first representation and the second representation are thumbnail images of the corresponding photos.

In some embodiments, the electronic device is a wearable electronic device.

In some embodiments, the external device is a smartphone.

In some embodiments, the first representation and the second representation are arranged in a rectilinear grid pattern.

The operations described above with reference to FIG. 23 are, optionally, implemented by components depicted in FIGS. 1A-1B, and 28. For example, the operations described with reference to blocks 2306 and/or 2308 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B, and 28.

Figure 29:
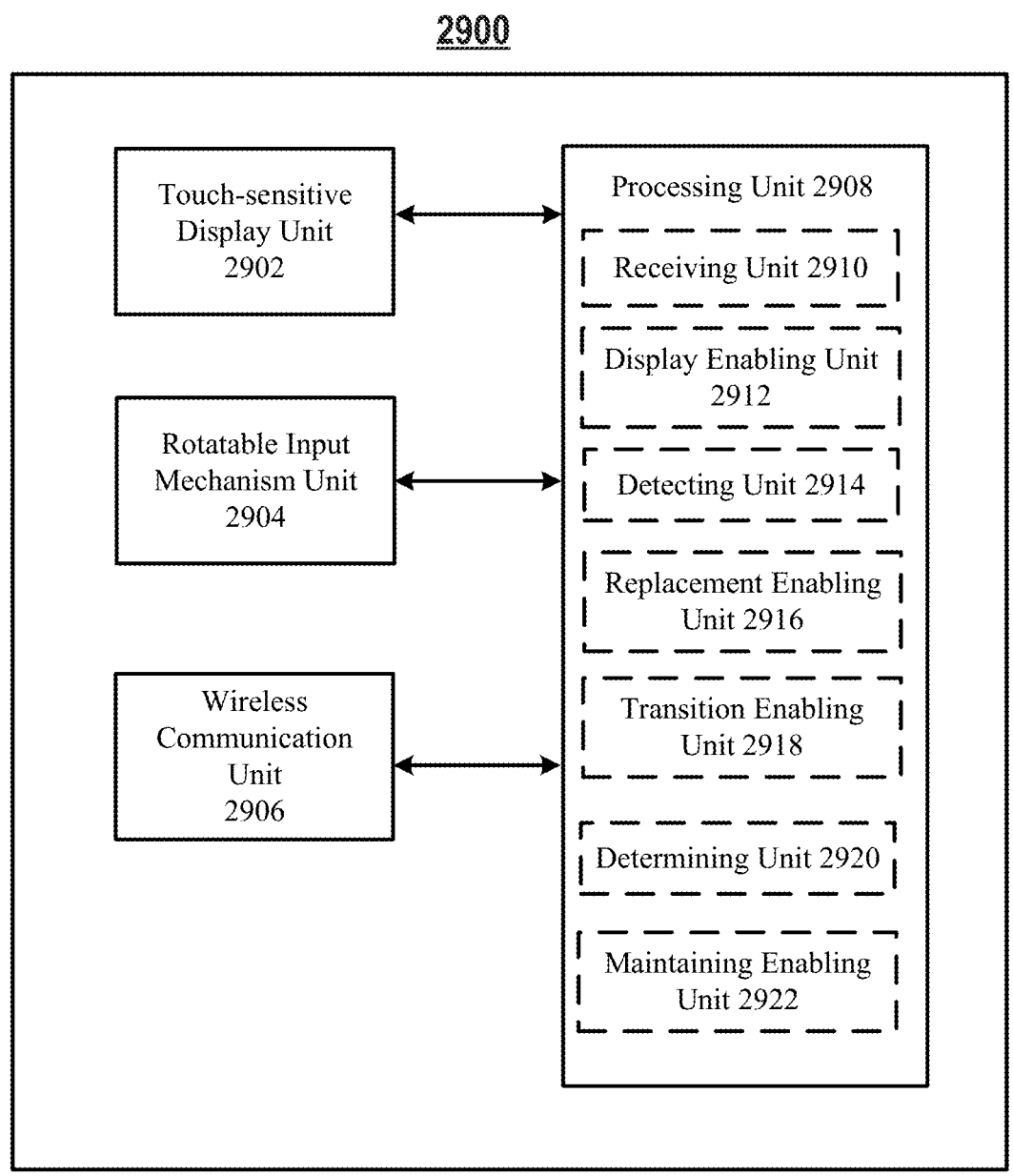
FIG. 29 is a functional block diagram of an electronic device in accordance with some embodiments.

In accordance with some embodiments, FIG. 29 shows a functional block diagram of an electronic device 2900 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 29 are, optionally, combined or separated into sub-blocks to implement the principles of the various described embodiments. Therefore, the description herein optionally supports any possible combination or separation or further definition of the functional blocks described herein.

As shown in FIG. 29, an electronic device 2900 includes a touch-sensitive display unit 2902 configured to display a graphic user interface and receive contacts, a rotatable input mechanism unit 2904 configured to receive rotational input, a wireless communication unit 2906 configured to transmit and receive wireless communication, and a processing unit 2908 coupled to the touch-sensitive display unit 2902, the rotatable input mechanism unit 2904, and the wireless communication unit 2906.

Processing unit 2908 configured to receive (e.g., with receiving unit 2910), via wireless communication by the wireless communication unit 2906, data representing a collection of photos stored on an external device; enable display (e.g., with display enabling unit 2912), on the touch-sensitive display unit 2902, of a user interface including a user interface object, the user interface object representing the collection of photos; detect (e.g., with detecting unit 2914) a user interaction with the displayed user interface object. Processing unit 2908 is further configured to, in response to detecting the user interaction with the displayed user interface object, enable replacement (e.g., with replacement enabling unit 2916) of the display of the user interface with an image comprising a first representation including a visual representation of a first photo in the collection of photos and a second representation including a visual representation of a second photo in the collection of photos, where the first representation and the second representation are arranged in the image in fixed positions with respect to each other; detect (e.g., with detecting unit 2914) a first point of contact of a contact on the touch-sensitive display unit 2902, wherein the first point of contact corresponds to a first location on the image; determine (e.g., with determining unit 2920) whether the duration of the contact exceeds a predetermined threshold; and, in response to a determination that the duration of the contact exceeds the predetermined threshold, enable display (e.g., with display enabling unit 2912) of an enlarged view of a portion of the image surrounding or adjacent to the first location.

In some embodiments, processing unit 2908 is further configured to detect (e.g., with detecting unit 2914) a translation of the contact along the touch-sensitive display unit 2902 to a second point of contact corresponding to a second location on the image; and in response to detecting the translation of the contact to the second point of contact, enable replacement (e.g., with replacement enabling unit 2916) of the display of the enlarged view of the portion of the image surrounding or adjacent to the first location with an enlarged view of a portion of the image surrounding or adjacent to the second location.

In some embodiments, the enlarged view includes a circular display of the portion of the image.

In some embodiments, the first location is associated with the first representation, and the enlarged view is an image of the first photo.

In some embodiments, the enlarged view is displayed above the point of contact on the touch-sensitive display unit 2902.

In some embodiments, processing unit 2908 is further configured to, in response to a determination that the duration of the contact does not exceed the predetermined threshold, enable maintaining (e.g., with maintaining enabling unit 2922) the display of the image on the touch-sensitive display unit 2902.

In some embodiments, processing unit 2908 is further configured to, in response to a determination that the duration of the contact does not exceed the predetermined threshold, enable replacement (e.g., with replacement enabling unit 2916) of the display of the image with a display of a photo corresponding to the first location on the image.

In some embodiments, processing unit 2908 is further configured to, in response to a determination that the duration of the contact does not exceed the predetermined threshold, enable transition (e.g., with transition enabling unit 2918) from the display of the image to a zoomed-in view of the image centered on the first location on the image.

In some embodiments, the user interface object is an icon representing a photos application program.

In some embodiments, the user interface object is an icon representing an electronic folder containing the collection of photos.

In some embodiments, the first user interaction with the displayed user interface object is a tap gesture.

In some embodiments, the first representation and the second representation are thumbnail images of the corresponding photos.

In some embodiments, the electronic device is a wearable electronic device.

In some embodiments, the external device is a smartphone.

In some embodiments, the first representation and the second representation are arranged in a rectilinear grid pattern.

The operations described above with reference to FIG. 24 are, optionally, implemented by components depicted in FIGS. 1A-1B, and 29. For example, the operations described with reference to blocks 2406, 2408, 2410, 2412, and/or 2414 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B, and 29.

Figure 30:
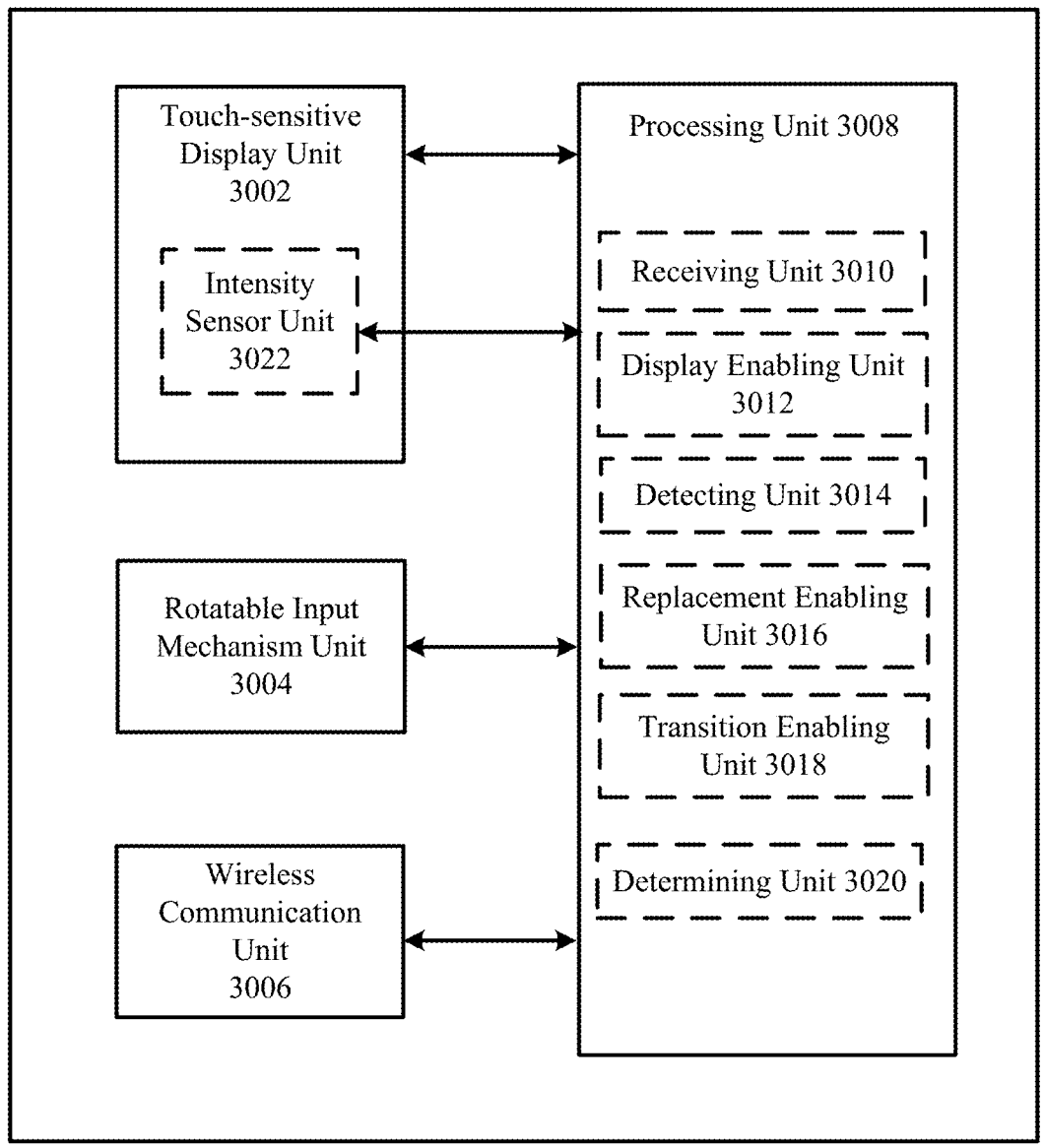
FIG. 30 is a functional block diagram of an electronic device in accordance with some embodiments.

In accordance with some embodiments, FIG. 30 shows a functional block diagram of an electronic device 3000 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 30 are, optionally, combined or separated into sub-blocks to implement the principles of the various described embodiments. Therefore, the description herein optionally supports any possible combination or separation or further definition of the functional blocks described herein.

As shown in FIG. 30, an electronic device 3000 includes a touch-sensitive display unit 3002 configured to display a graphic user interface and receive contacts, where the touch-sensitive display unit 3002 comprises one or more intensity sensor units 3022 to detect the intensity of contacts with the touch-sensitive display unit 3002, a rotatable input mechanism unit 3004 configured to receive rotational input, a wireless communication unit 3006 configured to transmit and receive wireless communication, and a processing unit 3008 coupled to the touch-sensitive display unit 3002, the one or more intensity sensor units 3022, the rotatable input mechanism unit 3004, and the wireless communication unit 3006.

Processing unit 3008 is configured to receive (e.g., with receiving unit 3010), via wireless communication by the wireless communication unit 3006, data representing a first collection of photos and a second collection photos, wherein the first and second collections are stored on an external device; enable display (e.g., with display enabling unit 3012), on the touch-sensitive display unit 3002, of a user interface including a user interface object representing the first collection; detect (e.g., with detecting unit 3014) a user interaction with the user interface object; in response to detecting the user interaction with the user interface object, enable replacement (e.g., with replacement enabling unit 3016) of the display of the user interface with a display of a first image representative of the first collection of photos; detect (e.g., with detecting unit 3014), while the first image is displayed, a contact on the touch-sensitive display unit 3002; determine (e.g., with determining unit 3020) whether the contact has a characteristic intensity above a threshold intensity; and in response to a determination that the characteristic intensity is above the threshold intensity, enable replacement (e.g., with replacement enabling unit 3016) of the display of the first image with a display of a second image representative of the second collection of photos.

In some embodiments, the first image includes a first cover image indicative of the first collection of photos, and the second image includes a second cover image indicative of the second collection of photos.

In some embodiments, the first image comprises a first representation including a visual representation of a first photo in the collection of photos and a second representation including a visual representation of a second photo in the collection of photos, where the first representation and the second representation are arranged in the first image in fixed positions with respect to each other, and where the second image comprises a third representation including a visual representation of a third photo in the second collection of photos and a fourth representation including a visual representation of a fourth photo in the second collection of photos, where the third representation and the fourth representation are arranged in the second image in fixed positions with respect to each other.

In some embodiments, processing unit 3008 is further configured to in response to a determination that the characteristic intensity is not above the threshold intensity, enable transition (e.g., with transition enabling unit 3018) from the display of the first image to a zoomed-in view of the first image.

In some embodiments, processing unit 3008 is further configured to, in response to a determination that the characteristic intensity is not above the threshold intensity, enable replacement (e.g., with replacement enabling unit 3016) of the display of the first image with a display of a photo in the first collection of photos.

In some embodiments, the first representation, the second representation, the third representation, and the fourth representation are thumbnail images of the corresponding photos.

In some embodiments, the first representation and the second representation are arranged in a rectilinear grid pattern in the first image, and the third representation and the fourth representation are arranged in a rectilinear grid pattern in the second image.

In some embodiments, the user interface object is an icon representing a photos application program.

In some embodiments, the user interface object is an icon representing an electronic folder containing the collection of photos.

In some embodiments, the first user interaction with the displayed user interface object is a tap gesture.

In some embodiments, the electronic device is a wearable electronic device.

In some embodiments, the external device is a smartphone.

The operations described above with reference to FIG. 25 are, optionally, implemented by components depicted in FIGS. 1A-1B, and 30. For example, the operations described with reference to blocks 2506, 2508, 2510, 2512, and/or 2514 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B, and 30.

Figure 31:
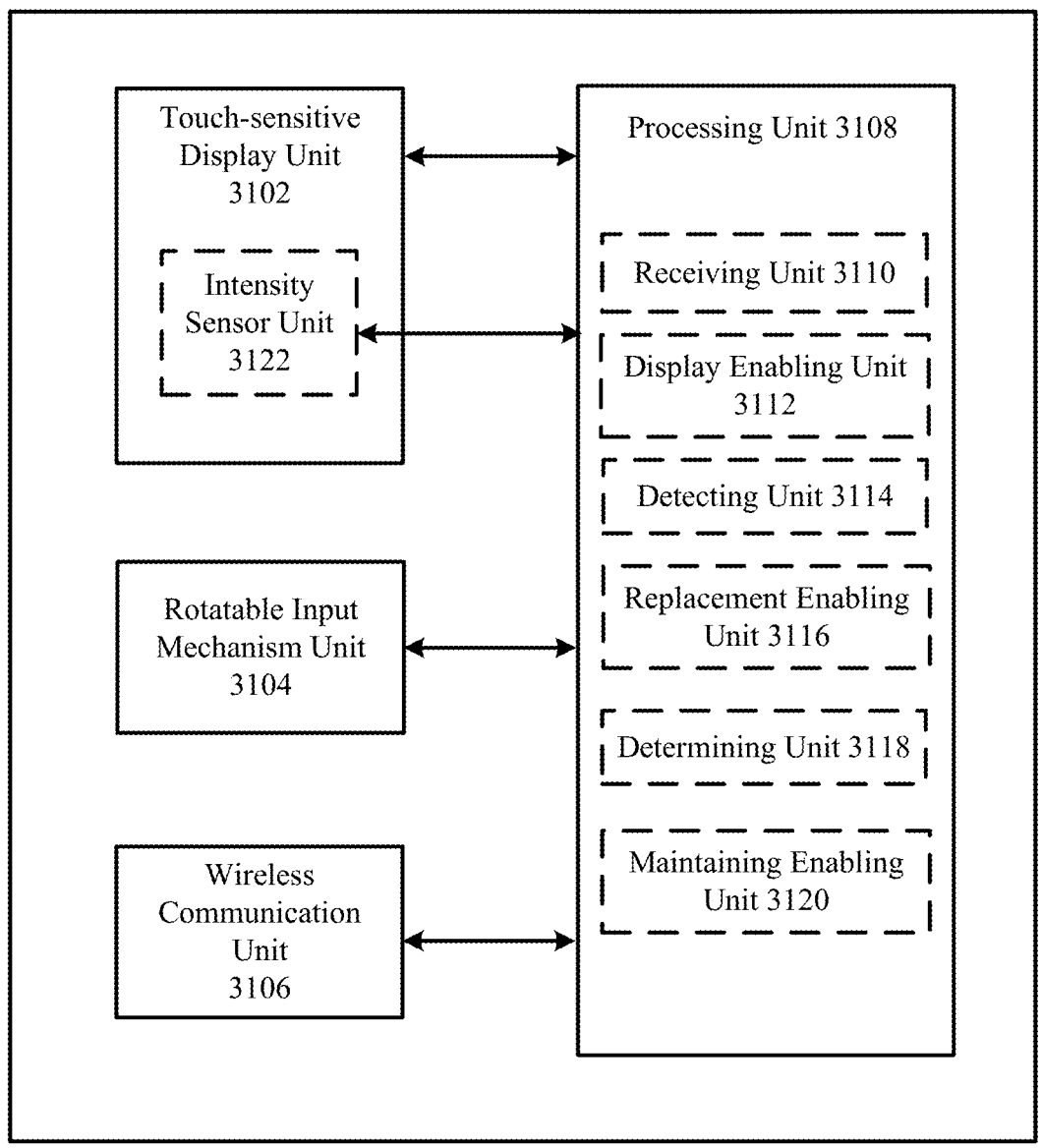
FIG. 31 is a functional block diagram of an electronic device in accordance with some embodiments.

In accordance with some embodiments, FIG. 31 shows a functional block diagram of an electronic device 3100 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 31 are, optionally, combined or separated into sub-blocks to implement the principles of the various described embodiments. Therefore, the description herein optionally supports any possible combination or separation or further definition of the functional blocks described herein.

As shown in FIG. 31, an electronic device 3100 includes a touch-sensitive display unit 3102 configured to display a graphic user interface and receive contacts, where the touch-sensitive display unit 3102 comprises one or more intensity sensor units 3122 to detect the intensity of contacts with the touch-sensitive display unit 3102, a rotatable input mechanism unit 3104 configured to receive rotational input, a wireless communication unit 3106 configured to transmit and receive wireless communication, and a processing unit 3108 coupled to the touch-sensitive display unit 3102, the one or more intensity sensor units 3122, the rotatable input mechanism unit 3104, and the wireless communication unit 3106.

Processing unit 3108 is configured to receive (e.g., with receiving unit 3110), via wireless communication by the wireless communication unit 3106, data representing a collection of photos stored on an external device; enable display (e.g., with display enabling unit 3112), on the touch-sensitive display unit 3102, of at least one of the photos in the collection; detect (e.g., with detecting unit 3114) a contact on the touch-sensitive display unit 3102 at a location of a first photo of the at least one displayed photos; determine (e.g., with determining unit 3118) whether the contact has a characteristic intensity above a threshold intensity; and in response to a determination that the characteristic intensity is above the threshold intensity, enable display (e.g., with display enabling unit 3112) of a user interface menu including at least one user interface object, where the user interface object represents an option to share the first photo or display the first photo as a background of a user interface on the display of the electronic device.

In some embodiments, the user interface comprises the background, a first user interface object indicating a time of day, and a second user interface object indicating a date, wherein the appearance of the second user interface object is blended with the background.

In some embodiments, processing unit 3108 is further configured to, in response to a determination that the characteristic intensity is not above the threshold intensity, enable maintaining (e.g., with maintaining enabling unit 3120) the display of the at least one of the photos in the collection of photos.

In some embodiments, the at least one of the photos in the collection is a first photo, and processing unit 3108 is further configured to, in response to a determination that the characteristic intensity is not above the threshold intensity, enable replacement (e.g., with replacement enabling unit 3116) of the display of the first photo with a display of a second photo in the collection of photos.

In some embodiments, the electronic device is a wearable electronic device.

In some embodiments, the external device is a smartphone.

The operations described above with reference to FIG. 26 are, optionally, implemented by components depicted in FIGS. 1A-1B, and 31. For example, the operations described with reference to blocks 2606, 2608, and/or 2610 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B, and 31.

Figure 32:
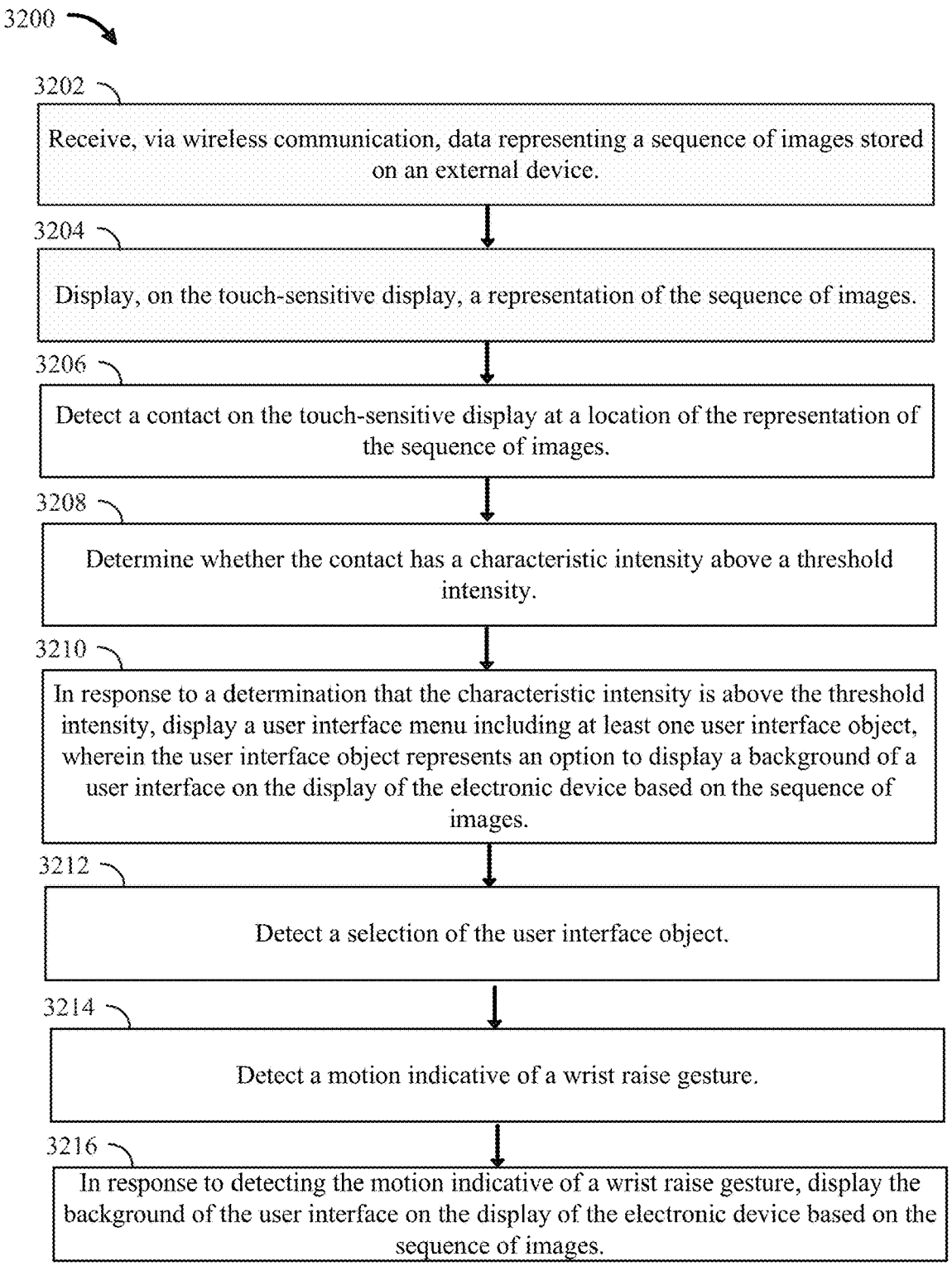
FIG. 32 is a flow diagram illustrating a process for using a sequence of images to display a background on an electronic device in accordance with some embodiments.

FIG. 32 is a flow diagram illustrating a method 3200 for accessing, navigating, and displaying photos using an electronic device in accordance with some embodiments. Method 3200 is performed at a device (e.g., 100, 300, 500) with a touch-sensitive display, a motion sensor, and a rotatable input mechanism. Some operations in method 3200 may be combined, the order of some operations may be changed, and some operations may be omitted.

As described below, method 3200 provides an intuitive way to use a sequence of images for displaying a background of a user interface. The method reduces the cognitive burden on a user when interacting with the background, thereby creating a more efficient human-machine interface. For battery-operated computing devices, enabling a user to view photos more quickly and more efficiently conserves power and increases the time between battery charges.

At block 3202, the device receives, via wireless communication, data representing a sequence of images (e.g., sequence 1780) stored on an external device. At block 3204, the device displays, on the touch-sensitive display, a representation (e.g., 1721) of the sequence of images. At block 3206, the device detects a contact (e.g., touch 1705) on the touch-sensitive display at a location of the representation of the sequence of images. At block 3208, the device determines whether the contact has a characteristic intensity above a threshold intensity. At block 3210, in response to a determination that the characteristic intensity is above the threshold intensity, the device displays a user interface menu (e.g., 1770) including a user interface object, where the user interface object represents an option to display a background of a user interface on the display of the electronic device based on the sequence of images. At block 3212, the device detects a selection of the user interface object. At block 3214, the device detects, with the motion sensor, a motion indicative of a wrist raise gesture. At block 3216, in response to detecting the motion indicative of a wrist raise gesture, the device displays the background of the user interface on the display of the electronic device based on the sequence of images.

Note that details of the processes described above with respect to method 3200 (e.g., FIG. 32) are also applicable in an analogous manner to the methods described above. For example, methods 2200-2600 may include one or more of the characteristics of the various methods described with reference to method 3200.

Figure 33:
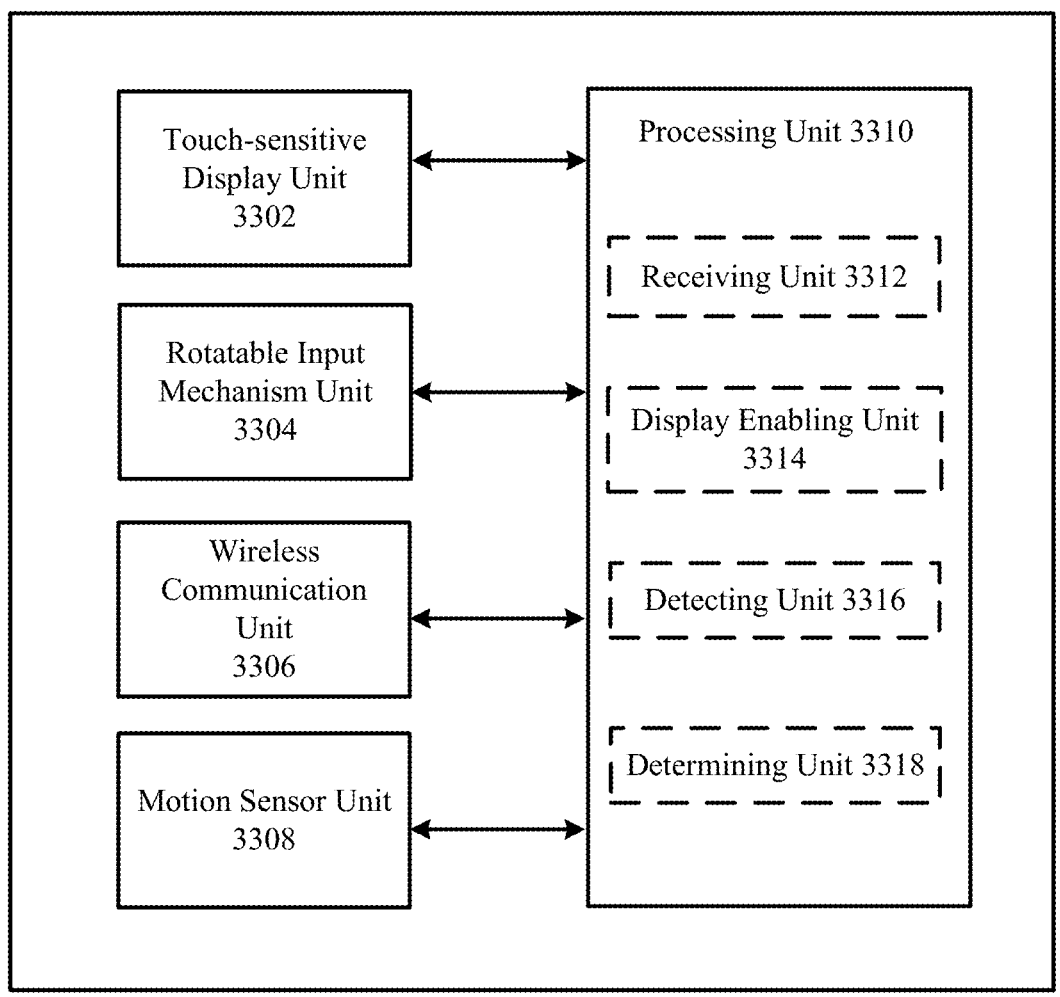
FIG. 33 is a functional block diagram of an electronic device in accordance with some embodiments.

In accordance with some embodiments, FIG. 33 shows a functional block diagram of an electronic device 3300 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 33 are, optionally, combined or separated into sub-blocks to implement the principles of the various described embodiments. Therefore, the description herein optionally supports any possible combination or separation or further definition of the functional blocks described herein.

As shown in FIG. 33, an electronic device 3300 includes a touch-sensitive display unit 3302 configured to display a graphic user interface and receive contacts, a rotatable input mechanism unit 3304 configured to receive rotational input, a wireless communication unit 3306 configured to transmit and receive wireless communication, a motion sensor unit 3308 configured to sense motion indicative of a wrist raise gesture, and a processing unit 3310 coupled to the touch-sensitive display unit 3302, the rotatable input mechanism unit 3304, the wireless communication unit 3306, and the motions sensor unit 3308. In some embodiments, the processing unit 3310 optionally includes a receiving unit 3312, a display enabling unit 3314, a detecting unit 3316, and a determining unit 3318.

Processing unit 3310 is configured to receive (e.g., with receiving unit 3312), via the wireless communication unit 3306, data representing a sequence of images stored on an external device; enable (e.g., with display enabling unit 3314), on the touch-sensitive display unit, display of a representation of the sequence of images; detect (e.g., with detecting unit 3316) a contact on the touch-sensitive display unit at a location of the representation of the sequence of images; determine (e.g., with determining unit 3318) whether the contact has a characteristic intensity above a threshold intensity; in response to a determination that the characteristic intensity is above the threshold intensity, enable (e.g., with display enabling unit 3314) display of a user interface menu including a user interface object, where the user interface object represents an option to display a background of a user interface on the touch-sensitive display unit of the electronic device based on the sequence of images; detect (e.g., with detecting unit 3316) a selection of the user interface object; detect (e.g., with detecting unit 3316), with motion sensor unit 3308, a motion indicative of a wrist raise gesture; and in response to detecting the motion indicative of a wrist raise gesture, enable (e.g., with display enabling unit 3314) display of the background of the user interface on the touch-sensitive display unit of the electronic device based on the sequence of images.

In some embodiments, the sequence of images includes a first image, a last image, and a representative image, and enabling display of the background based on the sequence of images includes enabling display of, in sequence, a first set of one or more images from the sequence of images that are positioned before the representative image and the representative image.

In some embodiments, processing unit 3310 is further configured to: after enabling display of the first set of images, detect (e.g., with detecting unit 3316) a user input; and in response to detecting the user input, enable (e.g., with display enabling unit 3314) display of, in sequence, a second set of one or more images from the sequence of images that are positioned after the representative image including the last image.

In some embodiments, processing unit 3310 is further configured to: after enabling display of the first set of images, detect (e.g., with detecting unit 3316) a user input including a first portion and a second portion after the first portion; in response to the first portion of the user input, enable (e.g., with display enabling unit 3314) display of, in sequence, a second set of one or more images from the sequence of images that are positioned after the representative image; and in response to the second portion of the user input, enable (e.g., with display enabling unit 3314) display of, in sequence, a third set of one or more images from the sequence of images that are positioned after the representative image and the last image, where the one or more images of the second set of images are positioned before the one or more images of the third set of images.

In some embodiments, processing unit 3310 is further configured to: after enabling display of the first set of images, detect (e.g., with detecting unit 3316) a rotation of the rotatable input mechanism; in response to the rotation of the rotatable input mechanism, enable (e.g., with display enabling unit 3314) replacement of the display of the representative image with a second image from the sequence of images; detect (e.g., with detecting unit 3316) a second user input representing a selection of the second image as the representative image; after detecting the second user input representing a selection of the second image as the representative image, detect (e.g., with detecting unit 3316), with motion sensor unit 3308, a second motion indicative of a wrist raise gesture; and in response to detecting the second motion indicative of a wrist raise gesture, enable (e.g., with display enabling unit 3314) display of the background of the user interface on the display of the electronic device based on the sequence of images with the second image as the representative image.

In some embodiments, the sequence of images includes a first image, a last image, and a representative image, and enabling display of the background based on the sequence of images includes enabling display of, in sequence, the representative image and a first set of one or more images from the sequence of images that are positioned after the representative image including the last image.

In some embodiments, processing unit 3310 is further configured to: after enabling display of the first set of images, detect (e.g., with detecting unit 3316) a user input; and in response to detecting the user input, enable (e.g., with display enabling unit 3314) display of, in sequence, a second set of one or more images from the sequence of images that are positioned before the representative image and the representative image.

In some embodiments, processing unit 3310 is further configured to: after enabling display of the first set of images, detect (e.g., with detecting unit 3316) a user input including a first portion and a second portion after the first portion; in response to the first portion of the user input, enable (e.g., with display enabling unit 3314) display of, in sequence, a second set of one or more images from the sequence of images that are positioned before the representative image; and in response to the first portion of the user input, display, in sequence, a third set of one or more images from the sequence of images that are positioned before or include the representative image, where the one or more images of the second set are positioned before the one or more images of third set, the second set includes the first image, and the third set includes the representative image.

In some embodiments, processing unit 3310 is further configured to: after enabling display of the first set of images, detect (e.g., with detecting unit 3316) a rotation of the rotatable input mechanism; in response to the rotation of the rotatable input mechanism, enable (e.g., with display enabling unit 3314) replacement of the display of the last image with a second image from the sequence of images; detect (e.g., with detecting unit 3316) a second user input representing a selection of the second image as the representative image; after detecting the second user input representing a selection of the second image as the representative image, detect (e.g., with detecting unit 3316), with motion sensor unit 3308, a second motion indicative of a wrist raise gesture; and in response to detecting the second motion indicative of a wrist raise gesture, enable (e.g., with display enabling unit 3314) display of the background of the user interface on the display of the electronic device based on the sequence of images with the second image as the representative image.

In some embodiments, the sequence of images includes a first image, a last image, and a representative image, and enabling display of the background based on the sequence of images includes enabling display of, in sequence, a first set of images from the sequence of images including the representative image, one or more images positioned after the representative image, one or more images positioned before the representative image, and the representative image.

In some embodiments, processing unit 3310 is further configured to: after enabling display of the first set of images, detect (e.g., with detecting unit 3316) a user input; and in response to detecting the user input, enable (e.g., with display enabling unit 3314) display of, in sequence, a second set of one or more images from the sequence of images that are positioned after the representative image including the last image.

In some embodiments, processing unit 3310 is further configured to: after enabling display of the first set of images, detect (e.g., with detecting unit 3316) a user input including a first portion and a second portion after the first portion; in response to the first portion of the user input, enable (e.g., with display enabling unit 3314) display of, in sequence, a second set of one or more images from the sequence of images that are positioned after the representative image; and in response to the second portion of the user input, enable (e.g., with display enabling unit 3314) display of, in sequence, a third set of one or more images from the sequence of images that are positioned after the representative image and the last image, where the one or more images of the second set of images is before the one or more images of the third set of images.

In some embodiments, processing unit 3310 is further configured to: after enabling display of the first set of images, detect (e.g., with detecting unit 3316) a rotation of the rotatable input mechanism; in response to the rotation of the rotatable input mechanism, enable (e.g., with display enabling unit 3314) replacement of the display of the representative image with a second image from the sequence of images; detect (e.g., with detecting unit 3316) a second user input representing a selection of the second image as the representative image; after detecting the second user input representing a selection of the second image as the representative image, detect (e.g., with detecting unit 3316), with motion sensor unit 3308, a second motion indicative of a wrist raise gesture; and in response to detecting the second motion indicative of a wrist raise gesture, enable (e.g., with display enabling unit 3314) display of the background of the user interface on the display of the electronic device based on the sequence of images with the second image as the representative image.

In some embodiments, the user interface comprises the background, a first user interface object indicating a time of day, and a second user interface object indicating a date. In some embodiments, the appearance of the second user interface object is blended with the background.

The operations described above with reference to FIG. 32 are, optionally, implemented by components depicted in FIGS. 1A-1B, and 33. For example, operations described with reference to FIG. 32 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

What is claimed is:

1. An electronic device, comprising:
   a touch-sensitive display;
   one or more processors;
   a memory; and
   one or more programs, wherein the one or more programs are stored in the memory and configured to be executed by the one or more processors, the one or more programs including instructions for:
      receiving, via wireless communication, data representing a plurality of photos stored on an external device;
      concurrently displaying, on the touch-sensitive display, two or more photos in the plurality of photos;
      while concurrently displaying the two or more photos, detecting a contact directed to a first photo of the two or more photos that are displayed on the touch-sensitive display;
      in response to detecting the contact directed to the first photo of the two or more photos that are displayed on the touch-sensitive display, displaying a respective user interface object that is different from the first photo and corresponds to a process for setting the first photo as a background of a user interface that represents a clock face on the touch-sensitive display of the electronic device;
      while displaying the respective user interface object, receiving a first set of one or more inputs;
      in response to receiving the first set of one or more inputs, displaying an enlarged subportion of the first photo;
      while displaying the enlarged subportion of the first photo, detecting selection of the respective user interface object; and
      in response to detecting selection of the respective user interface object that was displayed in response to detecting the contact directed to the first photo of the two or more concurrently displayed photos, initiating a process to set the enlarged subportion of the first photo as a background of a user interface that represents a clock face on the touch-sensitive display of the electronic device, wherein the user interface that represents the clock face comprises:
         the background;
         a first user interface object indicating a time of day; and
         a second user interface object indicating a date, wherein the second user interface object is overlaid on the background.

2. The electronic device of claim 1, wherein the one or more programs further include instructions for:
   in response to detecting the contact directed to the first photo of the two or more photos that are displayed on the touch-sensitive display, maintaining the display of the first photo in the plurality of photos.

3. The electronic device of claim 1, wherein the electronic device is a wearable electronic device.

4. The electronic device of claim 1, wherein the plurality of the photos wirelessly received from the external device represents a subset of photos that are designated by a user.

5. The electronic device of claim 1, wherein the electronic device comprises a rotatable input mechanism and wherein the first set of one or more inputs includes movement of the rotatable input mechanism.

6. A non-transitory computer-readable storage medium storing one or more programs, the one or more programs comprising instructions, which when executed by one or more processors of an electronic device with a touch-sensitive display, cause the electronic device to:
   receiving, via wireless communication, data representing a plurality of photos stored on an external device;
   concurrently displaying, on the touch-sensitive display, two or more photos in the plurality of photos;
   while concurrently displaying the two or more photos, detecting a contact directed to a first photo of the two or more photos that are displayed on the touch-sensitive display;
   in response to detecting the contact directed to the first photo of the two or more photos that are displayed on the touch-sensitive display, displaying a respective user interface object that is different from the first photo and corresponds to a process for setting the first photo as a background of a user interface that represents a clock face on the touch-sensitive display of the electronic device;
   while displaying the respective user interface object, receiving a first set of one or more inputs;

in response to receiving the first set of one or more inputs, displaying an enlarged subportion of the first photo;

while displaying the enlarged subportion of the first photo, detecting selection of the respective user interface object; and in response to detecting selection of the respective user interface object that was displayed in response to detecting the contact directed to the first photo of the two or more concurrently displayed photos, initiating a process to set the enlarged subportion of the first photo as a background of a user interface that represents a clock face on the touch-sensitive display of the electronic device, wherein the user interface that represents the clock face comprises:

the background;

a first user interface object indicating a time of day; and a second user interface object indicating a date, wherein the second user interface object is overlaid on the background.

7. The non-transitory computer-readable storage medium of claim 6, wherein the one or more programs further include instructions for:

in response to detecting the contact directed to the first photo of the two or more photos that are displayed on the touch-sensitive display, maintaining the display of the first photo in the plurality of photos.

8. The non-transitory computer-readable storage medium of claim 6, wherein the electronic device is a wearable electronic device.

9. The non-transitory computer-readable storage medium of claim 6, wherein the plurality of the photos wirelessly received from the external device represents a subset of photos that are designated by a user.

10. The non-transitory computer-readable storage medium of claim 6, wherein the electronic device comprises a rotatable input mechanism and wherein the first set of one or more inputs includes movement of the rotatable input mechanism.

11. A method, comprising:

at an electronic device with a touch-sensitive display, wherein the touch-sensitive display:

receiving, via wireless communication, data representing a plurality of photos stored on an external device;

concurrently displaying, on the touch-sensitive display, two or more photos in the plurality of photos;

while concurrently displaying the two or more photos, receiving a first set of one or more inputs;

in response to receiving the first set of one or more inputs, displaying an enlarged subportion of the first photo;

while displaying the enlarged subportion of the first photo, detecting a contact directed to a first photo of the two or more photos that are displayed on the touch-sensitive display;

in response to detecting the contact directed to the first photo of the two or more photos that are displayed on the touch-sensitive display, displaying a respective user interface object that is different from the first photo and corresponds to a process for setting the first photo as a background of a user interface that represents a clock face on the touch-sensitive display of the electronic device;

while displaying the respective user interface object, detecting selection of the respective user interface object; and in response to detecting selection of the respective user interface object that was displayed in response to detecting the contact directed to the first photo of the two or more concurrently displayed photos, initiating a process to set the enlarged subportion of the first photo as a background of a user interface that represents a clock face on the touch-sensitive display of the electronic device, wherein the user interface that represents the clock face comprises:

the background;

a first user interface object indicating a time of day; and a second user interface object indicating a date, wherein the second user interface object is overlaid on the background.

12. The method of claim 11, further comprising:

in response to detecting the contact directed to the first photo of the two or more photos that are displayed on the touch-sensitive display, maintaining the display of the first photo in the plurality of photos.

13. The method of claim 11, wherein the electronic device is a wearable electronic device.

14. The method of claim 11, wherein the plurality of the photos wirelessly received from the external device represents a subset of photos that are designated by a user.

15. The method of claim 11, wherein the electronic device comprises a rotatable input mechanism and wherein the first set of one or more inputs includes movement of the rotatable input mechanism.

* * * * *

UNITED STATES PATENT AND TRADEMARK OFFICE
CERTIFICATE OF CORRECTION

| | |
|---|---|
| PATENT NO. | : 11,402,968 B2 |
| APPLICATION NO. | : 16/775528 |
| DATED | : August 2, 2022 |
| INVENTOR(S) | : Jonathan R. Dascola et al. |

It is certified that error appears in the above-identified patent and that said Letters Patent is hereby corrected as shown below:

On the Title Page

Item (54) and in the Specification, Column 1, Line 1, Delete "IN INTERFACE" and insert -- INTERFACE --.

Signed and Sealed this
Thirteenth Day of December, 2022

Katherine Kelly Vidal
*Director of the United States Patent and Trademark Office*